(12) United States Patent
Deng et al.

(10) Patent No.: US 11,785,210 B2
(45) Date of Patent: Oct. 10, 2023

(54) USE OF GENERAL CONSTRAINT FLAGS IN VIDEO BITSTREAMS

(71) Applicants: Beijing Bytedance Network Technology Co., Ltd., Beijing (CN); Bytedance Inc., Los Angeles, CA (US)

(72) Inventors: Zhipin Deng, Beijing (CN); Li Zhang, San Diego, CA (US); Kai Zhang, San Diego, CA (US); Ye-Kui Wang, San Diego, CA (US); Kui Fan, San Diego, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/887,294

(22) Filed: Aug. 12, 2022

(65) Prior Publication Data
US 2023/0009491 A1 Jan. 12, 2023

Related U.S. Application Data

(63) Continuation of application No. PCT/CN2021/076552, filed on Feb. 10, 2021.

(30) Foreign Application Priority Data

Feb. 14, 2020 (WO) ............... PCT/CN2020/075194

(51) Int. Cl.
*H04N 11/02* (2006.01)
*H04N 19/105* (2014.01)
(Continued)

(52) U.S. Cl.
CPC ......... *H04N 19/105* (2014.11); *H04N 19/117* (2014.11); *H04N 19/119* (2014.11);
(Continued)

(58) Field of Classification Search
CPC .... H04N 19/70; H04N 19/132; H04N 19/139; H04N 19/174; H04N 19/196
(Continued)

(56) References Cited

U.S. PATENT DOCUMENTS

| 9,071,814 | B1 | 6/2015 | Fan et al. |
| 9,654,802 | B2 | 5/2017 | Wang |

(Continued)

FOREIGN PATENT DOCUMENTS

| CN | 101389021 A | 3/2009 |
| CN | 105325003 A | 2/2016 |

(Continued)

OTHER PUBLICATIONS

Document: JVET-Q2001-vB, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 519 pages.

(Continued)

*Primary Examiner* — Jayanti K Patel
*Assistant Examiner* — Richard B Carter
(74) *Attorney, Agent, or Firm* — Conley Rose, P.C.

(57) ABSTRACT

A method includes performing a conversion between a video including video pictures that include one or more subpictures and a bitstream of the video. The bitstream conforms to a format rule specifying that one or more syntax structures are constrained based on a constraint flag of a syntax element that includes general constraints information.

20 Claims, 19 Drawing Sheets

(51) Int. Cl.

| | |
|---|---|
| *H04N 19/174* | (2014.01) |
| *H04N 19/70* | (2014.01) |
| *H04N 19/30* | (2014.01) |
| *H04N 19/82* | (2014.01) |
| *H04N 19/139* | (2014.01) |
| *H04N 19/52* | (2014.01) |
| *H04N 19/573* | (2014.01) |
| *H04N 19/117* | (2014.01) |
| *H04N 19/119* | (2014.01) |
| *H04N 19/167* | (2014.01) |
| *H04N 19/172* | (2014.01) |
| *H04N 19/184* | (2014.01) |
| *H04N 19/196* | (2014.01) |
| *H04N 19/547* | (2014.01) |
| *H04N 19/132* | (2014.01) |

(52) U.S. Cl.
CPC ......... *H04N 19/132* (2014.11); *H04N 19/139* (2014.11); *H04N 19/167* (2014.11); *H04N 19/172* (2014.11); *H04N 19/174* (2014.11); *H04N 19/184* (2014.11); *H04N 19/196* (2014.11); *H04N 19/30* (2014.11); *H04N 19/52* (2014.11); *H04N 19/547* (2014.11); *H04N 19/573* (2014.11); *H04N 19/70* (2014.11); *H04N 19/82* (2014.11)

(58) Field of Classification Search
USPC ........................................ 375/240.16, 240.27
See application file for complete search history.

(56) References Cited

U.S. PATENT DOCUMENTS

| | | | |
|---|---|---|---|
| 10,560,695 | B2 | 2/2020 | Pettersson et al. |
| 11,284,077 | B2 | 3/2022 | Hsu et al. |
| 11,363,307 | B2 | 6/2022 | Chen et al. |
| 11,375,223 | B2 | 6/2022 | Choi et al. |
| 11,490,099 | B2 | 11/2022 | Chang et al. |
| 11,509,914 | B2 | 11/2022 | Kim et al. |
| 2009/0034626 | A1* | 2/2009 | Park .................. H04N 19/70 375/240.27 |
| 2011/0110428 | A1 | 5/2011 | Chang et al. |
| 2012/0008688 | A1 | 1/2012 | Tsai |
| 2013/0003827 | A1 | 1/2013 | Misra et al. |
| 2013/0128970 | A1 | 5/2013 | Yu et al. |
| 2013/0243092 | A1 | 9/2013 | Sugio |
| 2013/0315308 | A1 | 11/2013 | Sugio |
| 2014/0301463 | A1 | 10/2014 | Rusanovskyy |
| 2014/0328398 | A1 | 11/2014 | Chen et al. |
| 2014/0362902 | A1 | 12/2014 | Seregin |
| 2015/0195577 | A1 | 7/2015 | Hannuksela |
| 2015/0304665 | A1 | 10/2015 | Hannuksela |
| 2016/0255359 | A1 | 9/2016 | Yu et al. |
| 2017/0318301 | A1* | 11/2017 | Li .................. H04N 19/70 |
| 2017/0347106 | A1 | 11/2017 | Sasai et al. |
| 2018/0332286 | A1 | 11/2018 | Pettersson et al. |
| 2019/0028734 | A1 | 1/2019 | Naing et al. |
| 2019/0230337 | A1 | 7/2019 | Kim |
| 2019/0379901 | A1 | 12/2019 | Chiang |
| 2020/0053372 | A1 | 2/2020 | Xu |
| 2020/0092545 | A1* | 3/2020 | Xu .................. H04N 19/117 |
| 2020/0186794 | A1 | 6/2020 | Chao |
| 2020/0186795 | A1 | 6/2020 | Wang |
| 2021/0029372 | A1 | 1/2021 | Zhang et al. |
| 2021/0076074 | A1* | 3/2021 | Chang .................. H04N 19/96 |
| 2021/0392362 | A1* | 12/2021 | Sharman .............. H04N 19/70 |
| 2021/0400275 | A1 | 12/2021 | De Lagrange |
| 2022/0150479 | A1* | 5/2022 | Rosewarne .......... H04N 19/119 |
| 2022/0345698 | A1 | 10/2022 | Misra |
| 2022/0394304 | A1 | 12/2022 | Deng et al. |
| 2022/0400291 | A1 | 12/2022 | Hendry |
| 2022/0417564 | A1 | 12/2022 | Hendry |

FOREIGN PATENT DOCUMENTS

| | | |
|---|---|---|
| CN | 105379286 A | 3/2016 |
| CN | 105556967 A | 5/2016 |
| CN | 105723712 A | 6/2016 |
| CN | 109076235 A | 12/2018 |
| CN | 110662057 A | 1/2020 |
| CN | 110719463 A | 1/2020 |
| EP | 4026319 A1 | 7/2022 |
| IL | 264182 A | 2/2019 |
| JP | 2013504936 A | 2/2013 |
| JP | 2016129361 A | 7/2016 |
| TW | 201028011 A | 7/2010 |
| WO | 2015034061 A1 | 3/2015 |
| WO | 2018178507 A1 | 10/2018 |
| WO | 2019009590 A1 | 1/2019 |
| WO | 2019144732 A1 | 8/2019 |
| WO | 2019189279 A1 | 10/2019 |
| WO | 2019221072 A1 | 11/2019 |
| WO | 2020022943 A1 | 1/2020 |
| WO | 2020108652 A1 | 6/2020 |

OTHER PUBLICATIONS

"Series H: Audiovisual and Multimedia Systems Infrastructure of audiovisual services—Coding of moving video High efficiency video coding," Recommendation ITU-T H.265, ISO/IEC 23008-2 (in forceedition), Feb. 2018, 692 pages.

Document: JVET-N1002-v2, Chen, J., et al., "Algorithm description for Versatile Video Coding and Test Model 5(VTM 5)," Joint Video Experts Team (JVET) of ITU-T SG 16 WP 3 and ISO/IEC JTC 1/SC 29/WG 11 14th Meeting: Geneva, CH, Mar. 19-27, 2019, 79 pages.

Li, X., Retrieved From the Internet: https://vcgit.hhi.fraunhofer.de/jvet/VVCSoftware_VTM.git, Nov. 2, 2022, 3 pages.

Document: JVET-Q0259, Samuelsson, J., "AHG9: On Picture Header," Joint Video Experts Team (JVET) of ITU-T SG 16 WP 3 and ISO/IEC JTC I/SC 29/WG 11 17th Meeting: Brussels, BE, Jan. 7-17, 2020, 10 pages.

Document: JVET-Q0426-v3, Sjoberg, R., et al., "AHG9: Picture header enabled flag," Joint Video Experts Team (JVET) of ITU-T SG 16 WP 3 and ISO/IEC JTC 1/SC 29/WG 11 17th Meeting: Brussels, BE, Jan. 7-17, 2020, 15 pages.

Document: JCTVC-O0216_v3, Chen, J., et al., "On slice level information derivation and motion field mapping for resampled interlayer reference picture," Joint Collaborative Team on Video Coding (JCT-VC) of ITU-T SG 16 WP 3 and ISO/IEC JTC 1/SC 29/WG 11 15th Meeting: Geneva, CH, Oct. 23-Nov. 1, 2013, 5 pages.

Document: JVET-Q0994-v1, Chen, L., et al., "AHG9/AHG12: On raster scan slice within a picture," Joint Video Experts Team (JVET) of ITU-T SG 16 WP 3 and ISO/IEC JTC 1/SC 29/WG 11 17th Meeting: Brussels, BE, Jan. 7-17, 2020, 14 pages.

Document: JVET-R0053-v1, Hsiang, S-T., et al., "AHG9: Signalling tile partitioning," Joint Video Experts Team (JVET) of ITU-T SG 16 WP 3 and ISO/IEC JTC 1/SC 29/WG 11 18th Meeting: by teleconference, Apr. 15-24, 2020, 5 pages.

Document: JVET-R0197, Park, N., et al., "AHG12: On signalling of loop filter across tiles and slices enabled flags," Joint Video Experts Team (JVET) of ITU-T SG 16 WP 3 and ISO/IEC JTC 1/SC 29/WG 11 18th Meeting: by teleconference, Apr. 15-24, 2020, 3 pages.

Document: JVET-R0113, Samuelsson, J., et al., "AHG9: On Picture Parameter Set," Joint Video Experts Team (JVET) of ITU-T SG 16 WP 3 and ISO/IEC JTC 1/SC 29/WG 11 18th Meeting: by teleconference, Apr. 15-24, 2020, 3 pages.

Document: JVET-Q0210_r2, Hendry, et al., "[AHG9]: Miscellaneous HLS clean-ups," Joint Video Experts Team (JVET) of ITU-T SG 16 WP 3 and ISO/IEC JTC 1/SC 29/WG 11 17th Meeting: Brussels, BE, Jan. 7-17, 2020, 8 pages.

Document: JVET-Q0413-v1, Chen, J., et al., "AHG9/AHG12: On subpicture partitioning signaling," Joint Video Experts Team (JVET) of ITU-T SG 16 WP 3 and ISO/IEC JTC 1/SC 29/WG 11 17th Meeting: Brussels, BE, Jan. 7-17, 2020, 6 pages.

(56) References Cited

OTHER PUBLICATIONS

Document: JVET-Q0114-v1, Wang, Y-K., et al., "AHG9: A few more general constraints flags," Joint Video Experts Team (JVET) of ITU-T SG 16 WP 3 and ISO/IECJTC I/SC 29/WG 11, 17th Meeting: Brussels, BE, Jan. 7-17, 2020, 3 pages.
Document: JVET-Q0119-v1, Wang, Y-K., et al., "AHG12: Cleanups on signalling of subpictures, tiles, and rectangular slices," Joint Video Experts Team (JVET) of ITU-T SG 16 WP 3 and ISO/IEC JTC 1/SC 29/WG 11, 17th Meeting: Brussels, BE, Jan. 7-17, 2020, 9 pages.
Document: JVET-Q0487-v2, Wan, W., et al., "AHG8: RPR Scaling Window Issues," Joint Video Experts Team (JVET) of ITU-T SG 16 WP 3 and ISO/IEC JTC I/SC 29/WG 11, 17th Meeting: Brussels, BE, Jan. 7-17, 2020, 6 pages.
Foreign Communication From A Related Counterpart Application, International Application No. PCT/CN2021/076531, English Translation of International Search Report dated May 11, 2021, 10 pages.
Foreign Communication From A Related Counterpart Application, International Application No. PCT/CN2021/076539, English Translation of International Search Report dated May 20, 2021, 6 pages.
Foreign Communication From A Related Counterpart Application, International Application No. PCT/CN2021/076539, English Translation of International Search Report dated May 8, 2021, 13 pages.
Foreign Communication From A Related Counterpart Application, International Application No. PCT/CN2021/076542, English Translation of International Search Report dated May 11, 2021, 10 pages.
Foreign Communication From A Related Counterpart Application, International Application No. PCT/CN2021/076546, English Translation of International Search Report dated May 10, 2021, 14 pages.
Foreign Communication From A Related Counterpart Application, International Application No. PCT/CN2021/076547, English Translation of International Search Report dated Apr. 29, 2021, 12 pages.
Foreign Communication From A Related Counterpart Application, International Application No. PCT/CN2021/076550, English Translation of International Search Report dated Apr. 29, 2021, 11 pages.
Foreign Communication From A Related Counterpart Application, International Application No. PCT/CN2021/076551, English Translation of International Search Report dated May 12, 2021, 13 pages.
Foreign Communication From A Related Counterpart Application, International Application No. PCT/CN2021/076552, English Translation of International Search Report dated May 10, 2021, 10 pages.
Document: JCTVC-AC1005-v1, Boyce, J., et al., "HEVC Additional Supplemental Enhancement Information (Draft 4)," Joint Collaborative Team on Video Coding (JCT-VC) of ITU-T SG 16 WP 3 and ISO/IEC JTC 1/SC 29/WG 11 29th Meeting: Macao, CN, Oct. 19-25, 2017, 44 pages.
Document: JVET-P2001-vE, Bross, B., et al., "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 491 pages.
Document: JVET-O2001-vE, Bross, B., et al., "Versatile Video Coding (Draft 6),"Joint Video Experts Team (JVET) of ITU-T SG 16 WP3 and ISO/IEC JTC 1/SC 29/WG 11 15th Meeting: Gothenburg, SE, Jul. 3-12, 2019, 455 pages.

Document: JVET-Q2000-v2, Sullivan, G., et al., "Meeting Report of the 17th Meeting of the Joint Video Experts Team (JVET), Brussels, BE, Jan. 7-17, 2020," Joint Video Experts Team (JVET) of ITU-T SG 16 WP 3 and ISO/IEC UTC 1/SC 29/WG 11 17th Meeting: Brussels, BE, Jan. 7-17, 2020, 378 pages.
Foreign Communication From A Related Counterpart Application, Indian Application No. 202247046311, Indian Office Action dated Nov. 28, 2022, 6 pages.
Foreign Communication From A Related Counterpart Application, Indian Application No. 202247045853, Indian Office Action dated Dec. 22, 2022, 5 pages.
Foreign Communication From A Related Counterpart Application, Indian Application No. 202247046537, Indian Office Action dated Dec. 30, 2022, 6 pages.
Non-Final Office Action dated Jan. 18, 2023, 19 pages, U.S. Appl. No. 17/886,121 filed Aug. 11, 2022, 19 pages.
Notice of Allowance dated Feb. 3, 2023, 17 pages, U.S. Appl. No. 17/887,294, filed Aug. 12, 2022.
Document: JVET-Q2001-vC, Bross, B., et al., "Versatile Video Coding (Draft 8)," Joint Video Experts Team (JVET) of ITU-T SG 16 WP 3 and ISO/IEC JTC 1/SC 29/WG 11, 17th Meeting: Brussels, BE, Jan. 7-17, 2020, 508 pages.
Document: JVET-S2001-v1, Bross, B., et al., "Versatile Video Coding (Draft 10)," Joint Video Experts Team (JVET) of ITU-T SG 16 WP 3 and ISO/IEC JTC 1/SC 29/WG 11, 19th Meeting: by teleconference, Jun. 22-Jul. 1, 2020, 526 pages.
Document: JVET-S0050-v3, Deng, Z., et al., "AHG9: On General constraints information," Joint Video Experts Team (JVET) of ITU-T SG 16 WP 3 and ISO/IEC JTC 1/SC 29/WG 11, 19th Meeting: by teleconference, Jun. 22-Jul. 1, 2020, 9 pages.
Notice of Allowance dated Jan. 30, 2023, 18 pages, U.S. Appl. No. 17/887,275, filed Aug. 12, 2022.
Non-Final Office Action dated Feb. 14, 2023, 19 pages, U.S. Appl. No. 17/886,104, filed Aug. 11, 2022.
Non-Final Office Action dated Feb. 23, 2023, 21 pages, U.S. Appl. No. 17/886,084, filed Aug. 11, 2022.
Foreign Communication From A Related Counterpart Application, European Application No. 21753627.5, Extended European Search Report dated Apr. 13, 2023, 11 pages.
Document: JVET-Q0271-v1, Damghanian, M., et al., "AHG9: On Subpicture Ordering," Joint Video Experts team (JVET) of ITU-T SG 16 WP 3 and ISO/IEC JTC 1/SC 29/WG 11 17th Meeting: Brussels, BE, Jan. 7-17, 2020, 4 pages.
Document: JVET-R0071-v1, Deng, Z., et al., "AHG12: Some cleanups on subpicture signalling," Joint Video Experts team (JVET) of ITU-T SG 16 WP 3 and ISO/IEC JTC 1/SC 29/WG 11 18th Meeting: by teleconference, Apr. 15-24, 2020, 4 pages.
Document: JVET-R2001-v1B, Bross, B., et al., "Versatile Video Coding (Draft 9)," Joint Video Experts Team (JVET) of ITU-T SG 16 WP 3 and ISO/IEC JTC 1/SC 29/WG 11JVET-R2001 (version 11) 18th Meeting: by teleconference Apr. 15-24, 2020, 25 pages.
Foreign Communication From A Related Counterpart Application. European Application No. 21753418.9, Extended European Search Report dated Apr. 24, 2023, 15 pages.

* cited by examiner

3000

3002 performing a conversion between a video unit in a video region of a video and a coded representation of the video, wherein the coded representation conforms to a syntax rule;
  wherein the rule specifies that a first indicator at a video picture level and a second indicator at the video region level are indicative of use of a temporal motion vector prediction coding tool during the conversion; and
  wherein the rule specifies a condition under which the first indicator and/or the second indicator are omitted in the coded representation

910 performing a conversion between a video comprising a video picture that includes a video slice and a bitstream of the video, where the bitstream conforms to a format rule specifying that, in case a slice type of the video slice is type P and temporal motion vector prediction is enabled, usage of reference picture resampling (RPR) for a reference picture in a collocated reference picture list is disabled, the reference picture indicated by a reference index of a collocated picture of the video slice used for the temporal motion vector prediction

FIG. 9

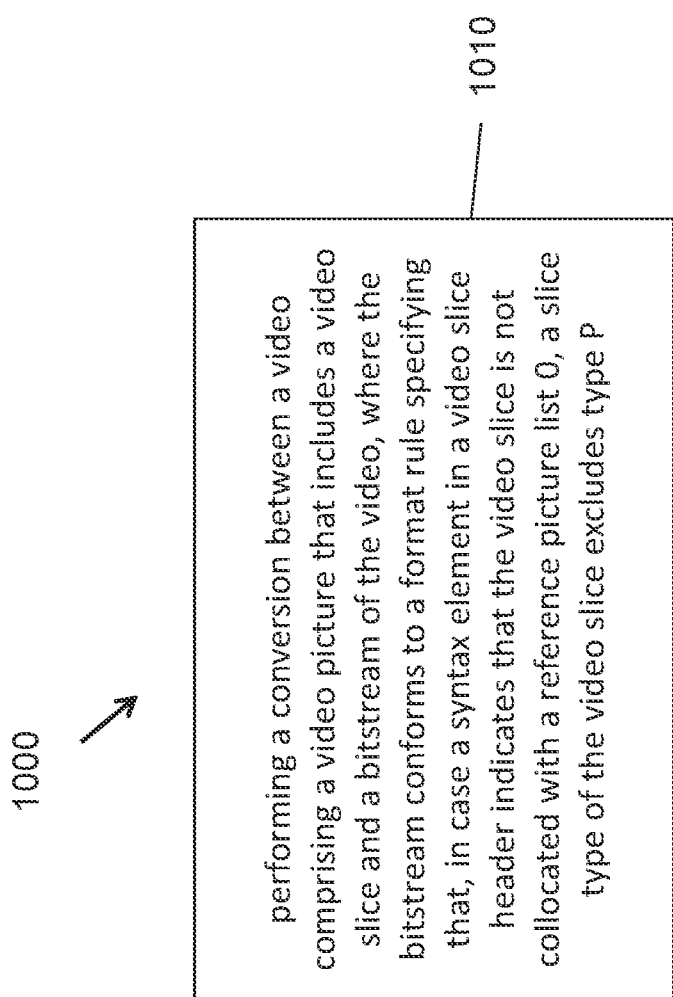

1100

1110 performing a conversion between a video comprising a video picture that includes one or more subpictures and a bitstream of the video, where the bitstream conforms to a format rule specifying that a syntax element indicating whether an operation is performed across a boundary of a subpicture in the coded layer video sequence is selectively included responsive to a number of subpictures in the video picture

FIG. 11

1200 performing a conversion between a video comprising a video picture that includes one or more subpictures and a bitstream of the video, where the bitstream conforms to a format rule specifying that a number of subpictures in the video picture in the bitstream is constrained by a constraint flag in the bitstream — 1210

1300

1310 performing a conversion between a video comprising a video picture that includes one or more subpictures and a bitstream of the video, where the bitstream conforms to a format rule specifying that a number of slices in a subpicture determines a manner of signaling a syntax element indicating a width of a slice, where the width of the slice is specified as a number of tile columns

1510 — performing a conversion between a video comprising video pictures and a bitstream of the video, where at least one of the video pictures includes one or more subpictures and the bitstream conforms to a format rule specifying that, for determining an output sub-bitstream of one or more target subpictures during a subpicture sub-bitstream extraction process of the conversion, each target subpicture across different video pictures uses a same subpicture index

FIG. 15

1700 performing a conversion between a video comprising an instantaneous decoding refresh (IDR) picture and a bitstream of the video, where the bitstream conforms to a format rule specifying that one or more syntax elements associated with a reference picture list are present in a slice header of the IDR picture — 1710

FIG. 17

1800

1810 — performing a conversion between a video comprising luma video blocks and chroma video blocks and a bitstream of the video, where the luma video blocks are partitioned according to luma partition trees and the chroma video blocks are partitioned according to chroma partition trees, where the bitstream includes luma block splitting information indicative of the luma partition trees and chroma block splitting information indicative of the chroma partition trees, and there the bitstream conforms to a rule specifying that the chroma block splitting information is allowed to be different from the luma block splitting information

FIG. 18

1900 performing a conversion between a video comprising video pictures that include one or more subpictures and a bitstream of the video, where the bitstream conforms to a format rule specifying that one or more syntax elements are constrained based on a constraint flag of a syntax structure that includes general constraint flags — 1910

FIG. 19

USE OF GENERAL CONSTRAINT FLAGS IN VIDEO BITSTREAMS

CROSS REFERENCE TO RELATED APPLICATIONS

This application is a continuation of International Patent Application No. PCT/CN2021/076552, filed on Feb. 10, 2021, which claims the priority to and benefits of International Patent Application No. PCT/CN2020/075194, filed on Feb. 14, 2020, all of which are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for video processing in which a conversion is performed between a coded representation of a video and pixel values of the video.

In one example aspect, a video processing method is disclosed. The method includes performing a conversion between a video comprising a video picture that includes a video slice and a bitstream of the video. The bitstream conforms to a format rule specifying that a slice type of the video slice determines a manner by which certain information from a picture header for the video picture is inherited by a slice header of the video slice.

In another example aspect, a video processing method is disclosed. The method includes performing a conversion between a video comprising a video picture that includes a video slice and a bitstream of the video. The bitstream conforms to a format rule specifying that a slice type of the video slice determines a value of a first syntax element in a video slice header. The first syntax element specifies a reference index of a collocated picture used for temporal motion vector prediction.

In another example aspect, a video processing method is disclosed. The method includes performing a conversion between a video comprising a video picture that includes a video slice and a bitstream of the video. The bitstream conforms to a format rule specifying that, in case a slice type of the video slice is type P and temporal motion vector prediction is enabled, usage of reference picture resampling (RPR) for a reference picture in a collocated reference picture list is disabled. The reference picture is indicated by a reference index of a collocated picture of the video slice used for the temporal motion vector prediction.

In another example aspect, a video processing method is disclosed. The method includes performing a conversion between a video comprising a video picture that includes a video slice and a bitstream of the video. The bitstream conforms to a format rule specifying that, in case a syntax element in a video slice header indicates that the video slice is not collocated with a reference picture list 0, a slice type of the video slice excludes type P.

In another example aspect, a video processing method is disclosed. The method includes performing a conversion between a video comprising a video picture that includes one or more subpictures and a bitstream of the video. The bitstream conforms to a format rule specifying that a first syntax element indicating whether an operation is performed across a boundary of a subpicture in the coded layer video sequence is selectively included responsive to a number of subpictures in the video picture.

In another example aspect, a video processing method is disclosed. The method includes performing a conversion between a video comprising a video picture that includes one or more subpictures and a bitstream of the video. The bitstream conforms to a format rule specifying that a number of subpictures in the video picture in the bitstream is constrained by a constraint flag in the bitstream.

In another example aspect, a video processing method is disclosed. The method includes performing a conversion between a video comprising a video picture that includes one or more subpictures and a bitstream of the video. The bitstream conforms to a format rule specifying that a number of slices in a subpicture determines a manner of signalling a syntax element indicating a width of a slice, where the width of the slice is specified as a number of tile columns.

In another example aspect, a video processing method is disclosed. The method includes performing a conversion between a video comprising a video picture that includes one or more subpictures and a bitstream of the video according to a format rule specifying that whether each of the one or more subpictures in the video picture includes a single slice is determined based on a constraint flag.

In another example aspect, a video processing method is disclosed. The method includes performing a conversion between a video comprising video pictures and a bitstream of the video. At least one of the video pictures includes one or more subpictures. The bitstream conforms to a format rule specifying that, for determining an output sub-bitstream of one or more target subpictures during a subpicture sub-bitstream extraction process of the conversion, each target subpicture across different video pictures uses a same subpicture index.

In another example aspect, a video processing method is disclosed. The method includes determining an output sub-bitstream by extracting a sub-bitstream of one or more target subpictures from a bitstream of a video comprising video pictures. At least one of the video pictures includes one or more subpictures and the output sub-bitstream conforms to a format rule specifying that the one or more target subpictures is represented as a single subpicture in the output sub-bitstream.

In another example aspect, a video processing method is disclosed. The method includes performing a conversion between a video comprising an instantaneous decoding refresh (IDR) picture and a bitstream of the video. The bitstream conforms to a format rule specifying that one or more syntax elements associated with a reference picture list are present in a slice header of the IDR picture.

In another example aspect, a video processing method is disclosed. The method includes performing a conversion between a video comprising luma video blocks and chroma video blocks and a bitstream of the video. The luma video blocks are partitioned according to luma partition trees, and the chroma video blocks are partitioned according to chroma partition trees. The bitstream includes luma block splitting information indicative of the luma partition trees and chroma block splitting information indicative of the chroma partition trees. The bitstream conforms to a rule specifying that the chroma block splitting information is allowed to be different from the luma block splitting information.

In another example aspect, a video processing method is disclosed. The method includes performing a conversion between a video comprising video pictures that include one or more subpictures and a bitstream of the video. The bitstream conforms to a format rule specifying that one or more syntax structures are constrained based on a constraint flag of a syntax element that includes general constraints information.

In another example aspect, a video processing method is disclosed. The method includes performing a conversion between a video comprising a video picture that includes a video slice and a bitstream of the video. The bitstream conforms to a format rule specifying that a slice type of the video slice determines a manner by which certain information from a picture header for the video picture is inherited by a slice header of the video slice.

In another example aspect, a video processing method is disclosed. The method includes performing a conversion between a video unit in a video region of a video and a coded representation of the video, wherein the coded representation conforms to a syntax rule. The rule specifies that a first indicator at a video picture level and a second indicator at the video region level are indicative of use of a temporal motion vector prediction coding tool during the conversion. The rule specifies a condition under which the first indicator and/or the second indicator are omitted in the coded representation.

In another example aspect, a video processing method is disclosed. The method includes performing a conversion between a video unit in a video region of a video and a coded representation of the video, wherein the coded representation conforms to a syntax rule; wherein the syntax rule specifies that information of a header at the video region level is inferred as information of a header at the video unit level.

In another example aspect, a video processing method is disclosed. The method includes performing a conversion between a video unit in a video region of a video comprising multiple pictures organized as a layer-wise video sequence and a coded representation of the video; wherein one or more fields in the coded representation indicate a number of subpictures in the video unit.

In another example aspect, a video processing method is disclosed. The method includes performing a conversion between a video unit in a video region of a video comprising multiple pictures organized as a layer-wise video sequence and a coded representation of the video; wherein the coded representation conforms to a format rule that specifies that a value of a second field indicative of a number of subpictures in the video unit controls whether a second field indicating applicability of a cross-subpicture coding tool to the conversion.

In another example aspect, a video processing method is disclosed. The method includes performing a conversion between a video unit in a video region of a video comprising multiple pictures organized as a layer-wise video sequence and a coded representation of the video; wherein the coded representation conforms to a format rule that specifies that a number of subpictures per video unit controls a value of a syntax element in the coded representation.

In another example aspect, a video processing method is disclosed. The method includes performing a conversion between a video unit in a video region of a video comprising multiple pictures organized as a layer-wise video sequence and a coded representation of the video wherein the coded representation conforms to a format rule that specifies that a value of a field indicative of whether a single video slice occurs in a video unit controls a coding characteristic of rectangular slices of the video.

In another example aspect, a video processing method is disclosed. The method includes performing a conversion between a video unit in a video region of a video comprising multiple pictures organized as a layer-wise video sequence and a coded representation of the video; wherein the coded representation conforms to a syntax rule that extracted subpictures across different pictures in the coded representation of the layer-wide video sequence have a same subpicture index.

In another example aspect, a video processing method is disclosed. The method includes performing a conversion between a video unit in a video region of a video comprising multiple pictures organized as a layer-wise video sequence and a coded representation of the video; wherein the coded representation conforms to a syntax rule that a sub-bitstream extracted for a subpicture sub-bitstream conforms to a format of a single subpicture.

In another example aspect, a video processing method is disclosed. The method includes performing a conversion between a video unit in a video region of a video comprising multiple pictures organized as a layer-wise video sequence and a coded representation of the video; wherein the coded representation conforms to a format rule that specifies inclusion of one or more constraint flags that control occurrence of one or more syntax elements in a syntax structure in the coded representation.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclosed. The code embodies one of the methods described herein in the form of processor-executable code.

These, and other, features are described throughout the present document.

BRIEF DESCRIPTION OF DRAWINGS

FIG. 3 is a flowchart for an example method of video processing.

FIG. 9 is a flowchart representation of another method for video processing according to various embodiments of the present disclosure.

FIG. 10 is a flowchart representation of another method for video processing according to various embodiments of the present disclosure.

FIG. 11 is a flowchart representation of another method for video processing according to various embodiments of the present disclosure.

FIG. 13 is a flowchart representation of another method for video processing according to various embodiments of the present disclosure.

FIG. 15 is a flowchart representation of another method for video processing according to various embodiments of the present disclosure.

FIG. 17 is a flowchart representation of another method for video processing according to various embodiments of the present disclosure.

FIG. 18 is a flowchart representation of another method for video processing according to various embodiments of the present disclosure.

FIG. 19 is a flowchart representation of yet another method for video processing according to various embodiments of the present disclosure.

DETAILED DESCRIPTION

Figure 1:
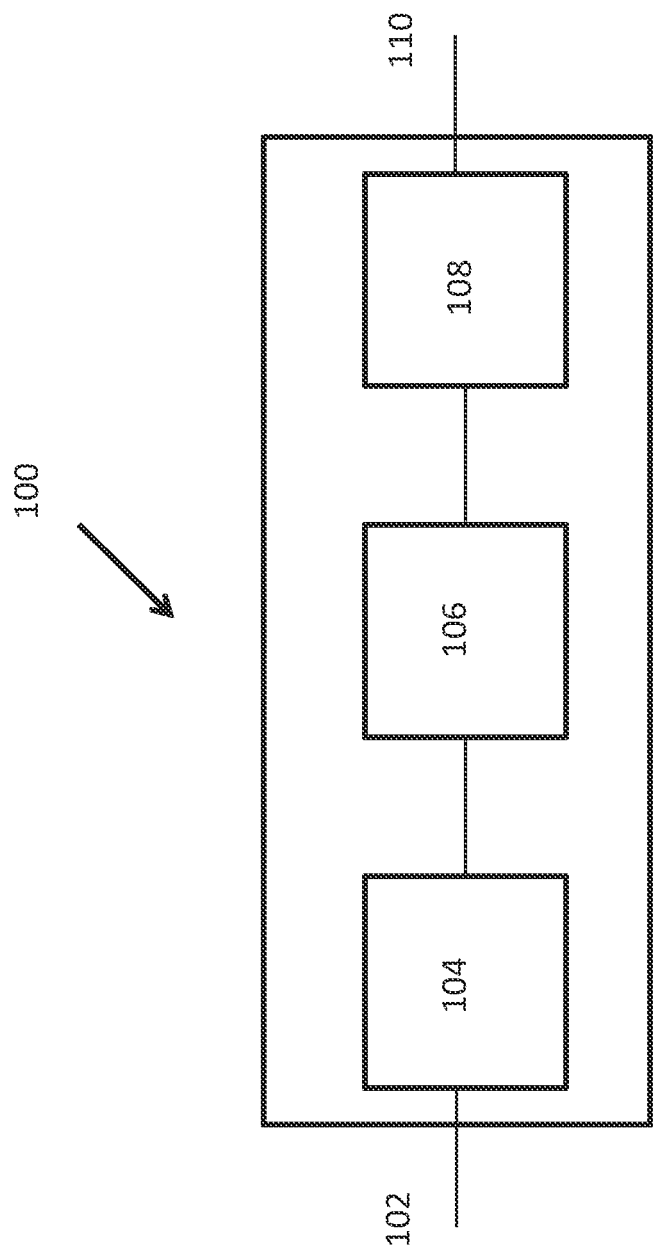
FIG. 1 is a block diagram of an example video processing system.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also. Furthermore, some techniques are described using examples of how current version of the Versatile Video Coding (VVC) standard may be modified by inserting new text (highlighted) or by deleting current text (strikethrough).

This document is related to video coding technologies. Specifically, it is about high level syntax (HLS) and related techniques in video coding. It may be applied to the existing video coding standard like High Efficiency Video Coding (HEVC), or the standard Versatile Video Coding to be finalized. It may be also applicable to future video coding standards or video codec.

Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced MPEG-1 and MPEG-4 Visual, and the two organizations jointly produced the H.262/MPEG-2 Video and H.264/moving pictures experts group (MPEG)-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by video coding experts group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting.

Example Definitions

The following definitions are used in this document.

Access unit (AU): A set of picture units (PUs) that belong to different layers and contain coded pictures associated with the same time for output from the decoded picture buffer (DPB).

Adaptive loop filter (ALF): A filtering process that is applied as part of the decoding process and is controlled by parameters conveyed in an adaptation parameter set (APS).

AC transform coefficient: Any transform coefficient for which the frequency index in at least one of the two dimensions is non-zero.

ALF APS: An APS that controls the ALF process.

Adaptation parameter set (APS): A syntax structure containing syntax elements that apply to zero or more slices as determined by zero or more syntax elements found in slice headers.

Associated IRAP picture (of a particular picture): The previous intra random access point (IRAP) picture in decoding order (when present) having the same value of nuh_layer_id as the particular picture.

Associated non-VCL NAL unit: A non-video coding layer (VCL) network abstraction layer (NAL) unit (when present) for a VCL NAL unit where the VCL NAL unit is the associated VCL NAL unit of the non-VCL NAL unit.

Associated VCL NAL unit: The preceding VCL NAL unit in decoding order for a non-VCL NAL unit with nal_unit_type equal to EOS_NUT, EOB_NUT, SUFFIX_APS_NUT, SUFFIX_SEI_NUT, FD_NUT, RSV_NVCL_27, or in the range of UNSPEC_30 . . . UNSPEC_31; or otherwise the next VCL NAL unit in decoding order.

Bin: One bit of a bin string.

Binarization: A set of bin strings for all possible values of a syntax element.

Binarization process: A unique mapping process of all possible values of a syntax element onto a set of bin strings.

Binary split: A split of a rectangular M×N block of samples into two blocks where a vertical split results in a first (M/2)×N block and a second (M/2)×N block, and a horizontal split results in a first M×(N/2) block and a second M×(N/2) block.

Bin string: An intermediate binary representation of values of syntax elements from the binarization of the syntax element.

Bi-predictive (B) slice: A slice that is decoded using intra prediction or using inter prediction with at most two motion vectors and reference indices to predict the sample values of each block.

Bitstream: A sequence of bits, in the form of a NAL unit stream or a byte stream, that forms the representation of a sequence of AUs forming one or more coded video sequences (CVSs).

Block; A M×N (M-column by N-row) array of samples, or a M×N array of transform coefficients.

Block vector: A two-dimensional vector used for intra block copy (IBC) prediction that provides an offset from the coordinates of the current coding block to the coordinates of the prediction block in the same decoded picture.

Byte: A sequence of 8 bits, within which, when written or read as a sequence of bit values, the left-most and right-most bits represent the most and least significant bits, respectively.

Byte-aligned: A position in a bitstream is byte-aligned when the position is an integer multiple of 8 bits from the position of the first bit in the bitstream, and a bit or byte or syntax element is said to be byte-aligned when the position at which it appears in a bitstream is byte-aligned.

Byte stream; An encapsulation of a NAL unit stream containing start code prefixes and NAL units.

Ban: A term used to refer to behaviour that is allowed, but not necessarily required.

Chroma: An adjective, represented by the symbols Cb and Cr, specifying that a sample array or single sample is representing one of the two colour difference signals related to the primary colours. It is noted that the term chroma is used rather than the term chrominance in order to avoid the implication of the use of linear light transfer characteristics that is often associated with the term chrominance.

Clean random access (CRA) PU: A PU in which the coded picture is a CRA picture.

Clean random access (CRA) picture: An IRAP picture for which each VCL NAL unit has nal_unit_type equal to CRA_NUT. It is noted that CRA picture does not refer to any pictures other than itself for inter prediction in its decoding process, and may be the first picture in the bitstream in decoding order, or may appear later in the bitstream. A CRA picture may have associated RADL or RASL pictures. When a CRA picture has NoOutputBeforeRecoveryFlag equal to 1, the associated RASL pictures are not output by the decoder, because they may not be decodable, as they may contain references to pictures that are not present in the bitstream.

Coded layer video sequence (CLVS): A sequence of PUs with the same value of nuh_layer_id that consists, in decoding order, of a coded layer video sequence start (CLVSS) PU, followed by zero or more PUs that are not CLVSS PUs, including all subsequent PUs up to but not including any subsequent PU that is a CLVSS PU. It is noted that a CLVSS PU may be an instantaneous decoding refresh (IDR) PU, a CRA PU, or a gradual decoding refresh (GDR) PU. The value of NoOutputBeforeRecoveryFlag is equal to 1 for each IDR PU, and each CRA PU that has HandleCraAsCvsStartFlag equal to 1, and each CRA or GDR PU that is the first PU in the layer of the bitstream in decoding order or the first PU in the layer of the bitstream that follows an EOS NAL unit in decoding order.

Coded layer video sequence start (CLVSS) PU: A PU in which the coded picture is a CLVSS picture.

Coded layer video sequence start (CLVSS) picture: A coded picture that is an IRAP picture with NoOutputBeforeRecoveryFlag equal to 1 or a GDR picture with NoOutputBeforeRecoveryFlag equal to 1.

Coded picture: A coded representation of a picture comprising VCL NAL units with a particular value of nuh_layer_id within an AU and containing all CTUs of the picture.

Coded picture buffer (CPB): A first-in first-out buffer containing DUs in decoding order specified in the hypothetical reference decoder.

Coded representation: A data element as represented in its coded form.

Coded video sequence (CVS): A sequence of AUs that consists, in decoding order, of a CVSS AU, followed by zero or more AUs that are not CVSS AUs, including all subsequent AUs up to but not including any subsequent AU that is a CVSS AU.

Coded video sequence start (CVSS) AU: An AU in which there is a PU for each layer in the CV S and the coded picture in each PU is a CLVSS picture.

Coding block: A M×N block of samples for some values of M and N such that the division of a CTB into coding blocks is a partitioning.

Coding tree block (CTB): A N×N block of samples for some value of N such that the division of a component into CIBs is a partitioning.

Coding tree unit (CTU): A CTB of luma samples, two corresponding CTBs of chroma samples of a picture that has three sample arrays, or a CB of samples of a monochrome picture or a picture that is coded using three separate colour planes and syntax structures used to code the samples.

Coding unit (CU): A coding block of luma samples, two corresponding coding blocks of chroma samples of a picture that has three sample arrays, or a coding block of samples of a monochrome picture or a picture that is coded using three separate colour planes and syntax structures used to code the samples.

Component: An array or single sample from one of the three arrays (luma and two chroma) that compose a picture in 4:2:0, 4:2:2, or 4:4:4 colour format or the array or a single sample of the array that compose a picture in monochrome format.

Context variable: A variable specified for the adaptive binary arithmetic decoding process of a bin by an equation containing recently decoded bins.

Deblocking filter: A filtering process that is applied as part of the decoding process in order to minimize the appearance of visual artefacts at the boundaries between blocks.

Decoded picture: A picture produced by applying the decoding process to a coded picture.

Decoded picture buffer (DPB): A buffer holding decoded pictures for reference, output reordering, or output delay specified for the hypothetical reference decoder.

Decoder: An embodiment of a decoding process.

Decoding order: The order in which syntax elements are processed by the decoding process.

Decoding process: The process specified in this Specification that reads a bitstream and derives decoded pictures from it.

Decoding unit (DU): An AU if DecodingUnitHrdFlag is equal to 0 or a subset of an AU otherwise, consisting of one or more VCL NAL units in an AU and the associated non-VCL NAL units.

Emulation prevention byte: A byte equal to 0x03 that is present within a NAL unit when the syntax elements of the bitstream form certain patterns of byte values in a manner that ensures that no sequence of consecutive byte-aligned bytes in the NAL unit can contain a start code prefix.

Encoder: An embodiment of an encoding process.

Encoding process: A process not specified in this Specification that produces a bitstream conforming to this Specification.

Filler data NAL units: NAL units with nal_unit_type equal to FD_NUT.

Flag: A variable or single-bit syntax element that can take one of the two possible values: 0 and 1.

Frequency index: A one-dimensional or two-dimensional index associated with a transform coefficient prior to the application of a transform in the decoding process.

Gradual decoding refresh (GDR) AU: An AU in which the coded picture in each present PU is a GDR picture.

Gradual decoding refresh (GDR) PU: A PU in which the coded picture is a GDR picture.

Gradual decoding refresh (GDR) picture: A picture for which each VCL NAL unit has nal_unit_type equal to GDR_NUT.

Hypothetical reference decoder (HRD): A hypothetical decoder model that specifies constraints on the variability of conforming NAL unit streams or conforming byte streams that an encoding process may produce.

Hypothetical stream scheduler (HSS): A hypothetical delivery mechanism used for checking the conformance of a bitstream or a decoder with regards to the timing and data flow of the input of a bitstream into the hypothetical reference decoder.

Informative: A term used to refer to content provided in this Specification that does not establish any mandatory requirements for conformance to this Specification and thus is not considered an integral part of this Specification.

Instantaneous decoding refresh (IDR) PU: A PU in which the coded picture is an IDR picture.

Instantaneous decoding refresh (IDR) picture: An IRAP picture for which each VCL NAL unit has nal_unit_type equal to IDR_W_RADL or IDR_N_LP. It is noted that an IDR picture does not refer to any pictures other than itself for inter prediction in its decoding process, and may be the first picture in the bitstream in decoding order, or may appear later in the bitstream. Each IDR picture is the first picture of a CVS in decoding order. When an IDR picture for which each VCL NAL unit has nal_unit_type equal to IDR_W_RADL, it may have associated RADL pictures. When an IDR picture for which each VCL NAL unit has nal_unit_type equal to IDR_N_LP, it does not have any associated leading pictures. An IDR picture does not have associated RASL pictures.

Inter-layer reference picture (ILRP): A picture in the same AU with the current picture, with nuh_layer_id less than the nuh_layer_id of the current picture, and is marked as "used for long-term reference".

Inter coding: Coding of a coding block, slice, or picture that uses inter prediction.

Inter prediction: A prediction derived in a manner that is dependent on data elements (e.g., sample values or motion vectors) of one or more reference pictures.

Intra block copy (IBC) prediction: A prediction derived in a manner that is dependent on data elements (e.g., sample values or block vectors) of the same decoded slice without referring to a reference picture.

Intra coding: Coding of a coding block, slice, or picture that uses intra prediction.

Intra prediction: A prediction derived from only data elements (e.g., sample values) of the same decoded slice without referring to a reference picture.

Intra random access point (IRAP) AU: An AU in which there is a PU for each layer in the CVS and the coded picture in each PU an IRAP picture.

Intra random access point (IRAP) PU: A PU in which the coded picture is an IRAP picture.

Intra random access point (IRAP) picture: A coded picture for which all VCL NAL units have the same value of nal_unit_type in the range of IDR_W_RADL to CRA_NUT, inclusive. It is noted that an IRAP picture does not refer to any pictures other than itself for inter prediction in its decoding process, and may be a CRA picture or an IDR picture. The first picture in the bitstream in decoding order may be an IRAP or GDR picture. Provided the necessary parameter sets are available when they need to be referenced, the IRAP picture and all subsequent non-RASL pictures in the CVS in decoding order can be correctly decoded without performing the decoding process of any pictures that precede the IRAP picture in decoding order. It is also noted that the value of mixed_nalu_types_in_pic_flag for an IRAP picture is equal to 0. When mixed_nalu_types_in_pic_flag is equal to 0 for a picture, and any slice of the picture has nal_unit_type in the range of IDR_W_RADL to CRA_NUT, inclusive, all other slices of the picture have the same value of nal_unit_type, and the picture is known to be an IRAP picture.

Intra (I) slice: A slice that is decoded using intra prediction only.

Layer: A set of VCL NAL units that all have a particular value of nuh_layer_id and the associated non-VCL NAL units.

Leading picture: A picture that is in the same layer as the associated IRAP picture and precedes the associated IRAP picture in output order.

Leaf: A terminating node of a tree that is a root node of a tree of depth 0.

Level: A defined set of constraints on the values that may be taken by the syntax elements and variables of this Specification, or the value of a transform coefficient prior to scaling. It is noted that the same set of levels is defined for all profiles, with most aspects of the definition of each level being in common across different profiles. Individual implementations may, within the specified constraints, support a different level for each supported profile.

List 0 (list 1) motion vector: A motion vector associated with a reference index pointing into reference picture list 0 (list 1).

List 0 (list 1) prediction: Inter prediction of the content of a slice using a reference index pointing into reference picture list 0 (list 1).

Luma mapping with chroma scaling (LMCS) APS: An APS that controls the AICS process.

Long-term reference picture (LTRP): A picture with nuh_layer_id equal to the nuh_layer_id of the current picture and marked as "used for long-term reference".

Luma: An adjective, represented by the symbol or subscript Y or L, specifying that a sample array or single sample is representing the monochrome signal related to the primary colours. It is noted that the term luma is used rather than the term luminance in order to avoid the implication of the use of linear light transfer characteristics that is often associated with the term luminance. The symbol L is sometimes used instead of the symbol Y to avoid confusion with the symbol y as used for vertical location.

Luma mapping with chroma scaling (LMCS): A process that is applied as part of the decoding process that maps luma samples to particular values and may apply a scaling operation to the values of chroma samples.

May: A term that is used to refer to behaviour that is allowed, but not necessarily required. It is noted that in some places where the optional nature of the described behaviour is intended to be emphasized, the phrase "may or may not" is used to provide emphasis. This term is used in the present document only to highlight an example embodiment in which the requirement is adopted by a coding standard and not to limit scope of the disclosed technology.

Motion vector: A two-dimensional vector used for inter prediction that provides an offset from the coordinates in the decoded picture to the coordinates in a reference picture.

Multi-type tree: A tree in which a parent node can be split either into two child nodes using a binary split or into three child nodes using a ternary split, each of which may become parent node for another split into either two or three child nodes.

Must: A term that is used in expressing an observation about a requirement or an implication of a requirement that is specified elsewhere in this Specification (used exclusively in an informative context). This term is used in the present document only to highlight an example embodiment in which the requirement is adopted by a coding standard and not to limit scope of the disclosed technology.

Network abstraction layer (NAL) unit: A syntax structure containing an indication of the type of data to follow and bytes containing that data in the form of a raw byte sequence payload (RBSP) interspersed as necessary with emulation prevention bytes.

Network abstraction layer (NAL) unit stream: A sequence of NAL units.

Note: A term that is used to prefix informative remarks (used exclusively in an informative context).

Operation point (OP): A temporal subset of an output layer set (OLS), identified by an OLS index and a highest value of TemporalId.

Output layer: A layer of an output layer set that is output.

Output layer set (OLS): A set of layers consisting of a specified set of layers, where one or more layers in the set of layers are specified to be output layers.

Output layer set (OLS) layer index: An index, of a layer in an OLS, to the list of layers in the OLS.

Output order: The order in which the decoded pictures are output from the DPB (for the decoded pictures that are to be output from the DPB).

Output time: A time when a decoded picture is to be output from the DPB (for the decoded pictures that are to be output from the DPB) as specified by the HRD according to the output timing DPB operation.

Parameter: A syntax element of a sequence parameter set (SPS) or picture parameter set (PPS), or the second word of the defined term quantization parameter.

Partitioning: The division of a set into subsets such that each element of the set is in exactly one of the subsets.

Picture: An array of luma samples in monochrome format or an array of luma samples and two corresponding arrays of chroma samples in 4:2:0, 4:2:2, and 4:4:4 colour format. It is noted that a picture may be either a frame or a field. However, in one CVS, either all pictures are frames or all pictures are fields.

Picture header (PH): A syntax structure containing syntax elements that apply to all slices of a coded picture.

Picture-level slice index: An index of a slice to the list of slices in a picture in the order as they are signalled in the PPS when the rect_slice_flag is equal to 1.

Picture order count (POC): A variable that is associated with each picture, uniquely identifies the associated picture among all pictures in the CLVS, and, when the associated picture is to be output from the DPB, indicates the position of the associated picture in output order relative to the output order positions of the other pictures in the same CLVS that are to be output from the DPB.

Picture parameter set (PPS): A syntax structure containing syntax elements that apply to zero or more entire coded pictures as determined by a syntax element found in each slice header.

Picture unit (PU): A set of NAL units that are associated with each other according to a specified classification rule, are consecutive in decoding order, and contain exactly one coded picture.

Prediction: An embodiment of the prediction process.

Prediction process: The use of a predictor to provide an estimate of the data element (e.g., sample value or motion vector) currently being decoded.

Predictive (P) slice: A slice that is decoded using intra prediction or using inter prediction with at most one motion vector and reference index to predict the sample values of each block.

Predictor: A combination of specified values or previously decoded data elements (e.g., sample value or motion vector) used in the decoding process of subsequent data elements.

Profile: A specified subset of the syntax of this Specification.

Quadtree: A tree in which a parent node can be split into four child nodes, each of which may become parent node for another split into four child nodes.

Quantization parameter: A variable used by the decoding process for scaling of transform coefficient levels.

Random access: The act of starting the decoding process for a bitstream at a point other than the beginning of the stream.

Random access decodable leading (RADL) PU: A PU in which the coded picture is a RADL picture.

Random access decodable leading (RADL) picture: A coded picture for which each VCL NAL unit has nal_unit_type equal to RADL_NUT. It is noted that all RADL pictures are leading pictures. RADL pictures are not used as reference pictures for the decoding process of trailing pictures of the same associated IRAP picture. When field_seq_flag is equal to 0, all RADL pictures, when present, precede, in decoding order, all non-leading pictures of the same associated IRAP picture.

Random access skipped leading (RASL) PU: A PU in which the coded picture is a RASL picture.

Random access skipped leading (RASL) picture: A coded picture for which each VCL NAL unit has nal_unit_type equal to RASL_NUT. It is noted that all RASL pictures are leading pictures of an associated CRA picture. When the associated CRA picture has NoOutputBeforeRecoveryFlag equal to 1, the RASL picture is not output and may not be correctly decodable, as the RASL picture may contain references to pictures that are not present in the bitstream. RASL pictures are not used as reference pictures for the decoding process of non-RASL pictures. When field_seq_flag is equal to 0, all RASL pictures, when present, precede, in decoding order, all non-leading pictures of the same associated CRA picture.

Raster scan: A mapping of a rectangular two-dimensional pattern to a one-dimensional pattern such that the first entries in the one-dimensional pattern are from the first top row of the two-dimensional pattern scanned from left to right, followed similarly by the second, third, etc., rows of the pattern (going down) each scanned from left to right.

Raw byte sequence payload (RBSP): A syntax structure containing an integer number of bytes that is encapsulated in a NAL unit and is either empty or has the form of a string of data bits containing syntax elements followed by a RBSP stop bit and zero or more subsequent bits equal to 0.

Raw byte sequence payload (RBSP) stop bit: A bit equal to 1 present within a raw byte sequence payload (RBSP) after a string of data bits, for which the location of the end within a RBSP can be identified by searching from the end of the RBSP for the RBSP stop bit, which is the last non-zero bit in the RBSP.

Reference index. An index into a reference picture list.

Reference picture: A picture that is a short-term reference picture, a long-term reference picture, or an inter-layer reference picture. It is noted that a reference picture contains samples that may be used for inter prediction in the decoding process of subsequent pictures in decoding order.

Reference picture list: A list of reference pictures that is used for inter prediction of a P or B slice. It is noted that two reference picture lists, reference picture list 0 and reference picture list 1, are generated for each slice of a non-IDR picture. The set of unique pictures referred to by all entries in the two reference picture lists associated with a picture consists of all reference pictures that may be used for inter prediction of the associated picture or any picture following the associated picture in decoding order. For the decoding process of a P slice, only reference picture list 0 is used for inter prediction. For the decoding process of a B slice, both reference picture list 0 and reference picture list 1 are used for inter prediction. For decoding the slice data of an I slice, no reference picture list is used for inter prediction.

Reference picture list 0: The reference picture list used for inter prediction of a P or the first reference picture list used for inter prediction of a B slice.

Reference picture list 1: The second reference picture list used for inter prediction of a B slice.

Reserved: A term that may be used to specify that some values of a particular syntax element are for future use by ITU-T|ISO/IEC and may not be used in bitstreams conforming to this version of this Specification, but may be used in bitstreams conforming to future extensions of this Specification by ITU-T|ISO/IEC.

Residual: The decoded difference between a prediction of a sample or data element and its decoded value.

Scaling: The process of multiplying transform coefficient levels by a factor, resulting in transform coefficients.

Scaling list: A list that associates each frequency index with a scale factor for the scaling process.

Scaling list APS: An APS with syntax elements used to construct the scaling lists.

Sequence parameter set (SPS): A syntax structure containing syntax elements that apply to zero or more entire CLVSs as determined by the content of a syntax element found in the PPS referred to by a syntax element found in each picture header.

Shall: A term used to express mandatory requirements for conformance to this Specification. It is noted that, when used to express a mandatory constraint on the values of syntax elements or on the results obtained by operation of the specified decoding process, it is the responsibility of the encoder to ensure that the constraint is fulfilled. When used in reference to operations performed by the decoding process, any decoding process that produces identical cropped decoded pictures to those output from the decoding process described in this Specification conforms to the decoding process requirements of this Specification. This term is used in the present document only to highlight an example embodiment in which the requirement is adopted by a coding standard and not to limit scope of the disclosed technology.

Short-term reference picture (STRP): A picture with nuh_layer_id equal to the nuh_layer_id of the current picture and marked as "used for short-term reference".

Should: A term used to refer to behaviour of an implementation that is encouraged to be followed under antici-pated ordinary circumstances, but is not a mandatory requirement for conformance to this Specification. This term is used in the present document only to highlight an example embodiment in which the requirement is adopted by a coding standard and not to limit scope of the disclosed technology.

Slice: An integer number of complete tiles or an integer number of consecutive complete CTU rows within a tile of a picture that are exclusively contained in a single NAL unit.

Slice header: A part of a coded slice containing the data elements pertaining to all tiles or CTU rows within a tile represented in the slice.

Source: A term used to describe the video material or some of its attributes before encoding.

Start code prefix: A unique sequence of three bytes equal to 0x000001 embedded in the byte stream as a prefix to each NAL unit. It is noted that the location of a start code prefix can be used by a decoder to identify the beginning of a new NAL unit and the end of a previous NAL unit. Emulation of start code prefixes is prevented within NAL units by the inclusion of emulation prevention bytes.

Step-wise temporal sublayer access (STSA) PU: A PU in which the coded picture is an STSA picture.

Step-wise temporal sublayer access (STSA) picture: A coded picture for which each VCL NAL unit has nal_unit_type equal to STSA_NUT. It is noted that a STSA picture does not use pictures with the same TemporalId as the STSA picture for inter prediction reference. Pictures following a STSA picture in decoding order with the same TemporalId as the STSA picture do not use pictures prior to the STSA picture in decoding order with the same TemporalId as the STSA picture for inter prediction reference. An STSA picture enables up-switching, at the STSA picture, to the sublayer containing the STSA picture, from the immediately lower sublayer. STSA pictures may have TemporalId greater than 0.

String of data bits (SODB): A sequence of some number of bits representing syntax elements present within a raw byte sequence payload prior to the raw byte sequence payload stop bit, where the left-most bit is considered to be the first and most significant bit, and the right-most bit is considered to be the last and least significant bit.

Sub-bitstream extraction process: A specified process by which NAIL units in a bitstream that do not belong to a target set, determined by a target OLS index and a target highest TemporalId, are removed from the bitstream, with the output sub-bitstream consisting of the NAL units in the bitstream that belong to the target set.

Sublayer: A temporal scalable layer of a temporal scalable bitstream, consisting of VCL NAL units with a particular value of the TemporalId variable and the associated non-VCL NAL units.

Sublayer representation: A subset of the bitstream consisting of NAL, units of a particular sublayer and the lower sublayers.

Subpicture: A rectangular region of one or more slices within a picture.

Subpicture-level slice index: An index of a slice to the list of slices in a subpicture in the order as they are signalled in the PPS when the rect_slice_flag is equal to 1.

Supplemental enhancement information (SEI) message: A syntax structure with specified semantics that conveys information that is not needed by the decoding process in order to determine the values of the samples in decoded pictures.

Syntax element: An element of data represented in the bitstream.

Syntax structure: Zero or more syntax elements present together in the bitstream in a specified order.

Ternary split: A split of a rectangular M×N block of samples into three blocks where a vertical split results in a first (M/4)×N block, a second (M/2)×N block, a third (M/4)×N block, and a horizontal split results in a first M×(N/4) block, a second M×(N/2) block, a third M×(N/4) block.

Tier: A specified category of level constraints imposed on values of the syntax elements in the bitstream, where the level constraints are nested within a tier and a decoder conforming to a certain tier and level would be capable of decoding all bitstreams that conform to the same tier or the lower tier of that level or any level below it.

Tile: A rectangular region of CTUs within a particular tile column and a particular tile row in a picture.

Tile column: A rectangular region of CTUs having a height equal to the height of the picture and a width specified by syntax elements in the picture parameter set.

Tile row: A rectangular region of CTUs having a height specified by syntax elements in the picture parameter set and a width equal to the width of the picture.

Tile scan: A specific sequential ordering of CTLs partitioning a picture in which the CTUs are ordered consecutively in CTU raster scan in a tile whereas tiles in a picture are ordered consecutively in a raster scan of the tiles of the picture.

Trailing picture: A non-IRAP picture that follows the associated IRAP picture in output order and is not a STSA picture. It is noted that trailing pictures associated with an IRAP picture also follow the IRAP picture in decoding order. Pictures that follow the associated IRAP picture in output order and precede the associated IRAP picture in decoding order are not allowed.

Transform: A part of the decoding process by which a block of transform coefficients is converted to a block of spatial-domain values.

Transform block: A rectangular M×N block of samples resulting from a transform in the decoding process.

Transform coefficient: A scalar quantity, considered to be in a frequency domain, that is associated with a particular one-dimensional or two-dimensional frequency index in a transform in the decoding process.

Transform coefficient level: An integer quantity representing the value associated with a particular two-dimensional frequency index in the decoding process prior to scaling for computation of a transform coefficient value.

Transform unit (TU): A transform block of luma samples and two corresponding transform blocks of chroma samples of a picture when using a single coding unit tree for luma and chroma; or, a transform block of luma samples or two transform blocks of chroma samples when using two separate coding unit trees for luma and chroma, and syntax structures used to transform the transform block samples.

Tree: A tree is a finite set of nodes with a unique root node.

Unspecified: A term that may be used to specify some values of a particular syntax element to indicate that the values have no specified meaning in this Specification and will not have a specified meaning in the future as an integral part of future versions of this Specification.

Video coding layer (VCL) NAL unit: A collective term for coded slice NAL units and the subset of NAL units that have reserved values of nal_unit_type that are classified as VCL NAL units in this Specification.

Some example bitstream and picture formats, partitionings, scanning processes and neighbouring relationships are described as follows.

6.3 Partitioning of Pictures, Subpictures, Slices, Tiles, and CTUs 6.3.2 Block, Quadtree and Multi-Type Tree Structures The samples are processed in units of CTBs. The array size for each luma CTB in both width and height is CtbSizeY in units of samples. The width and height of the array for each chroma CTB are CtbWidthC and CtbHeightC, respectively, in units of samples.

Each CTB is assigned a partition signalling to identify the block sizes for intra or inter prediction and for transform coding. The partitioning is a recursive quadtree partitioning. The root of the quadtree is associated with the CTB. The quadtree is split until a leaf is reached, which is referred to as the quadtree leaf. When the component width is not an integer number of the CTB size, the CTBs at the right component boundary are incomplete. When the component height is not an integer multiple of the CTB size, the CTBs at the bottom component boundary are incomplete. The coding block is the root node of two trees, the prediction tree and the transform tree. The prediction tree specifies the position and size of prediction blocks. The transform tree specifies the position and size of transform blocks. The splitting information for luma and chroma is identical for the prediction tree and may or may not be identical for the transform tree. The blocks and associated syntax structures are grouped into "unit" structures as follows:

- One transform block (monochrome picture or separate_colour_plane_flag is equal to 1) or three transform blocks (luma and chroma components of a picture in 4:2:0, 4:2:2 or 4:4:4 colour format) and the associated transform syntax structures units are associated with a transform unit.
- One coding block (monochrome picture or separate_colour_plane_flag is equal to 1) or three coding blocks (luma and chroma), the associated coding syntax structures and the associated transform units are associated with a coding unit.
- One CTB (monochrome picture or separate_colour_plane_flag is equal to 1) or three CTBs (luma and chroma), the associated coding tree syntax structures and the associated coding units are associated with a CTU.

7 Syntax and Semantics 7.3 Syntax in Tabular Form 7.3.1 NAL Unit Syntax 7.3.1.1 General NAL Unit Syntax

| | Descriptor |
|---|---|
| nal_unit( NumBytesInNalUnit ) { | |
|   nal_unit_header( ) | |
|   NumBytesInRbsp = 0 | |
|   for( i = 2; i < NumBytesInNalUnit; i++ ) | |
|     if( i + 2 < NumBytesInNalUnit && next_bits( 24 ) = = 0x000003 ) { | |
|       rbsp_byte[ NumBytesInRbsp++ ] | b(8) |
|       rbsp_byte[ NumBytesInRbsp++ ] | b(8) |
|       i += 2 | |
|       emulation_prevention_three_byte /* equal to 0x03 */ | f(8) |
|     } else | |
|       rbsp_byte[ NumBytesInRbsp++ ] | b(8) |
| } | |

7.3.1.2 NAL Unit Header Syntax

| | Descriptor |
|---|---|
| nal_unit_header( ) { | |
|   forbidden_zero_bit | f(1) |
|   nuh_reserved_zero_bit | u(1) |
|   nuh_layer_id | u(6) |
|   nal_unit_type | u(5) |
|   nuh_temporal_id_plus1 | u(3) |
| } | |

7.3.2 Raw Byte Sequence Payloads, Trailing Bits and Byte Alignment Syntax

7.3.2.1 Decoding Capability Information RBSP Syntax

| | Descriptor |
|---|---|
| decoding_capability_information_rbsp( ) { | |
|   dci_max_sublayers_minus1 | u(3) |
|   dci_reserved_zero_bit | u(1) |
|   dci_num_ptls_minus1 | u(4) |
|   for( i = 0; i <= dci_num_ptls_minus1; i++ ) | |
|     profile_tier_level( 1, 0) | |
|   dci_extension_flag | u(1) |
|   if( dci_extension_flag ) | |
|     while( more_rbsp_data( ) ) | |
|       dci_extension_data_flag | u(1) |
|   rbsp_trailing_bits( ) | |
| } | |

7.3.2.2 Video Parameter Set RBSP Syntax

| | Descriptor |
|---|---|
| video_parameter_set_rbsp( ) { | |
|   vps_video_parameter_set_id | u(4) |
|   vps_max_layers_minus1 | u(6) |
|   vps_max_sublayers_minus1 | u(3) |
|   if( vps_max_layers_minus1 > 0 && vps_max_sublayers_minus1 > 0 ) | |
|     vps_all_layers_same_num_sublayers_flag | u(1) |
|   if( vps_max_layers_minus1 > 0 ) | |
|     vps_all_independent_layers_flag | u(1) |
|   for( i = 0; i <= vps_max_layers_minus1; i++ ) { | |
|     vps_layer_id[ i ] | u(6) |
|     if( i > 0 && !vps_all_independent_layers_flag ) { | |
|       vps_independent_layer_flag[ i ] | u(1) |
|       if( !vps_independent_layer_flag[ i ] ) { | |
|         for( j = 0; j < i; j++) | |
|           vps_direct_ref_layer_flag[ i ][ j ] | u(1) |
|         max_tid_ref_present_flag[ i ] | u(1) |
|         if( max_tid_ref_resent_flag[ i ] ) | |
|           max_tid_il_ref_pics_plus1[ i ] | u(3) |
|       } | |
|     } | |
|   } | |
|   if( vps_max_layers_minus1 > 0 ) { | |
|     if( vps_all_independent_layers_flag ) | |
|       each_layer_is_an_ols_flag | u(1) |
|     if( !each_layer_is_an_ols_flag ) { | |
|       if( !vps_all_independent_layers_flag ) | |
|         ols_mode_idc | u(2) |
|       if( ols_mode_idc = = 2 ) { | |
|         num_output_layer_sets_minus1 | u(8) |
|         for( i = 1; i <= num_output_layer_sets_minus1; i ++) | |
|           for( j = 0; j <= vps_max_layers_minus1; j++ ) | |
|             ols_output_layer_flag[ i ][ j ] | u(1) |
|       } | |
|     } | |
|   } | |
|   vps_num_ptls_minus1 | u(8) |
|   for( i = 0; i <= vps_num_ptls_minus1; i++ ) { | |
|     if( i > 0) | |
|       pt_present_flag[ i ] | u(1) |
|     if( vps_max_sublayers_minus1 > 0 && !vps_all_layers_same_num_sublayers_flag ) | |
|       ptl_max_temporal_id[ i ] | u(3) |
|   } | |
|   while( !byte_aligned( ) ) | |
|     vps_ptl_alignment_zero_bit /* equal to 0 */ | f(1) |
|   for( i = 0; i <= vps_num_ptls_minus1; i++ ) | |
|     profile_tier_level( pt_present_flag[ i ], ptl_max_temporal_id[ i ] ) | |
|   for( i = 0, i < TotalNumOlss; i++ ) | |
|     if( vps_num_ptls_minus1 > 0 ) | |
|       ols_ptl_idx[ i ] | u(8) |
|   if( !vps_all_independent_layers_flag) | |
|     vps_num_dpb_params | ue(v) |
|   if( vps_num_dpb_params > 0 && vps_max_sublayers_minus1 > 0 ) | |
|     vps_sublayer_dpb_params_present_flag | u(1) |

-continued

| | Descriptor |
|---|---|
| for( i = 0; i < vps_num_dpb_params; i++ ) { | |
|   if( vps_max_sublayers_minus1 > 0 && !vps_all_layers_same_num_sublayers_flag ) | |
|     dpb_max_temporal_id[ i ] | u(3) |
|   dpb_parameters( dpb_max_temporal_id[ i ], vps_sublayer_dpb_params_present_flag ) | |
| } | |
| for( i = 0, i < TotalNumOlss; i++ ) { | |
|   if( NumLayersInOls[ i ] > 1 ) { | |
|     ols_dpb_pic_width[ i ] | ue(v) |
|     ols_dpb_pic_height[ i ] | ue(v) |
|     if( vps_num_dpb_params > 1 ) | |
|       ols_dpb_params_idx[ i ] | ue(v) |
|   } | |
| } | |
| if( !each_layer_is_an_ols_flag ) | |
|   vps_general_hrd_params_present_flag | u(1) |
| if( vps_general_hrd_params_present_flag ) { | |
|   general_hrd_parameters( ) | |
|   if( vps_max_sublayers_minus 1 > 0 ) | |
|     vps_sublayer_cpb_params_present_flag | u(1) |
|   num_ols_hrd_params_minus1 | ue(v) |
|   for( i = 0; i <= num_ols_hrd_params_minus1; i++ ) { | |
|     if( vps_max_sublayers_minus1 > 0 && !vps_all_layers_same_num_sublayers_flag ) | |
|       hrd_max_tid[ i ] | u(3) |
|     firstSubLayer = vps_sublayer_cpb_params_present_flag ? 0 : hrd_max_tid[ i ] | |
|     ols_hrd_parameters( firstSubLayer, hrd_max_tid[ i ] ) | |
|   } | |
|   if( num_ols_hrd_params_minus1 + 1 != TotalNumOlss && num_ols_hrd_params_minus1 > 0 ) | |
|     for( i = 1 ; i < TotalNumOlss; i++ ) | |
|       if( NumLayersInOls[ i ] > 1 ) | |
|         ols_hrd_idx[ i ] | ue(v) |
| } | |
| vps_extension_flag | u(1) |
| if( vps_extension_flag ) | |
|   while( more_rbsp_data( ) ) | |
|     vps_extension_data_flag | u(1) |
| rbsp_trailing_bits( ) | |
| } | |

7.3.2.3 Sequence Parameter Set RBSP Syntax

| | Descriptor |
|---|---|
| seq_parameter_set_rbsp( ) { | |
|   sps_seq_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sublayers_minus1 ) | |
|   gdr_enabled_flag | u(1) |
|   chroma_format_idc | u(2) |
|   if( chroma_format_idc = = 3 ) | |
|     separate_colour_plane_flag | u(1) |
|   res_change_in_clvs_allowed_flag | u(1) |
|   pic_width_max_in _luma_samples | ue(v) |
|   pic_height_max_in_luma_samples | ue(v) |
|   sps_conformance_window_flag | u(1) |
|   if( sps_conformance_window_flag ) { | |
|     sps_conf_win_left_offset | ue(v) |
|     sps_conf_win_right_offset | ue(v) |
|     sps_conf_win_top_offset | ue(v) |
|     sps_conf_win_bottom_offset | ue(v) |
|   } | |
|   sps_log2_ctu_size_minus5 | u(2) |
|   subpic_info_present_flag | u(1) |
|   if( subpic_info_present_flag ) { | |
|     sps_num_subpics_minus1 | ue(v) |
|     sps_independent_subpics_flag | u(1) |

-continued

| | Descriptor |
|---|---|
| for( i = 0; sps_num_subpics_minus1 > 0 && i <= sps_num_subpics_minus1; i++ ) { | |
|   if( i > 0 && pic_width_max_in_luma_samples > CtbSizeY ) | |
|     subpic_ctu_top_left_x[ i ] | u(v) |
|   if( i > 0 && pic_height_max_in_luma_samples > CtbSizeY ) { | |
|     subpic_ctu_top_left_y[ i ] | u(v) |
|   if( i < sps_num_subpics_minus1 && pic_width_max_in_luma_samples > CtbSizeY ) | |
|     subpic_width_minus1[ i ] | u(v) |
|   if( i < sps_num_subpics_minus1 && pic_height_max_in_luma_samples > CtbSizeY ) | |
|     subpic_height_minus1[ i ] | u(v) |
|   if( !sps_independent_subpics_flag ) { | |
|     subpic_treated_as_pic_flag[ i ] | u(1) |
|     loop_filter_across_subpic_enabled_flag[ i ] | u(1) |
|   } | |
| } | |
| sps_subpic_id_len_minus1 | ue(v) |
| subpic_id_mapping_explicitly_signalled_flag | u(1) |
| if( subpic_id_mapping_explicitly_signalled_flag ) { | |
|   subpic_id_mapping_in_sps_flag | u(1) |
|   if( subpic_id_mapping_in_sps_flag ) | |
|     for( i = 0; i <= sps_num_subpics_minus1; i++ ) | |
|       sps_subpic_id[ i ] | u(v) |
| } | |
| bit_depth_minus8 | ue(v) |
| sps_entropy_coding_sync_enabled_flag | u(1) |
| if( sps_entropy_coding_sync_enabled_flag ) | |
|   sps_wpp_entry_point_offsets_present_flag | u(1) |
| sps_weighted_pred_flag | u(1) |
| sps_weighted_bipred_flag | u(1) |
| log2_max_pic_order_cnt_lsb_minus4 | u(4) |
| sps_poc_msb_flag | u(1) |
| if( sps_poc_msb_flag ) | |
|   poc_msb_len_minus1 | ue(v) |
| num_extra_ph_bits_bytes | u(2) |
|   extra_ph_bits_struct( num_extra_ph_bits_bytes ) | |
| num_extra_sh_bits_bytes | u(2) |
|   extra_sh_bits_struct_(num_extra_sh_bits_bytes ) | |
| if( sps_max_sublayers_minus 1 > 0 ) | |
|   sps_sublayer_dpb_params_flag | u(1) |
| if( sps_ptl_dpb_hrd_params_present_flag ) | |
|   dpb_parameters( sps_max_sublayers_minus1, sps_sublayer_dpb_params_flag ) | |
| long_term_ref_pics_flag | u(1) |
| inter_layer_ref_pics_present_flag | u(1) |
| sps_idr_rpl_present_flag | u(1) |
| rpl1_same_as_rpl0_flag | u(1) |
| for( i = 0; i < !rpl1_same_as_rpl0_flag ? 2 : 1; i++ ) { | |
|   num_ref_pic_lists_in_sps[ i ] | ue(v) |
|   for( j = 0, j < num_ref_pic_lists_in_sps[ i ]; j++ ) | |
|     ref_pic_list_struct( i, j ) | |
| } | |
| if( ChromaArrayType !== 0 ) | |
|   qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { | |
|   sps_log2_diff_max_bt_min_qt_inter_slice | ue(v) |
|   sps_log2_diff_max_tt_min_qt_inter_slice | ue(v) |
| } | |
| if( qtbtt_dual_tree_intra_flag ) { | |
|   sps_log2_diff_min_qt_min_cb_intra_slice_chroma | ue(v) |
|   sps_max_mtt_hierarchy_depth_intra_slice_chroma | ue(v) |
|   if( sps_max_mtt_hierarchy_depth_intra_slice_chroma != 0 ) { | |

-continued

| | Descriptor |
|---|---|
|       sps_log2_diff_max_bt_min_qt_intra slice chroma | ue(v) |
|       sps_log2_diff_max_tt_min_qt_intra_slice_chroma | ue(v) |
|     } | |
|   } | |
|   sps_max_luma_transform_size_64_flag | u(1) |
|   if( ChromaArrayType != 0 ) { | |
|     sps_joint_cbcr_enabled_flag | u(1) |
|     same_qp_table_for_chroma | u(1) |
|     numQpTables = same_qp_table_for_chroma ? 1 : ( sps_joint_cbcr_enabled_flag ? 3 : 2 ) | |
|     for( i = 0; i < numQpTables; i++ ) { | |
|       qp_table_start_minus26[ i ] | se(v) |
|       num_points_in_qp_table_minus1[ i ] | ue(v) |
|       for( j = 0; j <= num_pointsjn_qp_table_minus1[ i ]; j++ ) { | |
|         delta_qp_in_val_minus1[ i ][ j ] | ue(v) |
|         delta_qp_dif_val[ i ][ j ] | ue(v) |
|       } | |
|     } | |
|   } | |
|   sps_sao_enabled_flag | u(1) |
|   sps_alf_enabled_flag | u(1) |
|   if( sps_alf_enabled_flag && ChromaArrayType != 0 ) | |
|     sps_ccalf_enabled_flag | u(1) |
|   sps_transform_skip_enabled_flag | u(1) |
|   if( sps_transform_skip_enabled_flag) { | |
|     log2_transform_skip_max_size_minus2 | ue(v) |
|     sps_bdpcm_enabled_flag | u(1) |
|   } | |
|   sps_ref_wraparound_enabled_flag | u(1) |
|   sps_temporal_mvp_enabled_flag | u(1) |
|   if( sps_temporal_mvp_enabled_flag ) | |
|     sps_shtmvp_enabled_flag | u(1) |
|   sps_amvr_ enabled_flag | u(1) |
|   sps_bdof_enabled_flag | u(1) |
|   if( sps_bdof_enabled_flag ) | |
|     sps_bdof_pic_present_flag | u(1) |
|   sps_smvd_enabled_flag | u(1) |
|   sps_dmvr_enabled_flag | u(1) |
|   if( sps_dmvr_enabled_flag) | |
|     sps_dmvr_pic_present_flag | u(1) |
|   sps_mmvd_enabled_flag | u(1) |
|   sps_isp_enabled_flag | u(1) |
|   sps_mrl_enabled_flag | u(1) |
|   sps_mip_enabled_flag | u(1) |
|   if( ChromaArrayType != 0 ) | |
|     sps_cclm_enabled_flag | u(1) |
|   if( chroma_format_idc = = 1 ) { | |
|     sps_chroma_horizontal_collocated_flag | u(1) |
|     sps_chroma_vertical_collocated_flag | u(1) |
|   } | |
|   sps_mts_enabled_flag | u(1) |
|   if( sps_mts_enabled_flag ) { | |
|     sps_explicit_mts_intra_ena bled_flag | u(1) |
|     sps_explicit_mts_inter_enabled_flag | u(1) |
|   } | |
|   six_minus_max_num_merge_cand | ue(v) |
|   sps_sbt_enabled_flag | u(1) |
|   sps_affine_enabled_flag | u(1) |
|   if( sps_affine_enabled_flag ) { | |
|     five_minus_max_num_subblock_merge_cand | ue(v) |
|     sps_affine_type_flag | u(1) |
|   if( sps_amvr_enabled_flag) | |
|     sps_affine_amvr_enabled_flag | u(1) |
|   sps_affine_prof_enabled_flag | u(1) |
|   if( sps_affine_prof_enabled_flag ) | |
|     sps_prof_pic_present_flag | u(1) |
|   } | |
|   sps_palette_enabled_flag | u(1) |
|   if( ChromaArray Type = = 3 && !sps_max_luma_transform_size_64_flag ) | |
|     sps_act_enabled_flag | u(1) |
|   if( sps_transform_skip_enabled_flag \|\| sps_palette_enabled_flag ) | |
|     min_qp_prime_ts_minus4 | ue(v) |
|   sps_bcw_enabled_flag | u(1) |
|   sps_ibc_enabled_flag | u(1) |
|   if( sps_ibc_enabled_flag ) | |
|     six_minus_max_num_ibc_merge_cand | ue(v) |

| | Descriptor |
|---|---|
| sps_ciip_enabled_flag | u(1) |
| if( sps_mmvd_enabled_flag ) | |
|   sps_fpel_mmvd_enabled_flag | u(1) |
| if( MaxNumMergeCand >= 2 ) { | |
|   sps_gpm_enabled_flag | u(1) |
|   if( sps_gpm_enabled_flag && MaxNumMergeCand >= 3 ) | |
|     max_num_merge_cand_minus_max_num_gpm_cand | ue(v) |
| } | |
| sps_lmcs_enabled_flag | u(1) |
| sps_lfnst_enabled_flag | u(1) |
| sps_ladf_enabled_flag | u(1) |
| if( sps_ladf_enabled_flag) { | |
|   sps_num_ladf_intervals_minus2 | u(2) |
|   sps_ladf_lowest_interval_qp_offset | se(v) |
|   for( i = 0; i < sps_num_ladf_intervals_minus2 + 1; i++ ) { | |
|     sps_ladf_qp_offset[ i ] | se(v) |
|     sps_ladf_delta_threshold_minus1[ i ] | ue(v) |
|   } | |
| } | |
| log2_parallel_merge_level_minus2 | ue(v) |
| sps_scaling_list_enabled_flag | u(1) |
| sps_dep_quant_enabled_flag | u(1) |
| if( !sps_dep_quant_enabled_flag ) | |
|   sps_sign_data_hiding_enabled_flag | u(1) |
| sps_virtual_boundaries_enabled_flag | u(1) |
| if( sps_virtual_boundaries_enabled_flag ) { | |
|   sps_virtual_boundaries_present_flag | u(1) |
|   if( sps_virtual_boundaries_present_flag ) { | |
|     sps_num_ver_virtual_boundaries | u(2) |
|     for( i = 0; i < sps_num_ver_virtual_boundaries; i++ ) | |
|       sps_virtual_boundaries_pos_x[ i ] | u(13) |
|     sps_num_hor_virtual_boundaries | u(2) |
|     for( i = 0; i < sps_num_hor_virtual_boundaries; i++ ) | |
|       sps_virtual_boundaries_pos_y[ i ] | u(13) |
|   } | |
| } | |
| if( sps_ptl_dpb_hrd_params_present_flag ) { | |
|   sps_general_hrd_params_present_flag | u(1) |
|   if( sps_general_hrd_params_present_flag ) { | |
|     general_hrd_parameters( ) | |
|     if( sps_max_sublayers_minus1 > 0 ) | |
|       sps_sublayer_cpb_params_present_flag | u(1) |
|     firstSubLayer = sps_sublayer_cpb_params_present_flag ? 0 : | |
|       sps_max_sublayers_minus1 | |
|     ols_hrd_parameters( firstSubLayer, sps_max_sublayers_minus1 ) | |
|   } | |
| } | |
| field_seq_flag | u(1) |
| vui_parameters_present_flag | u(1) |
| if( vui_parameters_present_flag ) | |
|   vui_parameters( ) /* Specified in ITU-T H.SEI \| ISO/IEC 23002-7 */ | |
| sps_extension_flag | u(1) |
| if( sps_extension_flag ) | |
|   while( more_rbsp_data( ) ) | |
|     sps_extension_data_flag | u(1) |
| rbsp_trailing_bits( ) | |
| } | |

7.3.2.4 Picture Parameter Set RBSP Syntax

| | Descriptor |
|---|---|
| pic_parameter_set_rbsp( ) { | |
|   pps_pic_parameter_set_id | ue(v) |
|   pps_seq_parameter_set_id | u(4) |
|   mixed_nalu_types_in_pic_flag | u(1) |
|   pic_width_in_luma_samples | ue(v) |
|   pic_height_in_luma_samples | ue(v) |
|   pps_conformance_window_flag | u(1) |
|   if( pps_conformance_window_flag) { | |
|     pps_conf_win_left_offset | ue(v) |
|     pps_conf_win_right_offset | ue(v) |
|     pps_conf_win_top_offset | ue(v) |
|     pps_conf_win_bottom_offset | ue(v) |

-continued

| | Descriptor |
|---|---|
| } | |
| scaling_window_explicit_signalling_flag | u(1) |
| if( scaling_window_explicit_signalling_flag ) { | |
|   scaling_win_left_offset | ue(v) |
|   scaling_win_right_offset | ue(v) |
|   scaling_win_top_offset | ue(v) |
|   scaling_win_bottom_offset | ue(v) |
| } | |
| output_flag_present_flag | u(1) |
| subpic_id_mapping_in_pps_flag | u(1) |
| if( subpic_id_mapping_in_pps_flag ) { | |
|   pps_num_subpics_minus1 | ue(v) |
|   pps_subpic_id_len_minus1 | ue(v) |
|   for( i = 0, i <= pps_num_subpic_minus!; i++ ) | |
|     pps_subpic_id[ i ] | u(v) |
| } | |
| no_pic_partition_flag | u(1) |
| if( !no_pic_partition_flag ) { | |
|   pps_log2_ctu_size_minus5 | u(2) |
|   num_exp_tile_columns_minus1 | ue(v) |
|   num_exp_tile_rows_minus1 | ue(v) |
|   for( i = 0; i <= num_exp_tile_columns_minus1; i++ ) | |
|     tile_column_width_minus1[ i ] | ue(v) |
|   for( i = 0; i <= num_exp_tile_rows_minus1; i++ ) | |
|     tile_row_height_minus1[ i ] | ue(v) |
|   if( NumTilesInPic > 1 ) | |
|     rect_slice_flag | u(1) |
|   if( rect_slice_flag) | |
|     single_slice_per_subpic_flag | u(1) |
|   if( rect_slice_flag && ! single_slice_per_subpic_flag ) { | |
|     num_slices_in_pic_minus1 | ue(v) |
|     if( num_slices_in_pic_minus1 > 0 ) | |
|       tile_idx_delta_present_flag | u(1) |
|     for( i = 0; i < num_slices_in_pic_minus1; i++ ) { | |
|       if( NumTileColumns > 1 ) | |
|         slice_width_in_tiles_minus1 [ i ] | ue(v) |
|       if( NumTileRows > 1 && | |
|         ( tile_idx_delta_present_flag \|\| tileIdx % NumTileColumns == 0 ) ) | |
|         slice_height_in_tiles_minus1[ i ] | ue(v) |
|       if( slice_width_in_tiles_minus1[ i ]  = = 0 && | |
|         slice_height_in_tiles_minus1[ i ]  = = 0 && | |
|         RowHeight[ SliceTopLeftTileIdx[ i ] / NumTileColumns ] > 1 ) | |
|       { | |
|         num_exp_slices_in_tile[ i ] | ue(v) |
|         numExpSlicesInTile = num_exp_slices_in_tile[ i ] | |
|         for( j = 0; j < numExpSlicesInTile, j++ ) | |
|           exp_slice_height_in_ctus_minus1[ j ] | ue(v) |
|         i += NumSlicesInTile[ i ] | |
|       } | |
|       if( tile_idx_delta_present_flag && i < num_slices_in_pic_minus1 ) | |
|         tile_idx_delta[ i ] | se(v) |
|     } | |
|   } | |
|   loop_filter_across_tiles_enabled_flag | u(1) |
|   loop_filter_across_slices_enabled_flag | u(1) |
| } | |
| cabac_init_present_flag | u(1) |
| for( i = 0, i < 2; i++ ) | ue(v) |
|   num_ref_idx_default_active_minus1[ i ] | |
| rpl1_idx_present_flag | u(1) |
| init_qp_minus26 | se(v) |
| cu_qp_delta_enabled_flag | u(1) |
| pps_chroma_tool_offsets_present_flag | u(1) |
| if( pps_chroma_tool_offsets_present_flag) { | |
|   pps_cb_qp_offset | se(v) |
|   pps_cr_qp_offset | se(v) |
|   pps_joint_cber_qp_offset_present_flag | u(1) |
|   if( pps_joint_cbcr_qp_offset_present_flag) | |
|     pps_joint_cbcr_qp_offset_value | se(v) |
|   pps_slice_chroma_qp_offsets_present_flag | u(1) |
|   pps_cu_chroma_qp_offset_list_enabled_flag | u(1) |
| } | |
| if( pps_cu_chroma_qp_offset_list_enabled_flag) { | |
|   chroma_qp_offset_list_len_minus1 | ue(v) |
|   for( i = 0; i <= chroma_qp_offset_list_len_minus 1; i++ ) { | |
|     cb_qp_offset_list [ i ] | se(v) |

| | Descriptor |
|---|---|
|    cr_qp_offset_list[ i ] | se(v) |
|    if( pps_joint_cbcr_qp_offset_present_flag) | |
|     joint_cbcr_qp_offset_list[ i ] | se(v) |
|   } | |
| } | |
| pps_weighted_pred_flag | u(1) |
| pps_weighted_bipred_flag | u(1) |
| deblocking_filter_control_present_flag | u(1) |
| if( deblocking_filter_control_present_flag) { | |
|  deblocking_filter_override_enabled_flag | u(1) |
|  pps_deblocking_filter_disabled_flag | u(1) |
|  if( !pps_deblocking_filter_disabled_flag ) { | |
|   pps_beta_offset_div2 | se(v) |
|   pps_tc_offset_div2 | se(v) |
|   pps_cb_beta_offset_div2 | se(v) |
|   pps_cb_tc_offset_div2 | se(v) |
|   pps_cr_beta_offset_div2 | se(v) |
|   pps_cr_tc_offset_div2 | se(v) |
|  } | |
| } | |
| rpl_info_in_ph_flag | u(1) |
| if( deblocking_filter_override_enabled_flag ) | |
|  dbf_info_in_ph_flag | u(1) |
| sao_info_in_ph_flag | u(1) |
| alf_info_in_ph_flag | u(1) |
| if( ( pps_weighted_pred_flag \|\| pps_weighted_bipred_flag ) && rpl_present_in_ph_flag ) | |
|  wp_info_in_ph_flag | u(1) |
| qp_delta_info_in_ph_flag | u(1) |
| pps_ref_wraparound_enabled_flag | u(1) |
| if( pps_ref_wraparound_enabled_flag) | |
|  pps_ref_wraparound_offset | ue(v) |
| picture_header_extension_present_flag | u(1) |
| slice_header_extension_present_flag | u(1) |
| pps_extension_flag | u(1) |
| if( pps_extension_flag) | |
|  while( more_rbsp_data( ) ) | |
|   pps_extension_data_flag | u(1) |
| rbsp_trailing_bits( ) | |
| } | |

7.3.2.5 Adaptation Parameter Set RBSP Syntax

| | Descriptor |
|---|---|
| adaptation_parameter_set_rbsp( ) { | |
|  adaptation_parameter_set_id | u(5) |
|  aps_params_type | u(3) |
|  if( aps_params_type = = ALF_APS ) | |
|   alf_data() | |
|  else if( aps_params_type = = LMCS_APS) | |
|   lmcs_data() | |
|  else if( aps_params_type = = SCALING_APS ) | |
|   scaling_list_data( ) | |
|  aps_extension_flag | u(1) |
|  if( aps_extension_flag ) | |
|   while( more_rbsp_data()) | |
|    aps_extension_data_flag | u(1) |
|  rbsp_trailing_bits() | |
| } | |

7.3.2.6 Picture Header RBSP Syntax

| | Descriptor |
|---|---|
| picture_header_rbsp( ) { | |
|  picture_header_structure( ) | |
|  rbsp_trailing_bits( ) | |
| } | |

7.3.2.7 Picture Header Structure Syntax

| | Descriptor |
|---|---|
| picture_header_structure( ) { | |
|  gdr_or_irap_pic_flag | u(1) |
|  if( gdr_or_irap_pic_flag ) | |
|   gdr_pic_flag | u(1) |
|  ph_inter_slice_allowed_flag | u(1) |
|  if( ph_inter_slice_allowed_flag ) | |
|   ph_intra_slice_allowed_flag | u(1) |
|  non_reference_picture_flag | u(1) |
|  ph_pic_parameter_set_id | ue(v) |

| | Descriptor |
|---|---|
| ph_pic_order_ent_lsb | u(v) |
| if( gdr_or_irap_pic_flag ) | |
|   no_output_of_prior_pics_flag | u(1) |
| if( gdr_pic_ flag ) | |
|   recovery_poc_cnt | ue(v) |
| for( i = 0; i < NumExtraPhBits; i++ ) | |
|   ph_extra_bit[ i ] | u(1) |
| if( sps_poc_msb_flag ) { | |
|   ph_poc_msb_present_flag | |
|   if( ph_poc_msb_present_flag ) | |
|     poc_msb_val | u(v) |
| } | |
| if( sps_alf_enabled_flag && alf_info_in_ph_flag) { | |
|   ph_alf_enabled_flag | u(1) |
|   if( ph_alf_enabled_flag) { | |
|     ph_num_alf_aps_ids_luma | u(3) |
|     for( i = 0; i < ph_num_alf_aps_ids_luma; i++ ) | |
|       ph_alf_aps_id_luma[ i ] | u(3) |
|     if( ChromaArrayType != 0 ) | |
|       ph_alf_chroma_idc | u(2) |
|     if( ph_alf_chroma_idc) | |
|       ph_alf_aps_id_chroma | u(3) |
|     if( sps_ccalf_enabled_flag ) { | |
|       ph_cc_alf_cb_enabled_flag | u(1) |
|       if( ph_cc_alf_cb_enabled_flag) | |
|         ph_cc_alf_cb_aps_id | u(3) |
|       ph_cc_alf_cr_enabled_flag | u(1) |
|       if( ph_cc_alf_cr_enabled_flag) | |
|         ph_cc alf cr aps id | u(3) |
|     } | |
|   } | |
| } | |
| if( sps lmcs enabled flag ) { | |
|   ph_lmcs_enabled_flag | u(1) |
|   if( ph_lmes_enabled_flag ) { | |
|     ph_lmcs_aps_id | u(2) |
|     if( Chroma Array Type != 0 ) | |
|       ph_chroma_residual_scale_flag | u(1) |
|   } | |
| } | |
| if( sps_scaling_list_enabled_flag ) { | |
|   ph_scaling_list_present_flag | u(1) |
|   if( ph_scaling_list_present_flag ) | |
|     ph_scaling_list_aps_id | u(3) |
| } | |
| if( sps_virtual_boundaries_enabled_flag &&  !sps_virtual_boundaries_present_flag ) { | |
|   ph_virtual_boundaries_present_flag | u(1) |
|   if( ph_virtual_boundaries present flag ) { | |
|     ph_num_ver_virtual_boundaries | u(2) |
|     for( i = 0; i < ph_num_ver_virtual_boundaries; i++ ) | |
|       ph_virtual_boundaries_pos x[ i ] | u(13) |
|     ph_num_hor_virtual_boundaries | u(2) |
|     for( i = 0; i < ph_num_hor_virtual_boundaries; i++ ) | |
|       ph_virtual_boundaries_pos_y[ i ] | u(13) |
|   } | |
| } | |
| if( output_flag_present_flag ) | |
|   pic_output_flag | u(1) |
| if( rpl_info_in_ph_flag ) | |
|   ref_pic_lists( ) | |
| if( partition_constraints_override_enabled_flag ) | |
|   partition_constraints_override_flag | u(1) |
| if( ph_intra_slice_allowed_flag ) { | |
|   if( partition_constraints_override_flag ) { | |
|     ph_log2_diff_min_qt_min_cb_intra_slice_luma | ue(v) |
|     ph_max_mtt_hierarchy_depth_intra_slice_luma | ue(v) |
|     if( ph_max_mtt_hierarchy_depth_intra_slice_luma != 0 ) { | |
|       ph_log2_diff_max_bt_min_qt_intra_slice_luma | ue(v) |
|       ph_log2_diff_max_tt_min_qt_intra sliceluma | ue(v) |
|     } | |
|     if( qtbtt_dual_tree_intra_flag) { | |
|       ph_log2_diff_min_qt_min_cb_intra_slice chroma | ue(v) |
|       ph_max_mtt_hierarchy_depth_intra_slice_chroma | ue(v) |
|       if( ph_max_mtt_hierarchy_depth_intra_slice_chroma != 0 ) { | |
|         ph_log2_diff_max_bt_min_qt_intra_slice_chroma | ue(v) |
|         ph_log2_diff_max_tt_min_qt_intra_slice_chroma | ue(v) |

-continued

|  | Descriptor |
|---|---|
|     } | |
|    } | |
|   } | |
|   if( cu_qp_delta_enabled_flag) | |
|     ph_cu_qp_delta_subdiv_intra slice | ue(v) |
|   if( pps_cu_chroma_qp_offset_list_enabled_flag ) | |
|     ph_cu_chroma_qp_offset_subdiv_intra_slice | ue(v) |
| } | |
| if( ph_inter_slice_allowed_flag) { | |
|   if( partition_constraints_override_flag ) { | |
|     ph_log2_diff_min_qt_min_cb_inter_slice | ue(v) |
|     ph_ max_mtt_ hierarchy depth_inter_slice | ue(v) |
|     if( ph_max_mtt_hierarchy_depth_inter_slice != 0 ) { | |
|       ph_log2_diff_max_bt_min_qt_inter_slice | ue(v) |
|       ph_log2_diff_max_tt_min_qt_inter_slice | ue(v) |
|     } | |
|   } | |
|   if( cu_qp_delta_enabled_flag ) | |
|     ph_cu_qp_delta_subdiv_inter_slice | ue(v) |
|   if( pps_cu_chroma_qp_offset_list_enabled_flag ) | |
|     ph_cu_chroma_qp_offset_subdiv_inter_slice | ue(v) |
|   if( sps_temporal_mvp_enabled_flag ) { | |
|     ph_temporal_mvp_enabled_flag | u(1) |
|     if( ph_temporal_mvp_enabled_flag && rpl_info_in_ph_flag ) { | |
|       ph_collocated_from_l0_flag | u(1) |
|       if( ( ph_collocated_from_l0_flag && | |
|         num_ref_entries[ 0 ][ PicRplsIdx[ 0 ] ] > 1 ) \|\| | |
|         ( !ph_collocated_from_l0_flag && | |
|         num_ref_entries[ 1 ][ PicRplsIdx[ 1 ] ] > 1 ) ) | |
|       ph_collocated_ref_idx | ue(v) |
|     } | |
|   } | |
|   mvd_l1_zero_flag | u(1) |
|   if( sps_fpel_mmvd_enabled_flag ) | |
|     ph_fpel_mmvd_enabled_flag | u(1) |
|   if( sps_bdof_pic_present_flag ) | |
|     ph_disable_bdof_flag | u(1) |
|   if( sps_dmvr_pic_present_flag) | |
|     ph_disable_dmvr_flag | u(1) |
|   if( sps_prof_pic_present_flag ) | |
|     ph_disable_prof_flag | u(1) |
|   if( ( pps_weighted_pred_flag \|\| pps_weighted_bipred_flag ) && | |
| wp_info_in_ph_flag ) | |
|     pred_weight_table( ) | |
| } | |
| if( qp_delta_info_in_ph_flag ) | |
|   ph_qp_delta | se(v) |
| if( sps_joint_cbcr_enabled_flag ) | u(1) |
|   ph_joint_cbcr_sign_flag | |
| if( sps_sao_enabled_flag && sao_info_in_ph_flag ) { | |
|   ph_sao_luma_enabled_flag | u(1) |
|   if( ChromaArrayType != 0 ) | |
|     ph_sao_chroma_enabled_flag | u(1) |
| } | |
| if( sps_dep_quant_enabled_flag) | |
|   ph_dep_quant_enabled_flag | u(1) |
| if( sps_sign_data_hiding_enabled_flag && !ph_dep_quant_enabled_flag ) | |
|   pic_sign_data_hiding_enabled_flag | u(1) |
| if( deblocking_filter_override_enabled_flag && dbf_info_in_ph_flag ) { | |
|   ph_deblocking_filter_override_flag | u(1) |
|   if( ph_deblocking_filter_override_flag) { | |
|     ph_deblocking_filter_disabled_flag | u(1) |
|     if( !ph_deblocking_filter_disabled_flag) { | |
|       ph_beta_offset_div2 | se(v) |
|       ph_tc_offset_div2 | se(v) |
|       ph_cb_beta_offset_div2 | se(v) |
|       ph_cb_tc_offset_div2 | se(v) |
|       ph_cr_beta_offset_div2 | se(v) |
|       ph_cr_tc_offset_div2 | se(v) |
|     } | |
|   } | |
| } | |

-continued

| | Descriptor |
|---|---|
| if( picture_header_extension_present_flag) {<br>  ph_extension_length<br>  for( i = 0; i < ph_extension_length; i++)<br>    ph_extension_data_byte[ i ]<br>  }<br>} | <br>ue(v)<br><br>u(8) |

7.3.2.8 Supplemental Enhancement Information RBSP Syntax

| | Descriptor |
|---|---|
| sei_rbsp( ) {<br>  do<br>    sei_message( )<br>  while( more_rbsp_data( ))<br>  rbsp_trailing_bits( )<br>} | |

7.3.2.9 AU Delimiter RBSP Syntax

| | Descriptor |
|---|---|
| access_unit_delimiter_rbsp( ) {<br>  pic_type<br>  rbsp_trailing_bits( )<br>} | <br>u(3) |

7.3.2.10 End of Sequence RBSP Syntax

| | Descriptor |
|---|---|
| end_of_seq_rbsp( ) {<br>} | |

7.3.2.11 End of Bitstream RBSP Syntax

| | Descriptor |
|---|---|
| end_of_bitstream_rbsp( ) {<br>} | |

7.3.2.11 Filler Data RBSP Syntax

| | Descriptor |
|---|---|
| filler_data_rbsp( ) {<br>  while( next_bits( 8 ) = = 0xFF )<br>    ff_byte /* equal to 0xFF */<br>  rbsp_trailing_bits( )<br>} | <br><br>f(8) |

7.4 Semantics
7.4.1 General

Semantics associated with the syntax structures and with the syntax elements within these structures are specified in this clause. When the semantics of a syntax element are specified using a table or a set of tables, any values that are not specified in the table(s) may not be present in the bitstream unless otherwise specified in this Specification.

7.4.2 NAL Unit Semantics
7.4.2.1 General NAL Unit Semantics

NumBytesInNalUnit specifies the size of the NAL unit in bytes. This value may be used for decoding of the NAL unit. Some form of demarcation of NAL unit boundaries is necessary to enable inference of NumBytesInNal Unit. One such demarcation method for the byte stream format. Other methods of demarcation may be specified outside of this Specification.

NOTE 1—The video coding layer (VCL) is specified to efficiently represent the content of the video data. The NAL is specified to format that data and provide header information in a manner appropriate for conveyance on a variety of communication channels or storage media. All data are contained in NAL units, each of which contains an integer number of bytes. A NAL unit specifies a generic format for use in both packet-oriented and bitstream systems. The format of NAL units for both packet-oriented transport and byte stream is identical except that each NAL unit can be preceded by a start code prefix and extra padding bytes in the byte stream format.

rbsp_byte[i] is the i-th byte of a RBSP. A RBSP is specified as an ordered sequence of bytes as follows:

The RBSP contains a string of data bits (SODB) as follows:
  If the SODB is empty (i.e., zero bits in length), the RBSP is also empty.
  Otherwise, the RBSP contains the SODB as follows:
    1) The first byte of the RBSP contains the first (most significant, left-most) eight bits of the SODB: the next byte of the RBSP contains the next eight bits of the SODB, etc., until fewer than eight bits of the SODB remain.
    2) The rbsp_trailing_bits( ) syntax structure is present after the SODB as follows:
      i) The first (most significant, left-most) bits of the final RBSP byte contain the remaining bits of the SODB (if any).
      ii) The next bit consists of a single bit equal to 1 (i.e., rbsp_stop_one_bit).
      iii) When the rbsp_stop_one_bit is not the last bit of a byte-aligned byte, one or more zero-valued bits (i.e., instances of rbsp_alignment_zero_bit) are present to result in byte alignment.
    3) One or more cabac_zero_word 16-bit syntax elements equal to 0x0000 may be present in some RBSPs after the rbsp_trailing_bits( ) at the end of the RBSP.

Syntax structures having these RBSP properties are denoted in the syntax tables using an "_rbsp" suffix. These structures are carried within NAL units as the content of the rbsp_byte[i] data bytes. The association of the RBSP syntax structures to the NAL units is as specified in Table 5.

NOTE 2—When the boundaries of the RBSP are known, the decoder can extract the SODB from the RBSP by concatenating the bits of the bytes of the RBSP and discarding the rbsp_stop_one_bit, which is the last (least significant, right-most) bit equal to 1, and discarding any following (less significant, farther to the right) bits that follow it, which are equal to 0. The data necessary for the decoding process is contained in the SODB part of the RBSP.

emulation_prevention_three_byte is a byte equal to 0x03. When an emulation_prevention_three_byte is present in the NAL unit, it may be discarded by the decoding process.

The last byte of the NAL unit may not be equal to 0x00.

Within the NAL unit, the following three-byte sequences may not occur at any byte-aligned position:
- 0x000000
- 0x000001
- 0x000002

Within the NAL unit, any four-byte sequence that starts with 0x000003 other than the following sequences may not occur at any byte-aligned position:
- 0x00000300
- 0x00000301
- 0x00000302
- 0x00000303

7.4.2.2 NAL Unit Header Semantics forbidden_zero_bit may be equal to 0.

nuh_reserved_zero_bit may be equal to 0. The value 1 of nuh_reserved_zero_bit may be specified in the future by ITU-T|ISO/IEC. Decoders may ignore (i.e. remove from the bitstream and discard) NAL units with nuh_reserved_zero_bit equal to 1.

nuh_layer_id specifies the identifier of the layer to which a VCL NAL unit belongs or the identifier of a layer to which a non-VCL NAL unit applies. The value of nuh_layer_id may be in the range of 0 to 55, inclusive. Other values for nuh_layer_id are reserved for future use by ITU-T|ISO/IEC.

The value of nuh_layer_id may be the same for all VCL NAL units of a coded picture. The value of nuh_layer_id of a coded picture or a PU is the value of the nuh_layer_id of the VCL NAL units of the coded picture or the PU.

The value of nuh_layer_id for AUD, PH, EOS, and FD NAL units is constrained as follows:

If nal_unit_type is equal to AUD_NUT, nuh_layer_id may be equal to vps_layer_id[0].

Otherwise, when nal_unit_type is equal to PH_NUT, EOS_NUT, or FD_NUT, nuh_layer_id may be equal to the nuh_layer_id of associated VCL NAL unit.

NOTE 1—The value of nuh_layer_id of DCI, VPS, and EOB NAL units is not constrained.

The value of nal_unit_type may be the same for all pictures of a CVSS AU.

nal_unit_type specifies the NAL unit type, i.e., the type of RBSP data structure contained in the NAL unit as specified in Table 5.

NAL units that have nal_unit_type in the range of UNSPEC_28 ... UNSPEC_31, inclusive, for which semantics are not specified, may not affect the decoding process specified in this Specification.

NOTE 2—NAL unit types in the range of UNSPEC_28 ... UNSPEC_31 may be used as determined by the application. No decoding process for these values of nal_unit_type is specified in this Specification. Since different applications might use these NAL unit types for different purposes, particular care may be exercised in the design of encoders that generate NAL units with these nal_unit_type values, and in the design of decoders that interpret the content of NAL units with these nal_unit_type values. This Specification does not define any management for these values. These nal_unit_type values might only be suitable for use in contexts in which "collisions" of usage (i.e., different definitions of the meaning of the NAL unit content for the same nal_unit_type value) are unimportant, or not possible, or are managed—e.g., defined or managed in the controlling application or transport specification, or by controlling the environment in which bitstreams are distributed.

For purposes other than determining the amount of data in the DUs of the bitstream decoders may ignore (remove from the bitstream and discard) the contents of all NAL units that use reserved values of nal_unit_type.

NOTE 3—This allows future definition of compatible extensions to this Specification.

TABLE 5

NAL unit type codes and NAL unit type classes

| nal_unit_type | Name of nal_unit_type | Content of NAL unit and RBSP syntax structure | NAL unit type class |
|---|---|---|---|
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RADL_NUT | Coded slice of a RADL picture slice_layer_rbsp( ) | VCL |
| 3 | RASL_NUT | Coded slice of a RASL picture slice layer rbsp( ) | VCL |
| 4...6 | RSV_VCL_4 ... RSV_VCL_6 | Reserved non-IRAP VCL NAL unit types | VCL |
| 7 | IDR_W_RADL | Coded slice of an IDR picture slice_layer_rbsp( ) | VCL |
| 8 | IDR_N_LP | | |
| 9 | CRA_NUT | Coded slice of a CRA picture silce_layer_rbsp( ) | |
| 10 | GDR_NUT | Coded slice of a GDR picture slice_layer_rbsp( ) | VCL |
| 11 | RSV_IRAP_11 | Reserved IRAP VCL NAL unit types | VCL |
| 12 | RSV_IRAP_12 | | |
| 13 | DCI_NUT | Decoding capability information decoding_capability_information_rbsp() | |
| 14 | VPS_NUT | Video parameter set video_parameter_set_rbsp( ) | |
| 15 | SPS_NUT | Sequence parameter set seq_parameter_set_rbsp( ) | non-VCL |

TABLE 5-continued

NAL unit type codes and NAL unit type classes

| nal_unit_type | Name of nal_unit_type | Content of NAL unit and RBSP syntax structure | NAL unit type class |
|---|---|---|---|
| 16 | PPS_NUT | Picture parameter set pic_parameter_set_rbsp( ) | non-VCL |
| 17 | PREFIX_APS_NUT | Adaptation parameter set | non-VCL |
| 18 | SUFFIX_APS_NUT | adaptation_parameter_set_rbsp( ) | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_NUT | Supplemental enhancement information | non-VCL |
| 24 | SUFFIX_SEI_NUT | sei_rbsp( ) | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28 . . . 31 | UNSPEC_28 . . . UNSPEC_31 | Unspecified non-VCL NAL unit types | non-VCL |

NOTE 4 - A clean random access (CRA) picture may have associated RASE or RADL pictures present in the bitstream.
NOTE 5 - An instantaneous decoding refresh (IDR) picture having nal_unit_type equal to IDR_N_LP does not have associated leading pictures present in the bitstream. An IDR picture having nal_unit_type equal to IDR_W_RADL does not have associated RASL pictures present in the bitstream, but may have associated RADL pictures in the bitstream.

For VCL NAL units of any particular picture, the following applies:
  If mixed_nalu_types_in_pic_flag is equal to 0, the value of nal_unit_type may be the same for all coded slice NAL units of a picture. A picture or a PU is referred to as having the same NAL unit type as the coded slice NAL units of the picture or PU.
  Otherwise (mixed_nalu_types_in_pic_flag is equal to 1), the VCL NAL units of one or more subpictures of the picture all have a particular value of nal_unit_type equal to STSA_NUT, RADL_NUT, RASL_NUT, IDR_W_RADL, IDR_N_LP, or CRA_NUT, while the other VCL NAL units in the picture all have a different particular value of nal_unit_type equal to TRAIL_NUT, RADL_NUT, or RASL_NUT.
For a single-layer bitstream, the following constraints apply:
  Each picture, other than the first picture in the bitstream in decoding order, is considered to be associated with the previous IRAP picture in decoding order.
  When a picture is a leading picture of an IRAP picture, it may be a RADL or RASL picture.
  When a picture is a trailing picture of an IRAP picture, it may not be a RADL or RASL picture.
  No RASL pictures may be present in the bitstream that are associated with an IDR picture.
  No RADL pictures may be present in the bitstream that are associated with an IDR picture having nal_unit_type equal to IDR_N_LP.
  NOTE 6—It is possible to perform random access at the position of an IRAP PU by discarding all PUs before the IRAP PU (and to correctly decode the IRAP picture and all the subsequent non-RASL pictures in decoding order), provided each parameter set is available (either in the bitstream or by external means not specified in this Specification) when it is referenced.
  Any picture that precedes an IRAP picture in decoding order may precede the IRAP picture in output order and may precede any RADL picture associated with the IRAP picture in output order.
  Any RASL picture associated with a CRA picture may precede any RADL picture associated with the CRA picture in output order.
  Any RASL picture associated with a CRA picture may follow, in output order, any IRAP picture that precedes the CRA picture in decoding order.
  If field_seq_flag is equal to 0 and the current picture is a leading picture associated with an IRAP picture, it may precede, in decoding order, all non-leading pictures that are associated with the same IRAP picture. Otherwise, let picA and picB be the first and the last leading pictures, in decoding order, associated with an IRAP picture, respectively, there may be at most one non-leading picture preceding picA in decoding order, and there may be no non-leading picture between picA and picB in decoding order.
nuh_temporal_id_plus1 minus 1 specifies a temporal identifier for the NAL unit. The value of nuh_temporal_id_plus1 may not be equal to 0.
The variable TemporalId is derived $$TemporalId = nuh\_temporal\_id\_plus1 - 1 \qquad (36)$$

When nal_unit_type is in the range of IDR_W_RADL to RSV_IRAP_12, inclusive, TemporalId may be equal to 0.
  When nal_unit_type is equal to STSA_NUT and vps_independent_layer_flag[GeneralLayerIdx[nuh_layer_id]] is equal to 1, TemporalId may not be equal to 0.
The value of TemporalId may be the same for all VCL NAL units of an AU. The value of TemporalId of a coded picture, a PU, or an AU is the value of the TemporalId of the VCL NAL units of the coded picture, PU, or AU. The value of TemporalId of a sublayer representation is the greatest value of TemporalId of all VCL NAL units in the sublayer representation.
The value of TemporalId for non-VCL NAL units is constrained as follows:
  If nal_unit_type is equal to DCI_NUT, VPS_NUT, or SPS_NUT, TemporalId may be equal to 0 and the TemporalId of the AU containing the NAL unit may be equal to 0.

Otherwise, if nal_unit_type is equal to PH_NUT, TemporalId may be equal to the TemporalId of the PU containing the NAL unit.

Otherwise, if nal_unit_type is equal to EOS_NUT or EOB_NUT, TemporalId may be equal to 0.

Otherwise, if nal_unit_type is equal to AUD_NUT, FD_NUT, PREFIX_SEI_NUT, or SUFFIX_SEI_NUT, TemporalId may be equal to the TemporalId of the AU containing the NAL unit.

Otherwise, when nal_unit_type is equal to PPS_NUT, PREFIX_APS_NUT, or SUFFIX_APS_NUT, TemporalId may be greater than or equal to the TemporalId of the PU containing the NAL unit.

NOTE 7—When the NAL unit is a non-VCL NAL unit, the value of TemporalId is equal to the minimum value of the TemporalId values of all AUs to which the non-VCL NAL unit applies. When nal_unit_type is equal to PPS_NUT, PREFIX_APS_NUT, or SUFFIX_APS_NUT, TemporalId may be greater than or equal to the TemporalId of the containing AU, as all PPSs and APSs may be included in the beginning of the bitstream (e.g., when they are transported out-of-band, and the receiver places them at the beginning of the bitstream), wherein the first coded picture has TemporalId equal to 0.

7.4.2.3 Encapsulation of a SODB within a RBSP (Informative)

This clause does not form an integral part of this Specification.

The form of encapsulation of a SODB within a RBSP and the use of the emulation_prevention_three_byte for encapsulation of a RBSP within a NAL unit is described for the following purposes:

To prevent the emulation of start codes within NAL units while allowing any arbitrary SODB to be represented within a NAL unit, To enable identification of the end of the SODB within the NAL unit by searching the RBSP for the rbsp_stop_one_bit starting at the end of the RBSP, To enable a NAL unit to have a size greater than that of the SODB under some circumstances (using one or more cabac_zero_word syntax elements).

The encoder can produce a NAL unit from a RBSP by the following procedure:

1. The RBSP data are searched for byte-aligned bits of the following binary patterns:
    '00000000 00000000 000000xx' (where 'xx' represents any two-bit pattern: '00', '01', '10', or '11'),
    and a byte equal to 0x03 is inserted to replace the bit pattern with the pattern:
    '00000000 00000000 00000011 000000xx',
    and finally, when the last byte of the RBSP data is equal to 0x00 (which can only occur when the RBSP ends in a cabac_zero_word), a final byte equal to 0x03 is appended to the end of the data. The last zero byte of a byte-aligned three-byte sequence 0x000000 in the RBSP (which is replaced by the four-byte sequence 0x00000300) is taken into account when searching the RBSP data for the next occurrence of byte-aligned bits with the binary patterns specified above.

2. The resulting sequence of bytes is then prefixed with the NAL unit header, within which the nal_unit_type indicates the type of RBSP data structure in the NAL unit.

The process specified above results in the construction of the entire NAL unit.

This process can allow any SODB to be represented in a NAL unit while ensuring both of the following:

No byte-aligned start code prefix is emulated within the NAL unit.

No sequence of 8 zero-valued bits followed by a start code prefix, regardless of byte-alignment, is emulated within the NAL unit.

7.4.2.4 Order of NAL Units in the Bitstream 7.4.2.4.1 General

The subclauses of clause 7.4.2.4 specify constraints on the order of NAL units in the bitstream.

Any order of NAL units in the bitstream obeying these constraints is referred to in the text as the decoding order of NAL units.

Within a NAL unit, the syntax in clauses 7.3 and D.2 specifies the decoding order of syntax elements. When the VUI parameters or any SEI message specified in ITU-T H.SEI|ISO/IEC 23002-7 is included in a NAL unit specified in this Specification, the syntax of the VUI parameters or the SEI message specified in ITU-T H.SEI|ISO/IEC 23002-7 specifies the decoding order of those syntax elements. Decoders may be capable of receiving NAL units and their syntax elements in decoding order.

7.4.2.4.2 Order of AUs and their Association to CVSs

A bitstream consists of one or more CVSs.

A CVS consists of one or more AUs. The order of PUs and their association to AUs are described in clause 7.4.2.4.3.

The first AU of a CVS is a CVSS AU, wherein each present PU is a CLVSS PU, which is either an IRAP PU with NoOutputBeforeRecoveryFlag equal to 1 or a GDR PU with NoOutputBeforeRecoveryFlag equal to 1.

Each CVSS AU may have a PU for each of the layers present in the CVS.

For bitstream conformance, when present, the next AU after an AU that contains an EOS NAL unit may be a CVSS AU.

7.4.2.4.3 Order of PUs and their Association to AUs

An AU consists of one or more PUs in increasing order of nuh_layer_id. The order NAL units and coded pictures and their association to PUs are described in clause 7.4.2.4.4.

There can be at most one AUD NAL unit in an AU. When an AUD NAL unit is present in an AU, it may be the first NAL unit of the AU, and consequently, it is the first NAL unit of the first PU of the AU.

There can be at most one EOB NAL unit in an AU. When an EOB NAL unit is present in an AU, it may be the last NAL unit of the AU, and consequently, it is the last NAL unit of the last PU of the AU.

A VCL NAL unit is the first VCL NAL unit of an AU (and consequently the PU containing the VCL NAL unit is the first PU of the AU) when the VCL NAL unit is the first VCL NAL unit that follows a PH NAL unit and one or more of the following conditions are true:

The value of nuh_layer_id of the VCL NAL unit is less than the nuh_layer_id of the previous picture in decoding order.

The value of ph_pic_order_cnt_lsb of the VCL NAL unit differs from the ph_pic_order_cnt_lsb of the previous picture in decoding order.

PicOrderCntVal derived for the VCL NAL unit differs from the PicOrderCntVal of the previous picture in decoding order.

Let firstVclNalUnitInAu be the first VCL NAL unit of an AU. The first of any of the following NAL units preceding firstVclNalUnitInAu and succeeding the last VCL NAL unit preceding firstVclNalUnitInAu, if any, specifies the start of a new AU:

AUD NAL unit (when present),
DCI NAL unit (when present),
VPS NAL unit (when present),
SPS NAL unit (when present),
PPS NAL unit (when present),
Prefix APS NAL unit (when present),
PH NAL unit (when present),
Prefix SEI NAL unit (when present),
NAL unit with nal_unit_type equal to RSV_NVCL_26 (when present),
NAL unit with nal_unit_type in the range of UNSPEC28 . . . UNSPEC29 (when present).
NOTE—The first NAL unit preceding firstVclNalUnitInAu and succeeding the last VCL NAL unit preceding firstVclNalUnitInAu, if any, can only be one of the above-listed NAL units.

For bitstream conformance, when present, the next PU of a particular layer after a PU that belongs to the same layer and contains an EOS NAL unit may be a CLVSS PU, which is either an IRAP PU with NoOutputBeforeRecoveryFlag equal to 1 or a GDR PU with NoOutputBeforeRecoveryFlag equal to 1.

7.4.2.4.4 Order of NAL Units and Coded Pictures and their Association to PUs

A PU consists of zero or one PH NAL unit, one coded picture, which comprises of one or more VCL NAL units, and zero or more other non-VCL NAL units. The association of VCL NAL units to coded pictures is described in clause 7.4.2.4.5.

When a picture consists of more than one VCL NAL unit, a PH NAL unit may be present in the PU.

If a PH NAL unit is present in a PU, the first VCL NAL unit of a picture is the first VCL NAL unit that follows the PH NAL unit in decoding order of the picture. Otherwise (no PH NAL unit is present in the PU), the first VCL NAL unit of a picture is the only VCL NAL unit of the picture. The order of the non-VCL NAL units (other than the AUD and EOB NAL units) within a PU may obey the following constraints:

When a PH NAL unit is present in a PU, it may precede the first VCL NAL unit of the PU.
When any DCI NAL units, VPS NAL units, SPS NAL units, PPS NAL units, prefix APS NAL units, prefix SEI NAL units, NAL units with nal_unit_type equal to RSV_NVCL_26, or NAL units with nal_unit_type in the range of UNSPEC_28 . . . UNSPEC_29 are present in a PU, they may not follow the last VCL NAL unit of the PU.
When any DCI NAL units, VPS NAL units, SPS NAL units, or PPS NAL units are present in a PU, they may precede the PH NAL unit (when present) of the PU and may precede the first VCL NAL unit of the PU.
NAL units having nal_unit_type equal to SUFFIX_APS_NUT, SUFFIX_SEI_NUT, FD_NUT, or RSV_NVCL_27, or in the range of UNSPEC_30 . . . UNSPEC_31 in a PU may not precede the first VCL NAL unit of the PU.
When an EOS NAL unit is present in a PU, it may be the last NAL unit among all NAL units within the PU other than an EOB NAL unit (when present).

7.4.2.4.5 Order of VCL NAL Units and their Association to Coded Pictures

The order of the VCL NAL units within a coded picture is constrained as follows:

For any two coded slice NAL units A and B of a coded picture, let subpicIdxA and subpicIdxB be their subpicture level index values, and sliceAddrA and sliceddrB be their slice_address values.
When either of the following conditions is true, coded slice NAL unit A may precede coded slice NAL unit B:
subpicIdxA is less than subpicIdxB.
subpicIdxA is equal to subpicIdxB and sliceAddrA is less than sliceAddrB.

7.4.3. Raw Byte Sequence Payloads, Trailing Bits and Byte Alignment Semantics 7.4.3.1 Decoding Capability Information RBSP Semantics A DCI RBSP may be made available to the decoder, through either being present in the bitstream, included in at least the first AU of the bitstream, or provided through external means.

NOTE 1—The information contained in the DCI RBSP is not necessary for operation of the decoding process.

When present, all DCI NAL units in a bitstream may have the same content.

dci_max_sublayers_minus1 plus 1 specifies the maximum number of temporal sublayers that may be present in a layer in each CVS of the bitstream. The value of dci_max_sublayers_minus1 may be in the range of 0 to 6, inclusive.

dci_reserved_zero_bit may be equal to 0 in bitstreams conforming to this version of this Specification. The value 1 for dci_reserved_zero_bit is reserved for future use by ITU-T|ISO/IEC.

dci_num_ptls_minus1 plus 1 specifies the number of profile_tier_level( ) syntax structures in the DCI NAL unit.

For bitstream conformance, each OLS in a CVS in the bitstream may conform to at least one of the profile_tier_level( ) syntax structures in the DCI NAL unit.

NOTE 2—The DCI NAL unit may include PTL information, possibly carried in multiple profile_tier_level( ) syntax structures, that applies collectively to multiple OLSs, and does not need to include PTL information for each of the OLSs individually.

dci_extension_flag equal to 0 specifies that no dci_extension_data_flag syntax elements are present in the DCI RBSP syntax structure. dci_extension_flag equal to 1 specifies that there are dci_extension_data_flag syntax elements present in the DCI RBSP syntax structure.

dci_extension_data_flag may have any value. Its presence and value do not affect decoder conformance to profiles. Decoders conforming to this version of this Specification may ignore all dci_extension_data_flag syntax elements.

7.4.3.2 Video Parameter Set RBSP Semantics

A VPS RBSP may be available to the decoding process prior to it being referenced, included in at least one AU with TemporalId equal to 0 or provided through external means. All VPS NAL units with a particular value of vps_video_parameter_set_id in a CVS may have the same content.

vps_video_parameter_set_id provides an identifier for the VPS for reference by other syntax elements. The value of vps_video_parameter_set_id may be greater than 0.

vps_max_layers_minus1 plus 1 specifies the maximum allowed number of layers in each CVS referring to the VPS.

vps_max_sublayers_minus1 plus 1 specifies the maximum number of temporal sublayers that may be present in a layer in each CVS referring to the VPS. The value of vps_max_sublayers_minus1 may be in the range of 0 to 6, inclusive.

vps_all_layers_same_num_sublayers_flag equal to 1 specifies that the number of temporal sublayers is the same for all the layers in each CVS referring to the VPS.

vps_all_layers_same_num_sublayers_flag equal to 0 specifies that the layers in each CVS referring to the VPS may or may not have the same number of temporal sublayers. When not present, the value of vps_all_layers_same_num_sublayers_flag is inferred to be equal to 1.

vps_all_independent_layers_flag equal to 1 specifies that all layers in the CVS are independently coded without using inter-layer prediction. vps_all_independent_layers_flag equal to 0 specifies that one or more of the layers in the CVS may use inter-layer prediction. When not present, the value of vps_all_independent_layers_flag is inferred to be equal to 1.

vps_layer_id[i] specifies the nuh_layer_id value of the i-th layer. For any two non-negative integer values of m and n, when m is less than n, the value of vps_layer_id[m] may be less than vps_layer_id[n].

vps_independent_layer_flag[i] equal to 1 specifies that the layer with index i does not use inter-layer prediction. vps_independent_layer_flag[i] equal to 0 specifies that the layer with index i may use inter-layer prediction and the syntax elements vps_direct_ref_layer_flag[i][j] for j in the range of 0 to i−1, inclusive, are present in VPS. When not present, the value of vps_independent_layer_flag[i] is inferred to be equal to 1.

vps_direct_ref_layer_flag[i][j] equal to 0 specifies that the layer with index j is not a direct reference layer for the layer with index i. vps_direct_ref_layer_flag [i][j] equal to 1 specifies that the layer with index j is a direct reference layer for the layer with index i. When vps_direct_ref_layer_flag [i][j] is not present for i and j in the range of 0 to vps_max_layers_minus1, inclusive, it is inferred to be equal to 0. When vps_independent_layer_flag[i] is equal to 0, there may be at least one value of j in the range of 0 to i−1, inclusive, such that the value of vps_direct_ref_layer_flag [i][j] is equal to 1. The variables NumDirectRefLayers[i], DirectRefLayerIdx[i][d], NumRefLayers[i], RefLayerIdx[i][r], and LayerUsedAsRefLayerFlag[j] are derived as follows:

```
for( i = 0; i <= vps_max_layers_minus1; i++ ) {
   for( j = 0; j <= vps_max_layers_minus1; j++ ) {
      dependencyFlag[ i ][ j ] = vps_direct_ref_layer_flag[ i ][ j ]
      for( k = 0, k < i; k++ )
         if( vps_direct_ref_layer_flag[ i ][ k ] &&
            dependencyFlag[ k ][ j ] )
               dependencyFlag[ i ][ j ] = 1
   }
   LayerUsedAsRefLayerFlag[ i ] = 0
}
for( i = 0; i <= vps_max_layers_minus1; i++ ) {
   for( j = 0, d = 0, r = 0; j <= vps_max_layers_minus1; j++ ) {    (37)
      if( direct_ref_layer_flag[ i ][ j ] ) {
         DirectRefLayerIdx[ i ][ d++ ] = j
         LayerUsedAsRefLayerFlag[ j ] = 1
      }
      if( dependencyFlag[ i ][ j ] )
         RefLayerIdx[ i ][ r++ ] = j
   }
   NumDirectRefLayers[ i ] = d
   NumRefLayers[ i ] = r
}
```

The variable GeneralLayerIdx[i], specifying the layer index of the layer with nuh_layer_id equal to vps_layer_id[i], is derived as follows:

```
for( i = 0; i <= vps_max_layers_minus1; i++ )              (38)
   GeneralLayerIdx[ vps_layer_id[ i ] ] = i
```

For any two different values of i and j, both in the range of 0 to vps_max_layers_minus1, inclusive, when dependencyFlag[i][j] equal to 1, for bitstream conformance, the values of chroma_format_idc and bit_depth_minus8 that apply to the i-th layer may be equal to the values of chroma_format_idc and bit_depth_minus8, respectively, that apply to the j-th layer.

max_tid_ref_present_flag[i] equal to 1 specifies that the syntax element max_tid_il_ref_pics_plus1[i] is present. max_tid_ref_present_flag[i] equal to 0 specifies that the syntax element max_tid_il_ref_pics_plus1[i] is not present.

max_tid_il_ref_pics_plus1[i] equal to 0 specifies that inter-layer prediction is not used by non-IRAP pictures of the i-th layer. max_tid_il_ref_pics_plus1[i] greater than 0 specifies that, for decoding pictures of the i-th layer, no picture with TemporalId greater than max_tid_il_ref_pics_plus1[i]−1 is used as ILRP. When not present, the value of max_tid_il_ref_pics_plus1[i] is inferred to be equal to 7.

each_layer_is_an_ols_flag equal to 1 specifies that each OLS contains only one layer and each layer itself in a CVS referring to the VPS is an OLS with the single included layer being the only output layer. each_layer_is_an_ols_flag equal to 0 that an OLS may contain more than one layer. If vps_max_layers_minus1 is equal to 0, the value of each_layer_is_an_ols_flag is inferred to be equal to 1. Otherwise, when vps_all_independent_layers_flag is equal to 0, the value of each_layer_is_an_ols_flag is inferred to be equal to 0.

ols_mode_idc equal to 0 specifies that the total number of OLSs specified by the VPS is equal to vps_max_layers_minus1+1, the i-th OLS includes the layers with layer indices from 0 to i, inclusive, and for each OLS only the highest layer in the OLS is output.

ols_mode_idc equal to 1 specifies that the total number of OLSs specified by the VPS is equal to vps_max_layers_minus1+1, the i-th OLS includes the layers with layer indices from 0 to i, inclusive, and for each OLS all layers in the OLS are output.

ols_mode_idc equal to 2 specifies that the total number of OLSs specified by the VPS is explicitly signalled and for each OLS the output layers are explicitly signalled and other layers are the layers that are direct or indirect reference layers of the output layers of the OLS.

The value of ols_mode_idc may be in the range of 0 to 2, inclusive. The value 3 of ols_mode_idc is reserved for future use by ITU-T|ISO/IEC.

When vps_all_independent_layers_flag is equal to 1 and each_layer_is_an_ols_flag is equal to 0, the value of ols_mode_idc is inferred to be equal to 2.

num_output_layer_sets_minus1 plus 1 specifies the total number of OLSs specified by the VPS when ols_mode_idc is equal to 2.

The variable TotalNumOlss, specifying the total number of OLSs specified by the VPS, is derived as follows:

```
if( vps_max_layers_minus1 = = 0 )
   TotalNumOlss = 1
else if( each_layer_is_an_ols_flag | | ols_mode_idc = =
   0 | | ols_mode_idc = = 1 )
   TotalNumOlss = vps_max_layers_minus1 + 1     (39)
else if( ols_mode_idc = = 2 )
   TotalNumOlss = num_output_layer_sets_minus1 + 1
``` ols_output_layer_flag[i][j] equal to 1 specifies that the layer with nuh_layer_id equal to vps_layer_id[j] is an output layer of the i-th OLS when ols_mode_idc is equal to 2. ols_output_layer_flag[i][j] equal to 0 specifies that the layer with nuh_layer_id equal to vps_layer_id[j] is not an output layer of the i-th OLS when ols_mode_idc is equal to 2. The variable NumOutputLayersInOls[i], specifying the number of output layers in the i-th OLS, the variable NumSubLayersInLayerInOLS[i][j], specifying the number of sublayers in the j-th layer in the i-th OLS, the variable OutputLayerIdInOls[i][j], specifying the nuh_layer_id value of the j-th output layer in the i-th OLS, and the variable LayerUsedAsOutputLayerFlag[k], specifying whether the k-th layer is used as an output layer in at least one OLS, are derived as follows:

```
NumOutputLayersInOls[ 0 ] = 1
OutputLayerIdInOls[ 0 ][ 0 ] = vps_layer_id[ 0 ]
NumSubLayersInLayerInOLS[ 0 ][ 0 ] =
vps_max_sub_layers_minus1 + 1
LayerUsedAsOutputLayerFlag[ 0 ] = 1
for( i = 1, i <= vps_max_layers_minus1; i++ ) {
    if( each_layer_is_an_ols_flag | | ols_mode_idc < 2 )
        LayerUsedAsOutputLayerFlag[ i ] = 1
    else /*( !each_layer_is_an_ols_flag && ols_mode_idc = = 2 ) */
        LayerUsedAsOutputLayerFlag[ i ] = 0
}
for( i = 1; i < TotalNumOlss; i++ )
    if( each_layer_is_an_ols_flag | | ols_mode_idc = = 0 ) {
        NumOutputLayersInOls[ i ] = 1
        OutputLayerIdInOls[ i ][ 0 ] = vps_layer_id[ i ]
        for( j = 0; j < i && ( ols_mode_idc = = 0 ); j++ )
            NumSubLayersInLayerInOLS[ i ][ j ] =
            max_tid_il_ref_pics_plus1[ i ]
        NumSubLayersInLayerInOLS[ i ][ i ] =
        vps_max_sub_layers_minus1 + 1
    } else if( ols_mode_idc = = 1 ) {
        NumOutputLayersInOls[ i ] = i + 1
        for( j = 0; j < NumOutputLayersInOls[ i ], j++ ) {
            OutputLayerIdInOls[ i ][ j ] = vps_layer_id[ j ]
            NumSubLayersInLayerInOLS[ i ][ j ] =
            vps_max_sub_layers_minus1 + 1
        }
    } else if( ols_mode_idc = = 2 ) {
        for( j = 0; j <= vps_max_layers_minus1; j++ ) {
            layerIncludedInOlsFlag[ i ][ j ] = 0
            NumSubLayersInLayerInOLS[ i ][ j ] = 0
        }
        for( k = 0, j = 0; k <= vps_max_layers_minus1; k++ )    (40)
            if( ols_output_layer_flag[ i ][ k ] ) {
                layerIncludedInOlsFlag[ i ][ k ] = 1
                LayerUsedAsOutputLayerFlag[ k ] = 1
                OutputLayerIdx[ i ][ j ] = k
                OutputLayerIdInOls[ i ][ j++ ] = vps_layer_id[ k ]
                NumSubLayersInLayerInOLS[ i ][ j ] =
vps_max_sub_layers_minus1 + 1
            }
        NumOutputLayersInOls[ i ] = j
        for( j = 0; j < NumOutputLayersInOls[ i ]; j++ ) {
            idx = OutputLayerIdx[ i ][ j ]
            for( k = 0; k < NumRefLayers[ idx ]; k++ ) {
                layerIncludedInOlsFlag[ i ][ RefLayerIdx[ idx ][ k ] ] = 1
                if( NumSubLayersInLayerInOLS[ i ][ RefLayerIdx[ idx ][
k ] ] <
max_tid_il_ref_pics_plus1[ OutputLayerIdInOls[ i ][ j ] ] )
                    NumSubLayersInLayerInOLS[ i ][ RefLayerIdx[ idx ][ k ] ] =
                    max_tid_il_ref_pics_plus1[ OutputLayerIdInOls[ i ][ j ] ]
            }
        }
    }
```

For each value of i in the range of 0 to vps_max_layers_minus1, inclusive, the values of LayerUsedAsRefLayerFlag[i] and LayerUsedAsOutputLayerFlag[i] may not be both equal to 0.

In other words, there may be no layer that is neither an output layer of at least one OLS nor a direct reference layer of any other layer.

For each OLS, there may be at least one layer that is an output layer. In other words, for any value of i in the range of 0 to TotalNumOlss−1, inclusive, the value of NumOutputLayersInOls[i] may be greater than or equal to 1.

The variable NumLayersInOls[i], specifying the number of layers in the i-th OLS, and the variable LayerIdInOls[i][j], specifying the nuh_layer_id value of the j-th layer in the i-th OLS, are derived as follows:

```
NumLayersInOls[ 0 ] = 1
LayerIdInOls[ 0 ][ 0 ] = vps_layer_id[ 0 ]
for( i = 1; i < TotalNumOlss; i++ ) {
    if( each_layer_is_an_ols_flag ) {
        NumLayersInOls[ i ] = 1
        LayerIdInOls[ i ][ 0 ] = vps_layer_id[ i ]          (41)
    } else if( ols_mode_idc = = 0 | | ols_mode_idc = = 1 ) {
        NumLayersInOls[ i ] = i + 1
        for( j = 0; j < NumLayersInOls[ i ]; j++ )
            LayerIdInOls[ i ][ j ] = vps_layer_id[ j ]
    } else if( ols_mode_idc = = 2 ) {
        for( k = 0, j = 0; k <= vps_max_layers_minus1; k++ )
            if( layerIncludedInOlsFlag[ i ][ k ] )
                LayerIdInOls[ i ][ j++ ] = vps_layer_id[ k ]
        NumLayersInOls[ i ] = j
    }
}
```

NOTE 1

The 0-th OLS contains only the lowest layer (i.e., the layer with nuh_layer_id equal to vps_layer_id[ 0 ]) and for the 0-th OLS the only included layer is output.

The variable OlsLayerIdx[i][j], specifying the OLS layer index of the layer with nuh_layer_id equal to LayerIdInOls[i][j], is derived as follows:

```
for( i = 0; i < TotalNumOlss; i++ )
    for j = 0; j < NumLayersInOls[ i ]; j++ )            (42)
        OlsLayerIdx[ i ][ LayerIdInOls[ i ][ j ] ] = j
```

The lowest layer in each OLS may be an independent layer. In other words, for each i in the range of 0 to TotalNumOlss−1, inclusive, the value of vps_independent_layer_flag[GeneralLayerIdx[LayerIdInOls[i][0]]] may be equal to 1. Each layer may be included in at least one OLS specified by the VPS. In other words, for each layer with a particular value of nuh_layer_id nuhLayerId equal to one of vps_layer_id[k] for k in the range of 0 to vps_max_layers_minus1, inclusive, there may be at least one pair of values of i and j, where i is in the range of 0 to TotalNumOlss−1, inclusive, and j is in the range of NumLayersInOls[i]−1, inclusive, such that the value of LayerIdInOls[i][j] is equal to nuhLayerId.

vps_num_pts_minus1 plus 1 specifies the number of profile_tier_level( ) syntax structures in the VPS. The value of vps_num_ptls_minus1 may be less than TotalNumOlss.

pt_present_flag[i] equal to 1 specifies that profile, tier, and general constraints information are present in the i-th profile_tier_level( ) syntax structure in the VPS. pt_present_flag[i] equal to 0 specifies that profile, tier, and general constraints information are not present in the i-th profile_tier_level( ) syntax structure in the VPS. The value of pt_present_flag[0] is inferred to be equal to 1. When pt_present_flag[i] is equal to 0, the profile, tier, and general constraints information for the i-th profile_tier_level( ) syntax structure in the VPS are inferred to be the same as that for the (i−1)-th profile_tier_level( ) syntax structure in the VPS. ptl_max_temporal_id[i] specifies the TemporalId of the highest sublayer representation for which the level information is present in the i-th profile_tier_level( ) syntax structure in the VPS. The value of ptl_max_temporal_id[i] may be in the range of 0 to vps_max_sublayers_minus1, inclusive. When vps_max_sublayers_minus1 is equal to 0, the value of ptl_max_temporal_id[i] is inferred to be equal to 0. When vps_max_sublayers_minus1 is greater than 0 and vps_all_layers_same_num_sublayers_flag is equal to 1, the value of ptl_max_temporal_id[i] is inferred to be equal to vps_max_sublayers_minus1.

vps_ptl_alignment_zero_bit may be equal to 0.

ols_ptl_idx[i] specifies the index, to the list of profile_tier_level( ) syntax structures in the VPS, of the profile_tier_level( ) syntax structure that applies to the i-th OLS. When present, the value of ols_ptl_idx[i] may be in the range of 0 to vps_num_ptls_minus1, inclusive. When vps_num_ptls_minus1 is equal to 0, the value of ols_ptl_idx[i] is inferred to be equal to 0. When NumLayersInOls[i] is equal to 1, the profile_tier_level( ) syntax structure that applies to the i-th OLS is also present in the SPS referred to by the layer in the i-th OLS. For bitstream conformance, when NumLayersInOls[i] is equal to 1, the profile_tier_level( ) syntax structures signalled in the VPS and in the SPS for the i-th OLS may be identical.

vps_num_dpb_params specifies the number of dpb_parameters( ) syntax structures in the VPS. The value of vps_num_dpb_params may be in the range of 0 to 16, inclusive. When not present, the value of vps_num_dpb_params is inferred to be equal to 0.

vps_sublayer_dpb_params_present flag is used to control the presence of max_dec_pic_buffering_minus1[ ], max_num_reorder_pics[ ], and max_latency_increase_plus1[ ] syntax elements in the dpb_parameters( ) syntax structures in the VPS. When not present, vps_sub_dpb_params_info_present_flag is inferred to be equal to 0.

dpb_max_temporal_id[i] specifies the TemporalId of the highest sublayer representation for which the DPB parameters may be present in the i-th dpb_parameters( ) syntax structure in the VPS. The value of dpb_max_temporal_id[i] may be in the range of 0 to vps_max_sublayers_minus1, inclusive. When vps_max_sublayers_minus1 is equal to 0, the value of dpb_max_temporal_id[i] is inferred to be equal to 0. When vps_max_sublayers_minus1 is greater than 0 and vps_all_layers_same_num_sublayers_flag is equal to 1, the value of dpb_max_temporal_id[i] is inferred to be equal to vps_max_sublayers_minus1.

ois_dpb_pic_width[i] specifies the width, in units of luma samples, of each picture storage buffer for the i-th OLS.

ols_dpb_pic_height[i] specifies the height, in units of luma samples, of each picture storage buffer for the i-th OLS.

ols_dpb_params_idx[i] specifies the index, to the list of dpb_parameters( ) syntax structures in the VPS, of the dpb_parameters( ) syntax structure that applies to the i-th OLS when NumLayersInOls[i] is greater than 1. When present, the value of ols_dpb_params_idx[i] may be in the range of 0 to vps_num_dpb_params−1, inclusive. When ols_dpb_params_idx[i] is not present, the value of ols_dpb_params_idx[i] is inferred to be equal to 0.

When NumLayersInOls[i] is equal to 1, the dpb_parameters( ) syntax structure that applies to the i-th OLS is present in the SPS referred to by the layer in the i-th OLS.

vps_general_hrd_params_present_flag equal to 1 specifies that the syntax structure general_hrd_parameters( ) and other HRD parameters are present in the VPS RBSP syntax structure. vps_general_hrd_params_present_flag equal to 0 specifies that the syntax structure general_hrd_parameters( ) and other HRD parameters are not present in the VPS RBSP syntax structure. When not present, the value of vps_general_hrd_params_present_flag is inferred to be equal to 0.

When NumLayersInOls[i] is equal to 1, the general_hrd_parameters( ) syntax structure that applies to the i-th OLS is present in the SPS referred to by the layer in the i-th OLS.

vps_sublayer_cpb_params_present_flag equal to 1 specifies that the i-th ols_hrd_parameters( ) syntax structure in the VPS contains HRD parameters for the sublayer representations with TemporalId in the range of 0 to hrd_max_tid[i], inclusive. vps_sublayer_cpb_params_present_flag equal to 0 specifies that the i-th ols_hrd_parameters( ) syntax structure in the VPS contains HRD parameters for the sublayer representation with TemporalId equal to hrd_max_tid[i] only. When vps_max_sublayers_minus1 is equal to 0, the value of vps_sublayer_cpb_params_present_flag is inferred to be equal to 0.

When vps_sublayer_cpb_params_present_flag is equal to 0, the HRD parameters for the sublayer representations with TemporalId in the range of 0 to hrd_max_tid[i]−1, inclusive, are inferred to be the same as that for the sublayer representation with TemporalId equal to hrd_max_tid[i]. These include the HRD parameters starting from the fixed_pic_rate_general_flag[i] syntax element till the sublayer_hrd_parameters(i) syntax structure immediately under the condition "if(general_vcl_hrd_params_present_flag)" in the ols_hrd_parameters syntax structure.

num_ols_hrd_params_minus1 plus 1 specifies the number of ols_hrd_parameters( ) syntax structures present in the general_hrd_parameters( ) syntax structure when vps_general_hrd_params_present_flag is equal to 1. The value of num_ols_hrd_params_minus1 may be in the range of 0 to TotalNumOlss−1, inclusive.

hrd_max_tid[i] specifies the TemporalId of the highest sublayer representation for which the HRD parameters are contained in the i-th ols_hrd_parameters( ) syntax structure. The value of hrd_max_tid[i] may be in the range of 0 to vps_max_sublayers_minus1, inclusive. When vps_max_sublayers_minus1 is equal to 0, the value of hrd_max_tid[i] is inferred to be equal to 0. When vps_max_sublayers_minus1 is greater than 0 and vps_all_layers_same_num_sublayers_flag is equal to 1, the value of hrd_max_tid[i] is inferred to be equal to vps_max_sublayers_minus1.

ols_hrd_idx[i] specifies the index, to the list of ols_hrd_parameters( ) syntax structures in the VPS, of the ols_hrd_parameters( ) syntax structure that applies to the i-th OLS when NumLayersInOls[i] is greater than 1. The value of ols_hrd_idx[[i] may be in the range of 0 to num_ols_hrd_params_minus1, inclusive.

When NumLayersInOls[i] is equal to 1, the ols_hrd_parameters( ) syntax structure that applies to the i-th OLS is present in the SPS referred to by the layer in the i-th OLS. If the value of num_ols_hrd_param_minus1+1 is equal to TotalNumOlss, the value of ols_hrd_idx[i] is inferred to be equal to i. Otherwise, when NumLayersInOls[i] is greater than 1 and num_ols_hrd_params_minus1 is equal to 0, the value of ols_hrd_idx[[i] is inferred to be equal to 0.

vps_extension_flag equal to 0 specifies that no vps_extension_data_flag syntax elements are present in the VPS RBSP syntax structure. vps_extension_flag equal to 1 specifies that there are vps_extension_data_flag syntax elements present in the VPS RBSP syntax structure.

vps_extension_data_flag may have any value. Its presence and value do not affect decoder conformance to profiles specified in this version of this Specification. Decoders conforming to this version of this Specification may ignore all vps_extension_data_flag syntax elements.

7.4.3.3 Sequence Parameter Set RBSP Semantics

A SPS RBSP may be available to the decoding process prior to it being referenced, included in at least one AU with TemporalId equal to 0 or provided through external means. All SPS NAL units with a particular value of sps_seq_parameter_set_id in a CVS may have the same content.

sps_seq_parameter_set_id provides an identifier for the SPS for reference by other syntax elements.

SPS NAL units, regardless of the nuh_layer_id values, share the same value space of sps_seq_parameter_set_id.

Let spsLayerId be the value of the nuh_layer_id of a particular SPS NAL unit, and vclLayerId be the value of the nuh_layer_id of a particular VCL NAL unit. The particular VCL NAL unit may not refer to the particular SPS NAL unit unless spsLayerId is less than or equal to vclLayerId and the layer with nuh_layer_id equal to spsLayerId is included in at least one OLS that includes the layer with nuh_layer_id equal to vclLayerId.

sps_video_parameter_set_id, when greater than 0, specifies the value of vps_video_parameter_set_id for the VPS referred to by the SPS.

When sps_video_parameter_set_id is equal to 0, the following applies.

The SPS does not refer to a VPS.

No VPS is referred to when decoding each CLVS referring to the SPS.

The value of vps_max_layers_minus1 is inferred to be equal to 0.

The CVS may contain only one layer (i.e., all VCL NAL unit in the CVS may have the same value of nuh_layer_id).

The value of GeneralLayerIdx[nuh_layer_id] is inferred to be equal to 0.

The value of vps_independent_layer_flag[GeneralLayerIdx[nuh_layer_id]] is inferred to be equal to 1.

When vps_independent_layer_flag[GeneralLayerIdx[nuh_layer_id]] is equal to 1, the SPS referred to by a CLVS with a particular nuh_layer_id value nuhLayerId may have nuh_layer_id equal to nuhLayerId.

The value of sps_video_parameter_set_id may be the same in all SPSs that are referred to by CLVSs in a CVS.

sps_max_sublayers_minus1 plus 1 specifies the maximum number of temporal sublayers that may be present in each CLVS referring to the SPS. The value of sps_max_sublayers_minus1 may be in the range of 0 to vps_max_sublayers_minus1, inclusive.

sps_reserved_zero_4bits may be equal to 0 in bitstreams conforming to this version of this Specification. Other values for sps_reserved_zero_4bits are reserved for future use by ITU-T|ISO/IEC.

sps_ptl_dpb_hrd_params_present_flag equal to 1 specifies that a profile_tier_level( ) syntax structure and a dpb_parameters( ) syntax structure are present in the SPS, and a general_hrd_parameters( ) syntax structure and an ols_hrd_parameters( ) syntax structure may also be present in the SPS. sps_ptl_dpb_hrd_params_present_flag equal to 0 specifies that none of these four syntax structures is present in the SPS. The value of sps_ptl_dpb_hrd_params_present_flag may be equal to vps_independent_layer_flag[GeneralLayerIdx[nuh_layer_id]].

gdr_enabled_flag equal to 1 specifies that GDR pictures may be present in CLVSs referring to the SPS. gdr_enabled_flag equal to 0 specifies that GDR pictures are not present in CLVSs referring to the SPS.

chroma_format_idc specifies the chroma sampling relative to the luma sampling as specified in clause 6.2.

separate_colour_plane_flag equal to 1 specifies that the three colour components of the 4:4:4 chroma format are coded separately. separate_colour_plane_flag equal to 0 specifies that the colour components are not coded separately. When separate_colour_plane_flag is not present, it is inferred to be equal to 0. When separate_colour_plane_flag is equal to 1, the coded picture consists of three separate components, each of which consists of coded samples of one colour plane (Y, Cb, or Cr) and uses the monochrome coding syntax. In this case, each colour plane is associated with a specific colour_plane_id value.

NOTE 1—There is no dependency in decoding processes between the colour planes having different colour_plane_id values. For example, the decoding process of a monochrome picture with one value of colour_plane_id does not use any data from monochrome pictures having different values of colour_plane_id for inter prediction.

Depending on the value of separate colour_plane_flag, the value of the variable ChromaArrayType is assigned as follows:

If separate_colour_plane_flag is equal to 0, ChromaArrayType is set equal to chroma_format_idc.

Otherwise (separate_colour_plane_flag is equal to 1), ChromaArrayType is set equal to 0.

res_change_in_clvs_allowed_flag equal to 1 specifies that the picture spatial resolution may change within a CLVS referring to the SPS. res_change_in_clvs_allowed_flag equal to 0 specifies that the picture spatial resolution does not change within any CLVS referring to the SPS.

pic_width_max_in_luma_samples specifies the maximum width, in units of luma samples, of each decoded picture referring to the SPS. pic_width_max_in_luma_samples may not be equal to 0 and may be an integer multiple of Max(8, MinCbSizeY).

For bitstream conformance, for any OLS with OLS index i that contains one or more layers that refers to the SPS, the value of pic_width_max_in_luma_samples may be less than or equal to the value of ols_dpb_pic_width[i].

pic_height_max_in_luma samples specifies the maximum height, in units of luma samples, of each decoded picture referring to the SPS. pic_height_max_in_luma_samples may not be equal to 0 and may be an integer multiple of Max(8, MinCbSizeY).

For bitstream conformance, for any OLS with OLS index i that contains one or more layers that refers to the SPS, the value of pic_height_max_in_luma_samples may be less than or equal to the value of ols_dpb_pic_height[i].

sps_conformance_window_flag equal to 1 indicates that the conformance cropping window offset parameters follow next in the SPS. sps_conformance_window_flag equal to 0 indicates that the conformance cropping window offset parameters are not present in the SPS. sps_conf_win_left_offset, sps_conf_win_right offset, sps_conf_win_top_offset, and sps_conf_win_bottom_offset specify the cropping window that is applied to pictures with pic_width_in_luma_samples equal to pic_width_max_in_luma_samples and pic_height_in_luma_samples equal to pic_height_max_in_luma_samples. When sps_conformance_window_flag is equal to 0, the values of sps_conf_win_left_offset, sps_conf_win_right_offset, sps_conf_win_top_offset, and sps_conf_win_bottom_offset are inferred to be equal to 0.

The conformance cropping window contains the luma samples with horizontal picture coordinates from SubWidthC*sps_conf_win_left_offset to pic_width_max_in_luma_samples−(SubWidthC*sps_conf_win_right_offset+1) and vertical picture coordinates from SubHeightC*sps_conf_win_top_offset to pic_height_max_in_luma_samples−(SubHeightC*sps_conf_win_bottom_offset+1), inclusive.

The value of SubWidthC*(sps_conf_win_left_offset+sps_conf_win_right_offset) may be less than pic_width_max_in_luma_samples, and the value of Sub- HeightC*(sps_conf_win_top_offset+sps_conf_win_bottom_offset) may be less than pic_height_max_in_luma_samples.

When ChromaArrayType is not equal to 0, the corresponding specified samples of the two chroma arrays are the samples having picture coordinates (x/SubWidthC, y/SubHeightC), where (x, y) are the picture coordinates of the specified luma samples.

NOTE 2—The conformance cropping window offset parameters are only applied at the output. All internal decoding processes are applied to the uncropped picture size.

sps_log_2_ctu_size_minus5 plus 5 specifies the luma coding tree block size of each CTU. The value of sps_log_2_ctu_size_minus5 may be in the range of 0 to 2, inclusive. The value 3 for sps_log_2_ctu_size_minus5 is reserved for future use by ITU-T|ISO/IEC.

The variables CtbLog2SizeY and CtbSizeY are derived as follows:

| | |
|---|---|
| CtbLog2SizeY = sps_log2_ctu_size_minus5 + 5 | (43) |
| CtbSizeY = 1 << CtbLog2SizeY | (44) | subpic_info_present_flag equal to 1 specifies that subpicture information is present for the CLVS and there may be one or more than one subpicture in each picture of the CLVS. subpic_info_present_flag equal to 0 specifies that subpicture information is not present for the CLVS and there is only one subpicture in each picture of the CLVS.

When res_change_in_clvs_allowed_flag is equal to 1, the value of subpic_info_present_flag may be equal to 0.

NOTE 3—When a bitstream is the result of a sub-bitstream extraction process and contains only a subset of the subpictures of the input bitstream to the sub-bitstream extraction process, it might be required to set the value of subpic_info_present_flag equal to 1 in the RBSP of the SPSs.

sps_num_subpics_minus1 plus 1 specifies the number of subpictures in each picture in the CLVS. The value of sps_num_subpics_minus1 may be in the range of 0 to Ceil(pic_width_max_in_luma_samples+CtbSizeY)*Ceil(pic_height_max_in_luma_samples+CtbSizeY)−1, inclusive. When not present, the value of sps_num_subpics_minus1 is inferred to be equal to 0.

sps_independent_subpics_flag equal to 1 specifies that no intra prediction, no inter prediction and no in-loop filtering operations may be performed across any subpicture boundary in the CLVS. sps_independent_subpics_flag equal to 0 specifies that inter prediction or in-loop filtering operations across the subpicture boundaries in the CLVS may be allowed. When not present, the value of sps_independent_subpics_flag is inferred to be equal to 0.

subpic_ctu_top_left_x[i] specifies horizontal position of top left CTU of i-th subpicture in unit of CtbSizeY. The length of the syntax element is Ceil(Log2((pic_width_max_in_luma_samples+CtbSizeY−1)>>CtbLog2SizeY)) bits. When not present, the value of subpic_ctu_top_left_x[i] is inferred to be equal to 0.

subpic_ctu_top_left_y[i] specifies vertical position of top left CTU of i-th subpicture in unit of CtbSizeY. The length of the syntax element is Ceil(Log2((pic_height_max_in_luma_samples+CtbSizeY−1)>>CtbLog2SizeY)) bits. When not present, the value of subpic_ctu_top_left_y[i] is inferred to be equal to 0.

subpic_width_minus1[i] plus 1 specifies the width of the i-th subpicture in units of CtbSizeY. The length of the syntax element is Ceil(Log2((pic_width_max_in_luma_samples+CtbSizeY−1)>>CtbLog2SizeY)) bits. When not present, the value of subpic_width_minus1[i] is inferred to be equal to ((pic_width_max_in_luma_samples+CtbSizeY−1)>>CtbLog2SizeY)−subpic_ctu_top_left_x[i]−1.

subpic_height_minus1[i] plus 1 specifies the height of the i-th subpicture in units of CtbSizeY. The length of the syntax element is Ceil(Log2((pic_height_max_in_luma_samples+CtbSizeY−1)>>CtbLog2SizeY)) bits. When not present, the value of subpic_height_minus1[i] is inferred to be equal to ((pic_height_max_in_luma_samples+CtbSizeY−1)>>CtbLog2SizeY)−subpic_ctu_top_left_y[i]−1.

subpic_treated_as_pic_flag[i] equal to 1 specifies that the i-th subpicture of each coded picture in the CLVS is treated as a picture in the decoding process excluding in-loop filtering operations. subpic_treated_as_pic_flag[i] equal to 0 specifies that the i-th subpicture of each coded picture in the CLVS is not treated as a picture in the decoding process excluding in-loop filtering operations. When not present, the value of subpic_treated_as_pic_flag[i] is inferred to be equal to sps_independent_subpics_flag.

When subpic_treated_as_pic_flag[i] is equal to 1, for bitstream conformance, all of the following conditions are true for each output layer and its reference layers in an OLS that includes the layer containing the i-th subpicture as an output layer:

All pictures in the output layer and its reference layers may have the same value of pic_width_in_luma_samples and the same value of pic_height_in_luma_samples.

All the SPSs referred to by the output layer and its reference layers may have the same value of sps_num_subpics_minus1 and may have the same values of subpic_ctu_top_left_x[j], subpic_ctu_top_left_y[j], subpic_width_minus1[j], subpic_height_minus1[j], and loop_filter_across_subpic_enabled_flag[j], respectively, for each value of j in the range of 0 to sps_num_subpics_minus1, inclusive.

All pictures in each access unit in the output layer and its reference layers may have the same value of SubpicIdVal[j] for each value of j in the range of 0 to sps_num_subpics_minus1, inclusive.

loop_filter_across_subpic_enabled_flag[i] equal to 1 specifies that in-loop filtering operations may be performed across the boundaries of the i-th subpicture in each coded picture in the CLVS. loop_filter_across_subpic_enabled_flag[i] equal to 0 specifies that in-loop filtering operations are not performed across the boundaries of the i-th subpicture in each coded picture in the CLVS. When not present, the value of loop_filter_across_subpic_enabled_pic_flag[i] is inferred to be equal to 1−sps_independent_subpics_flag.

For bitstream conformance, the shapes of the subpictures may be such that each subpicture, when decoded, may have its entire left boundary and entire top boundary consisting of picture boundaries or consisting of boundaries of previously decoded subpictures.

sps_subpic_id_len_minus1 plus 1 specifies the number of bits used to represent the syntax element sps_subpic_id[i], the syntax elements pps_subpic_id[i], when present, and the syntax element slice_subpic_id, when present. The value of sps_subpic_id_len_minus1 may be in the range of 0 to 15, inclusive. The value of 1<<(sps_subpic_id_len_minus1+1) may be greater than or equal to sps_num_subpics_minus1+1.

subpic_id_mapping_explicitly_signalled_flag equal to 1 specifies that the subpicture ID mapping is explicitly signalled, either in the SPS or in the PPSs referred to by coded pictures of the CLVS. subpic_id_mapping_explicitly_signalled_flag equal to 0 specifies that the subpicture ID mapping is not explicitly signalled for the CLVS. When not present, the value of subpic_id_mapping_explicitly_signalled_flag is inferred to be equal to 0.

subpic_id_mapping_in_sps_flag equal to 1 specifies that the subpicture ID mapping is signalled in the SPS when subpic_id_mapping_explicitly_signalled_flag is equal to 1. subpic_id_mapping_in_sps_flag equal to 0 specifies that subpicture ID mapping is signalled in the PPSs referred to by coded pictures of the CLVS when subpic_id_mapping_explicitly_signalled_flag is equal to 1.

sps_subpic_id[i] specifies the subpicture ID of the i-th subpicture. The length of the sps_subpic_id[i] syntax element is sps_subpic_id_len_minus1+1 bits.

bit_depth_minus8 specifies the bit depth of the samples of the luma and chroma arrays, BitDepth, and the value of the luma and chroma quantization parameter range offset, QpBdOffset, as follows:

$$\text{BitDepth} = 8 + \text{bit\_depth\_minus8} \quad (45)$$
$$\text{QpBdOffset} = 6 * \text{bit\_depth\_minus8} \quad (46)$$

bit_depth_minus8 may be in the range of 0 to 8, inclusive.

sps_entropy_coding_sync_enabled_flag equal to 1 specifies that a specific synchronization process for context variables is invoked before decoding the CTU that includes the first CTB of a row of CTBs in each tile in each picture referring to the SPS, and a specific storage process for context variables is invoked after decoding the CTU that includes the first CTB of a row of CTBs in each tile in each picture referring to the SPS. sps_entropy_coding_sync_enabled_flag equal to 0 specifies that no specific synchronization process for context variables may be required to be invoked before decoding the CTU that includes the first CTB of a row of CTBs in each tile in each picture referring to the SPS, and no specific storage process for context variables may be required to be invoked after decoding the CTU that includes the first CTB of a row of CTBs in each tile in each picture referring to the SPS.

sps_wpp_entry_point_offsets_present_flag equal to 1 specifies that signalling for entry point offsets for CTU rows may be present in the slice headers of pictures referring to the SPS when sps_entropy_coding_sync_enabled_flag is equal to 1. sps_wpp_entry_point_offsets_present_flag equal to 0 specifies that signalling for entry point offsets for CTU rows are not present in the slice headers of pictures referring to the SPS. When not present, the value of sps_wpp_entry_point_offsets_present_flag is inferred to be equal to 0.

sps_weighted_pred_flag equal to 1 specifies that weighted prediction may be applied to P slices referring to the SPS. sps_weighted_pred_flag equal to 0 specifies that weighted prediction is not applied to P slices referring to the SPS.

sps_weighted_bipred_flag equal to 1 specifies that explicit weighted prediction may be applied to B slices referring to the SPS. sps_weighted_bipred_flag equal to 0 specifies that explicit weighted prediction is not applied to B slices referring to the SPS.

log_2_max_pic_order_cnt_lsb_minus4 specifies the value of the variable MaxPicOrderCntLsb that is used in the decoding process for picture order count as follows:

$$\text{MaxPicOrderCntLsb} = 2^{(\log 2\_max\_pic\_order\_cnt\_lsb\_minus4+4)} \quad (47)$$

The value of log_2_max_pic_order_cnt_lsb_minus4 may be in the range of 0 to 12, inclusive.

sps_poc_msb_flag equal to 1 specifies that the ph_poc_msb_present_flag syntax element is present in PHs referring to the SPS. sps_poc_msb_flag equal to 0 specifies that the ph_poc_msb_present_flag syntax element is not present in PHs referring to the SPS.

poc_msb_len_minus1 plus 1 specifies the length, in bits, of the poc_msb_val syntax elements, when present in the PHs referring to the SPS. The value of poc_msb_len_minus1 may be in the range of 0 to 32−log_2_max_pic_order_cnt_lsb_minus4−5, inclusive.

num_extra_ph_bits_bytes specifies the number of bytes of extra bits in the PH syntax structure for coded pictures referring to the SPS. The value of num_extra_ph_bits_bytes may be equal to 0 in bitstreams conforming to this version of this Specification. Although the value of num_extra_ph_bits_bytes may be required to be equal to 0 in this version of this Specification, decoder conforming to this version of this Specification may allow the value of num_extra_ph_bits_bytes equal to 1 or 2 to appear in the syntax.

num_extra_sh_bits_bytes specifies the number of bytes of extra bits in the slice headers for coded pictures referring to the SPS. The value of num_extra_sh_bits_bytes may be equal to 0 in bitstreams conforming to this version of this Specification. Although the value of num_extra_sh_bits_bytes may be required to be equal to 0 in this version of this Specification, decoder conforming to this version of this Specification may allow the value of num_extra_sh_bits_bytes equal to 1 or 2 to appear in the syntax.

sps_sublayer_dpb_params_flag is used to control the presence of max_dec_pic_buffering_minus1[i], max_num_reorder_pics[i], and max_latency_increase_plus1[i] syntax elements in the dpb_parameters( ) syntax structure in the SPS. When not present, the value of sps_sub_dpb_params_info_present_flag is inferred to be equal to 0.

long_term_ref_pics_flag equal to 0 specifies that no LTRP is used for inter prediction of any coded picture in the CLVS. long_term_ref_pics_flag equal to 1 specifies that LTRPs may be used for inter prediction of one or more coded pictures in the CLVS.

inter_layer_ref_pics_present_flag equal to 0 specifies that no ILRP is used for inter prediction of any coded picture in the CLVS. inter_layer_ref_pic_flag equal to 1 specifies that ILRPs may be used for inter prediction of one or more coded pictures in the CLVS. When sps_video_parameter_set_id is equal to 0, the value of inter_layer_ref_pics_present_flag is inferred to be equal to 0. When vps_independent_layer_flag [GeneralLayerIdx[nuh_layer_id]] is equal to 1, the value of inter_layer_ref_pics_present_flag may be equal to 0.

sps_idr_rpl_present_flag equal to 1 specifies that reference picture list syntax elements are present in slice headers of IDR pictures. sps_idr_rpl_present_flag equal to 0 specifies that reference picture list syntax elements are not present in slice headers of IDR pictures.

rpl1_same_as_rpl0_flag equal to 1 specifies that the syntax element num_ref_pic_lists_in_sps[1] and the syntax structure ref_pic_list_struct(1, rplsIdx) are not present and the following applies:

The value of num_ref_pic_lists_in_sps[1] is inferred to be equal to the value of num_ref_pic_lists_in_sps[0].

The value of each of syntax elements in ref_pic_list_struct(1, rplsIdx) is inferred to be equal to the value of corresponding syntax element in ref_pic_list_struct(0, rplsIdx) for rplsIdx ranging from 0 to num_ref_pic_lists_in_sps[0]−1.

num_ref_pic_lists_in_sps[i] specifies the number of the ref_pic_list_struct(listIdx, rplsIdx) syntax structures with listIdx equal to i included in the SPS. The value of num_ref_pic_lists_in_sps[i] may be in the range of 0 to 64, inclusive.

NOTE 4—For each value of listIdx (equal to 0 or 1), a decoder should allocate memory for a total number of num_ref_pic_lists_in_sps[i]+1 ref_pic_list_struct(listIdx, rplsIdx) syntax structures since there may be one ref_pic_list_struct(listIdx, rplsIdx) syntax structure directly signalled in the slice headers of a current picture.

qtbtt_dual_tree_intra_flag equal to 1 specifies that, for I slices, each CTU is split into coding units with 64×64 luma samples using an implicit quadtree split, and these coding units are the root of two separate coding_tree syntax structure for luma and chroma. qtbtt_dual_tree_intra_flag equal to 0 specifies separate coding_tree syntax structure is not used for I slices. When qtbtt_dual_tree_intra_flag is not present, it is inferred to be equal to 0.

log2_min_luma_coding_block_size_minus2 plus 2 specifies the minimum luma coding block size. The value range of log2_min_luma_coding_block_size_minus2 may be in the range of 0 to Min(4, sps_log2_ctu_size_minus5+3), inclusive.

The variables MinCbLog2SizeY, MinCbSizeY, IbcBufWidthY, IbcBufWidthC and Vsize are derived as follows:

$$
\begin{aligned}
&\text{MinCbLog2SizeY} = \\
&\quad \text{log2\_min\_luma\_coding\_block\_size\_minus2} + 2 \quad (48) \\
&\text{MinCbSizeY} = 1 << \text{MinCbLogZSizeY} \quad (49) \\
&\text{IbcBufWidthY} = 256 * 128 / \text{CtbSizeY} \quad (50) \\
&\text{IbcBufWidthC} = \text{IbcBufWidthY} / \text{SubWidthC} \quad (51) \\
&\text{VSize} = \text{Min}(64, \text{CtbSizeY}) \quad (52)
\end{aligned}
$$

The value of MinCbSizeY may be less than or equal to VSize.

The variables CtbWidthC and CtbHeightC, which specify the width and height, respectively, of the array for each chroma CTB, are derived as follows:
- If chroma_format_idc is equal to 0 (monochrome) or separate_colour_plane_flag is equal to 1, CtbWidthC and CtbHeightC are both equal to 0.
- Otherwise, CtbWidthC and CtbHeightC are derived as follows:

$$
\begin{aligned}
&\text{CtbWidthC} = \text{CtbSizeY} / \text{SubWidthC} \quad (53) \\
&\text{CtbHeightC} = \text{CtbSizeY} / \text{SubHeightC} \quad (54)
\end{aligned}
$$

For log2BlockWidth ranging from 0 to 4 and for log2BlockHeight ranging from 0 to 4, inclusive, the up-right diagonal scan order array initialization process as specified in clause 6.5.2 is invoked with 1<<log2BlockWidth and 1<<log2BlockHeight as inputs, and the output is assigned to DiagScanOrder[log2BlockWidth][log2BlockHeight].

For log2BlockWidth ranging from 0 to 6 and for log2BlockHeight ranging from 0 to 6, inclusive, the horizontal and vertical traverse scan order array initialization process as specified in clause 6.5.3 is invoked with 1<<log2BlockWidth and 1<<log2BlockHeight as inputs, and the output is assigned to HorTravScanOrder[log2BlockWidth][log2BlockHeight] and VerTravScanOrder[log2BlockWidth][log2BlockHeight].

partition_constraints_override_enabled_flag equal to 1 specifies the presence of partition_constraints_override_flag in PHs referring to the SPS. partition_constraints_override_enabled_flag equal to 0 specifies the absence of partition_constraints_override_flag in PHs referring to the SPS.

sps_log2_diff_min_qt_min_cb_intra_slice_luma specifies the default difference between the base 2 logarithm of the minimum size in luma samples of a luma leaf block resulting from quadtree splitting of a CTU and the base 2 logarithm of the minimum coding block size in luma samples for luma CUs in slices with slice_type equal to 2 (I) referring to the SPS. When partition_constraints_override_enabled_flag is equal to 1, the default difference can be overridden by ph_log2_diff_min_qt_min_cb_luma present in PHs referring to the SPS. The value of sps_log2_diff_min_qt_min_cb_intra_slice_luma may be in the range of 0 to CtbLog2SizeY−MinCbLog2SizeY, inclusive. The base 2 logarithm of the minimum size in luma samples of a luma leaf block resulting from quadtree splitting of a CTU is derived as follows:

$$
\begin{aligned}
&\text{MinQtLog2SizeIntraY} = \\
&\quad \text{sps\_log2\_diff\_min\_qt\_min\_cb\_intra\_slice\_luma} + \\
&\quad \text{MinCbLog2SizeY} \quad (55)
\end{aligned}
$$

sps_max_mtt_hierarchy_depth_intra_slice_luma specifies the default maximum hierarchy depth for coding units resulting from multi-type tree splitting of a quadtree leaf in slices with slice_type equal to 2 (I) referring to the SPS. When partition_constraints_override_enabled_flag is equal to 1, the default maximum hierarchy depth can be overridden by ph_max_mtt_hierarchy_depth_intra_slice_luma present in PHs referring to the SPS. The value of sps_max_mtt_hierarchy_depth_intra_slice_luma may be in the range of 0 to 2*(CtbLog2SizeY−MinCbLog2SizeY), inclusive.

sps_log2_diff_max_bt_min_qt_intra_slice_luma specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type equal to 2 (I) referring to the SPS. When partition_constraints_override_enabled_flag is equal to 1, the default difference can be overridden by ph_log2_diff_max_bt_min_qt_luma present in PHs referring to the SPS. The value of sps_log2_diff_max_bt_min_qt_intra_slice_luma may be in the range of 0 to CtbLog2SizeY−MinQtLog2SizeIntraY, inclusive. When sps_log2_diff_max_bt_min_qt_intra_slice_luma is not present, the value of sps_log2_diff_max_bt_min_qt_intra_slice_luma is inferred to be equal to 0.

sps_log2_diff_max_tt_min_qt_intra_slice_luma specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 2 (I) referring to the SPS. When partition_constraints_override_enabled_flag is equal to 1, the default difference can be overridden by ph_log2_diff_max_tt_min_qt_luma present in PHs referring to the SPS. The value of sps_log2_diff_max_tt_min_qt_intra_slice_luma may be in the range of 0 to CtbLog2SizeY−MinQtLog2SizeIntraY, inclusive. When sps_log2_diff_max_tt_min_qt_intra_slice_luma is not present, the value of sps_log2_diff_max_tt_min_qt_intra_slice_luma is inferred to be equal to 0.

sps_log2_diff_min_qt_min_cb_inter_slice specifies the default difference between the base 2 logarithm of the minimum size in luma samples of a luma leaf block resulting from quadtree splitting of a CTU and the base 2 logarithm of the minimum luma coding block size in luma samples for luma CUs in slices with slice_type equal to 0 (B) or 1 (P) referring to the SPS. When partition_constraints_override_enabled_flag is equal to 1, the default difference can be overridden by ph_log2_diff_min_qt_min_cb_luma present in PHs referring to the SPS. The value of sps_log2_diff_min_qt_min_cb_inter_slice may be in the range of 0 to CtbLog2SizeY−MinCbLog2SizeY, inclusive. The base 2 logarithm of the minimum size in luma samples of a luma leaf block resulting from quadtree splitting of a CTU is derived as follows:

$$MinQtLog2SizeInterY = sps\_log2\_diff\_min\_qt\_min\_cb\_inter\_slice + MinCbLog2SizeY \quad (56)$$

sps_max_mtt_hierarchy_depth_inter_slice specifies the default maximum hierarchy depth for coding units resulting from multi-type tree splitting of a quadtree leaf in slices with slice_type equal to 0 (B) or 1 (P) referring to the SPS. When partition_constraints_override_enabled_flag is equal to 1, the default maximum hierarchy depth can be overridden by ph_max_mtt_hierarchy_depth_inter_slice present in PHs referring to the SPS. The value of sps_max_mtt_hierarchy_depth_inter_slice may be in the range of 0 to 2*(CtbLog2SizeY−MinCbLog2SizeY), inclusive.

sps_log2_diff_max_bt_min_qt_inter_slice specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type equal to 0 (B) or 1 (P) referring to the SPS. When partition_constraints_override_enabled_flag is equal to 1, the default difference can be overridden by ph_log2_diff_max_bt_min_qt_luma present in PHs referring to the SPS. The value of sps_log2_diff_max_bt_min_qt_inter_slice may be in the range of 0 to CtbLog2SizeY−MinQtLog2SizeInterY, inclusive. When sps_log2_diff_max_bt_min_qt_inter_slice is not present, the value of sps_log2_diff_max_bt_min_qt_inter_slice is inferred to be equal to 0.

sps_log2_diff_max_tt_min_qt_inter_slice specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 0 (B) or 1 (P) referring to the SPS. When partition_constraints_override_enabled_flag is equal to 1, the default difference can be overridden by ph_log2_diff_max_tt_min_qt_luma present in PHs referring to the SPS. The value of sps_log2_diff_max_tt_min_qt_inter_slice may be in the range of 0 to CtbLog2SizeY−MinQtLog2SizeInterY, inclusive. When sps_log2_diff_max_tt_min_qt_inter_slice is not present, the value of sps_log2_diff_max_tt_min_qt_inter_slice is inferred to be equal to 0.

sps_log2_diff_min_qt_min_cb_intra_slice_chroma specifies the default difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in slices with slice_type equal to 2 (I) referring to the SPS. When partition_constraints_override_enabled_flag is equal to 1, the default difference can be overridden by ph_log2_diff_min_qt_min_cb_chroma present in PHs referring to the SPS. The value of sps_log2_diff_min_qt_min_cb_intra_slice_chroma may be in the range of 0 to CtbLog2SizeY−MinCbLog2SizeY, inclusive. When not present, the value of sps_log2_diff_min_qt_min_cb_intra_slice_chroma is inferred to be equal to 0. The base 2 logarithm of the minimum size in luma samples of a chroma leaf block resulting from quadtree splitting of a CTU with treeType equal to DUAL_TREE_CHROMA is derived as follows:

$$MinQtLog2SizeIntraC = sps\_log2\_diff\_min\_qt\_min\_cb\_intra\_slice\_chroma + MinCbLog2SizeY \quad (57)$$

sps_max_mtt_hierarchy_depth_intra_slice_chroma specifies the default maximum hierarchy depth for chroma coding units resulting from multi-type tree splitting of a chroma quadtree leaf with treeType equal to DUAL_TREE_CHROMA in slices with slice type equal to 2 (I) referring to the SPS. When partition_constraints_override_enabled_flag is equal to 1, the default maximum hierarchy depth can be overridden by ph_max_mtt_hierarchy_depth_chroma present in PHs referring to the SPS. The value of sps_max_mtt_hierarchy_depth_intra_slice_chroma may be in the range of 0 to 2*(CtbLog2SizeY−MinCbLog2SizeY), inclusive. When not present, the value of sps_max_mtt_hierarchy_depth_intra_slice_chroma is inferred to be equal to 0.

sps_log2_diff_max_bt_min_qt_intra_slice_chroma specifies the default difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL_TREE_CHROMA in slices with slice_type equal to 2 (I) referring to the SPS. When partition_constraints_override_enabled_flag is equal to 1, the default difference can be overridden by ph_log2_diff_max_bt_min_qt_chroma present in PHs referring to the SPS. The value of sps_log2_diff_max_bt_min_qt_intra_slice_chroma may be in the range of 0 to CtbLog2SizeY−MinQtLog2SizeIntraC, inclusive. When sps_log2_diff_max_bt_min_qt_intra_slice_chroma is not present, the value of sps_log2_diff_max_bt_min_qt_intra_slice_chroma is inferred to be equal to 0.

sps_log2_diff_max_tt_min_qt_intra_slice_chroma specifies the default difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in slices with slice_type equal to 2 (I) referring to the SPS. When partition_constraints_override_enabled_flag is equal to 1, the default difference can be overridden by ph_log2_diff_max_tt_min_qt_chroma present in PHs referring to the SPS. The value of sps_log2_diff_max_tt_min_qt_intra_slice_chroma may be in the range of 0 to CtbLog2SizeY−MinQtLog2SizeIntraC, inclusive. When sps_log2_diff_max_tt_min_qt_intra_slice_chroma is not present, the value of sps_log2_diff_max_tt_min_qt_intra_slice_chroma is inferred to be equal to 0.

sps_max_luma_transform_size_64_flag equal to 1 specifies that the maximum transform size in luma samples is equal to 64. sps_max_luma_transform_size_64_flag equal to 0 specifies that the maximum transform size in luma samples is equal to 32.

When CtbSizeY is less than 64, the value of sps_max_luma_transform_size_64_flag may be equal to 0. The variables MinTbLog2SizeY, MaxTbLog2SizeY, MinTbSizeY, and MaxTbSizeY are derived as follows:

```
MinTbLog2SizeY = 2                                    (58)
MaxTbLog2SizeY =                                      (59)
  sps_max_luma_transform_size_64_flag ? 6 : 5
MinTtSizeY = 1 << MinTbLog2SizeY
  (60)
MaxTbSizeY = 1 << MaxTbLog2SizeY
  (61)
``` sps_joint_cbcr_enabled_flag equal to 0 specifies that the joint coding of chroma residuals is disabled. sps_joint_cbcr_enabled_flag equal to 1 specifies that the joint coding of chroma residuals is enabled. When not present, the value of sps_joint_cbcr_enabled_flag is inferred to be equal to 0.

same_qp_table_for_chroma equal to 1 specifies that only one chroma QP mapping table is signalled and this table applies to Cb and Cr residuals and additionally to joint Cb-Cr residuals when sps_joint_cbcr_enabled_flag is equal to 1. same_qp_table_for_chroma equal to 0 specifies that chroma QP mapping tables, two for Cb and Cr, and one additional for joint Cb-Cr when sps_joint_cbcr_enabled_flag is equal to 1, are signalled in the SPS. When same_qp_table_for_chroma is not present in the bitstream, the value of same_qp_table_for_chroma is inferred to be equal to 1.

qp_table_start_minus26[i] plus 26 specifies the starting luma and chroma QP used to describe the i-th chroma QP mapping table. The value of qp_table_start_minus26[i] may be in the range of −26−QpBdOffset to 36 inclusive. When qp_table_start_minus26[i] is not present in the bitstream, the value of qp_table_start_minus26[i] is inferred to be equal to 0.

num_points_in_qp_table_minus1[i] plus 1 specifies the number of points used to describe the i-th chroma QP mapping table. The value of num_points_in_qp_table_minus1[i] may be in the range of 0 to 63+QpBdOffset, inclusive. When num_points_in_qp_table_minus1[0] is not present in the bitstream, the value of num_points_in_qp_table_minus1[0] is inferred to be equal to 0.

delta_qp_in_val_minus1[i][j] specifies a delta value used to derive the input coordinate of the j-th pivot point of the i-th chroma QP mapping table. When delta_qp_in_val_minus1 [0][j] is not present in the bitstream, the value of delta_qp_in_val_minus1[0][j] is inferred to be equal to 0.

delta_qp_diff_val[i][j] specifies a delta value used to derive the output coordinate of the j-th pivot point of the i-th chroma QP mapping table.

The i-th chroma QP mapping table ChromaQpTable[i] for i=0 . . . numQpTables−1 is derived as follows:

```
qpInVal[ i ][ 0 ] = qp_table_start_minus26[ i ] + 26
qpOutVal[ i ][ 0 ] = qpInVal[ i ][ 0 ]
for( j = 0; j <= num_points_in_qp_table_minus1[ i ]; j++ ) {
  qpInVal[ i ][ j + 1 ] = qpInVal[ i ][ j ] +
  delta_qp_in_val_minus1[ i ][ j ] + 1
  qpOutVal[ i ][ j + 1 ] = qpOutVal[ i ][ j ] +
  ( delta_qp_in_val_minus1[ i ][ j ] ^ delta_qp_diff_val[ i ][ j ] )
}
ChromaQpTable[ i ][ qpInVal[ i ][ 0 ] ] = qpOutVal[ i ][ 0 ]
for( k = qpInVal[ i ][ 0 ] − 1; k >= −QpBdOffset, k − − )
  ChromaQpTable[ i ][ k ] = Clip3( −QpBdOffset, 63,
ChromaQpTable[ i ][ k + 1 ] − 1)                     (62)
for( j = 0; j <= num_points_in_qp_table_minus1[ i ]; j++ ) {
  sh = ( delta_qp_in_val_minus1[ i ][ j ] + 1 ) >> 1
  for( k = qpInVal[ i ][ j ] + 1, m = 1; k <= qpInval[ i ][ j + 1 ]; k++,
  m++ )
    ChromaQpTable[ i ][ k ] = ChromaQpTable[ i ][ qpInVal[ i ][
    j ] ] + ( ( qpOutVal[ i ][j + 1] − qpOutVal[ i ][j ] ) * m + sh ) /
  ( delta_qp_in_val_minus1[ i ][j] + 1 )
}
for( k = qpInVal[ i ][ num_points_in_qp_table_minus1[ i ] + 1 ] +
1; k <= 63, k++ )
  ChromaQpTable[ i ][ k ] = Clip3( −QpBdOffset, 63,
ChromaQpTable[ i ][ k − 1 ] + 1 )
When same_qp_table_for_chroma is equal to 1, ChromaQpTable[ 1 ][
k ] and ChromaQpTable[ 2 ][ k ] are set equal to ChromaQpTable[
0 ][ k ] for k in the range of −QpBdOffset to 63, inclusive.
```

For bitstream conformance, the values of qpInVal[i][j] and qpOutVal[i][j] may be in the range of −QpBdOffset to 63, inclusive for i in the range of 0 to numQpTables−1, inclusive, and j in the range of 0 to num_points_in_qp_table_minus1[i]+1, inclusive.

sps_sao_enabled_flag equal to 1 specifies that the sample adaptive offset process is applied to the reconstructed picture after the deblocking filter process. sps_sao_enabled_flag equal to 0 specifies that the sample adaptive offset process is not applied to the reconstructed picture after the deblocking filter process.

sps_alf_enabled_flag equal to 0 specifies that the adaptive loop filter is disabled. sps_alf_enabled_flag equal to 1 specifies that the adaptive loop filter is enabled.

sps_ccalf_enabled_flag equal to 0 specifies that the cross-component adaptive loop filter is disabled. sps_ccalf_enabled_flag equal to 1 specifies that the cross-component adaptive loop filter may be enabled.

sps_transform_skip_enabled_flag equal to 1 specifies that transform_skip_flag may be present in the transform unit syntax. sps_transform_skip_enabled_flag equal to 0 specifies that transform_skip_flag is not present in the transform unit syntax.

log2_transform_skip_max_size_minus2 specifies the maximum block size used for transform skip, and may be in the range of 0 to 3, inclusive.

The variable MaxTsSize is set equal to 1<<(log2_transform_skip_max_size_minus2+2).

sps_bdpcm_enabled_flag equal to 1 specifies that intra_bdpcm_luma_flag and intra_bdpcm_chroma_flag may be present in the coding unit syntax for intra coding units. sps_bdpcm_enabled_flag equal to 0 specifies that intra_bdpcm_luma_flag and intra_bdpcm_chroma_flag are not present in the coding unit syntax for intra coding units. When not present, the value of sps_bdpcm_enabled_flag is inferred to be equal to 0.

sps_ref_wraparound_enabled_flag equal to 1 specifies that horizontal wrap-around motion compensation is applied in inter prediction. sps_ref_wraparound_enabled_flag equal to 0 specifies that horizontal wrap-around motion compensation is not applied. When the value of (CtbSizeY/MinCbSizeY+1) is greater than (pic_width_in_luma_samples/MinCbSizeY−1), where pic_width_in_luma_samples is the value of pic_width_in_luma_samples in any PPS that refers to the SPS, the value of sps_ref_wraparound_enabled_flag may be equal to 0.

sps_temporal_mvp_enabled_flag equal to 1 specifies that temporal motion vector predictors may be used in the CLVS. sps_temporal_mvp_enabled_flag equal to 0 specifies that temporal motion vector predictors are not used in the CLVS.

sps_sbtmvp_enabled_flag equal to 1 specifies that subblock-based temporal motion vector predictors may be used in decoding of pictures with all slices having slice_type not equal to I in the CLVS. sps_sbtmvp_enabled_flag equal to 0 specifies that subblock-based temporal motion vector predictors are not used in the CLVS. When sps_sbtmvp_enabled_flag is not present, it is inferred to be equal to 0.

sps_amvr_enabled_flag equal to 1 specifies that adaptive motion vector difference resolution is used in motion vector coding. amvr_enabled_flag equal to 0 specifies that adaptive motion vector difference resolution is not used in motion vector coding.

sps_bdof_enabled_flag equal to 0 specifies that the bi-directional optical flow inter prediction is disabled. sps_bdof_enabled_flag equal to 1 specifies that the bi-directional optical flow inter prediction is enabled.

sps_bdof_pic_present_flag equal to 1 specifies that ph_disable_bdof_flag is present in PHs referring to the SPS. sps_bdof_pic_present_flag equal to 0 specifies that ph_disable_bdof_flag is not present in PHs referring to the SPS. When sps_bdof_pic_present_flag is not present, the value of sps_bdof_pic_present_flag is inferred to be equal to 0.

sps_smvd_enabled_flag equal to 1 specifies that symmetric motion vector difference may be used in motion vector decoding. sps_smvd_enabled_flag equal to 0 specifies that symmetric motion vector difference is not used in motion vector coding.

sps_dmvr_enabled_flag equal to 1 specifies that decoder motion vector refinement based inter bi-prediction is enabled. sps_dmvr_enabled_flag equal to 0 specifies that decoder motion vector refinement based inter bi-prediction is disabled.

sps_dmvr_pic_present_flag equal to 1 specifies that ph_disable_dmvr_flag is present in PHs referring to the SPS. sps_dmvr_pic_present_flag equal to 0 specifies that ph_disable_dmvr_flag is not present in PHs referring to the SPS. When sps_dmvr_pic_present_flag is not present, the value of sps_dmvr_pic_present_flag is inferred to be equal to 0.

sps_mmvd_enabled_flag equal to 1 specifies that merge mode with motion vector difference is enabled. sps_mmvd_enabled_flag equal to 0 specifies that merge mode with motion vector difference is disabled.

sps_isp_enabled_flag equal to 1 specifies that intra prediction with subpartitions is enabled. sps_isp_enabled_flag equal to 0 specifies that intra prediction with subpartitions is disabled.

sps_mrl_enabled_flag equal to 1 specifies that intra prediction with multiple reference lines is enabled. sps_mrl_enabled_flag equal to 0 specifies that intra prediction with multiple reference lines is disabled.

sps_mip_enabled_flag equal to 1 specifies that matrix-based intra prediction is enabled. sps_mip_enabled_flag equal to 0 specifies that matrix-based intra prediction is disabled.

sps_cclm_enabled_flag equal to 0 specifies that the cross-component linear model intra prediction from luma component to chroma component is disabled. sps_cclm_enabled_flag equal to 1 specifies that the cross-component linear model intra prediction from luma component to chroma component is enabled. When sps_cclm_enabled_flag is not present, it is inferred to be equal to 0.

sps_chroma_horizontal_collocated_flag equal to 1 specifies that prediction processes operate in a manner designed for chroma sample positions that are not horizontally shifted relative to corresponding luma sample positions. sps_chroma_horizontal_collocated_flag equal to 0 specifies that prediction processes operate in a manner designed for chroma sample positions that are shifted to the right by 0.5 in units of luma samples relative to corresponding luma sample positions. When sps_chroma_horizontal_collocated_flag is not present, it is inferred to be equal to 1.

sps_chroma_vertical_collocated_flag equal to 1 specifies that prediction processes operate in a manner designed for chroma sample positions that are not vertically shifted relative to corresponding luma sample positions. sps_chroma_vertical_collocated_flag equal to 0 specifies that prediction processes operate in a manner designed for chroma sample positions that are shifted downward by 0.5 in units of luma samples relative to corresponding luma sample positions. When sps_chroma_vertical_collocated_flag is not present, it is inferred to be equal to 1.

sps_mts_enabled_flag equal to 1 specifies that sps_explicit_mts_intra_enabled_flag is present in the sequence parameter set RBSP syntax and sps_explicit_mts_inter_enabled_flag is present in the sequence parameter set RBSP syntax. sps_mts_enabled_flag equal to 0 specifies that sps_explicit_mts_intra_enabled_flag is not present in the sequence parameter set RBSP syntax and sps_explicit_mts_inter_enabled_flag is not present in the sequence parameter set RBSP syntax.

sps_explicit_mts_intra_enabled_flag equal to 1 specifies that mts_idx may be present in intra coding unit syntax. sps_explicit_mts_intra_enabled_flag equal to 0 specifies that mts_idx is not present in intra coding unit syntax. When not present, the value of sps_explicit_mts_intra_enabled_flag is inferred to be equal to 0.

sps_explicit_mts_inter_enabled_flag equal to 1 specifies that mts_idx may be present in inter coding unit syntax. sps_explicit_mts_inter_enabled_flag equal to 0 specifies that mts_idx is not present in inter coding unit syntax. When not present, the value of sps_explicit_mts_inter_enabled_flag is inferred to be equal to 0.

six_minus_max_num_merge_cand specifies the maximum number of merging motion vector prediction (MVP) candidates supported in the SPS subtracted from 6. The maximum number of merging MVP candidates, MaxNumMergeCand, is derived as follows:

$$\text{MaxNumMergeCand} = 6 - \text{six\_minus\_max\_num\_merge\_cand} \quad (63)$$

The value of MaxNumMergeCand may be in the range of 1 to 6, inclusive.

sps_sbt_enabled_flag equal to 0 specifies that subblock transform for inter-predicted CUs is disabled. sps_sbt_enabled_flag equal to 1 specifies that subblock transform for inter-predicted CU is enabled.

sps_affine_enabled_flag specifies whether affine model based motion compensation can be used for inter prediction. If sps_affine_enabled_flag is equal to 0, the syntax may be constrained such that no affine model based motion compensation is used in the CLVS, and inter_affine_flag and cu_affine_type_flag are not present in coding unit syntax of the CLVS. Otherwise (sps_affine_enabled_flag is equal to 1), affine model based motion compensation can be used in the CLVS.

five_minus_max_num_subblock_merge_cand specifies the maximum number of subblock-based merging motion vector prediction candidates supported in the SPS subtracted from 5.

sps_affine_type_flag specifies whether 6-parameter affine model based motion compensation can be used for inter prediction. If sps_affine_type_flag is equal to 0, the syntax may be constrained such that no 6-parameter affine model based motion compensation is used in the CLVS, and cu_affine_type_flag is not present in coding unit syntax in the CLVS. Otherwise (sps_affine_type_flag is equal to 1), 6-parameter affine model based motion compensation can be used in the CLVS. When not present, the value of sps_affine_type_flag is inferred to be equal to 0.

sps_afine_amvr_enabled_flag equal to 1 specifies that adaptive motion vector difference resolution is used in motion vector coding of affine inter mode. sps_affine_amvr_enabled_flag equal to 0 specifies that adaptive motion vector difference resolution is not used in motion vector coding of affine inter mode. When not present, the value of sps_affine_amvr_enabled_flag is inferred to be equal to 0.

sps_affine_prof_enabled_flag specifies whether the prediction refinement with optical flow can be used for affine motion compensation. If sps_affine_prof_enabled_flag is equal to 0, the affine motion compensation may not be refined with optical flow. Otherwise (sps_affine_prof_enabled_flag is equal to 1), the affine motion compensation can be refined with optical flow. When not present, the value of sps_affine_prof_enabled_flag is inferred to be equal to 0.

sps_prof_pic_present_flag equal to 1 specifies that ph_disable_prof flag is present in PHs referring to the SPS. sps_prof_pic_present_flag equal to 0 specifies that ph_disable_prof flag is not present in PHs referring to the SPS. When sps_prof_pic_present_flag is not present, the value of sps_prof_pic_present_flag is inferred to be equal to 0.

sps_palette_enabled_flag equal to 1 specifies that pred_mode_plt_flag may be present in the coding unit syntax. sps_palette_enabled_flag equal to 0 specifies that pred_mode_plt_flag is not present in the coding unit syntax. When sps_palette_enabled_flag is not present, it is inferred to be equal to 0.

sps_act_enabled_flag equal to 1 specifies that adaptive colour transform may be used and the cu_act_enabled_flag may be present in the coding unit syntax. sps_act_enabled_flag equal to 0 specifies that adaptive colour transform is not used and cu_act_enabled_flag is not present in the coding unit syntax. When sps_act_enabled_flag is not present, it is inferred to be equal to 0.

min_qp_prime_ts_minus4 specifies the minimum allowed quantization parameter for transform skip mode as follows:

$$QpPrimeTsMin = 4 + min\_qp\_prime\_ts\_minus4 \quad (64)$$

The value of min_qp_prime_ts_minus4 may be in the range of 0 to 48, inclusive.

sps_bcw_enabled_flag specifies whether bi-prediction with CU weights can be used for inter prediction. If sps_bcw_enabled_flag is equal to 0, the syntax may be constrained such that no bi-prediction with CU weights is used in the CLVS, and bcw_idx is not present in coding unit syntax of the CLVS. Otherwise (sps_bcw_enabled_flag is equal to 1), bi-prediction with CU weights can be used in the CLVS.

sps_ibc_enabled_flag equal to 1 specifies that the IBC prediction mode may be used in decoding of pictures in the CLVS. sps_ibc_enabled_flag equal to 0 specifies that the IBC prediction mode is not used in the CLVS. When sps_ibc_enabled_flag is not present, it is inferred to be equal to 0.

six_minus_max_num_ibc_merge_cand specifies the maximum number of IBC merging block vector prediction (BVP) candidates supported in the SPS subtracted from 6.

The maximum number of IBC merging BVP candidates, MaxNumIbcMergeCand, is derived as follows:

```
if( sps_ibc_enabled_flag )
    MaxNumIbcMergeCand = 6 −                          (65)
      six_minus_max_num_ibc_merge_cand
else
    MaxNumIbcMergeCand = 0
``` sps_ciip_enabled_flag specifies that ciip_flag may be present in the coding unit syntax for inter coding units. sps_ciip_enabled_flag equal to 0 specifies that ciip_flag is not present in the coding unit syntax for inter coding units.

sps_fpel_mmvd_enabled_flag equal to 1 specifies that merge mode with motion vector difference is using integer sample precision. sps_fpel_mmvd_enabled_flag equal to 0 specifies that merge mode with motion vector difference can use fractional sample precision.

sps_gpm_enabled_flag specifies whether geometric partition based motion compensation can be used for inter prediction. sps_gpm_enabled_flag equal to 0 specifies that the syntax may be constrained such that no geometric partition based motion compensation is used in the CLVS, and merge_gpm_partition_idx, merge_gpm_idx0, and merge_gpm_idx1 are not present in coding unit syntax of the CLVS. sps_gpm_enabled_flag equal to 1 specifies that geometric partition based motion compensation can be used in the CLVS. When not present, the value of sps_gpm_enabled_flag is inferred to be equal to 0.

max_num_merge_cand_minus_max_num_gpm_cand specifies the maximum number of geometric partitioning merge mode candidates supported in the SPS subtracted from MaxNumMergeCand.

If sps_gpm_enabled_flag is equal to 1 and MaxNumMergeCand is greater than or equal to 3, the maximum number of geometric partitioning merge mode candidates, MaxNumGeoMergeCand, is derived as follows:

```
if( sps_gpm_enabled_flag && MaxNumMergeCand >= 3 )
    MaxNumGpmMergeCand = MaxNumMergeCand −
      max_num_merge_cand_minus_max_num_gpm_cand       (66)
else if( sps_gpm_enabled_flag && MaxNumMergeCand == 2 )
    MaxNumMergeCand = 2
else
    MaxNumGeoMergeCand = 0
```

The value of MaxNumGeoMergeCand may be in the range of 2 to MaxNumMergeCand, inclusive.

sps_lmcs_enabled_flag equal to 1 specifies that luma mapping with chroma scaling is used in the CLVS. sps_lmcs_enabled_flag equal to 0 specifies that luma mapping with chroma scaling is not used in the CLVS.

sps_lfnst_enabled_flag equal to 1 specifies that lfnst_idx may be present in intra coding unit syntax. sps_lfnst_enabled_flag equal to 0 specifies that lfnst_idx is not present in intra coding unit syntax.

sps_ladf_enabled_flag equal to 1, specifies that sps_num_ladf_intervals_minus2, sps_ladf_lowest_interval_qp_offset, sps_ladf_qp_offset[i], and sps_ladf_delta_threshold_minus1[i] are present in the SPS.

sps_num_ladf_intervals_minus2 plus 1 specifies the number of sps_ladf_delta_threshold_minus1[i] and sps_ladf_qp_offset[i] syntax elements that are present in the SPS. The value of sps_num_ladf_intervals_minus2 may be in the range of 0 to 3, inclusive.

sps_ladf_lowest_interval_qp_offset specifies the offset used to derive the variable qP as specified in clause 8.8.3.6.1. The value of sps_ladf_lowest_interval_qp_offset may be in the range of −63 to 63, inclusive.

sps_ladf_qp_offset[i] specifies the offset array used to derive the variable qP as specified in clause 8.8.3.6.1. The value of sps_ladf_qp_offset[i] may be in the range of −63 to 63, inclusive.

sps_ladf_delta_threshold_minus1[i] is used to compute the values of SpsLadfIntervalLowerBound[i], which specifies the lower bound of the i-th luma intensity level interval. The value of sps_ladf_delta_threshold_minus1[i] may be in the range of 0 to $2^{BitDepth}-3$ inclusive.

The value of SpsLadfIntervalLowerBound[0] is set equal to 0.

For each value of i in the range of 0 to sps_num_ladf_intervals_minus2, inclusive, the variable SpsLadfIntervalLowerBound[i+1] is derived as follows:

$$\text{SpsLadfIntervalLowerBound}[\,i+1\,] = \text{SpsLadfIntervalLowerBound}[\,i\,] + \text{sps\_ladf\_delta\_threshold\_minus1}[\,i\,] + 1 \quad (67)$$

log2_parallel_merge_level_minus2 plus 2 specifies the value of the variable Log2ParMrgLevel, which is used in the derivation process for spatial merging candidates as specified in clause 8.5.2.3, the derivation process for motion vectors and reference indices in subblock merge mode as specified in clause 8.5.5.2, and to control the invocation of the updating process for the history-based motion vector predictor list in clause 8.5.2.1. The value of log2_parallel_merge_level_minus2 may be in the range of 0 to CtbLog2SizeY−2, inclusive. The variable Log2ParMrgLevel is derived as follows:

$$\text{Log2ParMrgLevel} = \text{log2\_parallel\_merge\_level\_minus2} + 2 \quad (68)$$

sps_scaling_list_enabled_flag equal to 1 specifies that a scaling list is used for the scaling process for transform coefficients. sps_scaling_list_enabled_flag equal to 0 specifies that scaling list is not used for the scaling process for transform coefficients.

sps_dep_quant_enabled_flag equal to 0 specifies that dependent quantization is disabled for pictures referring to the SPS. sps_dep_quant_enabled_flag equal to 1 specifies that dependent quantization may be enabled for pictures referring to the SPS.

sps_sign_data_hiding_enabled_flag equal to 0 specifies that sign bit hiding is disabled for pictures referring to the SPS. sps_sign_data_hiding_enabled_flag equal to 1 specifies that sign bit hiding may be enabled for pictures referring to the SPS. When sps_sign_data_hiding_enabled_flag is not present, it is inferred to be equal to 0.

sps_virtual_boundaries_enabled_flag equal to 1 specifies that disabling in-loop filtering across virtual boundaries may be applied in the coded pictures in the CLVS. sps_virtual_boundaries_enabled_flag equal to 0 specifies that disabling in-loop filtering across virtual boundaries is not applied in the coded pictures in the CLVS. In-loop filtering operations include the deblocking filter, sample adaptive offset filter, and adaptive loop filter operations.

sps_virtual_boundaries_present_flag equal to 1 specifies that information of virtual boundaries is signalled in the SPS. sps_virtual_boundaries_present_flag equal to 0 specifies that information of virtual boundaries is not signalled in the SPS. When there is one or more than one virtual boundaries signalled in the SPS, the in-loop filtering operations are disabled across the virtual boundaries in pictures referring to the SPS. In-loop filtering operations include the deblocking filter, sample adaptive offset filter, and adaptive loop filter operations.

For bitstream conformance, when the value of res_change_in_clvs_allowed_flag is equal to 1, the value of sps_virtual_boundaries_present_flag may be equal to 0.

sps_num_ver_virtual_boundaries specifies the number of sps_virtual_boundaries_pos_x[i] syntax elements that are present in the SPS. When sps_num_ver_virtual_boundaries is not present, it is inferred to be equal to 0.

sps_virtual_boundaries_pos_x[i] specifies the location of the i-th vertical virtual boundary in units of luma samples divided by 8. The value of sps_virtual_boundaries_pos_x[i] may be in the range of 1 to Ceil(pic_width_in_luma_samples÷8)−1, inclusive.

sps_num_hor_virtual_boundaries specifies the number of sps_virtual_boundaries_pos_y[i] syntax elements that are present in the SPS. When sps_num_hor_virtual_boundaries is not present, it is inferred to be equal to 0.

When sps_virtual_boundaries_enabled_flag is equal to 1 and sps_virtual_boundaries_present_flag is equal to 1, the sum of sps_num_ver_virtual_boundaries and sps_num_hor_virtual_boundaries may be greater than 0.

sps_virtual_boundaries_pos_y[i] specifies the location of the i-th horizontal virtual boundary in units of luma samples divided by 8. The value of sps_virtual_boundaries_pos_y[i] may be in the range of 1 to Ceil(pic_height_in_luma_samples÷8)−1, inclusive.

sps_general_hrd_params_present_flag equal to 1 specifies that the syntax structure general_hrd_parameters( ) is present in the SPS RBSP syntax structure. sps_general_hrd_params_present_flag equal to 0 specifies that the syntax structure general_hrd_parameters( ) is not present in the SPS RBSP syntax structure. sps_sublayer_cpb_params_present_flag equal to 1 specifies that the syntax structure old_hrd_parameters( ) in the SPS RBSP includes HRD parameters for sublayer representations with TemporalId in the range of 0 to sps_max_sublayers_minus1, inclusive. sps_sublayer_cpb_params_present_flag equal to 0 specifies that the syntax structure ols_hrd_parameters( ) in the SPS RBSP includes HRD parameters for the sublayer representation with TemporalId equal to sps_max_sublayers_minus1 only. When sps_max_sublayers_minus1 is equal to 0, the value of sps_sublayer_cpb_params_present_flag is inferred to be equal to 0.

When sps_sublayer_cpb_params_present_flag is equal to 0, the HRD parameters for the sublayer representations with TemporalId in the range of 0 to sps_max_sublayers_minus1−1, inclusive, are inferred to be the same as that for the sublayer representation with TemporalId equal to sps_max_sublayers_minus1. These include the HRD parameters starting from the fixed_pic_rate_general_flag[i] syntax element till the sublayer_hrd_parameters(i) syntax structure immediately under the condition "if(general_vcl_hrd_params_present_flag)" in the ols_hrd_parameters syntax structure.

field_seq_flag equal to 1 indicates that the CLVS conveys pictures that represent fields. field_seq_flag equal to 0 indicates that the CLVS conveys pictures that represent frames. When general_frame_only_constraint_flag is equal to 1, the value of field_seq_flag may be equal to 0. When field_seq_flag is equal to 1, a frame-field information SEI message may be present for every coded picture in the CLVS.

NOTE 5—The specified decoding process does not treat pictures that represent fields or frames differently. A sequence of pictures that represent fields would therefore be coded with the picture dimensions of an individual field. For example, pictures that represent 1080i fields would commonly have cropped output dimensions of 1920×540, while the sequence picture rate would commonly express the rate of the source fields (typically between 50 and 60 Hz), instead of the source frame rate (typically between 25 and 30 Hz).

vui_parameters_present_flag equal to 1 specifies that the syntax structure vui_parameters( ) is present in the SPS RBSP syntax structure. vui_parameters_present_flag equal to 0 specifies that the syntax structure vui_parameters( ) is not present in the SPS RBSP syntax structure.

sps_extension_flag equal to 0 specifies that no sps_extension_data_flag syntax elements are present in the SPS RBSP syntax structure. sps_extension_flag equal to I specifies that there are sps_extension_data_flag syntax elements present in the SPS RBSP syntax structure.

sps_extension_data_flag may have any value. Its presence and value do not affect decoder conformance to profiles specified in this version of this Specification. Decoders conforming to this version of this Specification may ignore all sps_extension_data_flag syntax elements.

7.4.3.4 Picture Parameter Set RBSP Semantics

A PPS RBSP may be available to the decoding process prior to it being referenced, included in at least one AU with TemporalId less than or equal to the TemporalId of the PPS NAL unit or provided through external means.

All PPS NAL units with a particular value of pps_pic_parameter_set_id within a PU may have the same content.

pps_pic_parameter_set_id identifies the PPS for reference by other syntax elements. The value of pps_pic_parameter_set_id may be in the range of 0 to 63, inclusive. PPS NAL units, regardless of the nuh_layer_id values, share the same value space of pps_pic_parameter_set_id.

Let ppsLayerId be the value of the nuh_layer_id of a particular PPS NAL unit, and vclLayerId be the value of the nuh_layer_id of a particular VCL NAL unit. The particular VCL NAL unit may not refer to the particular PPS NAL unit unless ppsLayerId is less than or equal to vclLayerId and the layer with nuh_layer_id equal to ppsLayerId is included in at least one OLS that includes the layer with nuh_layer_id equal to vclLayerId.

pps_seq_parameter_set_id specifies the value of sps_seq_parameter_set_id for the SPS. The value of pps_seq_parameter_set_id may be in the range of 0 to 15, inclusive. The value of pps_seq_parameter_set_id may be the same in all PPSs that are referred to by coded pictures in a CLVS.

mixed_nalu_types_in_pic_flag equal to 1 specifies that each picture referring to the PPS has more than one VCL NAL unit, the VCL NAL units do not have the same value of nal_unit_type, and the picture is not an IRAP picture. mixed_nalu_types_in_pic_flag equal to 0 specifies that each picture referring to the PPS has one or more VCL NAL units and the VCL NAL units of each picture referring to the PPS have the same value of nal_unit_type.

When no_mixed_nalu_types_in_pic_constraint_flag is equal to 1, the value of mixed_nalu_types_in_pic_flag may be equal to 0.

For each slice with a nal_unit_type value nalUnitTypeA in the range of IDR_W_RADL to CRA_NUT, inclusive, in a picture picA that also contains one or more slices with another value of nal_unit_type (i.e., the value of mixed_nalu_types_in_pic_flag for the picture picA is equal to 1), the following applies:

- The slice may belong to a subpicture subpicA for which the value of the corresponding subpic_treated_as_pic_flag[i] is equal to 1.
- The slice may not belong to a subpicture of picA containing VCL NAL units with nal_unit_type not equal to nalUnitTypeA.
- If nalUnitTypeA is equal to CRA, for all the following PUs following the current picture in the CLVS in decoding order and in output order, neither RefPicList[0] nor RefPicList[1] of a slice in subpicA in those PUs may include any picture preceding picA in decoding order in an active entry.
- Otherwise (i.e., nalUnitTypeA is equal to IDR_W_RADL or IDR_N_LP), for all the PUs in the CLVS following the current picture in decoding order, neither RefPicList[0] nor RefPicList[1] of a slice in subpicA in those PUs may include any picture preceding picA in decoding order in an active entry.
- NOTE 1—mixed_nalu_types_in_pic_flag equal to 1 indicates that pictures referring to the PPS contain slices with different NAL unit types, e.g., coded pictures originating from a subpicture bitstream merging operation for which encoders have to ensure matching bitstream structure and further alignment of parameters of the original bitstreams. One example of such alignments is as follows: When the value of sps_idr_rpl_flag is equal to 0 and mixed_nalu_types_in_pic_flag is equal to 1, a picture referring to the PPS cannot have slices with nal_unit_type equal to IDR_W_RADL or IDR_N_LP.

pic_width_in_luma_samples specifies the width of each decoded picture referring to the PPS in units of luma samples. pic_width_in_luma_samples may not be equal to 0, may be an integer multiple of Max(8, MinCbSizeY), and may be less than or equal to pic_width_max_in_luma_samples.

When res_change_in_clvs_allowed_flag equal to 0, the value of pic_width_in_luma_samples may be equal to pic_width_max_in_luma_samples.

pic_height_in_luma_samples specifies the height of each decoded picture referring to the PPS in units of luma samples. pic_height_in_luma_samples may not be equal to 0 and may be an integer multiple of Max(8, MinCbSizeY), and may be less than or equal to pic_height_max_in_luma_samples.

When res_change_in_clvs_allowed_flag equal to 0, the value of pic_height_in_luma_samples may be equal to pic_height_max_in_luma_samples.

The variables PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows:

$$PicWidthInCtbsY = Ceil(\ pic\_width\_in\_luma\_samples \div CtbSizeY\ ) \quad (69)$$

$$PicHeightInCtbsY = Ceil(\ pic\_height\_in\_luma\_samples \div CtbSizeY\ ) \quad (70)$$

$$PicSizeInCtbsY = PicWidthInCtbsY * PicHeightInCtbsY \quad (71)$$

$$PicWidthInMinCbsY = pic\_width\_in\_luma\_samples / MinCbSizeY \quad (72)$$

-continued

PicHeightInMinCbsY = pic_height_in_luma_samples / MinCbSizeY  (73)
PicSizeInMinCbsY = PicWidthInMinCbsY * PicHeightInMinCbsY  (74)
PicSizeInSamplesY = pic_width_in_luma_samples * pic_height_in_luma_samples  (75)
PicWidthInSamplesC = pic_width_in_luma_samples / SubWidthC  (76)
PicHeightInSamplesC = pic_height_in_luma_samples / SubHeightC  (77)

pps_conformance_window_flag equal to 1 indicates that the conformance cropping window offset parameters follow next in the PPS. pps_conformance_window_flag equal to 0 indicates that the conformance cropping window offset parameters are not present in the PPS.

pps_conf_win_left_offset, pps_conf_win_right_offset, pps_conf_win_top_offset, and pps_conf_win_bottom_offset specify the samples of the pictures in the CLVS that are output from the decoding process, in terms of a rectangular region specified in picture coordinates for output. When pps_conformance_window_flag is equal to 0, the values of pps_conf_win_left_offset, pps_conf_win_right_offset, pps_conf_win_top_offset, and pps_conf_win_bottom_offset are inferred to be equal to 0.

The conformance cropping window contains the luma samples with horizontal picture coordinates from SubWidthC*pps_conf_win_left_offset to pic_width_in_luma_samples−(SubWidthC*pps_conf_win_right_offset+1) and vertical picture coordinates from SubHeightC*pps_conf_win_top_offset to pic_height_in_luma_samples−(SubHeightC*pps_conf_win_bottom_offset+1), inclusive. The value of SubWidthC*(pps_conf_win_left_offset+pps_conf_win_right_offset) may be less than pic_width_in_luma_samples, and the value of SubHeightC*(pps_conf_win_top_offset+pps_conf_win_bottom_offset) may be less than pic_height_in_luma_samples.

When ChromaArrayType is not equal to 0, the corresponding specified samples of the two chroma arrays are the samples having picture coordinates (x/SubWidthC, y/SubHeightC), where (x, y) are the picture coordinates of the specified luma samples.

> NOTE 2—The conformance cropping window offset parameters are only applied at the output. All internal decoding processes are applied to the uncropped picture size.

Let ppsA and ppsB be any two PPSs referring to the same SPS. For bitstream conformance, when ppsA and ppsB have the same the values of pic_width_in_luma_samples and pic_height_in_luma_samples, respectively, ppsA and ppsB may have the same values of pps_conf_win_left_offset, pps_conf_win_right_offset, pps_conf_win_top_offset, and pps_conf_win_bottom_offset, respectively.

When pic_width_in_luma_samples is equal to pic_width_max_in_luma_samples and pic_height_in_luma_samples is equal to pic_height_max_in_luma_samples, for bitstream conformance, pps_conf_win_left_offset, pps_conf_win_right_offset, pps_conf_win_top_offset, and pps_conf_win_bottom_offset, are equal to sps_conf_win_left_offset, sps_conf_win_right_offset, sps_conf_win_top_offset, and sps_conf_win_bottom_offset, respectively.

scaling_window_explicit_signalling_flag equal to 1 specifies that the scaling window offset parameters are present in the PPS. scaling_window_explicit_signalling_flag equal to 0 specifies that the scaling window offset parameters are not present in the PPS. When res_change_in_clvs_allowed_flag is equal to 0, the value of scaling_window_explicit_signalling_flag may be equal to 0.

scaling_win_left_offset, scaling_win_right_offset, scaling_win_top_offset, and scaling_win_bottom_offset specify the offsets that are applied to the picture size for scaling ratio calculation. When not present, the values of scaling_win_left_offset, scaling_win_right_offset, scaling_win_top_offset, and scaling_win_bottom_offset are inferred to be equal to SubWidthC*conf_win_left_offset, SubWidthC*conf_win_right_offset, SubHeightC*conf_win_top_offset, and SubHeightC*conf_win_bottom_offset, respectively.

The value of SubWidthC*(scaling_win_left_offset+scaling_win_right_offset) may be less than pic_width_in_luma_samples, and the value of SubHeightC*(scaling_win_top_offset+scaling_win_bottom_offset) may be less than pic_height_in_luma_samples.

The variables PicOutputWidthL and PicOutputHeightL are derived as follows:

PicOutputWidthL = pic_width_in_luma_samples − SubWidthC * ( scaling_win_right_offset + scaling_win_left_offset)  (78)
PicOutputHeightL = pic_height_in_luma_samples − SubWidthC * ( scaling_win_bottom_offset + scaling_win_top_offset )  (79)

Let refPicOutputWidthL and refPicOutputHeightL be the PicOutputWidthL and PicOutputHeightL, respectively, of a reference picture of a current picture referring to this PPS. For bitstream conformance, all of the following conditions may be satisfied:

PicOutputWidthL*2 may be greater than or equal to refPicWidthInLumaSamples.
PicOutputHeightL*2 may be greater than or equal to refPicHeightInLumaSamples.
PicOutputWidthL may be less than or equal to refPicWidthInLumaSamples*8.
PicOutputHeightL may be less than or equal to refPicHeightInLumaSamples*8.
PicOutputWidthL*pic_width_max_in_luma_samples may be greater than or equal to refPicOutputWidthL*(pic_width_in_luma_samples−Max(8, MinCbSizeY)).
PicOutputHeightL*pic_height_max_in_luma_samples may be greater than or equal to refPicOutputHeightL*(pic_height_in_luma_samples−Max(8, MinCbSizeY)).

output_flag_present_flag equal to 1 indicates that the pic_output_flag syntax element is present in slice headers referring to the PPS. output_flag_present_flag equal to 0 indicates that the pic_output_flag syntax element is not present in slice headers referring to the PPS.

subpic_id_mapping_in_pps_flag equal to 1 specifies that the subpicture ID mapping is signalled in the PPS. subpic_id_mapping_in_pps_flag equal to 0 specifies that the subpicture ID mapping is not signalled in the PPS. If subpic_id_mapping_explicitly_signalled_flag is 0 or subpic_id_mapping_in_sps_flag is equal to 1, the value of subpic_id_mapping_in_pps_flag may be equal to 0. Otherwise (subpic_id_mapping_explicitly_signalled_flag is equal to 1 and subpic_id_mapping_in_sps_flag is equal to 0), the value of subpic_id_mapping_in_pps_flag may be equal to 1.

pps_num_subpics_minus1 may be equal to sps_num_subpics_minus1.

pps_subpic_id_len_minus1 may be equal to sps_subpic_id_len_minus1.

pps_subpic_id[i] specifies the subpicture ID of the i-th subpicture. The length of the pps_subpic_id[i] syntax element is pps_subpic_id_len_minus1+1 bits. The variable SubpicIdVal[i], for each value of i in the range of 0 to sps_num_subpics_minus1, inclusive, is derived as follows:

```
for( i = 0; i <= sps_num_subpics_minus1; i++ )
  if( subpic_id_mapping_explicitly_signalled_flag )
    SubpicIdVal[ i ] = subpic_id_mapping_in_pps_flag ? pps_subpic_id[i] :
sps_subpic_id[ i ] (80)
  else
    SubpicIdVal[ i ] = i
```

For bitstream conformance, both of the following constraints apply:
  For any two different values of i and j in the range of 0 to sps_num_subpics_minus1, inclusive, SubpicIdVal[i] may not be equal to SubpicIdVal[j].
  When the current picture is not the first picture of the CLVS, for each value of i in the range of 0 to sps_num_subpics_minus1, inclusive, if the value of SubpicIdVal[i] is not equal to the value of SubpicIdVal[i] of the previous picture in decoding order in the same layer, the nal_unit_type for all coded slice NAL units of the subpicture in the current picture with subpicture index i may be equal to a particular value in the range of IDR_W_RADL to CRA_NUT, inclusive.
no_pic_partition_flag equal to 1 specifies that no picture partitioning is applied to each picture referring to the PPS. no_pic_partition_flag equal to 0 specifies each picture referring to the PPS may be partitioned into more than one tile or slice.
For bitstream conformance, the value of no_pic_partition_flag may be the same for all PPSs that are referred to by coded pictures within a CLVS.
For bitstream conformance, the value of no_pic_partition_flag may not be equal to 1 when the value of sps_num_subpics_minus1+1 is greater than 1.
pps_log2_ctu_size_minus5 plus 5 specifies the luma coding tree block size of each CTU. pps_log2_ctu_size_minus5 may be equal to sps_log2_ctu_size_minus5.
num_exp_tile_columns_minus1 plus 1 specifies the number of explicitly provided tile column widths. The value of num_exp_tile_columns_minus1 may be in the range of 0 to PicWidthInCtbsY−1, inclusive. When no_pic_partition_flag is equal to 1, the value of num_exp_tile_columns_minus1 is inferred to be equal to 0.
num_exp_tile_rows_minus1 plus 1 specifies the number of explicitly provided tile row heights. The value of num_exp_tile_rows_minus1 may be in the range of 0 to PicHeightInCtbsY−1, inclusive. When no_pic_partition_flag is equal to 1, the value of num_tile_rows_minus1 is inferred to be equal to 0.
tile_column_width_minus1[i] plus 1 specifies the width of the i-th tile column in units of CTBs for i in the range of 0 to num_exp_tile_columns_minus1−1, inclusive. tile_column_width_minus1[num_exp_tile_columns_minus1] is used to derive the width of the tile columns with index greater than or equal to num_exp_tile_columns_minus1 as specified in clause 6.5.1. The value of tile_column_width_minus1[i] may be in the range of 0 to PicWidthInCtbsY−1, inclusive. When not present, the value of tile_column_width_minus1[0] is inferred to be equal to PicWidthInCtbsY−1.
tile_row_height_minus1[i] plus 1 specifies the height of the i-th tile row in units of CTBs for i in the range of 0 to num_exp_tile_rows_minus1−1, inclusive.
tile_row_height_minus1[num_exp_tile_rows_minus1] is used to derive the height of the tile rows with index greater than or equal to num_exp_tile_rows_minus1 as specified in clause 6.5.1. The value of tile_row_height_minus1[i] may be in the range of 0 to PicHeightInCtbsY−1, inclusive. When not present, the value of tile_row_height_minus1[0] is inferred to be equal to PicHeightInCtbsY−1.
rect_slice_flag equal to 0 specifies that tiles within each slice are in raster scan order and the slice information is not signalled in PPS. rect_slice_flag equal to 1 specifies that tiles within each slice cover a rectangular region of the picture and the slice information is signalled in the PPS. When not present, rect_slice_flag is inferred to be equal to 1. When subpic_info_present_flag is equal to 1, the value of rect_slice_flag may be equal to 1.
single_slice_per_subpic_flag equal to 1 specifies that each subpicture consists of one and only one rectangular slice. single_slice_per_subpic_flag equal to 0 specifies that each subpicture may consist of one or more rectangular slices. When single_slice_per_subpic_flag is equal to 1, num_slices_in_pic_minus1 is inferred to be equal to sps_num_subpics_minus1. When not present, the value of single_slice_per_subpic_flag is inferred to be equal to 0.
num_slices_in_pic_minus1 plus 1 specifies the number of rectangular slices in each picture referring to the PPS. The value of num_slices_in_pic_minus1 may be in the range of 0 to MaxSlicesPerPicture−1, inclusive, where MaxSlicesPerPicture. When no_pic_partition_flag is equal to 1, the value of num_slices_in_pic_minus1 is inferred to be equal to 0.
tile_idx_delta_present_flag equal to 0 specifies that tile_idx_delta values are not present in the PPS and all rectangular slices in pictures referring to the PPS are specified in raster order according to the process defined in clause 6.5.1. tile_idx_delta_present_flag equal to 1 specifies that tile_idx_delta values may be present in the PPS and all rectangular slices in pictures referring to the PPS are specified in the order indicated by the values of tile_idx_delta. When not present, the value of tile_idx_delta_present_flag is inferred to be equal to 0.
slice_width_in_tiles_minus1[i] plus 1 specifies the width of the i-th rectangular slice in units of tile columns. The value of slice_width_in_tiles_minus1[i] may be in the range of 0 to NumTileColumns−1, inclusive.
When slice_width_in_tiles_minus1[i] is not present, the following applies:
  If NumTileColumns is equal to 1, the value of slice_width_in_tiles_minus1[i] is inferred to be equal to 0.
  Otherwise, the value of slice_width_in_tiles_minus1[i] is inferred as specified in clause 6.5.1.
slice_height_in_tiles_minus1[i] plus 1 specifies the height of the i-th rectangular slice in units of tile rows. The value of slice_height_in_tiles_minus1[i] may be in the range of 0 to NumTileRows−1, inclusive.
When slice_height_in_tiles_minus1[i] is not present, the following applies:
  If NumTileRows is equal to 1, or tile_idx_delta_present_flag is equal to 0 and tileIdx % NumTileColumns is greater than 0), the value of slice_height_in_tiles_minus1[i] is inferred to be equal to 0.
  Otherwise (NumTileRows is not equal to 1, and tile_idx_delta_present_flag is equal to 1 or tileIdx % NumTileColumns is equal to 0), when tile_idx_delta_present_flag is equal to 1 or tileIdx % NumTileColumns is equal to 0, the value of slice_height_in_tiles_minus1[i] is inferred to be equal to slice_height_in_tiles_minus1[i−1].

num_exp_slices_in_tile[i] specifies the number of explicitly provided slice heights in the current tile that contains more than one rectangular slices. The value of num_exp_slices_in_tile[i] may be in the range of 0 to RowHeight[tileY]−1, inclusive, where tileY is the tile row index containing the i-th slice. When not present, the value of num_exp_slices_in_tile[i] is inferred to be equal to 0. When num_exp_slices_in_tile[i] is equal to 0, the value of the variable NumSlicesInTile[i] is derived to be equal to 1.

exp_slice_height_in_ctus_minus1[j] plus 1 specifies the height of the j-th rectangular slice in the current tile in units of CTU rows. The value of exp_slice_height_in_ctus_minus1[j] may be in the range of 0 to RowHeight[tileY]−1, inclusive, where tileY is the tile row index of the current tile. When num_exp_slices_in_tile[i] is greater than 0, the variable NumSlicesInTile[i] and SliceHeightInCtusMinus1[i+k] for k in the range of 0 to NumSlicesInTile[i]−1 are derived as follows:

```
remainingHeightInCtbsY = RowHeight[ SliceTopLeftTileIdx[ i ] / NumTileColumns
]
numExpSliceInTile = num_exp_slices_in_tile[ i ]
for( j=0; j < numExpSliceInTile - 1; j++ ) {
   SliceHeightInCtusMinus1[ i++ ] = exp_slice_height_in_ctu_minus1[j ]
   remainingHeightInCtbsY-= SliceHeightInCtusMinus1 [ j ]
}
uniformSliceHeightMinus1 = SliceHeightInCtusMinus1 [ i - 1 ]     (81)
while( remainingHeightInCtbsY >= (uniformSliceHeightMinus1 + 1) ) {
   SliceHeightInCtusMinusl[ i++ ] = uniformSliceHeightMinus1
   remainingHeightInCtbsY -= (uniformSliceHeightMinus1 + 1)
   j++
}
if( remainingHeightInCtbsY > 0 ) {
   SliceHeightInCtusMinus1[ i++ ] = remainingHeightInCtbsY
   j++
}
NumSlicesInTile[ i ] = j
``` tile_idx_delta[i] specifies the difference between the tile index of the first tile in the i-th rectangular slice and the tile index of the first tile in the (i+1)-th rectangular slice. The value of tile_idx_delta[i] may be in the range of −NumTilesInPic+1 to NumTilesInPic−1, inclusive. When not present, the value of tile_idx_delta[i] is inferred to be equal to 0. When present, the value of tile_idx_delta[i] may not be equal to 0.

loop_filter_across_tiles_enabled_flag equal to 1 specifies that in-loop filtering operations may be performed across tile boundaries in pictures referring to the PPS. loop_filter_across_tiles_enabled_flag equal to 0 specifies that in-loop filtering operations are not performed across tile boundaries in pictures referring to the PPS. The in-loop filtering operations include the deblocking filter, sample adaptive offset filter, and adaptive loop filter operations. When not present, the value of loop_filter_across_tiles_enabled_flag is inferred to be equal to 1.

loop_filter_across_slices_enabled_flag equal to 1 specifies that in-loop filtering operations may be performed across slice boundaries in pictures referring to the PPS. loop_filter_across_slice_enabled_flag equal to 0 specifies that in-loop filtering operations are not performed across slice boundaries in pictures referring to the PPS. The in-loop filtering operations include the deblocking filter, sample adaptive offset filter, and adaptive loop filter operations. When not present, the value of loop_filter_across_slices_enabled_flag is inferred to be equal to 0.

cabac_init_present_flag equal to 1 specifies that cabac_init_flag is present in slice headers referring to the PPS.

cabac_init_present_flag equal to 0 specifies that cabac_init_flag is not present in slice headers referring to the PPS.

num_ref_idx_default_active_minus1[i] plus 1, when i is equal to 0, specifies the inferred value of the variable NumRefIdxActive[0] for P or B slices with num_ref_idx_active_override_flag equal to 0, and, when i is equal to 1, specifies the inferred value of NumRefIdxActive[1] for B slices with num_ref_idx_active_override_flag equal to 0. The value of num_ref_idx_default_active_minus1[i] may be in the range of 0 to 14, inclusive.

rpl1_idx_present_flag equal to 0 specifies that ref_pic_list_sps_flag[1] and ref_Pic_list_idx[1] are not present in the PH syntax structures or the slice headers for pictures referring to the PPS. rpl1_idx_present_flag equal to 1 specifies that ref_pic_list_sps_flag[1] and ref_pic_list_idx[1] may be present in the PH syntax structures or the slice headers for pictures referring to the PPS.

init_qp_minus26 plus 26 specifies the initial value of SliceQp$_Y$ for each slice referring to the PPS. The initial value of SliceQp$_Y$ is modified at the picture level when a non-zero value of ph_qp_delta is decoded or at the slice level when a non-zero value of slice_qp_delta is decoded. The value of init_qp_minus26 may be in the range of −(26+QpBdOffset) to +37, inclusive.

cu_qp_delta_enabled_flag equal to 1 specifies that the ph_cu_qp_delta_subdiv_intra_slice and ph_cu_qp_delta_subdiv_inter_slice syntax elements are present in PHs referring to the PPS and cu_qp_delta_abs may be present in the transform unit syntax. cu_qp_delta_enabled_flag equal to 0 specifies that the ph_cu_qp_delta_subdiv_intra_slice and ph_cu_qp_delta_subdiv_inter_slice syntax elements are not present in PHs referring to the PPS and cu_qp_delta_abs is not present in the transform unit syntax.

pps_chroma_tool_offsets_present_flag equal to 1 specifies that chroma tool offsets related syntax elements are present in the PPS RBSP syntax structure.

pps_chroma_tool_offsets_present_flag equal to 0 specifies that chroma tool offsets related syntax elements are not present in the PPS RBSP syntax structure. When ChromaArrayType is equal to 0, the value of pps_chroma_tool_offsets_present_flag may be equal to 0.

pps_cb_qp_offset and pps_cr_qp_offset specify the offsets to the luma quantization parameter Qp'$_Y$ used for deriving Qp'$_{Cb}$ and Qp'$_{Cr}$, respectively. The values of pps_cb_qp_offset and pps_cr_qp_offset may be in the range of −12 to +12, inclusive. When ChromaArrayType is equal to 0, pps_cb_qp_offset and pps_cr_qp_offset are not used in the decoding process and decoders may ignore their value. When not present, the values of pps_cb_qp_offset and pps_cr_qp_offset are inferred to be equal to 0.

ppsjoint_cbcr_qp_offset_present_flag equal to 1 specifies that pps_joint_cbcr_qp_offset_value and joint_cbcr_qp_offset_list[i] are present in the PPS RBSP syntax structure. pps_joint_cbcr_qp_offset_present_flag equal to 0 specifies that pps_joint_cbcr_qp_offset_value and joint_cbcr_qp_offset_list[i] are not present in the PPS RBSP syntax structure. When ChromaArrayType is equal to 0 or sps_joint_cbcr_enabled_flag is equal to 0, the value of pps_joint_cbcr_qp_offset_present_flag may be equal to 0. When not present, the value of pps_joint_cbcr_qp_offset_present_flag is inferred to be equal to 0.

pps_joint_cbcr_qp_offset_value specifies the offset to the luma quantization parameter $Qp'_Y$ used for deriving $Qp'_{CbCr}$. The value of pps_joint_cbcr_qp_offset_value may be in the range of −12 to +12, inclusive. When ChromaArrayType is equal to 0 or sps_joint_cbcr_enabled_flag is equal to 0, pps_joint_cbcr_qp_offset_value is not used in the decoding process and decoders may ignore its value. When pps_joint_cbcr_qp_offset_present_flag is equal to 0, pps_joint_cbcr_qp_offset_value is not present and is inferred to be equal to 0.

pps_slice_chroma_qp_offsets_present_flag equal to 1 specifies that the slice_cb_qp_offset and slice_cr_qp_offset syntax elements are present in the associated slice headers. pps_slice_chroma_qp_offsets_present_flag equal to 0 specifies that the slice cb_qp_offset and slice_cr_qp_offset syntax elements are not present in the associated slice headers. When not present, the value of pps_slice_chroma_qp_offsets_present_flag is inferred to be equal to 0.

pps_cu_chroma_qp_offset_list_enabled_flag equal to 1 specifies that the ph_cu_chroma_qp_offset_subdiv_intra_slice and ph_cu_chroma_qp_offset_subdiv_inter_slice syntax elements are present in PHs referring to the PPS and cu_chroma_qp_offset_flag may be present in the transform unit syntax and the palette coding syntax. pps_cu_chroma_qp_offset_list_enabled_flag equal to 0 specifies that the ph_cu_chroma_qp_offset_subdiv_intra_slice and ph_cu_chroma_qp_offset_subdiv_inter_slice syntax elements are not present in PHs referring to the PPS and the cu_chroma_qp_offset_flag is not present in the transform unit syntax and the palette coding syntax. When not present, the value of pps_cu_chroma_qp_offset_list_enabled_flag is inferred to be equal to 0.

chroma_qp_offset_list_len_minus1 plus 1 specifies the number of cb_qp_offset_list[i], cr_qp_offset_list[i], and joint_cbcr_qp_offset_list[i], syntax elements that are present in the PPS RBSP syntax structure. The value of chroma_qp_offset_list_len_minus1 may be in the range of 0 to 5, inclusive.

cb_qp_offset_list[i], cr_qp_offset_list[i], and joint_cbcr_qp_offset_list[i], specify offsets used in the derivation of $Qp'_{Cb}$, $Qp'_{Cr}$, and $Qp'_{CbCr}$, respectively. The values of cb_qp_offset_list[i], cr_qp_offset_list[i], and joint_cbcr_qp_offset_list[i] may be in the range of −12 to +12, inclusive. When pps_joint_cbcr_qp_offset_present_flag is equal to 0, joint_cbcr_qp_offset_list[i] is not present and it is inferred to be equal to 0.

pps_weighted_pred_flag equal to 0 specifies that weighted prediction is not applied to P slices referring to the PPS. pps_weighted_pred_flag equal to 1 specifies that weighted prediction is applied to P slices referring to the PPS. When sps_weighted_pred_flag is equal to 0, the value of pps_weighted_pred_flag may be equal to 0.

pps_weighted_bipred_flag equal to 0 specifies that explicit weighted prediction is not applied to B slices referring to the PPS. pps_weighted_bipred_flag equal to 1 specifies that explicit weighted prediction is applied to B slices referring to the PPS. When sps_weighted_bipred_flag is equal to 0, the value of pps_weighted_bipred_flag may be equal to 0.

deblocking_filter_control_present_flag equal to 1 specifies the presence of deblocking filter control syntax elements in the PPS. deblocking_filter_control_present_flag equal to 0 specifies the absence of deblocking filter control syntax elements in the PPS.

deblocking_filter_override_enabled_flag equal to 1 specifies the presence of ph_deblocking_filter_override_flag in the PHs referring to the PPS or slice_deblocking_filter_override_flag in the slice headers referring to the PPS. deblocking_filter_override_enabled_flag equal to 0 specifies the absence of ph_deblocking_filter_override_flag in PHs referring to the PPS or slice_deblocking_filter_override_flag in slice headers referring to the PPS. When not present, the value of deblocking_filter_override_enabled_flag is inferred to be equal to 0.

pps_deblocking_filter_disabled_flag equal to 1 specifies that the operation of deblocking filter is not applied for slices referring to the PPS in which slice_deblocking_filter_disabled_flag is not present. pps_deblocking_filter_disabled_flag equal to 0 specifies that the operation of the deblocking filter is applied for slices referring to the PPS in which slice_deblocking_filter_disabled_flag is not present. When not present, the value of pps_deblocking_filter_disabled_flag is inferred to be equal to 0.

pps_beta_offset_div2 and pps_tc_offset_div2 specify the default deblocking parameter offsets for β and tC (divided by 2) that are applied to the luma component for slices referring to the PPS, unless the default deblocking parameter offsets are overridden by the deblocking parameter offsets present in the picture headers or the slice headers of the slices referring to the PPS. The values of pps_beta_offset_div2 and pps_tc_offset_div2 may both be in the range of −12 to 12, inclusive. When not present, the values of pps_beta_offset_div2 and pps_tc_offset_div2 are both inferred to be equal to 0.

pps_cb_beta_offset_div2 and pps_cb_tc_offset_div2 specify the default deblocking parameter offsets for β and tC (divided by 2) that are applied to the Cb component for slices referring to the PPS, unless the default deblocking parameter offsets are overridden by the deblocking parameter offsets present in the picture headers or the slice headers of the slices referring to the PPS. The values of pps_cb_beta_offset_div2 and pps_cb_tc_offset_div2 may both be in the range of −12 to 12, inclusive. When not present, the values of pps_cb_beta_offset_div2 and pps_cb_tc_offset_div2 are both inferred to be equal to 0.

pps_cr_beta_offset_div2 and pps_cr_tc_offset_div2 specify the default deblocking parameter offsets for β and tC (divided by 2) that are applied to the Cr component for slices referring to the PPS, unless the default deblocking parameter offsets are overridden by the deblocking parameter offsets present in the picture headers or the slice headers of the slices referring to the PPS. The values of pps_cr_beta_offset_div2 and pps_cr_tc_offset_div2 may both be in the range of −12 to 12, inclusive. When not present, the values of pps_cr_beta_offset_div2 and pps_cr_tc_offset_div2 are both inferred to be equal to 0.

rpl_info_in_ph_flag equal to 1 specifies that reference picture list information is present in the PH syntax structure and not present in slice headers referring to the PPS that do not contain a PH syntax structure. rpl_info_in_ph_flag equal to 0 specifies that reference picture list information is not present in the PH syntax structure and may be present in slice headers referring to the PPS that do not contain a PH syntax structure.

dbf_info_in_ph_flag equal to 1 specifies that deblocking filter information is present in the PH syntax structure and not present in slice headers referring to the PPS that do not contain a PH syntax structure. dbf_info_in_ph_flag equal to 0 specifies that deblocking filter information is not present in the PH syntax structure and may be present in slice headers referring to the PPS that do not contain a PH syntax structure. When not present, the value of dbf_info_in_ph_flag is inferred to be equal to 0.

sao_info_in_ph_flag equal to 1 specifies that SAO filter information is present in the PH syntax structure and not present in slice headers referring to the PPS that do not contain a PH syntax structure. sao_info_in_ph_flag equal to 0 specifies that SAO filter information is not present in the PH syntax structure and may be present in slice headers referring to the PPS that do not contain a PH syntax structure.

alf_info_in_ph_flag equal to 1 specifies that ALF information is present in the PH syntax structure and not present in slice headers referring to the PPS that do not contain a PH syntax structure. alf_info_in_ph_flag equal to 0 specifies that ALF information is not present in the PH syntax structure and may be present in slice headers referring to the PPS that do not contain a PH syntax structure.

wp_info_in_ph_flag equal to 1 specifies that weighted prediction information may be present in the PH syntax structure and not present in slice headers referring to the PPS that do not contain a PH syntax structure. wp_info_in_ph_flag equal to 0 specifies that weighted prediction information is not present in the PH syntax structure and may be present in slice headers referring to the PPS that do not contain a PH syntax structure. When not present, the value of wp_info_in_ph_flag is inferred to be equal to 0.

qp_delta_info_in_ph_flag equal to 1 specifies that QP delta information is present in the PH syntax structure and not present in slice headers referring to the PPS that do not contain a PH syntax structure. qp_delta_info_in_ph_flag equal to 0 specifies that QP delta information is not present in the PH syntax structure and may be present in slice headers referring to the PPS that do not contain a PH syntax structure.

pps_ref_wraparound_enabled_flag equal to 1 specifies that horizontal wrap-around motion compensation is applied in inter prediction. pps_ref_wraparound_enabled_flag equal to 0 specifies that horizontal wrap-around motion compensation is not applied. When the value of CtbSizeY/MinCbSizeY+1 is greater than pic_width_in_luma_samples/MinCbSizeY−1, the value of pps_ref_wraparound_enabled_flag may be equal to 0. When sps_ref_wraparound_enabled_flag is equal to 0, the value of pps_ref_wraparound_enabled_flag may be equal to 0.

pps_ref_wraparound_offset plus (CtbSizeY/MinCbSizeY)+2 specifies the offset used for computing the horizontal wrap-around position in units of MinCbSizeY luma samples. The value of pps_ref_wraparound_offset may be in the range of 0 to (pic_width_in_luma_samples/MinCbSizeY)−(CtbSizeY/MinCbSizeY)−2, inclusive.

The variable PpsRefWraparoundOffset is set equal to pps_ref_wraparound_offset+(CtbSizeY/MinCbSizeY)+2.

picture_header_extension_present_flag equal to 0 specifies that no PH extension syntax elements are present in PHs referring to the PPS. picture_header_extension_present_flag equal to 1 specifies that PH extension syntax elements are present in PHs referring to the PPS. picture_header_extension_present_flag may be equal to 0 in bitstreams conforming to this version of this Specification.

slice_header_extension_present_flag equal to 0 specifies that no slice header extension syntax elements are present in the slice headers for coded pictures referring to the PPS. slice_header_extension_present_flag equal to 1 specifies that slice header extension syntax elements are present in the slice headers for coded pictures referring to the PPS. slice_header_extension_present_flag may be equal to 0 in bitstreams conforming to this version of this Specification.

pps_extension_flag equal to 0 specifies that no pps_extension_data_flag syntax elements are present in the PPS RBSP syntax structure. pps_extension_flag equal to 1 specifies that there are pps_extension_data_flag syntax elements present in the PPS RBSP syntax structure.

pps_extension_data_flag may have any value. Its presence and value do not affect decoder conformance to profiles specified in this version of this Specification. Decoders conforming to this version of this Specification may ignore all pps_extension_data_flag syntax elements.

7.4.3.5 Adaptation Parameter Set Semantics

Each APS RBSP may be available to the decoding process prior to it being referenced, included in at least one AU with TemporalId less than or equal to the TemporalId of the coded slice NAL unit that refers it or provided through external means.

All APS NAL units with a particular value of adaptation_parameter_set_id and a particular value of aps_params_type within a PU, regardless of whether they are prefix or suffix APS NAL units, may have the same content.

adaptation_parameter_set_id provides an identifier for the APS for reference by other syntax elements.

When aps_params_type is equal to ALF_APS or SCALING_APS, the value of adaptation_parameter_set_id may be in the range of 0 to 7, inclusive.

When aps_params_type is equal to LMCS_APS, the value of adaptation_parameter_set_id may be in the range of 0 to 3, inclusive.

Let apsLayerId be the value of the nuh_layer_id of a particular APS NAL unit, and vclLayerId be the value of the nuh_layer_id of a particular VCL NAL unit. The particular VCL NAL unit may not refer to the particular APS NAL unit unless apsLayerId is less than or equal to vclLayerId and the layer with nuh_layer_id equal to apsLayerId is included in at least one OLS that includes the layer with nuh_layer_id equal to vclLayerId.

aps_params_type specifies the type of APS parameters carried in the APS as specified in Table 6.

TABLE 6

APS parameters type codes and types of APS parameters

| aps_params_type | Name of aps_params_type | Type of APS parameters |
| --- | --- | --- |
| 0 | AMF_APS | ALT parameters |
| 1 | LMCS APS | LMCS parameters |
| 2 | SCALING_APS | Scaling list parameters |
| 3 . . . 7 | Reserved | Reserved |

All APS NAL units with a particular value of aps_params_type, regardless of the nuh_layer_id values, share the same value space for adaptation_parameter_set_id. APS NAL units with different values of aps_params_type use separate values spaces for adaptation_parameter_set_id.

NOTE 1—A APS NAL unit (with a particular value of adaptation_parameter_set_id and a particular value of aps_params_type) can be shared across pictures, and different slices within a picture can refer to different ALF APSs.

NOTE 2—A suffix APS NAL unit associated with a particular VCL NAL unit (this VCL NAL unit precedes the suffix APS NAL unit in decoding order) is not for use by the particular VCL NAL unit, but for use by VCL NAL units following the suffix APS NAL unit in decoding order.

aps_extension_flag equal to 0 specifies that no aps_extension_data_flag syntax elements are present in the APS RBSP syntax structure. aps_extension_flag equal to 1 specifies that there are aps_extension_data_flag syntax elements present in the APS RBSP syntax structure.

aps_extension_data_flag may have any value. Its presence and value do not affect decoder conformance to profiles specified in this version of this Specification. Decoders conforming to this version of this Specification may ignore all aps_extension_data_flag syntax elements.

7.4.3.6 Picture Header RBSP Semantics

The PH RBSP contains a PH syntax structure, i.e., picture_header_structure( ).

7.4.3.7 Picture Header Structure Semantics

The PH syntax structure contains information that is common for all slices of the coded picture associated with the PH syntax structure.

gdr_or_irap_pic_flag equal to 1 specifies that the current picture is a GDR or IRAP picture. gdr_or_irap_pic_flag equal to 0 specifies that the current picture may or may not be a GDR or IRAP picture.

gdr_pic_flag equal to 1 specifies the picture associated with the PH is a GDR picture. gdr_pic_flag equal to 0 specifies that the picture associated with the PH is not a GDR picture. When not present, the value of gdr_pic_flag is inferred to be equal to 0. When gdr_enabled_flag is equal to 0, the value of gdr_pic_flag may be equal to 0.

ph_inter_slice_allowed_flag equal to 0 specifies that all coded slices of the picture have slice_type equal to 2. ph_inter_slice_allowed_flag equal to 1 specifies that there may or may not be one or more coded slices in the picture that have slice_type equal to 0 or 1.

ph_intra_slice_allowed_flag equal to 0 specifies that all coded slices of the picture have slice_type equal to 0 or 1. ph_intra_slice_allowed_flag equal to 1 specifies that there may or may not be one or more coded slices in the picture that have slice_type equal to 2. When not present, the value of ph_intra_slice_allowed_flag is inferred to be equal to 1.

NOTE 1—For bitstreams that are supposed to work subpicture based bitstream merging without the need of changing PH NAL units, the encoder is expected to set the values of both ph_inter_slice_allowed_flag and ph_intra_slice_allowed_flag equal to 1.

non_reference_picture_flag equal to 1 specifies the picture associated with the PH is never used as a reference picture. non_reference_picture_flag equal to 0 specifies the picture associated with the PH may or may not be used as a reference picture.

ph_pic_parameter_set_id specifies the value of pps_pic_parameter_set_id for the PPS in use. The value of ph_pic_parameter_set_id may be in the range of 0 to 63, inclusive. For bitstream conformance, the value of TemporalId of the PH may be greater than or equal to the value of TemporalId of the PPS that has pps_pic_parameter_set_id equal to ph_pic_parameter_set_id.

ph_pic_order_cnt_lsb specifies the picture order count modulo MaxPicOrderCntLsb for the current picture. The length of the ph_pic_order_cnt_lsb syntax element is log2_max_pic_order_cnt_lsb_minus4+4 bits. The value of the ph_pic_order_cnt_lsb may be in the range of 0 to MaxPicOrderCntLsb−1, inclusive.

no_output_of_prior_pics_flag affects the output of previously-decoded pictures in the DPB after the decoding of a CLVSS picture that is not the first picture in the bitstream.

recovery_poc_cnt specifies the recovery point of decoded pictures in output order. If the current picture is a GDR picture that is associated with the PH, and there is a picture picA that follows the current GDR picture in decoding order in the CLVS that has PicOrderCntVal equal to the PicOrderCntVal of the current GDR picture plus the value of recovery_poc_cnt, the picture picA is referred to as the recovery point picture. Otherwise, the first picture in output order that has PicOrderCntVal greater than the PicOrderCntVal of the current picture plus the value of recovery_poc_cnt is referred to as the recovery point picture. The recovery point picture may not precede the current GDR picture in decoding order. The value of recovery_poc_cnt may be in the range of 0 to MaxPicOrderCntLsb−1, inclusive.

When the current picture is a GDR picture, the variable RpPicOrderCntVal is derived as follows:

$$RpPicOrderCntVal = PicOrderCntVal + recovery\_poc\_cnt \quad (82)$$

NOTE 2—When gdr_enabled_flag is equal to 1 and PicOrderCntVal of the current picture is greater than or equal to RpPicOrderCntVal of the associated GDR picture, the current and subsequent decoded pictures in output order are exact match to the corresponding pictures produced by starting the decoding process from the previous IRAP picture, when present, preceding the associated GDR picture in decoding order.

ph_extra_bit[i] may be equal to 1 or 0. Decoders conforming to this version of this Specification may ignore the value of ph_extra_bit[i]. Its value does not affect decoder conformance to profiles specified in this version of specification.

ph_poc_msb_present_flag equal to 1 specifies that the syntax element poc_msb_val is present in the PH. ph_poc_msb_present_flag equal to 0 specifies that the syntax element poc_msb_val is not present in the PH. When vps_independent_layer_flag[GeneralLayerIdx[nuh_layer_id] ] is equal to 0 and there is a picture in the current AU in a reference layer of the current layer, the value of ph_poc_msb_present_flag may be equal to 0.

poc_msb_val specifies the POC MSB value of the current picture. The length of the syntax element poc_msb_val is poc_msb_len_minus1+1 bits.

ph_alf_enabled_flag equal to 1 specifies that adaptive loop filter is enabled for all slices associated with the PH and may be applied to Y, Cb, or Cr colour component in the slices. ph_alf_enabled_flag equal to 0 specifies that adaptive loop filter may be disabled for one, or more, or all slices associated with the PH. When not present, ph_alf_enabled_flag is inferred to be equal to 0.

ph_num_alf_aps_ids_luma specifies the number of ALF APSs that the slices associated with the PH refers to.

ph_alf_aps_id_luma[i] specifies the adaptation_parameter_set_id of the i-th ALF APS that the luma component of the slices associated with the PH refers to.

The value of alf_luma_filter_signal_flag of the APS NAL unit having aps_params_type equal to ALF_APS and adaptation_parameter_set_id equal to ph_alf_aps_id_luma[i] may be equal to 1.
The TemporalId of the APS NAL unit having aps_params_type equal to ALF_APS and adaptation_parameter_set_id equal to ph_alf_aps_id_luma[i] may be less than or equal to the TemporalId of the picture associated with the PH.
ph_alf_chroma_idc equal to 0 specifies that the adaptive loop filter is not applied to Cb and Cr colour components. ph_alf_chroma_idc equal to 1 indicates that the adaptive loop filter is applied to the Cb colour component. ph_alf_chroma_idc equal to 2 indicates that the adaptive loop filter is applied to the Cr colour component. ph_alf_chroma_idc equal to 3 indicates that the adaptive loop filter is applied to Cb and Cr colour components. When ph_alf_chroma_idc is not present, it is inferred to be equal to 0.
ph_alf_aps_id_chroma specifies the adaptation_parameter_set_id of the ALF APS that the chroma component of the slices associated with the PH refers to.
The value of alf_chroma_filter_signal_flag of the APS NAL unit having aps_params_type equal to ALF_APS and adaptation_parameter_set_id equal to ph_alf_aps_id_chroma may be equal to 1. The TemporalId of the APS NAL unit having aps_params_type equal to ALF_APS and adaptation_parameter_set_id equal to ph_alf_aps_id_chroma may be less than or equal to the TemporalId of the picture associated with the PH.
ph_cc_alf_cb_enabled_flag equal to 1 specifies that cross-component filter for Cb colour component is enabled for all slices associated with the PH and may be applied to Cb colour component in the slices. ph_cc_alf_cb_enabled_flag equal to 0 specifies that cross-component filter for Cb colour component may be disabled for one, or more, or all slices associated with the PH. When not present, ph_cc_alf_cb_enabled_flag is inferred to be equal to 0.
ph_cc_alf_cb_aps_id specifies the adaptation_parameter_set_id of the ALF APS that the Cb colour component of the slices associated with the PH refers to.
The value of alf_cc_cb_filter_signal_flag of the APS NAL unit having aps_params_type equal to ALF_APS and adaptation_parameter_set_id equal to ph_cc_alf_cb_aps_id may be equal to 1.
ph_cc_alf_cr_enabled_flag equal to 1 specifies that cross-component filter for Cr colour component is enabled for all slices associated with the PH and may be applied to Cr colour component in the slices. ph_cc_alf_cr_enabled_flag equal to 0 specifies that cross-component filter for Cr colour component may be disabled for one, or more, or all slices associated with the PH. When not present, ph_cc_alf_cr_enabled_flag is inferred to be equal to 0.
ph_cc_alf_cr_aps_id specifies the adaptation_parameter_set_id of the ALF APS that the Cr colour component of the slices associated with the PH refers to.
The value of alf_cc_cr_filter_signal_flag of the APS NAL unit having aps_params_type equal to ALF_APS and adaptation_parameter_set_id equal to ph_cc_alf_cr_aps_id may be equal to 1.

ph_lmcs_enabled_flag equal to 1 specifies that luma mapping with chroma scaling is enabled for all slices associated with the PH. ph_lmcs_enabled_flag equal to 0 specifies that luma mapping with chroma scaling may be disabled for one, or more, or all slices associated with the PH. When not present, the value of ph_lmcs_enabled_flag is inferred to be equal to 0.
ph_lmcs_aps_id specifies the adaptation_parameter_set_id of the LMCS APS that the slices associated with the PH refers to. The TemporalId of the APS NAL unit having aps_params_type equal to LMCS_APS and adaptation_parameter_set_id equal to ph_lmcs_aps_id may be less than or equal to the TemporalId of the picture associated with PH.
ph_chroma_residual_scale_flag equal to 1 specifies that chroma residual scaling is enabled for the all slices associated with the PH. ph_chroma_residual_scale_flag equal to 0 specifies that chroma residual scaling may be disabled for one, or more, or all slices associated with the PH. When ph_chroma_residual_scale_flag is not present, it is inferred to be equal to 0.
ph_scaling_list_present_flag equal to 1 specifies that the scaling list data used for the slices associated with the PH is derived based on the scaling list data contained in the referenced scaling list APS. ph_scaling_list_present_flag equal to 0 specifies that the scaling list data used for the slices associated with the PH is set to be equal to 16. When not present, the value of ph_scaling_list_present_flag is inferred to be equal to 0.
ph_scaling_list_aps_id specifies the adaptation_parameter_set_id of the scaling list APS. The TemporalId of the APS NAL unit having aps_params_type equal to SCALING_APS and adaptation_parameter_set_id equal to ph_scaling_list_aps_id may be less than or equal to the TemporalId of the picture associated with PH.
ph_virtual_boundaries_present_flag equal to 1 specifies that information of virtual boundaries is signalled in the PH. ph_virtual_boundaries_present_flag equal to 0 specifies that information of virtual boundaries is not signalled in the PH. When there is one or more than one virtual boundaries signalled in the PH, the in-loop filtering operations are disabled across the virtual boundaries in the picture. The in-loop filtering operations include the deblocking filter, sample adaptive offset filter, and adaptive loop filter operations. When not present, the value of ph_virtual_boundaries_present_flag is inferred to be equal to 0.
For bitstream conformance, when subpic_info_present_flag is equal to 1, the value of ph_virtual_boundaries_present_flag may be equal to 0.
The variable VirtualBoundariesPresentFlag is derived as follows:

```
VirtualBoundariesPresentFlag = 0
if( sps_virtual_boundaries_enabled_flag )
    VirtualBoundariesPresentFlag = sps_virtual_boundaries_present_flag  ||
        ph_virtual_boundaries_present_flag          (83)
``` ph_num_ver_virtual_boundaries specifies the number of ph_virtual_boundaries_pos_x[i] syntax elements that are present in the PH. When ph_num_ver_virtual_boundaries is not present, it is inferred to be equal to 0.

The variable NumVerVirtualBoundaries is derived as follows:

```
NumVerVirtualBoundaries = 0
if( sps_virtual_boundaries_enabled_flag )
   NumVerVirtualBoundaries = sps_virtual_boundaries_present_flag ?
      sps_num_ver_virtual _boundaries : ph_num_ver_virtual_boundaries    (84)
``` ph_virtual_boundaries_pos_x[i] specifies the location of the i-th vertical virtual boundary in units of luma samples divided by 8. The value of ph_virtual_boundaries_pos_x[i] may be in the range of 1 to Ceil(pic_width_in_luma_samples÷8)−1, inclusive.
The list VirtualBoundariesPosX[i] for i ranging from 0 to NumVerVirtualBoundaries−1, inclusive, in units of luma samples, specifying the locations of the vertical virtual boundaries, is derived as follows:

```
for( i = 0; i < NumVerVirtualBoundaries; i++)
   VirtualBoundariesPosX[ i ] = ( sps_virtual_boundaries_present_flag ?
      sps_virtual_boundaries_pos_x[ i ] : ph_virtual_boundaries_pos_x[ i ] ) * 8
                                                                         (85)
```

The distance between any two vertical virtual boundaries may be greater than or equal to CtbSizeY luma samples.
ph_num_hor_virtual_boundaries specifies the number of ph_virtual_boundaries_pos_y[i] syntax elements that are present in the PH. When ph_num_hor_virtual_boundaries is not present, it is inferred to be equal to 0.
The parameter NumHorVirtualBoundaries is derived as follows:

```
NumHorVirtualBoundaries = 0
if( sps_virtual_boundaries_enabled_flag )
   NumHorVirtualBoundaries = sps_virtual_boundaries_present_flag ?
      sps_num_hor_virtual_boundaries : ph_num_hor_virtual_boundaries    (86)
```

When sps_virtual_boundaries_enabled_flag is equal to 1 and ph_virtual_boundaries_present_flag is equal to 1, the sum of ph_num_ver_virtual_boundaries and ph_num_hor_virtual_boundaries may be greater than 0.
ph_virtual_boundaries_pos_y[i] specifies the location of the i-th horizontal virtual boundary in units of luma samples divided by 8. The value of ph_virtual_boundaries_pos_y[i] may be in the range of 1 to Ceil(pic_height_in_luma_samples÷8)−1, inclusive.
The list VirtualBoundariesPosY[i] for i ranging from 0 to NumHorVirtualBoundaries−1, inclusive, in units of luma samples, specifying the locations of the horizontal virtual boundaries, is derived as follows:

```
for( i = 0; i < NumHorVirtualBoundaries; i++)
   VirtualBoundariesPosY[i] = ( sps_virtual_boundaries_present_flag ?
      sps_virtual_boundaries_pos_y[ i ] : ph_virtual_boundaries_pos_y[ i ] ) * 8
                                                                         (87)
```

The distance between any two horizontal virtual boundaries may be greater than or equal to CtbSizeY luma samples.
pic_output_flag affects the decoded picture output and removal processes. When pic_output_flag is not present, it is inferred to be equal to 1.
partition_constraints_override_flag equal to 1 specifies that partition constraint parameters are present in the PH. partition_constraints_override_flag equal to 0 specifies that partition constraint parameters are not present in the PH. When not present, the value of partition_constraints_override_flag is inferred to be equal to 0.
ph_log2_diff_min_qt_min_cb_intra_slice_luma specifies the difference between the base 2 logarithm of the minimum size in luma samples of a luma leaf block resulting from quadtree splitting of a CTU and the base 2 logarithm of the minimum coding block size in luma samples for luma CUs in the slices with slice_type equal to 2 (I) associated with the PH. The value of ph_log2_diff_min_qt_min_cb_intra_slice_luma may be in the range of 0 to CtbLog2SizeY−MinCbLog2SizeY, inclusive. When not present, the value of ph_log2_diff_min_qt_min_cb_luma is inferred to be equal to sps_log2_diff_min_qt_min_cb_intra_slice_luma.
ph_max_mtt_hierarchy_depth_intra_slice_luma specifies the maximum hierarchy depth for coding units resulting from multi-type tree splitting of a quadtree leaf in slices with slice_type equal to 2 (I) associated with the PH. The value of ph_max_mtt_hierarchy_depth_intra_slice_luma may be in the range of 0 to 2*(CtbLog2SizeY−MinCbLog2SizeY), inclusive. When not present, the value of ph_max_mtt_hierarchy_depth_intra_slice_luma is inferred to be equal to sps_max_mtt_hierarchy_depth_intra_slice_luma.
ph_log2_diff_max_bt_min_qt_intra_slice_luma specifies the difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type equal to 2 (I) associated with the PH. The value of ph_log2_diff_max_bt_min_qt_intra_slice_luma may be in the range of 0 to CtbLog2SizeY−MinQtLog2SizeIntraY, inclusive. When not present, the value of ph_log2_diff_max_bt_min_qt_intra_slice_luma is inferred to be equal to sps_log2_diff_max_bt_min_qt_intra_slice_luma.
ph_log2_diff_max_tt_min_qt_intra_slice_luma specifies the difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 2 (I) associated with the PH. The value of ph_log2_diff_max_tt_min_qt_intra_slice_luma may be in the range of 0 to CtbLog2SizeY−MinQtLog2SizeIntraY, inclusive. When not present, the value of ph_log2_diff_max_tt_min_qt_intra_slice_luma is inferred to be equal to sps_log2_diff_max_tt_min_qt_intra_slice_luma.

ph_log2_diff_min_qt_min_cb_intra_slice_chroma specifies the difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in slices with slice_type equal to 2 (I) associated with the PH. The value of ph_log2_diff_min_qt_min_cb_intra_slice_chroma may be in the range of 0 to CtbLog2SizeY−MinCbLog2SizeY, inclusive. When not present, the value of ph_log2_diff_min_qt_min_cb_intra_slice_chroma is inferred to be equal to sps_log2_diff_min_qt_min_cb_intra_slice_chroma.

ph_max_mtt_hierarchy_depth_intra_slice_chroma specifies the maximum hierarchy depth for chroma coding units resulting from multi-type tree splitting of a chroma quadtree leaf with treeType equal to DUAL_TREE_CHROMA in slices with slice_type equal to 2(1) associated with the PH. The value of ph_max_mtt_hierarchy_depth_intra_slice_chroma may be in the range of 0 to 2*(CtbLog2SizeY−MinCbLog2SizeY), inclusive. When not present, the value of ph_max_mtt_hierarchy_depth_intra_slice_chroma is inferred to be equal to sps_max_mtt_hierarchy_depth_intra_slice_chroma.

ph_log2_diff_max_bt_min_qt_intra_slice_chroma specifies the difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL_TREE_CHROMA in slices with slice_type equal to 2(1) associated with the PH. The value of ph_log2_diff_max_bt_min_qt_intra_slice_chroma may be in the range of 0 to CtbLog2SizeY−MinQtLog2SizeIntraC, inclusive. When not present, the value of ph_log2_diff_max_bt_min_qt_intra_slice_chroma is inferred to be equal to sps_log2_diff_max_bt_min_qt_intra_slice_chroma.

ph_log2_diff_max_tt_min_qt_intra_slice_chroma specifies the difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in slices with slice_type equal to 2(1) associated with the PH. The value of ph_log2_diff_max_tt_min_qt_intra_slice_chroma may be in the range of 0 to CtbLog2SizeY−MinQtLog2SizeIntraC, inclusive. When not present, the value of ph_log2_diff_max_tt_min_qt_intra_slice_chroma is inferred to be equal to sps_log2_diff_max_tt_min_qt_intra_slice_chroma ph_cu_qp_delta_subdiv_intra_slice specifies the maximum cbSubdiv value of coding units in intra slice that convey cu_qp_delta_abs and cu_qp_delta_sign_flag. The value of ph_cu_qp_delta_subdiv_intra_slice may be in the range of 0 to 2*(CtbLog2SizeY−MinQtLog2SizeIntraY+ph_max_mtt_hierarchy_depth_intra_slice_luma), inclusive. When not present, the value of ph_cu_qp_delta_subdiv_intra_slice is inferred to be equal to 0.

ph_cu_chroma_qp_offset_subdiv_intra_slice specifies the maximum cbSubdiv value of coding units in intra slice that convey cu_chroma_qp_offset_flag. The value of ph_cu_chroma_qp_offset_subdiv_intra_slice may be in the range of 0 to 2*(CtbLog2SizeY−MinQtLog2SizeintraY+ph_max_mtt_hierarchy_depth_intra_slice_luma), inclusive. When not present, the value of ph_cu_chroma_qp_offset_subdiv_intra_slice is inferred to be equal to 0.

ph_log2_diff_min_qt_min_cb_inter_slice specifies the difference between the base 2 logarithm of the minimum size in luma samples of a luma leaf block resulting from quadtree splitting of a CTU and the base 2 logarithm of the minimum luma coding block size in luma samples for luma CUs in the slices with slice_type equal to 0 (B) or 1 (P) associated with the PH. The value of ph_log2_diff_min_qt_min_cb_inter_slice may be in the range of 0 to CtbLog2SizeY−MinCbLog2SizeY, inclusive. When not present, the value of ph_log2_diff_min_qt_min_cb_luma is inferred to be equal to sps_log2_diff_min_qt_min_cb_inter_slice.

ph_max_mtt_hierarchy_depth_inter_slice specifies the maximum hierarchy depth for coding units resulting from multi-type tree splitting of a quadtree leaf in slices with slice_type equal to 0 (B) or 1 (P) associated with the PH. The value of ph_max_mtt_hierarchy_depth_inter_slice may be in the range of 0 to 2*(CtbLog2SizeY−MinCbLog2SizeY), inclusive. When not present, the value of ph_max_mtt_hierarchy_depth_inter_slice is inferred to be equal to sps_max_mtt_hierarchy_depth_inter_slice.

ph_log2_diff_max_bt_min_qt_inter_slice specifies the difference between the base 2 logarithm of the maximum size (width or height) in luma samples of a luma coding block that can be split using a binary split and the minimum size (width or height) in luma samples of a luma leaf block resulting from quadtree splitting of a CTU in the slices with slice_type equal to 0 (B) or 1 (P) associated with the PH. The value of ph_log2_diff_max_bt_min_qt_inter_slice may be in the range of 0 to CtbLog2SizeY−MinQtLog2SizeInterY, inclusive. When not present, the value of ph_log2_diff_max_bt_min_qt_inter_slice is inferred to be equal to sps_log2_diff_max_bt_min_qt_inter_slice.

ph_log2_diff_max_tt_min_qt_inter_slice specifies the difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 0 (B) or 1 (P) associated with the PH. The value of ph_log2_diff_max_tt_min_qt_inter_slice may be in the range of 0 to CtbLog2SizeY−MinQtLog2SizeInterY, inclusive. When not present, the value of ph_log2_diff_max_tt_min_qt_inter_slice is inferred to be equal to sps_log2_diff_max_tt_min_qt_inter_slice.

ph_cu_qp_delta_subdiv_inter_slice specifies the maximum cbSubdiv value of coding units that in inter slice convey cu_qp_delta_abs and cu_qp_delta_sign_flag. The value of ph_cu_qp_delta_subdiv_inter_slice may be in the range of 0 to 2*(CtbLog2SizeY−MinQtLog2SizeInterY+ph_max_mtt_hierarchy_depth_inter_slice), inclusive. When not present, the value of ph_cu_qp_delta_subdiv_inter_slice is inferred to be equal to 0.

ph_cu_chroma_qp_offset_subdiv_inter_slice specifies the maximum cbSubdiv value of coding units in inter slice that convey cu_chroma_qp_offset_flag. The value of ph_cu_chroma_qp_offset_subdiv_inter_slice may be in the range of 0 to 2*(CtbLog2SizeY−MinQtLog2SizeInterY+ph_max_mtt_hierarchy_depth_inter_slice), inclusive. When not present, the value of ph_cu_chroma_qp_offset_subdiv_inter_slice is inferred to be equal to 0.

ph_temporal_mvp_enabled_flag specifies whether temporal motion vector predictors can be used for inter prediction for slices associated with the PH. If ph_temporal_mvp_enabled_flag is equal to 0, the syntax elements of the slices associated with the PH may be constrained such that no temporal motion vector predictor is used in decoding of the slices. Otherwise (ph_temporal_mvp_enabled_flag is equal to 1), temporal motion vector predictors may be used in decoding of the slices associated with the PH. When not present, the value of ph_temporal_mvp_enabled_flag is inferred to be equal to 0. When no reference picture in the DPB has the same spatial resolution as the current picture, the value of ph_temporal_mvp_enabled_flag may be equal to 0.

The maximum number of subblock-based merging MVP candidates, MaxNumSubblockMergeCand, is derived as follows:

```
if( sps_affine_enabled_flag )
   MaxNumSubblockMergeCand = 5 - five_minus_max_num_subblock_merge_cand
    (88)
else
   MaxN umSubblockMergeCand
sps_sbtmvp_enabled_flag && ph_temporal_mvp_enable_flag
```

The value of MaxNumSubblockMergeCand may be in the range of 0 to 5, inclusive.

ph_collocated_from_l0_flag equal to 1 specifies that the collocated picture used for temporal motion vector prediction is derived from reference picture list 0. ph_collocated_from_l0_flag equal to 0 specifies that the collocated picture used for temporal motion vector prediction is derived from reference picture list 1.

ph_collocated_ref_idx specifies the reference index of the collocated picture used for temporal motion vector prediction.

When ph_collocated_from_l0_flag is equal to 1, ph_collocated_ref_idx refers to an entry in reference picture list 0, and the value of ph_collocated_ref_idx may be in the range of 0 to num_ref_entries[0][PicRplsIdx[0]]−1, inclusive.

When ph_collocated_from_l0_flag is equal to 0, ph_collocated_ref_idx refers to an entry in reference picture list 1, and the value of ph_collocated_ref_idx may be in the range of 0 to num_ref_entries[1][PicRplsIdx[1]]−1, inclusive.

When not present, the value of ph_collocated_ref_idx is inferred to be equal to 0. mvd_l1_zero_flag equal to 1 indicates that the mvd_coding(x0, y0, 1) syntax structure is not parsed and MvdL1[x0][y0][compIdx] and MvdCpL1[x0][y0][cpIdx][compIdx] are set equal to 0 for compIdx=0 . . . 1 and cpIdx=0.2. mvd_l1_zero_flag equal to 0 indicates that the mvd_coding(x0, y0, 1) syntax structure is parsed.

ph_fpel_mmvd_enabled_flag equal to 1 specifies that merge mode with motion vector difference uses integer sample precision in the slices associated with the PH. ph_fpel_mmvd_enabled_flag equal to 0 specifies that merge mode with motion vector difference can use fractional sample precision in the slices associated with the PH. When not present, the value of ph_fpel_mmvd_enabled_flag is inferred to be 0.

ph_disable_bdof_flag equal to 1 specifies that bi-directional optical flow inter prediction based inter bi-prediction is disabled in the slices associated with the PH. ph_disable_bdof_flag equal to 0 specifies that bi-directional optical flow inter prediction based inter bi-prediction may or may not be enabled in the slices associated with the PH.

When ph_disable_bdof_flag is not present, the following applies:
   If sps_bdof_enabled_flag is equal to 1, the value of ph_disable_bdof_flag is inferred to be equal to 0.
   Otherwise (sps_bdof_enabled_flag is equal to 0), the value of ph_disable_bdof_flag is inferred to be equal to 1.

ph_disable_dmvr_flag equal to 1 specifies that decoder motion vector refinement based inter bi-prediction is disabled in the slices associated with the PH. ph_disable_dmvr_flag equal to 0 specifies that decoder motion vector refinement based inter bi-prediction may or may not be enabled in the slices associated with the PH.

When ph_disable_dmvr_flag is not present, the following applies:
   If sps_dmvr_enabled_flag is equal to 1, the value of ph_disable_dmvr_flag is inferred to be equal to 0.
   Otherwise (sps_dmvr_enabled_flag is equal to 0), the value of ph_disable_dmvr_flag is inferred to be equal to 1.

ph_disable_prof_flag equal to 1 specifies that prediction refinement with optical flow is disabled in the slices associated with the PH. ph_disable_prof flag equal to 0 specifies that prediction refinement with optical flow may or may not be enabled in the slices associated with the PH.

When ph_disable_prof flag is not present, the following applies:
   If sps_affine_prof_enabled_flag is equal to 1, the value of ph_disable_prof flag is inferred to be equal to 0.
   Otherwise (sps_affine_prof_enabled_flag is equal to 0), the value of ph_disable_prof flag is inferred to be equal to 1.

ph_qp_delta specifies the initial value of $Qp_Y$ to be used for the coding blocks in the picture until modified by the value of CuQpDeltaVal in the coding unit layer.

When qp_delta_info_in_ph_flag is equal to 1, the initial value of the $Qp_Y$ quantization parameter for all slices of the picture, $SliceQp_Y$, is derived as follows:

$$SliceQp_Y = 26 + init\_qp\_minus26 + ph\_qp\_delta \quad (89)$$

The value of $SliceQp_Y$ may be in the range of −QpBdOffset to +63, inclusive.

phjoint_cbcr_sign_flag specifies whether, in transform units with tu_joint_cbcr_residual_flag[x0][y0] equal to 1, the collocated residual samples of both chroma components have inverted signs. When tu_joint_cbcr_residual_flag[x0][y0] equal to 1 for a transform unit, ph_joint_cbcr_sign_flag equal to 0 specifies that the sign of each residual sample of the Cr (or Cb) component is identical to the sign of the collocated Cb (or Cr) residual sample and ph_joint_cbcr_sign_flag equal to I specifies that the sign of each residual sample of the Cr (or Cb) component is given by the inverted sign of the collocated Cb (or Cr) residual sample.

ph_sao_luma_enabled_flag equal to 1 specifies that SAO is enabled for the luma component in all slices associated with the PH; ph_sao_luma_enabled_flag equal to 0 specifies that SAO for the luma component may be disabled for one, or more, or all slices associated with the PH. When ph_sao_luma_enabled_flag is not present, it is inferred to be equal to 0.

ph_sao_chroma_enabled_flag equal to 1 specifies that SAO is enabled for the chroma component in all slices associated with the PH; ph_sao_chroma_enabled_flag equal to 0 specifies that SAO for chroma component may be disabled for one, or more, or all slices associated with the PH. When ph_sao_chroma_enabled_flag is not present, it is inferred to be equal to 0.

ph_dep_quant_enabled_flag equal to 0 specifies that dependent quantization is disabled for the current picture. ph_dep_quant_enabled_flag equal to 1 specifies that dependent quantization is enabled for the current picture. When ph_dep_quant_enabled_flag is not present, it is inferred to be equal to 0.

pic_sign_data_hiding_enabled_flag equal to 0 specifies that sign bit hiding is disabled for the current picture. pic_sign_data_hiding_enabled_flag equal to 1 specifies that sign bit hiding is enabled for the current picture. When pic_sign_data_hiding_enabled_flag is not present, it is inferred to be equal to 0.

ph_deblocking_filter_override_flag equal to I specifies that deblocking parameters are present in the PH. ph_deblocking_filter_override_flag equal to 0 specifies that deblocking parameters are not present in the PH. When not present, the value of ph_deblocking_filter_override_flag is inferred to be equal to 0.

ph_deblocking_filter_disabled_flag equal to 1 specifies that the operation of the deblocking filter is not applied for the slices associated with the PH. ph_deblocking_filter_disabled_flag equal to 0 specifies that the operation of the deblocking filter is applied for the slices associated with the PH. When ph_deblocking_filter_disabled_flag is not present, it is inferred to be equal to pps_deblocking_filter_disabled_flag.

ph_beta_offset_div2 and ph_tc_offset_div2 specify the deblocking parameter offsets for β and tC (divided by 2) that are applied to the luma component for the slices associated with the PH. The values of ph_beta_offset_div2 and ph_tc_offset_div2 may both be in the range of −12 to 12, inclusive. When not present, the values of ph_beta_offset_div2 and ph_tc_offset_div2 are inferred to be equal to pps_beta_offset_div2 and pps_tc_offset_div2, respectively.

ph_cb_beta_offset_div2 and ph_cb_tc_offset_div2 specify the deblocking parameter offsets for β and tC (divided by 2) that are applied to the Cb component for the slices associated with the PH. The values of ph_cb_beta_offset_div2 and ph_cb_tc_offset_div2 may both be in the range of −12 to 12, inclusive. When not present, the values of ph_cb_betaa_offset_div2 and ph_cb_tc_offset_div2 are inferred to be equal to pps_cb_beta_offset_div2 and pps_cb_tc_offset_div2, respectively.

ph_cr_beta_offset_div2 and ph_cr_tc_offset_div2 specify the deblocking parameter offsets for β and tC (divided by 2) that are applied to the Cr component for the slices associated with the PH. The values of ph_cr_beta_offset_div2 and ph_cr_tc_offset_div2 may both be in the range of −12 to 12, inclusive. When not present, the values of ph_cr_beta_offset_div2 and ph_cr_tc_offset_div2 are inferred to be equal to pps_cr_beta_offset_div2 and pps_cr_tc_offset_div2, respectively.

ph_extension_length specifies the length of the PH extension data in bytes, not including the bits used for signalling ph_extension_length itself. The value of ph_extension_length may be in the range of 0 to 256, inclusive. When not present, the value of ph_extension_length is inferred to be equal to 0.

ph_extension_data_byte may have any value. Decoders conforming to this version of this Specification may ignore the value of ph_extension_data byte. Its value does not affect decoder conformance to profiles specified in this version of specification.

7.4.8 Slice Header Semantics 7.4.8.1 General Slice Header Semantics

The variable CuQpDeltaVal, specifying the difference between a luma quantization parameter for the coding unit containing cu_qp_delta_abs and its prediction, is set equal to 0. The variables $CuQpOffset_{Cb}$, $CuQpOffset_{Cr}$, and $CuQpOffset_{CbCr}$, specifying values to be used when determining the respective values of the $Qp'_{Cb}$, $Qp'_{Cr}$, and $Qp'_{CbCr}$ quantization parameters for the coding unit containing cu_chroma_qp_offset_flag, are all set equal to 0.

picture_header_in_slice_header_flag equal to 1 specifies that the PH syntax structure is present in the slice header. picture_header_in_slice_header_flag equal to 0 specifies that the PH syntax structure is not present in the slice header. For bitstream conformance, the value of picture_header_in_slice_header_flag may be the same in all coded slices in a CLVS.

When picture_header_in_slice_header flag is equal to 1 for a coded slice, for bitstream conformance, no VCL NAL unit with nal_unit_type equal to PH_NUT may be present in the CLVS.

When picture_header_in_slice_header_flag is equal to 0, all coded slices in the current picture may have picture_header_in_slice_header_flag is equal to 0, and the current PU may have a PH NAL unit.

slice_subpic_id specifies the subpicture ID of the subpicture that contains the slice. If slice_subpic_id is present, the value of the variable CurrSubpicIdx is derived to be such that SubpicIdVal[CurrSubpicIdx] is equal to slice_subpic_id. Otherwise (slice_subpic_id is not present), CurrSubpicIdx is derived to be equal to 0. The length of slice_subpic_id is sps_subpic_id_len_minus1+1 bits.

slice_address specifies the slice address of the slice. When not present, the value of slice_address is inferred to be equal to 0. When rect_slice_flag is equal to 1 and NumSlicesInSubpic[CurrSubpicIdx] is equal to 1, the value of slice_address is inferred to be equal to 0.

If rect_slice_flag is equal to 0, the following applies:
 The slice address is the raster scan tile index.
 The length of slice_address is Ceil(Log2 (NumTilesInPic)) bits.
 The value of slice_address may be in the range of 0 to NumTilesInPic−1, inclusive.

Otherwise (rect_slice_flag is equal to 1), the following applies:
 The slice address is the subpicture-level slice index of the slice.
 The length of slice_address is Ceil(Log2(NumSlicesInSubpic[CurrSubpicIdx])) bits.
 The value of slice_address may be in the range of 0 to NumSlicesInSubpic[CurrSubpicIdx]−1, inclusive.

For bitstream conformance, the following constraints may apply:

If rect_slice_flag is equal to 0 or subpic_info_present_flag is equal to 0, the value of slice_address may not be equal to the value of slice_address of any other coded slice NAL unit of the same coded picture.

Otherwise, the pair of slice_subpic_id and slice_address values may not be equal to the pair of slice_subpic_id and slice_address values of any other coded slice NAL unit of the same coded picture.

The shapes of the slices of a picture may be such that each CTU, when decoded, may have its entire left boundary and entire top boundary consisting of a picture boundary or consisting of boundaries of previously decoded CTU(s).

sh_extra_bit[i] may be equal to 1 or 0. Decoders conforming to this version of this Specification may ignore the value of sh_extra_bit[i]. Its value does not affect decoder conformance to profiles specified in this version of specification. num_tiles_in_slice_minus1 plus 1, when present, specifies the number of tiles in the slice. The value of num_tiles_in_slice_minus1 may be in the range of 0 to NumTilesInPic−1, inclusive. The variable NumCtusInCurrSlice, which specifies the number of CTUs in the current slice, and the list CtbAddrInCurrSlice[i], for i ranging from 0 to NumCtusInCurrSlice−1, inclusive, specifying the picture raster scan address of the i-th CTB within the slice, are derived as follows:

slice_type specifies the coding type of the slice according to Table 9.

TABLE 9

| Name association to slice type | |
| --- | --- |
| slice_type | Name of slice_type |
| 0 | B (B slice) |
| 1 | P (P slice) |
| 2 | I (I slice) |

When not present, the value of slice_type is inferred to be equal to 2.

When ph_intra_slice_allowed_flag is equal to 0, the value of slice_type may be equal to 0 or 1. When nal_unit_type is in the range of IDR_W_RADL to CRA_NUT, inclusive, and vps_independent_layer_flag[GeneralLayerIdx[nuh_layer_id]] is equal to 1, slice_type may be equal to 2.

The variables MinQtLog2SizeY, MinQtLog2SizeC, MinQtSizeY, MinQtSizeC, MaxBtSizeY, MaxBtSizeC, MinBtSizeY, MaxTtSizeY, MaxTtSizeC, MinTtSizeY, MaxMttDepthY and MaxMttDepthC are derived as follows:

```
if( rect_slice_flag ) {
  picLevelSliceIdx = slice_address
  for( j = 0; j < CurrSubpicIdx; j++ )
    picLevelSliceIdx += NumSlicesInSubpic[ j ]
  NumCtusInCurrSlice = NumCtusInSlice[ picLevelSliceIdx ]
  for( i = 0; i < NumCtusInCurrSlice; i++ )
    CtbAddrInCurrSlice[ i ] = CtbAddrInSlice[ picLevelSliceIdx ][ i ]      (117)
} else {
  NumCtusInCurrSlice = 0
  for( tileIdx = slice_address; tileIdx <= slice_address+num_tiles_in_slice_minus1;
tileIdx++ ) {
    tileX = tileIdx % NumTileColumns
    tileY = tileIdx / NumTileColumns
    for( ctbY = tileRowBd[ tileY ]; ctbY < tileRowBd[ tileY + 1 ]; ctbY++ ) {
      for( ctbX = tileColBd[ tileX ]; ctbX < tileColBd[ tileX + 1 ]; ctbX++ ) {
        CtbAddrInCurrSlice[ NumCtusInCurrSlice ] =
ctbY * PicWidthInCtb + ctbX
        NumCtusInCurrSlice++
      }
    }
  }
}
```

The variables SubpicLeftBoundaryPos, SubpicTopBoundaryPos, SubpicRightBoundaryPos, and SubpicBotBoundaryPos are derived as follows:

```
if( subpic_treated_as_pic_flag[ CurrSubpicIdx ] ) {
  SubpicLeftBoundaryPos = subpic_ctu_top_left_x[ CurrSubpicIdx ] * CtbSizeY
  SubpicRightBoundaryPos = Min( pic_width_max_in_luma_samples - 1,
    ( subpic_ctu_top_left_x[ CurrSubpicIdx ] +
    subpic_width_minus1[ CurrSubpicIdx ] + 1)* CtbSizeY - 1)
  SubpicTopBoundaryPos = subpic_ctu_top_left_y[ CurrSubpicIdx ] *CtbSizeY
                                                                              (118)
  SubpicBotBoundaryPos = Min(pic_height_max_in_luma_samples - 1,
    ( subpic_ctu_top_left_y[ CurrSubpicIdx ] +
    subpic_height_minus1[ CurrSubpicIdx ] + 1 ) * CtbSizeY - 1 )
}
```

```
If slice_type equal to 2 (I),
    MinQtLog2SizeY =
    MinCbLog2SizeY + ph_log2_diff_min_qt_min_cb_intra_slice_luma (119)
    MinQtLog2SizeC =
    MinCbLog2SizeY + ph_log2_diff_min_qt_min_cb_intra_slice_chroma (120)
    MaxBtSizeY = 1 <<
    (MinQtLog2SizeY + ph_log2_diff_max_bt_min_qt_intra_slice_luma) (121)
    MaxBtSizeC = 1 <<
    ( MinQtLog2SizeC + ph_log2_diff_max_bt_min_qt_intra_slice_chroma )(122)
    MaxTtSizeY = 1 <<
    (MinQtLog2SizeY + ph_log2_diff_max_tt_min_qt_intra_slice_luma ) (123)
    MaxTtSizeC = 1 <<
    ( MinQtLog2SizeC + ph_log2_diff_max_tt_min_qt_intra_slice_chroma )(124)
    MaxMttDepthY = ph_max_mtt_hierarchy_depth_intra_slice_luma (125)
    MaxMttDepthC = ph_max_mtt_hierarchy_depth_intra_slice_chroma (126)
    CuQpDeltaSubdiv = ph_cu_qp_delta_subdiv_intra_slice (127)
    CuChromaQpOffsetSubdiv = ph_cu_chroma_qp_offset_subdiv_intra_slice(128)
Otherwise (slice_type equal to 0 (B) or 1 (P)),
    MinQtLog2SizeY = MinCbLog2SizeY + ph_log2_diff_min_qt_min_cb_inter_slice
        (129)
    MinQtLog2SizeC = MinCbLog2SizeY + ph_log2_diff_min_qt_min_cb_inter_slice
        (130)
    MaxBtSizeY = 1 <<
    ( MinQtLog2SizeY + ph_log2_diff_max_bt_min_qt_inter_slice) (131)
    MaxBtSizeC = 1 <<
    ( MinQtLog2SizeC + ph_log2_diff_max_bt_min_qt_inter_slice) (132)
    MaxTtSizeY = 1 <<
    ( MinQtLog2SizeY + ph_log2_diff_max_tt_min_qt_inter_slice) (133)
    MaxTtSizeC = 1 << (MinQtLog2SizeC + ph_log2_diff_max_tt_min_qt_inter_slice)
        (134)
    MaxMttDepthY = ph_max_mtt_hierarchy_depth_inter_slice (135)
    MaxMttDepthC = ph_max_mtt_hierarchy_depth_inter_slice (136)
    CuQpDeltaSubdiv = ph_cu_qp_delta_subdiv_inter_slice (137)
    CuChromaQpOffsetSubdiv = ph_cu_chroma_qp_offset_subdiv_inter_slice(138)
MinQtSizeY = 1 << MinQtLog2SizeY
    (139)
MinQtSizeC = 1 << MinQtLog2SizeC
    (140)
MinBtSizeY = 1 << MinCbLog2SizeY
    (141)
MinTtSizeY = 1 << MinCbLog2SizeY
    (142)
``` slice_alf_enabled_flag equal to 1 specifies that adaptive loop filter is enabled and may be applied to Y, Cb, or Cr colour component in a slice. slice_alf_enabled_flag equal to 0 specifies that adaptive loop filter is disabled for all colour components in a slice. When not present, the value of slice_alf_enabled_flag is inferred to be equal to ph_alf_enabled_flag.

slice_num_alf_aps_ids_luma specifies the number of ALF APSs that the slice refers to. When slice_alf_enabled_flag is equal to 1 and slice_num_alf_aps_ids_luma is not present, the value of slice_num_alf_aps_ids_luma is inferred to be equal to the value of ph_num_alf_aps_ids_luma.

slice_alf_aps_id_luma[i] specifies the adaptation_parameter_set_id of the i-th ALF APS that the luma component of the slice refers to. The TemporalId of the APS NAL unit having aps_params_type equal to ALF_APS and adaptation_parameter_set_id equal to slice_alf_aps_id_luma[i] may be less than or equal to the Temporal Id of the coded slice NAL unit. When slice_alf_enabled_flag is equal to 1 and slice_alf_aps_id_luma[i] is not present, the value of slice_alf_aps_id_luma[i] is inferred to be equal to the value of ph_alf_aps_id_luma[i]. The value of alf_luma_filter_signal_flag of the APS NAL unit having aps_params_type equal to ALF_APS and adaptation_parameter_set_id equal to slice_alf_aps_id_luma[i] may be equal to 1.

slice_alf_chroma_idc equal to 0 specifies that the adaptive loop filter is not applied to Cb and Cr colour components. slice_alf_chroma_idc equal to I indicates that the adaptive loop filter is applied to the Cb colour component. slice_alf_chroma_idc equal to 2 indicates that the adaptive loop filter is applied to the Cr colour component. slice_alf_chroma_idc equal to 3 indicates that the adaptive loop filter is applied to Cb and Cr colour components. When slice_alf_chroma_idc is not present, it is inferred to be equal to ph_alf_chroma_idc.

slice_alf_aps_id_chroma specifies the adaptation_parameter_set_id of the ALF APS that the chroma component of the slice refers to. The TemporalId of the APS NAL unit having aps_params_type equal to ALF_APS and adaptation_parameter_set_id equal to slice_alf_aps_id_chroma may be less than or equal to the TemporalId of the coded slice NAL unit. When slice_alf_enabled_flag is equal to 1 and slice_alf_aps_id_chroma is not present, the value of slice_alf_aps_id_chroma is inferred to be equal to the value of ph_alf_aps_id_chroma. The value of alf_chroma_filter_signal_flag of the APS NAL unit having aps_params_type equal to ALF_APS and adaptation_parameter_set_id equal to slice_alf_aps_id_chroma may be equal to 1.

slice_cc_alf_cb_enabled_flag equal to 0 specifies that the cross-component filter is not applied to the Cb colour component. slice_cc_alf_cb_enabled_flag equal to 1 indicates that the cross-component filter is enabled and may be applied to the Cb colour component. When slice_cc_alf_cb_enabled_flag is not present, it is inferred to be equal to ph_cc_alf_cb_enabled_flag.

slice_cc_alf_cb_aps_id specifies the adaptation_parameter_set_id that the Cb colour component of the slice refers to.

The TemporalId of the APS NAL unit having aps_params_type equal to ALF_APS and adaptation_parameter_set_id equal to slice_cc_alf_cb_aps_id may be less than or equal to the TemporalId of the coded slice NAL unit. When slice_cc_alf_cb_enabled_flag is equal to 1 and slice_cc_alf_cb_aps_id is not present, the value of slice_cc_alf_cb_aps_id is inferred to be equal to the value of ph_cc_alf_cb_aps_id.

The value of alf_cc_cb_filter_signal_flag of the APS NAL unit having aps_params_type equal to ALF_APS and adaptation_parameter_set_id equal to slice_cc_alf_cb_aps_id may be equal to 1.

slice_cc_alf_cr_enabled_flag equal to 0 specifies that the cross-component filter is not applied to the Cr colour com- 143. The value of num_ref_idx_active_minus1[i] may be in the range of 0 to 14, inclusive.

For i equal to 0 or 1, when the current slice is a B slice, num_ref_idx_active_override_flag is equal to 1, and num_ref_idx_active_minus1[i] is not present, num_ref_idx_active_minus1[i] is inferred to be equal to 0.

When the current slice is a P slice, num_ref_idx_active_override_flag is equal to 1, and num_ref_idx_active_minus1[0] is not present, num_ref_idx_active_minus1[0] is inferred to be equal to 0.

The variable NumRefIdxActive[i] is derived as follows:

```
for( i = 0; i < 2; i++ ) {
    if( slice_type = = B | | ( slice_type = = P && i = = 0 ) ) {
        if( num_ref_idx_active_override_flag )
            NumRefIdxActive[ i ] = num_ref_idx_active_minus1[ i ] + 1  (143)
        else {
            if( num_ref_entries[ i ][ RplsIdx[ i ] ] >= num_ref_idx_default_active_minus1[i ] + 1 )
                NumRefIdxActive[ i ] = num_ref_idx_default_active_minus1[ i ] + 1
            else
                NumRefIdxActive [ i ] = num_ref_entries[ i ][ RpisIdx[ i ] ]
        }
    } else /* slice_type = = I | | ( slice_type = = P && i = = 1 ) */
        NumRefIdxActive[ i ] = 0
}
``` ponent. slice_cc_alf_cb_enabled_flag equal to 1 indicates that the cross-component adaptive loop filter is enabled and may be applied to the Cr colour component. When slice_cc_alf_cr_enabled_flag is not present, it is inferred to be equal to ph_cc_alf_cr_enabled_flag.

slice_cc_alf_cr_aps_id specifies the adaptation_parameter_set_id that the Cr colour component of the slice refers to. The TemporalId of the APS NAL unit having aps_params_type equal to ALF_APS and adaptation_parameter_set_id equal to slice_cc_alf_cr_aps_id may be less than or equal to the TemporalId of the coded slice NAL unit. When slice_cc_alf_cr_enabled_flag is equal to 1 and slice_cc_alf_cr_aps_id is not present, the value of slice_cc_alf_cr_aps_id is inferred to be equal to the value of ph_cc_alf_cr_aps_id.

The value of alf_cc_cr_filter_signal_flag of the APS NAL unit having aps_params_type equal to ALF_APS and adaptation_parameter_set_id equal to slice_cc_alf_cr_aps_id may be equal to 1.

colour_plane_id identifies the colour plane associated with the current slice when separate_colour_plane_flag is equal to 1. The value of colour_plane_id may be in the range of 0 to 2, inclusive. colour_plane_id values 0, 1 and 2 correspond to the Y, Cb and Cr planes, respectively. The value 3 of colour_plane_id is reserved for future use by ITU-T|ISO/IEC.

NOTE 1—There is no dependency between the decoding processes of different colour planes of one picture.

num_ref_idx_active_override_flag equal to I specifies that the syntax element num_ref_idx_active_minus1[0] is present for P and B slices and the syntax element num_ref_idx_active_minus1[1] is present for B slices. num_ref_idx_active_override_flag equal to 0 specifies that the syntax elements num_ref_idx_active_minus1[0] and num_ref_idx_active_minus1[1] are not present. When not present, the value of num_ref_idx_active_override_flag is inferred to be equal to 1.

num_ref_idx_active_minus1[i] is used for the derivation of the variable NumRefIdxActive[i] as specified by Equation The value of NumRefIdxActive[i]−1 specifies the maximum reference index for reference picture list i that may be used to decode the slice. When the value of NumRefIdxActive[i] is equal to 0, no reference index for reference picture list i may be used to decode the slice.

When the current slice is a P slice, the value of NumRefIdxActive[0] may be greater than 0. When the current slice is a B slice, both NumRefIdxActive[0] and NumRefIdxActive[1] may be greater than 0.

cabac_init_flag specifies the method for determining the initialization table used in the initialization process for context variables. When cabac_init_flag is not present, it is inferred to be equal to 0.

slice_collocated_from_l0_flag equal to 1 specifies that the collocated picture used for temporal motion vector prediction is derived from reference picture list 0. slice_collocated_from_l0_flag equal to 0 specifies that the collocated picture used for temporal motion vector prediction is derived from reference picture list 1.

When slice_type is equal to B or P, ph_temporal_mvp_enabled_flag is equal to 1, and slice_collocated_from_l0_flag is not present, the following applies:
  If rpl_info_in_ph_flag is equal to 1, slice_collocated_from_l0_flag is inferred to be equal to ph_collocated_from_l0_flag.
  Otherwise (rpl_info_in_ph_flag is equal to 0 and if slice_type is equal to P, the value of slice_collocated_from_l0_flag is inferred to be equal to 1.

slice_collocated_ref_idx specifies the reference index of the collocated picture used for temporal motion vector prediction.

When slice_type is equal to P or when slice_type is equal to B and collocated_from_l0_flag is equal to 1, slice_collocated_ref_idx refers to an entry in reference picture list 0, and the value of slice_collocated_ref_idx may be in the range of 0 to NumRefIdxActive[0]−1, inclusive. When slice_type is equal to B and slice_collocated_from_l0_flag is equal to 0, slice_collocated_ref_idx refers to an entry in reference picture list 1, and the value of slice_collocated_ref_idx may be in the range of 0 to NumRefIdxActive[1]−1, inclusive.

When slice_collocated_ref_idx is not present, the following applies:

If rpl_info_in_ph_flag is equal to 1, the value of slice_collocated_ref_idx is inferred to be equal to ph_collocated_ref_idx.

Otherwise (rpl_info_in_ph_flag is equal to 0), the value of slice_collocated_ref_idx is inferred to be equal to 0.

For bitstream conformance, the picture referred to by slice_collocated_ref_idx may be the same for all slices of a coded picture.

For bitstream conformance, the values of pic_width_in_luma_samples and pic_height_in_luma_samples of the reference picture referred to by slice_collocated_ref_idx may be equal to the values of pic_width_in_luma_samples and pic_height_in_luma_samples, respectively, of the current picture, and RprConstraintsActive[slice_collocated_from_l0_flag? 0:1][slice_collocated_ref_idx] may be equal to 0.

slice_qp_delta specifies the initial value of $Qp_Y$ to be used for the coding blocks in the slice until modified by the value of CuQpDeltaVal in the coding unit layer.

When qp_delta_info_in_ph_flag is equal to 0, the initial value of the $Qp_Y$ quantization parameter for the slice, $SliceQp_Y$, is derived as follows:

$$SliceQp_Y=26+init\_qp\_minus26+slice\_qp\_delta \quad (144)$$

The value of $SliceQp_Y$ may be in the range of −QpBdOffset to +63, inclusive.

When either of the following conditions is true:

The value of wp_info_in_ph_flag is equal to 1, pps_weighted_pred_flag is equal to 1, and slice_type is equal to P.

The value of wp_info_in_ph_flag is equal to 1, pps_weighted_bipred_flag is equal to 1, and slice_type is equal to B.

the following applies:

The value of NumRefIdxActive[0] may be less than or equal to the value of NumWeightsL0.

For each reference picture index RefPicList[0][i] for i in the range of 0 to NumRefIdxActive[0]−1, inclusive, the luma weight, Cb weight, and Cr weight that apply to the reference picture index are LumaWeightL0[i], ChromaWeightL0[0][i], and ChromaWeightL0[1][i], respectively.

When wp_info_in_ph_flag is equal to 1, pps_weighted_bipred_flag is equal to 1, and slice_type is equal to B, the following applies:

The value of NumRefIdxActive[1] may be less than or equal to the value of NumWeightsL1.

For each reference picture index RefPicList[1][i] for i in the range of 0 to NumRefIdxActive[1]−1, inclusive, the luma weight, Cb weight, and Cr weight that apply to the reference picture index are LumaWeightL1[i], ChromaWeightL1[0][i], and ChromaWeightL1[1][i], respectively.

slice_cb_qp_offset specifies a difference to be added to the value of pps_cb_qp_offset when determining the value of the $Qp'_{Cb}$ quantization parameter. The value of slice_cb_qp_offset may be in the range of −12 to +12, inclusive. When slice_cb_qp_offset is not present, it is inferred to be equal to 0. The value of pps_cb_qp_offset+slice_cb_qp_offset may be in the range of −12 to +12, inclusive.

slice_cr_qp_offset specifies a difference to be added to the value of pps_cr_qp_offset when determining the value of the $Qp'_{Cr}$ quantization parameter. The value of slice_cr_qp_offset may be in the range of −12 to +12, inclusive. When slice_cr_qp_offset is not present, it is inferred to be equal to 0. The value of pps_cr_qp_offset+slice_cr_qp_offset may be in the range of −12 to +12, inclusive.

slice_joint_cbcr_qp_offset specifies a difference to be added to the value of pps_joint_cbcr_qp_offset_value when determining the value of the $Qp'_{CbCr}$. The value of slice_joint_cbcr_qp_offset may be in the range of −12 to +12, inclusive. When slice_joint_cbcr_qp_offset is not present, it is inferred to be equal to 0. The value of pps_joint_cbcr_qp_offset_value+slice_joint_cbcr_qp_offset may be in the range of −12 to +12, inclusive.

cu_chroma_qp_offset_enabled_flag equal to 1 specifies that the cu_chroma_qp_offset_flag may be present in the transform unit and palette coding syntax. cu_chroma_qp_offset_enabled_flag equal to 0 specifies that the cu_chroma_qp_offset_flag is not present in the transform unit or palette coding syntax. When not present, the value of cu_chroma_qp_offset_enabled_flag is inferred to be equal to 0.

slice_sao_luma_flag equal to 1 specifies that SAO is enabled for the luma component in the current slice; slice_sao_luma_flag equal to 0 specifies that SAO is disabled for the luma component in the current slice. When slice_sao_luma_flag is not present, it is inferred to be equal to ph_sao_luma_enabled_flag.

slice_sao_chroma_flag equal to 1 specifies that SAO is enabled for the chroma component in the current slice; slice_sao_chroma_flag equal to 0 specifies that SAO is disabled for the chroma component in the current slice. When slice_sao_chroma_flag is not present, it is inferred to be equal to ph_sao_chroma_enabled_flag.

slice_deblocking_filter_override_flag equal to 1 specifies that deblocking parameters are present in the slice header. slice_deblocking_filter_override_flag equal to 0 specifies that deblocking parameters are not present in the slice header. When not present, the value of slice_deblocking_filter_override_flag is inferred to be equal to ph_deblocking_filter_override_flag.

slice_deblocking_filter_disabled_flag equal to 1 specifies that the operation of the deblocking filter is not applied for the current slice. slice_deblocking_filter_disabled_flag equal to 0 specifies that the operation of the deblocking filter is applied for the current slice. When slice_deblocking_filter_disabled_flag is not present, it is inferred to be equal to ph_deblocking_filter_disabled_flag.

slice_beta_offset_div2 and slice_tc_offset_div2 specify the deblocking parameter offsets for β and tC (divided by 2) that are applied to the luma component for the current slice. The values of slice_beta_offset_div2 and slice_tc_offset_div2 may both be in the range of −12 to 12, inclusive. When not present, the values of slice_beta_offset_div2 and slice_tc_offset_div2 are inferred to be equal to ph_beta_offset_div2 and ph_tc_offset_div2, respectively.

slice_cb_beta_offset_div2 and slice_cb_tc_offset_div2 specify the deblocking parameter offsets for β and tC (divided by 2) that are applied to the Cb component for the current slice. The values of slice_cb_beta_offset_div2 and slice_cb_tc_offset_div2 may both be in the range of −12 to 12, inclusive. When not present, the values of slice_cb_beta_offset_div2 and slice_cb_tc_offset_div2 are inferred to be equal to ph_cb_beta_offset_div2 and ph_cb_tc_offset_div2, respectively.

slice_cb_beta_offset_div2 and slice_cb_tc_offset_div2 specify the deblocking parameter offsets for β and tC (divided by 2) that are applied to the Cr component for the current slice. The values of slice_cr_beta_offset_div2 and slice_cr_tc_offset_div2 may both be in the range of −12 to 12, inclusive. When not present, the values of slice_cr_beta_offset_div2 and slice_cr_tc_offset_div2 are inferred to be equal to ph_cr_beta_offset_div2 and ph_cr_tc_offset_div2, respectively. slice_ts_residual_coding_disabled_flag equal to 1 specifies that the residual_coding( ) syntax structure is used to parse the residual samples of a transform skip block for the current slice. slice_ts_residual_coding_disabled_flag equal to 0 specifies that the residual_ts_coding( ) syntax structure is used to parse the residual samples of a transform skip block for the current slice. When slice_ts_residual_coding_disabled_flag is not present, it is inferred to be equal to 0.
slice_lmcs_enabled_flag equal to 1 specifies that luma mapping with chroma scaling is enabled for the current slice. slice_lmcs_enabled_flag equal to 0 specifies that luma mapping with chroma scaling is not enabled for the current slice. When slice_lmcs_enabled_flag is not present, it is inferred to be equal to 0.
slice_scaling_list_present_flag equal to 1 specifies that the scaling list data used for the current slice is derived based on the scaling list data contained in the referenced scaling list APS with aps_params_type equal to SCALING_APS and adaptation_parameter_set_id equal to ph_scaling_list_aps_id. slice_scaling_list_present_flag equal to 0 specifies that the scaling list data used for the current picture is the default scaling list data derived specified in clause 7.4.3.21. When not present, the value of slice_scaling_list_present_flag is inferred to be equal to 0. The variable NumEntryPoints, which specifies the number of entry points in the current slice, is derived as follows:

The last subset (with subset index equal to NumEntryPoints) consists of the remaining bytes of the coded slice data.

When sps_entropy_coding_sync_enabled_flag is equal to 0 and the slice contains one or more complete tiles, each subset may consist of all coded bits of all CTUs in the slice that are within the same tile, and the number of subsets (i.e., the value of NumEntryPoints+1) may be equal to the number of tiles in the slice.

When sps_entropy_coding_sync_enabled_flag is equal to 0 and the slice contains a subset of CTU rows from a single tile, the NumEntryPoints may be 0, and the number of subsets may be 1. The subset may consist of all coded bits of all CTUs in the slice.

When sps_entropy_coding_sync_enabled_flag is equal to 1, each subset k with k in the range of 0 to NumEntryPoints, inclusive, may consist of all coded bits of all CTUs in a CTU row within a tile, and the number of subsets (i.e., the value of NumEntryPoints+1) may be equal to the total number of tile-specific CTU rows in the slice.

slice_header_extension_length specifies the length of the slice header extension data in bytes, not including the bits used for signalling slice_header_extension_length itself. The value of slice_header_extension_length may be in the range of 0 to 256, inclusive. When not present, the value of slice_header_extension_length is inferred to be equal to 0. slice_header_extension_data_byte[i] may have any value. Decoders conforming to this version of this Specification may ignore the values of all the slice_header_extension_data_byte[i] syntax elements. Its value does not affect decoder conformance to profiles specified in this version of specification.

```
NumEntryPoints = 0
for( i = 1; i < NumCtusInCurrSlice; i++ ) {
   ctbAddrX = CtbAddrInCurrSlice[ i ] % PicWidthInCtbsY
   ctbAddrY = CtbAddrInCurrSlice[ i ] / PicWidthInCtbsY       (145)
   prevCtbAddrX = CtbAddrInCurrSlice[ i -1 ] % PicwidthInCtbsY
   prevCtbAddrY = CtbAddrInCurrSlice[ i - 1 ] / PicWidthInCtbsY
   if( CtbToTileRowBd[ ctbAddrY ] != CtbToTileRowBd[ prevCtbAddrY ] ||
      CtbToTileColBd[ ctbAddrX ] != CtbToTileColBd[ prevCtbAddrX ] ||
      (ctbAddrY != prevCtbAddrY && sps_entry_point_offsets_present_flag ) )
      NumEntryPoints++
}
``` offset_len_minus1 plus 1 specifies the length, in bits, of the entry_point_offset_minus1[i] syntax elements. The value of offset_len_minus1 may be in the range of 0 to 31, inclusive. entry_point_offset_minus1[i] plus 1 specifies the i-th entry point offset in bytes, and is represented by offset_len_minus1 plus 1 bits. The slice data that follow the slice header consists of NumEntryPoints+1 subsets, with subset index values ranging from 0 to NumEntryPoints, inclusive. The first byte of the slice data is considered byte 0. When present, emulation prevention bytes that appear in the slice data portion of the coded slice NAL unit are counted as part of the slice data for purposes of subset identification. Subset 0 consists of bytes 0 to entry_point_offset_minus1[0], inclusive, of the coded slice data, subset k, with k in the range of 1 to NumEntryPoints−1, inclusive, consists of bytes firstByte[k] to lastByte[k], inclusive, of the coded slice data with firstByte[k] and lastByte[k] defined as:

$$firstByte[\ k\ ] = \Sigma_{n=1}^{k}(\ entry\_point\_offset\_minus1[n - 1\ ] + 1\ ) \quad (146)$$
$$lastByte[\ k\ ] = firstByte[\ k\ ] + entry\_point\_offset\_minus1[\ k\ ] \quad (147)$$

Example Technical Problems Addressed by Disclosed Technical Solutions

There are several potential issues in the current design of HLS, which are described below.

(1) The control of temporal prediction flags in SPS, picture header and slice header cause problems for P slice and/or B slice.
  a) The picture header and slice level control of temporal prediction flags may result in un-initialized collocated pictures and/or collocated reference index for P slice.
  b) Slice_collocated_ref_idx refers to an entry in reference picture list 1 may be used for P slice.
  c) For P slice, the value of slice_collocated_ref_idx refers to an entry in reference picture list 0 may be beyond the range of 0 to NumRefIdxActive[0]−1.
  d) The picture level and slice level temporal prediction flags are about whether the collocated picture is from L0 or L1, and which reference pictures are referring to, but without a high-level control such as whether temporal prediction is allowed, which may be not clear enough.

(2) Semantics of subpicture related syntax elements may need to be modified for a more accurate interpretation considering the interaction of related syntax elements.
  a) sps_independent_subpics_flag may be equal to 0 when there is only one subpicture.
  b) When there is only one slice in the subpicture, the value of slice_width_in_tiles_minus1 may still be needed to be calculated other than inferred.
  c) single_slice_per_subpic_flag may be equal to 0 when there is only one slice and/or one tile in the picture.
  d) single_slice_per_subpic_flag is inferred to be 0 when not present, such as when no_pic_partition_flag is equal to 1. For bitstream conformance, the value of no_pic_partition_flag may not be equal to 1 when the value of sps_num_subpics_minus1+1 is greater than 1. So there is only one subpicture in a picture. And since there is only one slice in the subpicture, single_slice_per_subpic_flag should be equal to 1 in such a case.

(3) Some of syntax elements are not correctly set during the subpicture sub-bitstream extraction process.
  a) The syntax elements such as sps_independent_subpics_flag, subpic_treated_as_pic_flag, loop_filter_across_subpic_enabled_flag, and no_pic_partition_flag for extracted subpicture from sub-bitstream extraction process are not written, which may not be desirable.
  b) The subpicture sub-bitstream extraction process is dependent on the subpicture ID, which may be changed from picture-to-picture basis. This would result in different subpicture indices being extracted from different pictures, which may not be desirable.
  c) The sps_num_subpics_minus1 and pps_num_subpics_minus1 of output bitstream from subpicture sub-bitstream extraction process is written to 1, indicating two subpictures should be extracted at a time, which may not be desirable.

(4) Syntax elements on reference picture list may be present in IDR pictures without any usage.

(5) The splitting information is said to be identical for luma and chroma for the prediction tree, which is not true.

(6) The syntax elements of coding tools are not conditioned or constrained by the corresponding general constraint flags, and, the value of some general constraint flags is not conditioned by related constraints, which may cause some conflicts.
  a) res_change_in_clvs_allowed_flag is not constrained by the value of general constraint flag no_res_change_in_clvs_constraint_flag.
  b) scaling_window_explicit_signalling_flag is not constrained by no_res_change_in_clvs_constraint_flag.
  c) scaling_window_explicit_signalling_flag is not constrained by res_change_in_clvs_allowed_flag.
  d) The value of sps_num_subpics_minus1 is not constrained by one_subpic_per_pic_constraint_flag.
  e) subpic_treated_as_pic_flag is not constrained by one_subpic_per_pic_constraint flag and/or sps_num_subpics_minus1 and/or pps_num_subpics_minus1.
  f) loop_filter_across_subpic_enabled_flag is not constrained by one_subpic_per_pic_constraint_flag and/or sps_num_subpics_minus1 and/or pps_num_subpics_minus1.
  g) one_subpic_per_pic_constraint flag is not constrained by one_slice_per_pic_constraint_flag.
  h) no_bdpcm_constraint_flag is not constrained by no_transform_skip_constraint_flag.
  i) num_slices_in_pic_minus1 is not constrained by one_slice_per_pic_constraint_flag.
  j) num_tiles_in_slice_minus1 is not constrained by one_slice_per_pic_constraint_flag.

Example Techniques and Embodiments

The detailed embodiments below should be considered as examples to explain general concepts. These embodiments should not be interpreted in a narrow way. Furthermore, these embodiments can be combined in any manner. In below description, the deleted portions are marked between, and the added portions are marked in *underlined boldface italics.*

Temporal Prediction Related HLS
1. Two level controls of TMVP may be utilized, and one is at picture level and the other is at slice/tile/subpicture/brick level.
  a) In one example, a first syntax element which indicates whether there is at least one inter-coded slice referring to this flag enables TMVP may be signalled at picture level (e.g., denoted by ph_temporal_mvp_allowed_flag).
    i. In one example, it may be signalled in picture header or PPS.
    ii. In one example, it may be conditionally signalled, such as according to TMVP being enabled in SPS and/or current picture contains at least one inter coded slice and/or RPL being present in current picture header.
  b) In one example, a second syntax element which indicates whether current slice enables TMVP may be signalled at slice level (e.g., denoted by sh_temporal_mvp_allowed_flag) which may be dependent on the first syntax element.
    i. In one example, sh_temporal_mvp_allowed_flag may be signalled only if ph_temporal_mvp_allowed_flag is equal to 1. Otherwise, it is inferred to be 0.
    ii. In one example, sh_temporal_mvp_allowed_flag may be signalled only if ph_temporal_mvp_allowed_flag is equal to 0. Otherwise, it is inferred to be 1.
  c) In one example, a second syntax element which indicates whether current slice enables TMVP may be signalled at slice level (e.g., denoted by sh_temporal_mvp_allowed_flag) which may be dependent on RPL being present in current slice header and/or TMVP being enabled in SPS and/or current slice is an inter coded slice.
  d) In one example, a third syntax element (e.g. tmvp_info_in_ph_flag) is signalled to indicate whether TMVP information is signalled in picture header or slice header.
    i. TMVP information may comprise the information of whether to enable TMVP or not.
    ii. TMVP information may comprise the information of collocated reference picture.
    iii. In one example, tmvp_info_in_ph_flag is signalled only if TMVP is enabled at sequence level. (e.g. sps_temporal_mvp_enabled_flag is equal to 1).
  e) In one example, the second syntax element is inferred to be equal to a default value (such as the value of the first syntax element) when not present. For example, sh_temporal_mvp_allowed_flag is inferred to be equal to ph_temporal_mvp_allowed_flag when not present.
2. Whether and/or how to inherit the collocated picture information from PH to SH (e.g., collocated picture is from list 0; reference picture index of collocated picture) is at least dependent on the slice type and whether reference picture list information is present in the PH syntax structure (e.g., rpl_info_in_ph_flag being 1).
  a) In one example, when slice type is equal to P, rpl_info_in_ph_flag is equal to 1 (or/and ph_temporal_mvp_enabled_flag is equal to 1), the slice_collocated_from_l0_flag is set to 1 regardless of the value of ph_collocated_from_l0_flag.
    i. Alternatively, when slice type is equal to P, the slice_collocated_from_l0_flag may be inferred to be equal to 1 regardless of other conditions.
  b) In another example, when slice_type is equal to B and slice_collocated_from_l0_flag is equal to 1, slice_collocated_ref_idx refers to an entry in reference picture list 0, and the value of slice_collocated_ref_idx may be in the range of 0 to NumRefIdxActive[0]−1, inclusive.
  c) In one example, when slice type is equal to P, slice_collocated_from_l0_flag may be inferred to be 1 when TMVP is enabled.
  d) In one example, when slice type is equal to P and TMVP is enabled and slice_collocated_ref_idx is in the range of 0 to NumRefIdxActive[0]−1, inclusive.
  e) In one example, when slice type is equal to P and TMVP is enabled, RprConstraintsActive[0][slice_collocated_ref_idx] for the P slice may be required to be equal to 0.
  f) In one example, the example modifications below can be introduced.
    slice_collocated_ref_idx specifies the reference index of the collocated picture used for temporal motion vector prediction.
    When slice e is equal to P or when slice_type is equal to B and *slice_* collocated_from_l0_flag is equal to 1, slice_collocated_ref_idx refers to an entry in reference picture list 0, *and slice_collocated_from_l0_flag for P slice is inferred to be 1,* and the value of slice_collocated_ref_idx may be in the range of 0 to NumRefIdxActive[0]−1, inclusive.
    When slice_type is equal to B and slice_collocated_from_l0_flag is equal to 0, slice_collocated_ref_idx refers to an entry in reference picture list 1, and the value of slice_collocated_ref_idx may be in the range of 0 to NumRefIdxActive[1]−1, inclusive.
    When slice_collocated_ref_idx is not present, the following applies:
      If rpl_info_in_ph_flag is equal to 1, the value of slice_collocated_ref_idx is inferred to be equal to ph_collocated_ref_idx.
      Otherwise (rpl_info_in_ph_flag is equal to 0), the value of slice_collocated_ref_idx is inferred to be equal to 0.
    For bitstream conformance, the picture referred to by slice_collocated_ref_idx may be the same for all slices of a coded picture.
    For bitstream conformance, the values of pic_width_in_luma_samples and pic_height_in_luma_samples of the reference picture referred to by slice_collocated_ref_idx may be equal to the values of pic_width_in_luma_samples and pic_height_in_luma_samples, respectively, of the current picture, and RprConstraintsActive[slice_collocated_from_l0_flag? 0:1][slice_collocated_ref_idx] may be equal to 0.
  g) In one example, when ph_collocated_from_l0_flag is equal to 0, it may be required that the picture does not contain P slices.
    i. In one example, the example modifications below can be introduced. slice_type specifies the coding type of the slice according to Table 9.

TABLE 9

Name association to slice_type

| slice_type | Name of slice_type |
|---|---|
| 0 | B (B slice) |
| 1 | P (P slice) |
| 2 | I (I slice) |

When not present, the value of slice_type is inferred to be equal to 2.
When ph_intra_slice_allowed_flag is equal to 0, the value of slice_type may be equal to 0 or 1. When nal_unit_type is in the range of IDR_W_RADL to CRA_NUT, inclusive, and vps_independent_layer_flag[GeneralLayerIdx[nuh_layer_id]] is equal to 1, slice_type may be equal to 2.
*When ph collocated from 10 flag is equal to 0, the value of slice type may be not be equal to 1.*
    ii. Alternatively, whether to signal a slice type may depend on whether the collocated picture is from list 0.
      1. In one example, if all of the following conditions are true, signalling of slice types for slices referring to the current picture header may be skipped.
        rpl_info_in_ph_flag is equal to 1
        ph_temporal_mvp_enabled_flag is equal to 1
        ph_intra_slice_allowed_flag is equal to 0
        ph_collocated_from_l0_flag is equal to 0
      Alternatively, furthermore, the slice type may be inferred to be B slices.
  h) In one example, the value of slice_collocated_from_l0_flag for P slices may be always inferred to be equal to 1 when ph_temporal_mvp_enabled_flag is equal to 1 and rpl_info_in_ph_flag is equal to 1. The example modifications below can be introduced.
    slice_collocated_from_l0_flag equal to 1 specifies that the collocated picture used for temporal motion vector prediction is derived from reference picture list 0. slice_collocated_from_l0_flag equal to 0 specifies that the collocated picture used for temporal motion vector prediction is derived from reference picture list 1.
    [[When slice_type is equal to B or P, ph_temporal_mvp_enabled_flag is equal to 1, and slice_collocated_from_l0_flag is not present, the following applies:
      If rpl_info_in_ph_flag is equal to 1, slice_collecated_from_l0_flag is interred to be equal to ph_collocated_from_l0_flag.
      Otherwise (rpl_info_in_ph_flag is equal to 0 and slice_type is equal to P), the value of slice_collocated_from_l0_flag is inferred to be equal to 1]].
    *When ph temporal mvp enabled flag is equal to 1 and rpl info in ph flag is equal to 1, the following applies:*
      *If slice type is equal to B, slice_collocated_from_l0 flag is inferred to be equal to ph_collocated_from_l0_flag.*
      *Otherwise (slice_type is equal to P), slice_collocated_from_l0 flag is inferred to be equal to 1, and for bitstream conformance, the value of ph collocated ref idx may be less than NumRefIdxActive[ 0 ].*
    i) In one example, when slice type is equal to P and slice_collocated_from_l0_flag is equal to 0, slice_collocated_ref_idx may be said to refer to an inactive entry in reference picture list 1, and it may be required that the reference picture referred to by that inactive entry in reference picture list 1 may also be referred to by an active entry in reference picture list 0. The example modifications below can be introduced. slice_collocated_ref_idx specifies the reference index of the collocated picture used for temporal motion vector prediction.

When slice_type is equal to P or when slice_type is equal to B and *slice_* collocated from_l0_flag is equal to 1, slice_collocated_ref_idx refers to an entry in reference picture list 0, and the value of slice_collocated_ref_idx may be in the range of 0 to NumRefIdxActive[0]−1, inclusive.

When slice_type is equal to B and slice_collocated_from_l0_flag is equal to 0, slice_collocated_ref_idx refers to an entry in reference picture list 1, and the value of slice_collocated_ref_idx may be in the range of 0 to NumRefIdxActive[1]−1, inclusive.

*When slice type is equal to P and slice collocated from l0 flag is equal to 0, slice collocated ref idx refers to an inactive entry in reference picture list 1, and for bitstream conformance, the reference picture referred to by that inactive entry in reference picture list 1 may also be referred to by an active entry in reference picture list 0.*

When slice_collocated_ref_idx is not present, the following applies:
  If rpl_info_in_ph_flag is equal to 1, the value of slice_collocated_ref_idx is inferred to be equal to ph_collocated_ref_idx.
  Otherwise (rpl_info_in_ph_flag is equal to 0), the value of slice_collocated_ref_idx is inferred to be equal to 0.

For bitstream conformance, the picture referred to by slice_collocated_ref_idx may be the same for all slices of a coded picture.

For bitstream conformance, the values of pic_width_in_luma_samples and pic_height_in_luma_samples of the reference picture referred to by slice_collocated_ref_idx may be equal to the values of pic_width_in_luma_samples and pic_height_in_luma_samples, respectively, of the current picture, and RprConstraintsActive[slice_collocated_from_l0_flag? 0:1][slice_collocated_ref_idx] may be equal to 0.

j) Alternatively, B and P slices referring to the same picture header may use different collocated pictures.
  i. In one example, even RPL is signalled in picture header, the reference picture index of the collocated picture may be further signalled in slice header.
    1. In one example, when current slice is P slice, RPL is signalled in picture header, temporal motion vector prediction (e.g., ph_temporal_mvp_enabled_flag is true) is enabled, and ph_collocated_from_l0_flag is equal to 0, the reference picture index of collocated picture may be further signalled.
      a) Alternatively, furthermore, it is pointing to reference picture list 0.
    ii. In one example, two collocated reference picture indices may be signalled or derived, and one is for B slice, and the other for P slices referring to the same picture header.
      1. In one example, the two indices may be signalled only when the ph_collocated_from_l0_flag is equal to 0.
  k) In one example, indication of whether there are both B and P slices referring to the same picture header may be signalled.
    i. Alternatively, indication of types of slices referring to the same picture header may be signalled in the picture header.
    ii. Alternatively, indication of whether there are only B slices (excluding P slices) referring to the same picture header are existing may be signalled.
    iii. Alternatively, indication of whether there are only P slices (excluding B slices) referring to the same picture header are existing may be signalled.
    iv. Alternatively, indication of whether there are only B and I slices referring to the same picture header are existing may be signalled.
    v. Alternatively, indication of whether there are only P and I slices referring to the same picture header are existing may be signalled.
    vi. Alternatively, indication of types of slices referring to the same picture header may be signalled in the picture header only if RPL is signalled in the picture header.
    vii. Alternatively, RPL is signalled in a picture header only if the indication of types of slices referring to the same picture header is signalled in the picture header.
  l) Alternatively, when slice_type is equal to P and slice_collocated_from_l0_flag is equal to 0, slice_collocated_ref_idx may be modified before being used, such being mapped to an index being in the range of 0 to NumRefIdxActive[0]−1, inclusive.
    i. In one example, when slice type is equal to P and slice_collocated_from_l0_flag is equal to 0, slice_collocated_ref_idx refers to an entry in reference picture list 0 and slice_collocated_ref_idx is set to (slice_collocated_ref_idx>(NumRefIdxActive[0]−1)? default_col_ref_idx: slice_collocated_ref_idx) wherein the variable default_col_ref_idx is in the range of 0 to NumRefIdxActive[0]−1, inclusive.
      1. In one example, the variable default_col_ref_idx is set to 0.
      2. In one example, the variable may be signalled.
  m) It may be not allowed in a conformance bitstream that two slices associated with one picture header, but one of them is a P slice and the other of them is a B slice.
  n) It may be not allowed in a conformance bitstream that two slices associated with one picture header in which RPL is signalled, but one of them is a P slice and the other of them is a B slice.
  o) It may be not allowed in a conformance bitstream that a slice associated with one picture header in which RPL is signalled with two reference picture list, but the slice is a P slice.

Subpicture Related HLS
3. The number of subpictures in each picture in the CLVS (e.g., sps_num_subpics_minus1 and/or pps_num_subpics_minus1) may be conditioned by the general constraints flag such as one_subpic_per_pic_constraint_flag.

a) In one example, When the general constraint flag such as one_subpic_per_pic_constraint_flag is equal to 1, the value of sps_num_subpics_minus1 and/or pps_num_subpics_minus1 may be required to be equal to 0.

b) In one example, the example modifications below can be introduced. sps_num_subpics_minus1 plus 1 specifies the number of subpictures in each picture in the CLVS. The value of sps_num_subpics_minus1 may be in the range of 0 to Ceil(pic_width_max_in_luma_samples÷CtbSizeY)*Ceil(pic_height_max_in_luma_samples÷CtbSizeY)−1, inclusive. When not present, the value of sps_num_subpics_minus1 is inferred to be equal to 0. When When one_subpic_per_pic_ constraint_flag is equal to 1, the value of sps_num_subpics_minus1 may be equal to 0.

4. Whether the syntax element specifying for "no intra prediction, no inter prediction and no in-loop filtering operations performed across any subpicture boundary in the CLVS" (e.g., sps_independent_subpics_flag) is signalled or not may be dependent on the number of subpictures in each picture in the CLVS (e.g., sps_num_subpics_minus1).

a) In one example, when there is only one subpicture in each picture in the CLVS, the syntax element sps_independent_subpics_flag may be not signalled and inferred to be 1.

b) In one example, the example modifications below can be introduced. sps_independent_subpics_flag equal to 1 specifies that no intra prediction, no inter prediction and no in-loop filtering operations may be performed across any subpicture boundary in the CLVS. sps_independent_subpics_flag equal to 0 specifies that inter prediction or in-loop filtering operations across the subpicture boundaries in the CLVS may be allowed. When not present, the value of sps_independent_subpics_flag is inferred to be equal to 1.

c) In one example the example modifications below can be introduced. sps_independent_subpics_flag equal to 1 specifies that no intra prediction, no inter prediction and no in-loop filtering operations may be performed across any subpicture boundary in the CLVS. sps_independent_subpics_flag equal to 0 specifies that inter prediction or in-loop filtering operations across the subpicture boundaries in the CLVS may be allowed. When not present, the value of sps_independent_subpics_flag is inferred to be equal to 0. When sps_num_subpics_ minus1 is equal to 0, the value of sps_independent_subpics_ flag may be equal to 1.

5. The value of subpic_treated_as_pic_flag may be dependent on whether there is only one subpicture in the picture.

a) In one example, if one_subpic_per_pic_constraint_flag is equal to 1, the value of subpic_treated_as_pic_flag may be required to be equal to 1, or inferred to be equal to 1.

b) In one example, if sps_num_subpics_minus1 is equal to 0, the value of subpic_treated_as_pic_flag may be required to be equal to 1, or inferred to be equal to 1.

c) In one example, if pps_num_subpics_minus1 is equal to 0, the value of subpic_treated_as_pic_flag may be required to be equal to 1.

6. The value of loop_filter_across_subpic_enabled_flag may be dependent on whether there is only one subpicture in the picture.

a) In one example, if one_subpic_per_pic_constraint_flag is equal to 1, the value of loop_filter_across_subpic_enabled_flag may be required to be equal to 0, or inferred to be equal to 0.

b) In one example, if sps_num_subpics_minus1 is equal to 0, the value of loop_filter_across_subpic_enabled_flag may be required to be equal to 0, or inferred to be equal to 0.

c) In one example, if pps_num_subpics_minus1 is equal to 0, the value of loop_filter_across_subpic_enabled_flag may be required to be equal to 0.

7. Whether the width of the i-th rectangular slice in units of tile columns (such as slice_width_in_tiles_minus1) are specified or not, may be dependent on the single_slice_per_subpic_flag.

a) In one example, when slice_width_in_tiles_minus1 is not present but single_slice_per_subpic_flag is equal to 1, then the value of slice_width_in_tiles_minus1 may be not set.

b) In one example, the example modifications below can be introduced. slice_width_in_tiles_minus1[i] plus 1 specifies the width of the i-th rectangular slice in units of tile columns. The value of slice_width_in_tiles_minus1[i] may be in the range of 0 to NumTileColumns−1, inclusive.
   When slice_width_in_tiles_minus1[i] is not present and single_slice_per_subpic_flag is equal to 0, the following applies:
   If NumTileColumns is equal to 1, the value of slice_width_in_tiles_minus1[i] is inferred to be equal to 0.
   Otherwise, the value of slice_width_in_tiles_minus1[i] is inferred as specified in clause 6.5.1

8. Whether each subpicture consists of one and only one rectangular slice (e.g., single_slice_per_subpic_flag), may be conditioned by the general constraint flag such as one_slice_per_pic_constraint_flag.

a) In another example, when the syntax element single_slice_per_subpic_flag is not present, the value of single_slice_per_subpic_flag may be inferred to be equal to 1.

b) In another example, when the syntax element single_slice_per_subpic_flag is not present, the value of single_slice_per_subpic_flag may be inferred according to whether the current picture is partitioned or not (e.g., no_pic_partition_flag).

c) In one example, the example modifications below can be introduced.
   single_slice_per_subpic_flag equal to 1 specifies that each subpicture consists of one and only one rectangular slice. single_slice_per_subpic_flag equal to 0 specifies that each subpicture may consist of one or more rectangular slices. When single_slice_per_subpic_flag is equal to 1, num_slices_in_pic_minus1 is inferred to be equal to sps_num_subpics_minus1.

d) In one example, the example modifications below can be introduced.
   single_slice_per_subpic_flag equal to 1 specifies that each subpicture consists of one and only one rectangular slice. single_slice_per_subpic_flag equal to 0 specifies that each subpicture may consist of one or more rectangular slices. When single_slice_per_subpic_flag is equal to 1, num_slices_in_pic_minus1 is inferred to be equal to sps_num_subpics_minus1. When not present, the value of single_slice_per_subpic_flag is inferred to be equal to 0. When

*one slice per pic constraint flag is equal to 1,
the value of single slice per subpic
flag may be equal to 1.* e) In one example, the example modifications below can be introduced.

single_slice_per_subpic_flag equal to 1 specifies that each subpicture consists of one and only one rectangular slice. single_slice_per_subpic_flag equal to 0 specifies that each subpicture may consist of one or more rectangular slices. When single_slice_per_subpic_flag is equal to 1, num_slices_in_pic_minus1 is inferred to be equal to sps_num_subpics_minus1. When not present, the value of single_slice_per_subpic_flag is inferred to be equal to 0. *When one_slice_per_pic_constraint_ flag is equal to 1 and rect _slice_flag is equal to 1, the value of single slice per subpic flag may be equal to 1.* f) In one example, the example modifications below can be introduced.

single_slice_per_subpic_flag equal to 1 specifies that each subpicture consists of one and only one rectangular slice. single_slice_per_subpic_flag equal to 0 specifies that each subpicture may consist of one or more rectangular slices. When single_slice_per_subpic_flag is equal to 1, num_slices_in_pic_minus1 is inferred to be equal to sps_num_subpics_minus1. When not present, the value of single_slice_per_subpic_flag is inferred to be equal to 0. *When no pic partition flag is equal to 1, the value of single slice per subpic flag may be equal to 1.* g) In one example, the example modifications below can be introduced.

single_slice_per_subpic_flag equal to 1 specifies that each subpicture consists of one and only one rectangular slice. single_slice_per_subpic_flag equal to 0 specifies that each subpicture may consist of one or more rectangular slices. When single_slice_per_subpic_flag is equal to 1, num_slices_in_pic_minus1 is inferred to be equal to sps_num_subpics_minus1. When not present, the value of single_slice_per_subpic_flag is inferred to be equal to *no pic partition flag.*

9. In one example, regarding the derivation of output sub-bitstream during the subpicture sub-bitstream extraction, the extracted subpicture across different pictures in a CLVS may be required to have same subpicture index.

a) For example, it may be required that the target subpicture ID of extracted subpicture may refer to same subpicture index among different pictures in a CLVS.

b) For example, if subpic_id_mapping_explicitly_signalled_flag is equal to 1 and when subpicture sub-bitstream extraction is processed, it may be required that the subpicture ID mapping is NOT signalled in the PPS (e.g., subpic_id_mapping_in_pps_flag is equal to 0).

i. In one example, if subpic_id_mapping_explicitly_signalled_flag is equal to 1 and when subpicture sub-bitstream extraction is processed, it may be required that the subpicture ID mapping is signalled in the SPS (e.g., subpic_id_mapping_in_sps_flag is equal to 1).

c) For example, which subpicture are extracted during a subpicture sub-bitstream extraction process may be dependent on the subpicture index.

d) For example, which syntax elements are rewritten and/or removed during a subpicture sub-bitstream extraction process may be dependent on the subpicture index.

e) In one example, the example modifications below can be introduced.

C.7 Subpicture Sub-Bitstream Extraction Process

Inputs to this process are a bitstream inBitstream, a target OLS index targetOlsIdx, a target highest TemporalId value tIdTarget and an array of target subpicture *index* values for each layer subpicId*x'*Target[ ].

Output of this process is a sub-bitstream outBitstream.

For bitstream conformance for the input bitstream, any output sub-bitstream that satisfies all of the following conditions may be a conforming bitstream:

The output sub-bitstream is the output of the process specified in this clause with the bitstream, targetOlsIdx equal to an index to the list of OLSs specified by the VPS, and subpicId*x*Target[ ] to subpicture IDs present in the OLS, as inputs.

The output sub-bitstream contains at least one VCL NAL unit with nuh_layer_id equal to each of the nuh_layer_id values in LayerIdInOls[targetOlsIdx].

The output sub-bitstream contains at least one VCL NAL unit with TemporalId equal to tIdTarget.

NOTE—A conforming bitstream contains one or more coded slice NAL units with TemporalId equal to 0, but does not have to contain coded slice NAL units with nuh_layer_id equal to 0.

The output sub-bitstream contains at least one VCL NAL unit with nuh_layer_id equal to LayerIdInOls [targetOlsIdx][i] and with slice_subpic_id equal to the value in subpicId*x*target[i] for each i in the range of 0 to NumLayersInOls[targetOlsIdx]−1.

The output sub-bitstream outBitstream is derived as follows:

The sub-bitstream extraction process, specified in Annex C.6, is invoked with inBitstream, targetOlsIdx, and tIdTarget as inputs and the output of the process is assigned to outBitstream.

If some external means not specified in this Specification is available to provide replacement parameter sets for the sub-bitstream outBitstream, replace all parameter sets with the replacement parameter sets.

Otherwise, when subpicture level information SEI messages are present in inBitstream, the following applies:

Rewrite the value of general_level_idc in the ols_ptl_idx[targetOlsIdx]-th entry in the list of profile_tier_level( ) syntax structures in all referred to VPS NAL units to be equal to SubpicSetLevelIdc derived in D.3.8 for the set of subpictures consisting of the subpictures with subpicture ID equal to all entries in subpicId*x'*Target[ ].

Rewrite the values of cpb_size_value_minus1[tIdTarget][j] and bit_rate_value_minus1[tIdTarget][j] of the j-th CPB in the ols_hrd_idx[targetOlsIdx]-th entry in the list of ols_hrd_parameters( ) syntax structures in all referred to VPS NAL units to correspond to SubpicSetCpbSizeVcl[0], SubpicSetCpbSizeNal[0], SubpicSetBitrateVcl[0], and SubpicSetBitrateNal[0] as derived in D.3.8 for the set of subpictures consisting of the subpictures with subpicture ID equal to all entries in subpicId*x'*Target[ ] and j in the range of 0 to hrd_cpb_cnt_minus1. For the i-th layer with i in the range of 0 to NumLayersInOls[targetOlsIdx]−1, the following applies.

subpicId*x'* is set equal to the value of subpicId *x'* Target[i].

Rewrite the value of general_level_idc in the profile_tier_level( ) syntax structure in all referred to SPS NAL units with sps_ptl_dpb_hrd_params_present_flag equal to 1 to be equal to SubpicSetLevelIdc derived in D.3.8 for the set of subpictures consisting of the subpicture with subpicture *index* equal to subpicId*x'*.

Rewrite the values of cpb_size_value_minus1[tIdTarget][j] and bit_rate_value_minus1[tIdTarget][j] of the j-th CPB in the ols_hrd_idx[targetOlsIdx]-th entry in the list of ols_hrd_parameters( ) syntax structures in all referred to SPS NAL units to correspond to SubpicCpbSizeVcl[0][SubpicId*x'* List[subPicId*x'* ]], SubpicCpbSizeNal[0][SubpicId*x* List[subPicId *x* ]], SubpicBitrateVcl[0][SubpicId*x* List[subPicId *x* ]], and SubpicBitrateNal[0][SubpicId*x* List[subPicId*x* ]] as derived in D.3.8 for the subpicture with subpicture *index* equal to subpicId*x* and j in the range of 0 to hrd_cpb_cnt_minus1.

Rewrite the value of the pic_width_max_in_luma_samples and pic_height_max_in_luma_samples in all referred to SPS NAL units and the value of pic_width_in_luma_samples and pic_height_in_luma_samples in all referred to PPS NAL units to be equal to subpic_width_minus1[SubpicId*x* List[subPicId*x* ]] and subpic_height_minus1[SubpicId*x* List [subPicId*x* ]].

Rewrite the value of sps_num_subpics_minus1 in all referred to SPS NAL units and pps_num_subpics_minus1 in all referred to PPS NAL units to 1.

Rewrite the syntax elements subpic_ctu_top_left_x[SubpicId*x* List[subPicId*x* ]], subpic_ctu_top_left_y[SubpicId*x* List[subPicId*x* ]], when present, in all referred to SPS NAL units to 0.

Remove the syntax elements subpic_ctu_top_left_x[j], subpic_ctu_top_left_y[j], subpic_width_minus1[j], subpic_height_minus1[j], subpic_treated_as_pic_flag[j], loop_filter_across_subpic_enabled_flag[j], and sps_subpic_id[j] in all referred to SPS NAL units and for each j for which SubpicId*x* List[j] is not equal to subPicId*x*.

Rewrite the tiling and slice structure related syntax elements in all referred to PPS to remove all tiles rows, tile columns and slices that are not associated to the subpicture with a subpicture ID equal to subPicIdx.

Remove from outBitstream all VCL NAL units with nuh_layer_id equal to nuh_layer_id of the i-th layer and with slice_subpic_id not equal to subPicIdx.

When sli_cbr_constraint_flag is equal to 1, remove all NAL units with nal_unit_type equal to FD_NUT and filler payload SEI messages that are not associated with the VCL NAL units of a subpicture in subpicId*x* Target[ ] and set cbr_flag[tIdTarget][j] equal to 1 of the j-th CPB in the ols_hrd_idx[targetOlsIdx]-th entry in the list of ols_hrd_parameters( ) syntax structures in all referred to VPS NAL units and SPS NAL units and j in the range of 0 to hrd_cpb_cnt_minus1. Otherwise, (sli_cbr_constraint_flag is equal to 0), remove all NAL units with nal_unit_type equal to FD_NUT and filler payload SEI messages and set cbr_flag[tIdTarget][j] equal to 0.

When outBitstream contains SEI NAL units that contain a scalable nesting SEI message with nesting_ols_flag equal to 1 and nesting_subpic_flag equal to 1 that are applicable to outBitstream, extract appropriate non-scalable-nested SEI message with payloadType equal to 1 (picture timing), or 130 (decoding unit information) from the scalable nesting SEI message and place the extracted SEI messages into outBitstream.

10. In one example, regarding the derivation of output sub-bitstream during the subpicture sub-bitstream extraction, the extracted sub-bitstream may be treated as a single subpicture in the output bitstream.
  a) In one example, the syntax element sps_independent_subpics_flag may be rewritten to be equal to 1 for syntax structures referred to the output sub-bitstream with extracted subpicture.
  b) In one example, the syntax elements subpic_treated_as_pic_flag and/or loop_filter_across_subpic_enabled_flag referred to the extracted subpicture in all output layers may be not signalled (e.g., may be removed) from syntax structures of the output sub-bitstream.
    i. In one example, the syntax element subpic_treated_as_pic_flag may be inferred to be equal to 1 for syntax structures referred to the output sub-bitstream with extracted subpicture.
    ii. In one example, the syntax element loop_filter_across_subpic_enabled_flag may be inferred to be equal to 0 for syntax structures referred to the output sub-bitstream with extracted subpicture.
  c) In one example, the value of sps_num_subpics_minus1 in all referred to SPS NAL units and pps_num_subpics_minus1 in all referred to PPS NAL units with extracted subpicture may be rewritten to be equal to 0.
  d) In one example, the syntax element no_pic_partition_flag may be rewritten for syntax structures referred to the output sub-bitstream with extracted subpicture.
    i. For example, whether the syntax element no_pic_partition_flag is rewritten or not may be dependent on the number of tile/slice in the output bitstream containing the extracted subpicture.
      1. In one example, if there is only one tile and only one slice in the extracted subpicture, then the syntax element no_pic_partition_flag may be rewritten to be equal to 1 for syntax structures referred to the output sub-bitstream with extracted subpicture.
      2. Alternatively, if the number of tiles and/or slices in the extracted subpicture is greater than 1, then the syntax element no_pic_partition_flag may be equal to 0 for syntax structures referred to the output sub-bitstream with extracted subpicture.
  e) In one example, the example modifications below can be introduced.

C.7 Subpicture Sub-Bitstream Extraction Process

The output sub-bitstream outBitstream is derived as follows:

The sub-bitstream extraction process, specified in Annex C.6, is invoked with inBitstream, targetOlsIdx, and tIdTarget as inputs and the output of the process is assigned to outBitstream.

If some external means not specified in this Specification is available to provide replacement parameter sets for the sub-bitstream outBitstream, replace all parameter sets with the replacement parameter sets.

Otherwise, when subpicture level information SEI messages are present in inBitstream, the following applies:

Rewrite the value of general_level_idc in the ols_ptl_idx[targetOlsIdx]-th entry in the list of profile_tier_level( ) syntax structures in all referred to VPS NAL units to be equal to SubpicSetLevelIdc derived in D.3.8 for the set of subpictures consisting of the subpictures with subpicture ID equal to all entries in subpicIdTarget[ ].

Rewrite the values of cpb_size_value_minus1[tIdTarget][j] and bit_rate_value_minus1[tIdTarget][j] of the j-th CPB in the ols_hrd_idx[targetOlsIdx]-th entry in the list of ols_hrd_parameters( ) syntax structures in all referred to VPS NAL units to correspond to SubpicSetCpbSizeVcl[0], SubpicSetCpbSizeNal[0], SubpicSetBitrateVcl[0], and SubpicSetBitrateNal[0] as derived in D.3.8 for the set of subpictures consisting of the subpictures with subpicture ID equal to all entries in subpicIdTarget[ ] and j in the range of 0 to hrd_cpb_cnt_minus1. For the i-th layer with i in the range of 0 to NumLayersInOls[targetOlsIdx]−1, the following applies.

subpicId is set equal to the value of subpicIdTarget[i].

Rewrite the value of general_level_idc in the profile_tier_level( ) syntax structure in all referred to SPS NAL units with sps_ptl_dpb_hrd_params_present_flag equal to 1 to be equal to SubpicSetLevelIdc derived in D.3.8 for the set of subpictures consisting of the subpicture with subpicture ID equal to subpicId.

Rewrite the values of cpb_size_value_minus1[tIdTarget][j] and bit_rate_value_minus1[tIdTarget][j] of the j-th CPB in the ols_hrd_idx[targetOlsIdx]-th entry in the list of ols_hrd_parameters( ) syntax structures in all referred to SPS NAL units to correspond to SubpicCpbSizeVcl[0][SubpicIdList[subPicId]], SubpicCpbSizeNal[0][SubpicIdList[subPicId]], SubpicBitrateVcl[0][SubpicIdList[subPicId]], and SubpicBitrateNal[0][SubpicIdList[subPicId]] as derived in D.3.8 for the subpicture with subpicture ID equal to subpicId and j in the range of 0 to hrd_cpb_cnt_minus1.

Rewrite the value of the pic_width_max_in_luma_samples and pic_height_max_in_luma_samples in all referred to SPS NAL units and the value of pic_width_in_luma_samples and pic_height_in_luma_samples in all referred to PPS NAL units to be equal to subpic_width_minus1[SubpicIdList[subPicId]] and subpic_height_minus1[SubpicIdList[subPicId]].

Rewrite the value of sps_num_subpics_minus1 in all referred to SPS NAL units and pps_num_subpics_minus1 in all referred to PPS NAL units to 1.

Rewrite the syntax elements subpic_ctu_top_left_x[SubpicIdList[subPicId]], subpic_ctu_top_left_y[SubpicIdList[subPicId]], when present, in all referred to SPS NAL units to 0.

*Rewrite the value of sps independent_subpics_flag, in all referred to SPS NAL units to 1.*
*[Note: this sentence can be interpreted as below,*
*- Rewrite the syntax elements subpic_treated_as_pic_flag [ i ] in all referred to SPS NAL units to 1, for each i for which SubpicIdList[ i ] is equal to subPicId.*
*- Rewrite the syntax elements loop_filter_across_subpic_enabled_flag [ i ] in all referred to SPS NAL units to 0, for each i for which SubpicIdList[ i ] is equal to subPicId, ]*

Remove the syntax elements subpic_ctu_top_left_x[j], subpic_ctu_top_left_y[j], subpic_width_minus1[j], subpic_height_minus1[j], subpic_treated_as_pic_flag[j], loop_filter_across_subpic_enabled_flag[j], and sps_subpic_id[j] in all referred to SPS NAL units and for each j for which SubpicIdList[j] is not equal to subPicId.

Rewrite the tiling and slice structure related syntax elements in all referred to PPS to remove all tiles rows, tile columns and slices that are not associated to the subpicture with a subpicture ID equal to subPicId.

Remove from outBitstream all VCL NAL units with nuh_layer_id equal to nuh_layer_id of the i-th layer and with slice_subpic_id not equal to subPicId.

When sli_cbr_constraint_flag is equal to 1, remove all NAL units with nal_unit_type equal to FD_NUT and filler payload SEI messages that are not associated with the VCL NAL units of a subpicture in subpicIdTarget[ ] and set cbr_flag[tIdTarget][j] equal to 1 of the j-th CPB in the ols_hrd_idx[targetOlsIdx]-th entry in the list of ols_hrd_parameters( ) syntax structures in all referred to VPS NAL units and SPS NAL units and j in the range of 0 to hrd_cpb_cnt_fixminus1. Otherwise, (sli_cbr_constraint_flag is equal to 0), remove all NAL units with nal_unit_type equal to FD_NUT and filler payload SEI messages and set cbr_flag[tIdTarget][j] equal to 0.

NAL Unit Related HLS

11. The reference picture list syntax elements may be present in slice headers of IDR pictures, i.e., sps_idr_rpl_present_flag may be equal to 1, for the case of bitstream merging.

a) In one example, when an output bitstream (e.g., mixed_nalu_types_in_pic_flag is equal to 1) is merged from two input bitstreams during bitstream merging, and the NAL unit type of one of the input bitstream may be IRAP VCL NAL unit type such as IDR, it may be required that the RPL of the IDR bitstream should be available (i.e., sps_idr_rpl_present_flag is equal to 1 for that IDR input bitstream).

b) In one example, the example modifications below can be introduced.

sps_idr_rpl_present_flag equal to 1 specifies that reference picture list syntax elements are present in slice headers of IDR pictures. sps_idr_rpl_present_flag equal to 0 specifies that reference picture list syntax elements are not present in slice headers of IDR pictures.

NOTE – *When the bitstream is expected to be involved bitstream merging, encoders are expected to set the value of sps_idr_rpl_present flag is be equal to 1.*

Splitting Related

12. The block (i.e., CTB, TB, PB, CB, and etc.) splitting information for luma and chroma may be different for the prediction tree.
    a) In one example, the block splitting structure, and/or the splitting syntax elements for luma and chroma may be different in case of chroma dual tree.
    b) In one example, the block splitting structure, and/or the splitting syntax elements for luma and chroma may be different in case of local dual tree.
    c) In one example, the example modifications below can be introduced.
       The coding block is the root node of two trees, the prediction tree and the transform tree. The prediction tree specifies the position and size of prediction blocks. The transform tree specifies the position and size of transform blocks. The splitting information for luma and chroma *may or may not be* identical for the prediction tree and may or may not be identical for the transform tree.

General Constraint Flags

13. The syntax elements in parameter sets (such as SPS/VPS/PPS) and/or picture header and/or slice header may be conditioned by the general constraint flags.
    a) In one example, the enabled flags for coding tools may be conditioned by the corresponding general constraint flags.
       i. In one example, the enabled flag may be equal to 0, when the corresponding general constraint flag is 1.
       ii. In one example, the enabled flag may be overridden by the corresponding general constraint flag. For example, if the general constraint flag is 1, the corresponding enabled flag may be set to be 0.
    b) In one example, whether the enabled flags is signalled or not may depend on the corresponding general constraint flags.
       i. In one example, the enabled flag may be not present if the corresponding general constraint flag is 1.
       ii. In one example, the enabled flag may be inferred to be 0 if it is not present.
14. Whether the picture spatial resolution may change within a CLVS referring to the SPS (e.g., res_change_in_clvs_allowed_flag), may be conditioned by the general constraint flag such as no_res_change_in_civs_constraint_flag.
    a) In one example, res_change_in_clvs_allowed_flag may be not present, when the syntax no_res_change_in_clvs_constraint_flag is equal to 1.
    b) In one example, res_change_in_clvs_allowed flag may be inferred to be equal to 0, when the syntax res_change_in_clvs_allowed flag is not present.
15. Whether the scaling window offset parameters are present in the PPS (e.g. scaling_window_explicit_signalling_flag), may depend on whether the picture spatial resolution changes within a CLVS referring to the SPS (e.g. res_change_in_clvs_allowed_flag) and/or the general constraint flag such as no_res_change_in_clvs_constraint_flag.
    a) In one example, scaling_window_explicit_signalling_flag may be inferred to be equal to 0, when the syntax scaling_window_explicit_signalling_flag is not present.
    b) In one example, scaling_window_explicit_signalling_flag may be not present, when res_change_in_clvs_allowed_flag is equal to 0.
    c) In one example, scaling_window_explicit_signalling_flag may be not present, when no_res_change_in_clvs_constraint_flag is equal to 1.
16. Whether one_subpic_per_pic_constraint_flag is present may depend on the syntax one_slice_per_pic_constraint_flag.
    a) In one example, when one_slice_per_pic_constraint_flag is equal to 1, one_subpic_per_pic_constraint_flag may be not present and may be inferred to be 1.
    b) In one example, when one_slice_per_pic_constraint_flag is equal to 0, one_subpic_per_pic_constraint_flag may be present.
17. The general constraint flag no_bdpcm_constraint_flag may be conditioned by the general constraint flag no_transform_skip_constraint_flag.
    a) In one example, the general constraint flag no_bdpcm_constraint_flag may be 1, if the general constraint flag no_transform_skip_constraint_flag is equal to 1.
    b) In one example, whether the general constraint flag no_bdpcm_constraint_flag is signalled or not may depend on the syntax no_transform_skip_constraint_flag.
       i. In one example, the general constraint flag no_bdpcm_constraint_flag may be not present, when no_transform_skip_constraint_flag is equal to 1.
       ii. In one example, the syntax no_bdpcm_constraint_flag is inferred to be 1, when no_bdpcm_constraint_flag is not present.
18. Whether one general constraint flag is signalled or not may depend on other general constraint flags.
    a) In one example, several constraint group flags may be defined, and other general constraint flags may be conditioned by these constraint group flags.
       i. In one example, the constraint flags may be grouped according to tool types (including but not limited to prediction, transform, quantization, inter, intra) or profile.
       ii. In one example, the constraint flags belonging to one group may be derived from the corresponding constraint group flag.
       iii. In one example, whether the constraint flags belonging to one group are signalled or not may depend on the corresponding constraint group flag. For example, the constraint flags belonging to this group may be not signalled, when the constraint group flag is 0.

Semantics of General Constraint Flags

19. In one example, the example modifications below can be introduced.
    one_tile_per_pic_constraint_flag equal to 1 specifies that each picture may contain only one tile, *i.e., the value of NumTilesIn Pic that applies to each picture may be equal to 1.* one_tile_per_pic_constraint_flag equal to 0 does not impose such a constraint.
20. In one example, the example modifications below can be introduced.
    one_slice_per_pic_constraint_flag equal to 1 specifies that each picture may contain only one slice *In other words, when one slice per pic constraint flag is equal to 1, the following applies: If rect_slice_flag is equal to 1, num_slices_in_pic minus1 may be equal to 0.*

*Otherwise (rect_slice_flag is equal to 0), the value of num_tiles_in_slice_minus1 present in each slice header may be equal to NumTilesInPic - 1.* one_slice_per_pic_constraint_flag equal to 0 does not impose such a constraint.

21. In one example, the example modifications below can be introduced.

one_subpic_per_pic_constraint_flag equal to 1 specifies that each picture may contain only one subpicture, *i.e., the value of sps_num_subpics_minus1 may be equal to 0.* one_subpic_per_pic_constraint_flag equal to 0 does not impose such a constraint. When one_slice_per_pic_constraint_flag is equal to 1, the value of one_subpic_per_pic_constraint_flag may be equal to 1.

FIG. 1 is a block diagram showing an example video processing system 100 in which various techniques disclosed herein may be implemented. Various implementations may include some or all of the components of the system 100. The system 100 may include input 102 for receiving video content. The video content may be received in a raw or uncompressed format, e.g., 8 or 10 bit multi-component pixel values, or may be in a compressed or encoded format. The input 102 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 100 may include a coding component 104 that may implement the various coding or encoding methods described in the present document. The coding component 104 may reduce the average bitrate of video from the input 102 to the output of the coding component 104 to produce a coded representation of the video. The coding techniques are therefore sometimes called video compression or video transcoding techniques. The output of the coding component 104 may be either stored, or transmitted via a communication connected, as represented by the component 106. The stored or communicated bitstream (or coded) representation of the video received at the input 102 may be used by the component 108 for generating pixel values or displayable video that is sent to a display interface 110. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 2:
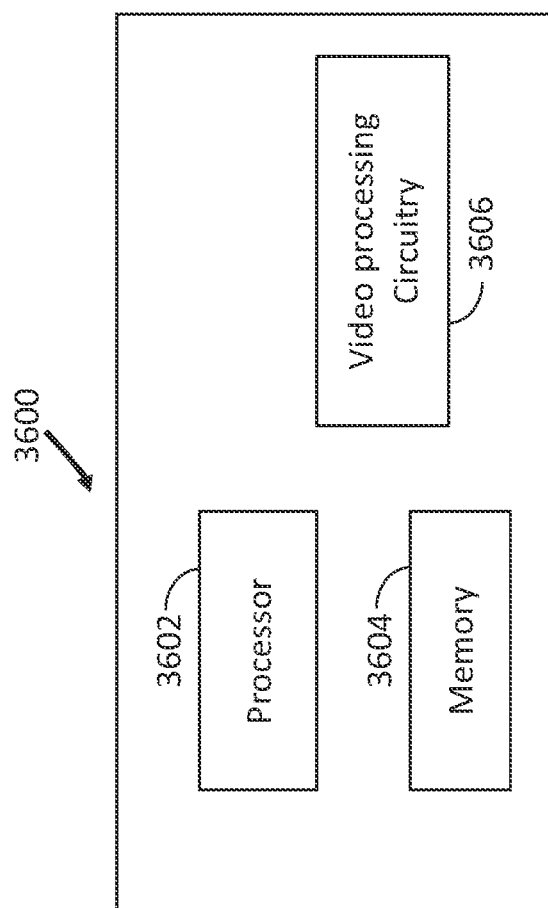
FIG. 2 is a block diagram of a video processing apparatus.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document.

Figure 4:
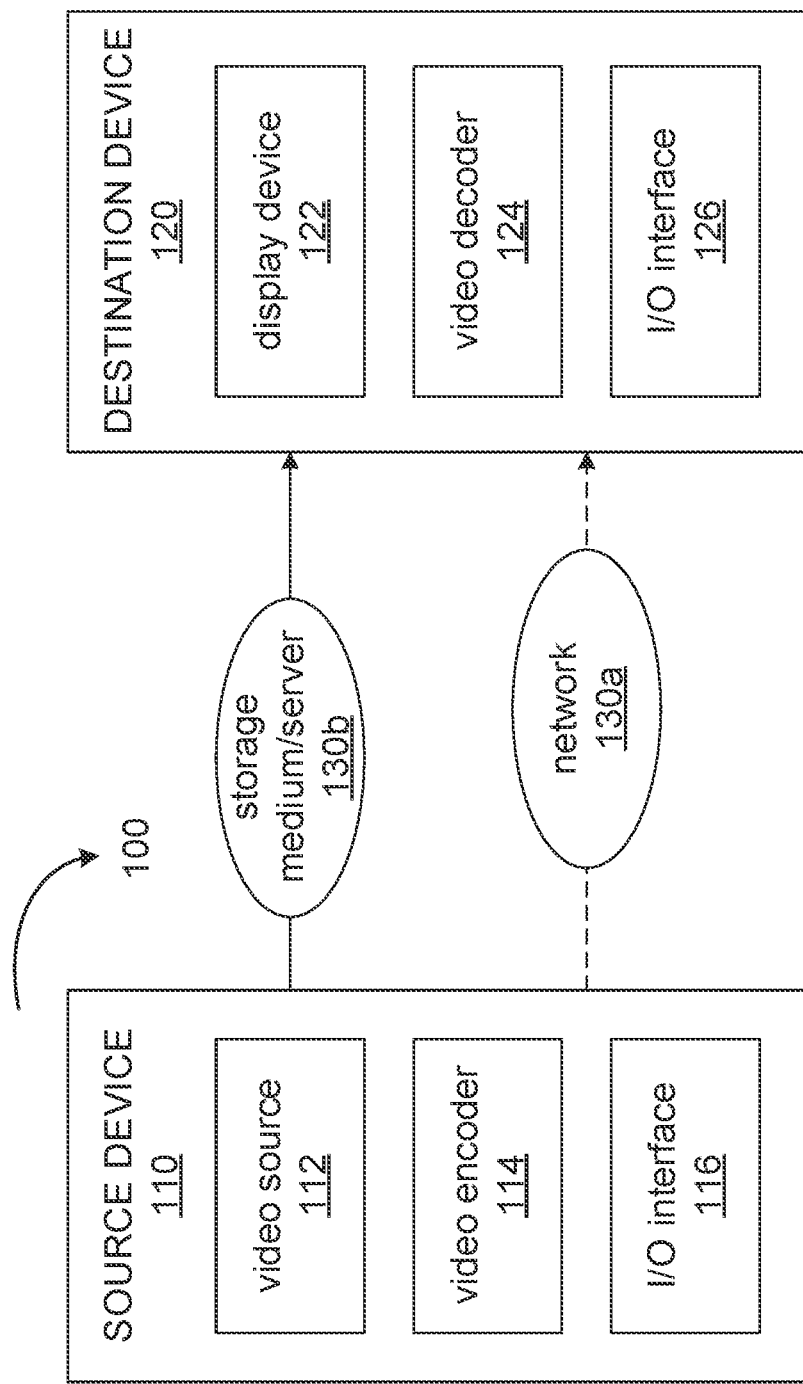
FIG. 4 is a block diagram that illustrates a video coding system according to various embodiments of the present disclosure.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 5:
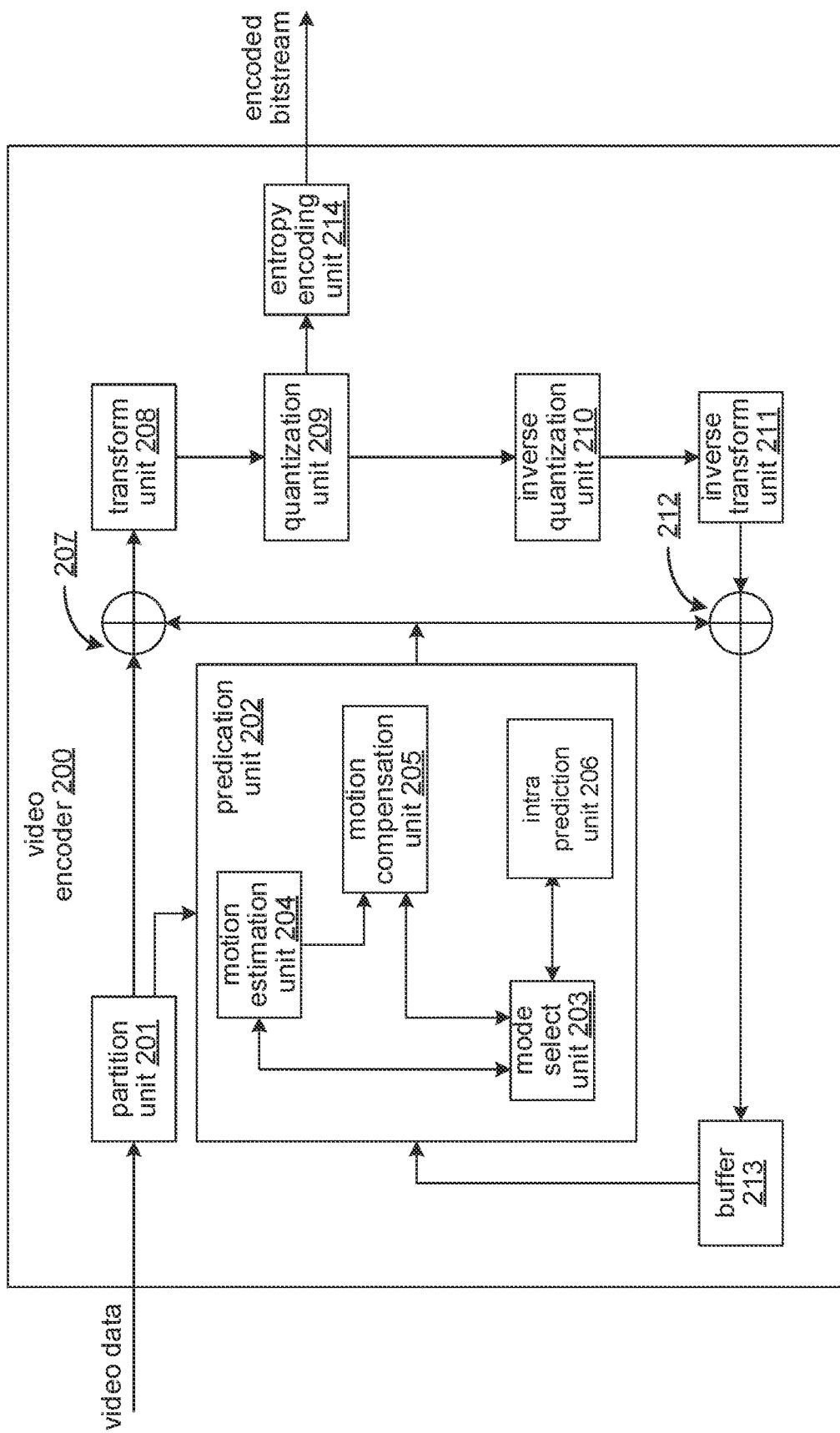
FIG. 5 is a block diagram that illustrates an encoder according to various embodiments of the present disclosure.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205, an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the other video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signalling techniques that may be implemented by video encoder 200 include advanced motion vector predication (AMVP) and merge mode signalling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed to reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
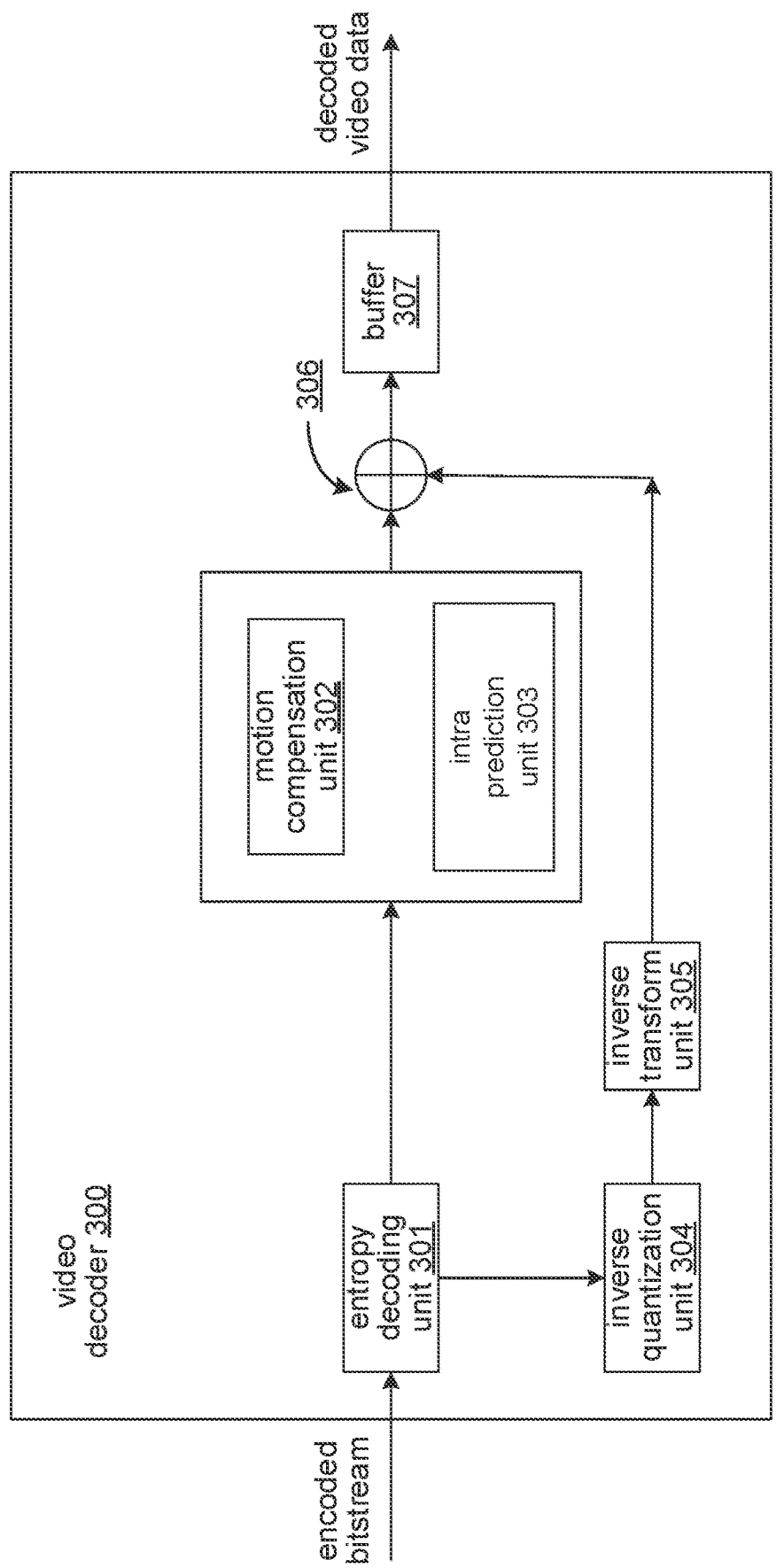
FIG. 6 is a block diagram that illustrates a decoder according to various embodiments of the present disclosure.

FIG. 6 is a block diagram illustrating an example of video decoder 300 which may be video decoder 124 in the system 100 illustrated in FIG. 4.

The video decoder 300 may be configured to perform any or all of the techniques of this disclosure. In the example of FIG. 6, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.o hyphen Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

A listing of solutions preferred by some embodiments is provided next.

The following solutions show example embodiments of techniques discussed in the previous section (e.g., item 1).

1. A method of video processing (e.g., method 3000 depicted in FIG. 3), comprising. performing (3002) a conversion between a video unit in a video region of a video and a coded representation of the video, wherein the coded representation conforms to a syntax rule. The rule specifies that a first indicator at a video picture level and a second indicator at the video region level are indicative of use of a temporal motion vector prediction coding tool during the conversion. The rule specifies a condition under which the first indicator and/or the second indicator are omitted in the coded representation.

2. The method of solution 1, wherein the first indicator indicates whether any video regions in the video picture is the temporal motion vector prediction coding tool.

3. The method of any of solutions 1-2, wherein the second indicator indicates enablement of the temporal motion vector prediction coding tool at the video region level.

4. The method of any of solutions 1-3, wherein the second indicator is omitted from the coded representation, and wherein, at a decoder, the second indicator is inferred to have a specific value.

The following solutions show example embodiments of techniques discussed in the previous section (e.g., item 2)

5. A video processing method, comprising: performing a conversion between a video unit in a video region of a video and a coded representation of the video, wherein the coded representation conforms to a syntax rule; wherein the syntax rule specifies that information of a header at the video region level is inferred as information of a header at the video unit level.

6. The information of solution 1, wherein the video unit is a video slice and the video region is a video picture.

The following solutions show example embodiments of techniques discussed in the previous section (e.g., item 3)

7. A method of video processing, comprising: performing a conversion between a video unit in a video region of a video comprising multiple pictures organized as a layer-wise video sequence and a coded representation of the video; wherein one or more fields in the coded representation indicate a number of subpictures in the video unit.

8. The method of solution 7, wherein the video unit is a video picture.

9. The method of solution 7, wherein a first field of the one or more fields indicates a constraint on the number of subpictures at the video region level, and a second field is limited to zero value in case that the first field indicates that the constraint is enabled.

The following solutions show example embodiments of techniques discussed in the previous section (e.g., item 4)

10. A method of video processing, comprising: performing a conversion between a video unit in a video region of a video comprising multiple pictures organized as a layer-wise video sequence and a coded representation of the video; wherein the coded representation conforms to a format rule that specifies that a value of a second field indicative of a number of subpictures in the video unit controls whether a second field indicating applicability of a cross-subpicture coding tool to the conversion.

11. The method of solution 10, wherein the video unit is a video picture.

12. The method of any of solutions 10-11, wherein the video region is a video sequence.

13. The method of any of solutions 10-12, wherein the cross-subpicture coding tools includes an intra coding tool or an inter coding tool or a in-loop filtering tool.

The following solutions show example embodiments of techniques discussed in the previous section (e.g., items 5, 6)

14. A method of video processing, comprising: performing a conversion between a video unit in a video region of a video comprising multiple pictures organized as a layer-wise video sequence and a coded representation of the video; wherein the coded representation conforms to a format rule that specifies that a number of subpictures per video unit controls a value of a syntax element in the coded representation.

15. The method of solution 14, wherein the value of syntax element is indicative of whether a subpicture is treated as a video picture.

16. The method of solution 14, wherein the value of syntax element is indicative of whether loop filtering is enabled across subpictures.

The following solutions show example embodiments of techniques discussed in the previous section (e.g., items 7, 8)

17. A method of video processing, comprising: performing a conversion between a video unit in a video region of a video comprising multiple pictures organized as a layer-wise video sequence and a coded representation of the video; wherein the coded representation conforms to a format rule that specifies that a value of a field indicative of whether a single video slice occurs in a video unit controls a coding characteristic of rectangular slices of the video.

18. The method of solution 17, wherein the coding characteristic comprises whether a width of a rectangular slice is specified in units of tile columns in the video unit.

19. The method of solution 17, wherein the coding characteristic comprises whether a single slice is included in the subpicture.

The following solutions show example embodiments of techniques discussed in the previous section (e.g., item 9).

20. A method of video processing, comprising: performing a conversion between a video unit in a video region of a video comprising multiple pictures organized as a layer-wise video sequence and a coded representation of the video; wherein the coded representation conforms to a syntax rule that extracted subpictures across different pictures in the coded representation of the layer-wide video sequence have a same subpicture index.

21. The method of solution 20, wherein the format rule specifies that subpictures are extracted during decoding of the coded representation based on subpicture indexes.

The following solutions show example embodiments of techniques discussed in the previous section (e.g., item 10)

22. A method of video processing, comprising: performing a conversion between a video unit in a video region of a video comprising multiple pictures organized as a layer-wise video sequence and a coded representation of the video; wherein the coded representation conforms to a syntax rule that a sub-bitstream extracted for a subpicture sub-bitstream conforms to a format of a single subpicture.

The following solutions show example embodiments of techniques discussed in the previous section (e.g., item 13)

23. A method of video processing, comprising: performing a conversion between a video unit in a video region of a video comprising multiple pictures organized as a layer-wise video sequence and a coded representation of the video; wherein the coded representation conforms to a format rule that specifies inclusion of one or more constraint flags that control occurrence of one or more syntax elements in a syntax structure in the coded representation.

24. The method of solution 23, wherein the syntax structure is a sequence parameter set or a video parameter set or a picture parameter set or a picture header or a slice header.

The following solutions show example embodiments of techniques discussed in the previous section (e.g., item 14).

25. The method of any of solution 23-24, wherein the one or more syntax elements indicate a picture resolution change within the coded representation.

The following solutions show example embodiments of techniques discussed in the previous section (e.g., item 15).

26. The method of any of solutions 23-24, wherein the one or more syntax elements indicate scaling window offset parameters for the conversion.

The following solutions show example embodiments of techniques discussed in the previous section (e.g., item 16)

27. The method of any of solutions 23-24, wherein the one or more constraint flags includes a flag indicative of whether one slice per picture constraint is enabled.

The following solutions show example embodiments of techniques discussed in the previous section (e.g., item 17).

28. The method of any of solutions 23-24, wherein the one or more constraint flags includes a flag indicating whether transform is skipped during the conversion.

The following solutions show example embodiments of techniques discussed in the previous section (e.g., item 18).

29. The method of any of solutions 23-28, wherein a first constraint flag from one or more constraint flags controls occurrence of a second constraint flag in the coded representation.

30. The method of any of solutions 23-29, wherein the syntax rule specifies that the one or more constraint flags include a group of constraint flags that is grouped according to a coding tool type or a coding profile used for the conversion of the video.

31. The method of any of above solutions, wherein the video unit corresponds to a video picture.

32. The method of any of above solutions, wherein the video region corresponds to a video sequence.

33. The method of any of solutions 1 to 32, wherein the conversion comprises encoding the video into the coded representation.

34. The method of any of solutions 1 to 32, wherein the conversion comprises decoding the coded representation to generate pixel values of the video.

35. A video decoding apparatus comprising a processor configured to implement a method recited in one or more of solutions 1 to 34.

36. A video encoding apparatus comprising a processor configured to implement a method recited in one or more of solutions 1 to 34.

37. A computer program product having computer code stored thereon, the code, when executed by a processor, causes the processor to implement a method recited in any of solutions 1 to 34.

38. A method, apparatus or system described in the present document.

Figure 7:
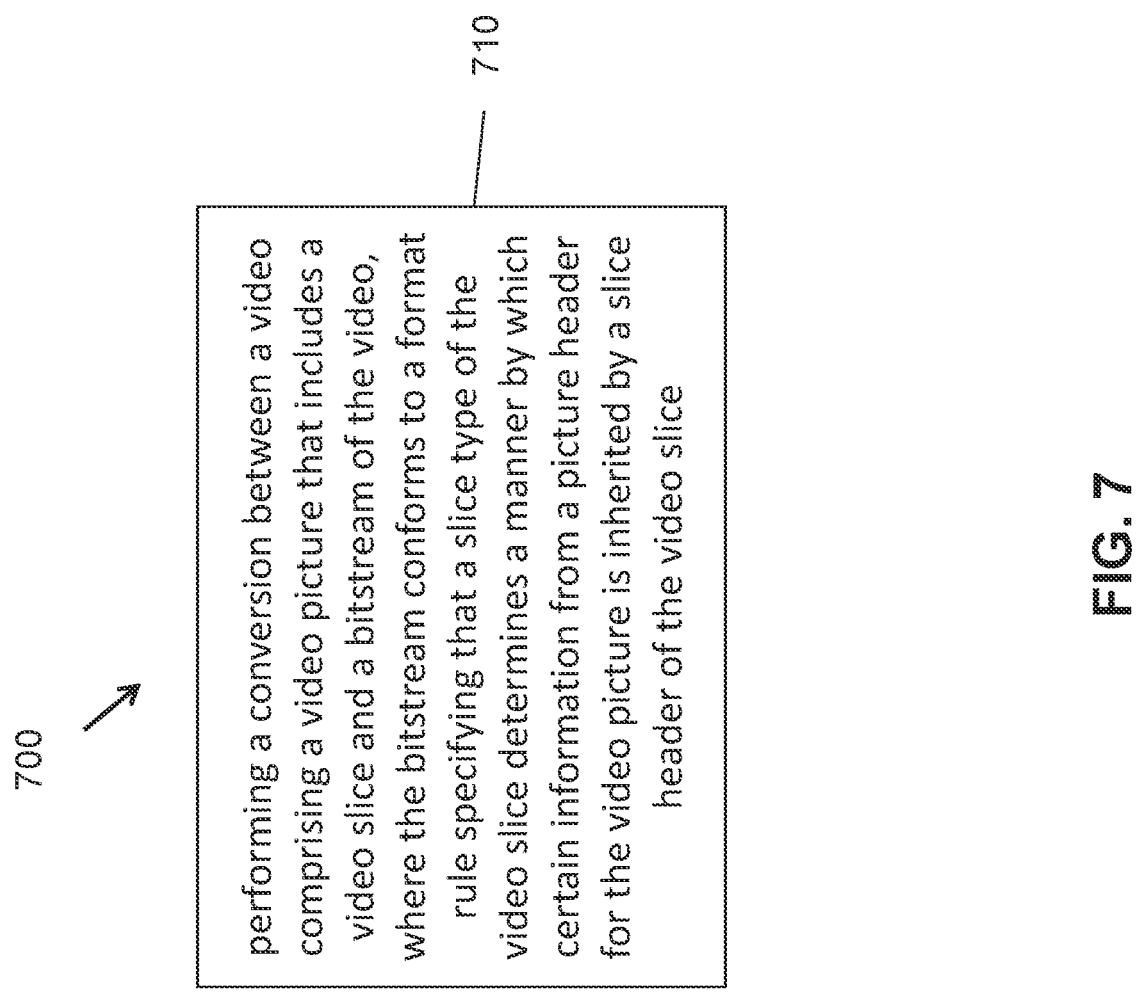
FIG. 7 is a flowchart representation of a method for video processing according to various embodiments of the present disclosure.

FIG. 7 is a flowchart representation of a method 700 for video processing in accordance with the present technology. The method 700 includes, at operation 710, performing a conversion between a video comprising a video picture that includes a video slice and a bitstream of the video. The bitstream conforms to a format rule specifying that a slice type of the video slice determines a manner by which certain information from a picture header for the video picture is inherited by a slice header of the video slice.

In some embodiments, the format rule specifies that the manner is further determined based on whether reference picture list information is present in the picture header. In some embodiments, the certain information comprises at least one of: whether a collocated picture used for temporal motion vector prediction is from a reference list 0, or a reference picture index of the collocated picture. In some embodiments, the format rule specifies that the manner is further based on whether a temporal motion vector prediction is enabled for the video slice. In some embodiments, a first syntax element in the picture header of the video picture indicates whether the temporal motion vector prediction is enabled for the video picture, and in case the slice type of the video slice is P and the first syntax element is equal to 1, the manner specifies that a value of a second syntax element in the slice header of the video slice indicating which reference picture list the video slice is collocated with is inferred to be 1 regardless of a value of a third syntax element in the picture header of the video picture indicating which reference picture list the video picture is collocated with. In some embodiments, in case the slice type of the video slice is P, the manner specifies that a value of a second syntax element in the slice header of the video slice indicating which reference picture list the video slice is collocated with is inferred to be 1 regardless of other conditions. In some embodiments, in case the slice type of the video slice is P, the manner specifies that the value of the second syntax element in the slice header of the video slice indicating which reference picture list the video slice is collocated with is inferred to be 1 in response to a temporal motion vector prediction being enabled for the video slice.

In some embodiments, a first syntax element in the picture header of the video picture indicates whether the temporal motion vector prediction is enabled for the video picture, and in case the slice type of the video slice is B and the first syntax element is equal to 1, the manner specifies that a value of a second syntax element in the slice header of the video slice indicating which reference picture list the video slice is collocated with is inferred to be equal to a fourth syntax element in the picture header of the video picture indicating which reference picture list the video picture is collocated with. In some embodiments, a syntax element in the video picture header specifies a reference index of a collocated picture of the video picture used for the temporal motion vector prediction, and the format rule specifies that a value of the syntax element is less than a variable that indicates the number of active reference entries in the reference picture list 0.

In some embodiments, a syntax element in the video slice header specifies a reference index of a collocated picture of the video picture used for the temporal motion vector prediction, and the format rule specifies that the syntax element refers to an inactive entry in a reference picture list 1. In some embodiments, the format rule further specifies that a reference picture corresponding to the inactive entry in the reference picture list 1 is also referred by an active entry in a reference picture list 0. In some embodiments, a syntax element in the video slice header specifies a reference index of a collocated picture of the video picture used for the temporal motion vector prediction is modified before being used for the conversion. In some embodiments, the syntax element is mapped to an index in a range between 0 to a number of active reference entries in the reference picture list 0 minus 1 inclusive. In some embodiments, the syntax element refers to an entry in the reference picture list 0 and is set to a default collocated reference index in case the syntax element has a value that is greater than or equal to a number of active reference entries in the reference picture list 0. The default collocated reference index is in a range between 0 and the number of active reference entries in the reference picture list 0 minus 1 inclusive. In some embodiments, the default collocated reference index is set to 0 or signalled in the bitstream.

In some embodiments, the format rule specifies that a first video slice of a first type and a second video slice of a second type referring to the same video picture header use different collocated pictures for the conversion. In some embodiments, the first type is B type of video slices and the second type is P type of video slices. In some embodiments, a reference picture list is signalled in the video picture header, and a reference picture index of a collocated picture is signalled in the video slice header. In some embodiments, the format rule specifies that the reference picture index of the collocated picture is signalled in the video slice header in case (1) the type of the slice is P, (2) the reference picture list is signalled in the video picture header, (3) the temporal motion vector prediction is enabled, and (4) the third syntax element in the video picture header being 0 indicating the video picture is not collocated with the reference picture list 0. In some embodiments, the reference picture index refers to a reference picture in the reference picture list 0.

In some embodiments, the format rule specifies a first collocated reference picture index is signalled or determined for the first video slice of type B, and a second collocated reference picture index is signalled or determined for the second video slice of type P. In some embodiments, the first collocated reference picture index and the second collocated reference picture index are signalled only in case the third syntax element in the video picture header indicates that the video picture is not collocated with the reference picture list 0.

In some embodiments, the format rule specifies that whether the first video slice of the first type and the second video slice of the second type refer to the same video picture header is signalled in the bitstream. In some embodiments, types of video slices referring to the same video picture header are signalled in the video picture header. In some embodiments, the format rule specifies that the types of video slices referring to the same video picture header are signalled in the video picture header only in case a reference picture list is signalled in the video picture header. In some embodiments, the format rule specifies that a reference picture list is signalled in the video picture header only in case the types of video slices referring to the same video picture header are signalled in the video picture header. In some embodiments, whether there are only B type of video slices referring to the same video picture header is signalled in the bitstream. In some embodiments, whether there are only P type of video slices referring to the same video picture header is signalled in the bitstream. In some embodiments, there are only B type of video slices and I type of video slices referring to the same video picture header is signalled in the bitstream. In some embodiments, there are only P type of video slices and I type of video slices referring to the same video picture header is signalled in the bitstream.

Figure 8:
FIG. 8 is a flowchart representation of another method for video processing according to various embodiments of the present disclosure.

FIG. 8 is a flowchart representation of a method 800 for video processing in accordance with the present technology. The method 800 includes, at operation 810, performing a conversion between a video comprising a video picture that includes a video slice and a bitstream of the video. The bitstream conforms to a format rule specifying that a slice type of the video slice determines a value of a first syntax element in a video slice header. The first syntax element specifies a reference index of a collocated picture used for temporal motion vector prediction.

In some embodiments, in case the slice type of the video slice is B and a value of a second syntax element in the video slice header indicating the video slice is collocated with a reference picture list 0, the first syntax element refers to an entry in a reference picture list 0. In some embodiments, the first syntax element is in a range of 0 to (a number of indices for active reference pictures−1) inclusive.

In some embodiments, in case the slice type of the video slice is P and the temporal motion vector prediction is enabled, the first syntax element is in a range of 0 to (a number of indices for active reference pictures−1) inclusive.

FIG. 9 is a flowchart representation of a method 900 for video processing in accordance with the present technology. The method 900 includes, at operation 910, performing a conversion between a video comprising a video picture that includes a video slice and a bitstream of the video. The bitstream conforms to a format rule specifying that, in case a slice type of the video slice is type P and temporal motion vector prediction is enabled, usage of reference picture resampling (RPR) for a reference picture in a collocated reference picture list is disabled. The reference picture is indicated by a reference index of a collocated picture of the video slice used for the temporal motion vector prediction.

In some embodiments, the collocated reference picture list is determined based on a syntax element in a video slice header, the syntax element indicating whether the video slice is collocated with a reference picture list 0. In some embodiments, the syntax element is inferred to be equal to 1 in case the slice type of the video slice is P and the temporal motion vector prediction is enabled. In some embodiments, the collocated reference picture list is a reference picture list 0.

FIG. 10 is a flowchart representation of a method 1000 for video processing in accordance with the present technology. The method 1000 includes, at operation 1010, performing a conversion between a video comprising a video picture that includes a video slice and a bitstream of the video. The bitstream conforms to a format rule specifying that, in case a syntax element in a video slice header indicates that the video slice is not collocated with a reference picture list 0, a slice type of the video slice excludes type P.

In some embodiments, the format rule further specifies that signalling of the slice type is omitted in the bitstream in case (1) information of a reference picture list is in a video picture header of the bitstream, (2) temporal motion vector prediction is enabled for the video picture, (3) all coded video slices of the video picture has a slice type of type B or type P, and (4) the video picture is not collocated with a reference picture list 0. In some embodiments, the slice type of the video slice is inferred to be type B.

FIG. 11 is a flowchart representation of a method 1100 for video processing in accordance with the present technology. The method 1100 includes, at operation 1110, performing a conversion between a video comprising a video picture that includes one or more subpictures and a bitstream of the video. The bitstream conforms to a format rule specifying that a first syntax element indicating whether an operation is performed across a boundary of a subpicture in the coded layer video sequence is selectively included responsive to a number of subpictures in the video picture.

In some embodiments, the format rule specifies that the first syntax element further indicates all boundaries of the subpicture in the coded layer video sequence are treated as picture boundaries. In some embodiments, the operation comprises at least one of an intra prediction, an inter prediction, or an in-loop filtering operation. In some embodiments, the format rule specifies that the syntax element is omitted in the bitstream in case the number of subpictures in the video picture is 1. In some embodiments, a value of the syntax element is inferred to be 1 indicating that no in-loop filtering operation is performed across a boundary of the subpicture. In some embodiments, the first syntax element is in a sequence parameter set. In some embodiments, the first syntax element comprises sps_independent_subpics_flag.

In some embodiments, the format rule further specifies that the number of subpictures in the video picture in the coded layer video sequence determines a manner of indicating a second syntax element indicating whether the one or more subpictures of the video picture are treated as one or more pictures for the conversion, where an in-loop filtering operation is not applied in the conversion. In some embodiments, in case the number of subpictures in the picture is 1, a value of the second syntax element is inferred to be 1 indicating that the subpicture of the video picture is treated as a picture for the conversion. In some embodiments, in case the number of subpictures in the picture is 1, a value of the second syntax element may be 1 indicating that the subpicture of the video picture is treated as a picture for the conversion.

In some embodiments, the format rule further specifies that the number of subpictures in the video picture in the coded layer video sequence determines a manner of indicating a third syntax element indicating whether an in-loop filtering operation is enabled across a boundary of a subpicture. In some embodiments, the third syntax element further indicates whether the in-loop filtering operation is applicable across a boundary of the subpicture. In some embodiments, in case the number of subpictures in the picture is 1, a value of the third syntax element is inferred to be 0 indicating that the in-loop filter operation is disabled across a boundary of the subpicture. In some embodiments, the third syntax element being inferred to be 0 further indicates the in-loop filtering operation is not applicable across a boundary of the subpicture. In some embodiments, in case the number of subpictures in the picture is 1, a value of the third syntax element may be 0 indicating that the loop filter operation is disabled across a boundary of the subpicture. In some embodiments, the third syntax element may be 0 further indicates the in-loop filtering operation is not applicable across a boundary of the subpicture.

In some embodiments, the number of subpictures is indicated by a syntax element sps_num_subpics_nimus1. In some embodiments, the number of subpictures is indicated by a syntax element one_subpic_per_pic_contraint_flag.

Figure 12:
FIG. 12 is a flowchart representation of another method for video processing according to various embodiments of the present disclosure.

FIG. 12 is a flowchart representation of a method 1200 for video processing in accordance with the present technology. The method 1200 includes, at operation 1210, performing a conversion between a video comprising a video picture that includes one or more subpictures and a bitstream of the video. The bitstream conforms to a format rule specifying that a number of subpictures in the video picture in the bitstream is constrained by a constraint flag in the bitstream.

In some embodiments, the constraint flag comprises one_subpic_per_pic_contraint_flag. In some embodiments, the number of subpictures may be 1 in case the constraint flag has a value of 1.

FIG. 13 is a flowchart representation of a method 1300 for video processing in accordance with the present technology. The method 1300 includes, at operation 1310, performing a conversion between a video comprising a video picture that includes one or more subpictures and a bitstream of the video. The bitstream conforms to a format rule specifying that a number of slices in a subpicture determines a manner of signalling a syntax element indicating a width of a slice, where the width of the slice is specified as a number of tile columns.

In some embodiments, the syntax element is omitted in the bitstream, and the width of the slice is inferred in case the number of slices in the subpicture is 1. In some embodiments, the width of the slice is inferred to be 1 tile column.

Figure 14:
FIG. 14 is a flowchart representation of another method for video processing according to various embodiments of the present disclosure.

FIG. 14 is a flowchart representation of a method 1400 for video processing in accordance with the present technology. The method 1400 includes, at operation 1410, performing a conversion between a video comprising a video picture that includes one or more subpictures and a bitstream of the video according to a format rule specifying that whether each of the one or more subpictures in the video picture includes a single slice is determined based on a constraint flag.

In some embodiments, a syntax element indicates whether each of the one or more subpictures in the video picture includes a single slice, and the constraint flag indicates whether the video picture is partitioned into more than one tile or slice. In some embodiments, a single slice indicates only one rectangular slice. In some embodiments, the syntax element is inferred to be equal to 1 in case the constraint flag indicates that the video picture is not partitioned into more than one tile or slice. In some embodiments, the syntax element is inferred to be equal to 1 in case the constraint flag indicates that no picture partitioning is applied to the video picture. In some embodiments, the syntax element is not present in the bitstream and the value of the syntax element is inferred to be equal to 1, in case the constraint flag indicates that no picture partitioning is applied to the video picture. In some embodiments, the syntax element is inferred to be equal to the constraint flag.

In some embodiments, a syntax element indicates whether each of the one or more subpictures in the video picture includes a single slice, the constraint flag indicates whether the video picture includes a single slice, and the syntax element is equal to 1 in case the constraint flag is equal to 1. In some embodiments, a syntax element indicates whether each of the one or more subpictures in the video picture includes a single slice, the constraint flag indicates whether the video picture includes a single slice, and the syntax element is equal to 1 in case the constraint flag is equal to 1 and the single slice is of a rectangular shape. In some embodiments, all video pictures controlled by the syntax element and the constraint flag refer to a same picture parameter set.

FIG. 15 is a flowchart representation of a method 1500 for video processing in accordance with the present technology. The method 1500 includes, at operation 1510, performing a conversion between a video comprising video pictures and a bitstream of the video. At least one of the video pictures includes one or more subpictures. The bitstream conforms to a format rule specifying that, for determining an output sub-bitstream of one or more target subpictures during a subpicture sub-bitstream extraction process of the conversion, each target subpicture across different video pictures uses a same subpicture index.

In some embodiments, a list of target subpicture index values for the one or more target subpictures is used as an input for the subpicture sub-bitstream extraction process, and the list of target subpicture index values is the same across different video pictures. In some embodiments, one or more subpicture identifiers across different video pictures are used for the subpicture sub-bitstream extraction process, and the one or more subpicture identifiers correspond to a same list of target subpicture indices. In some embodiments, the one or more target subpictures used for determining the output sub-bitstream in the subpicture sub-bitstream extraction process are determined based on the subpicture index.

In some embodiments, a manner of modifying syntax elements for determining the output sub-bitstream in the subpicture sub-bitstream extraction process is determined based on the subpicture index. In some embodiments, the manner of modifying the syntax elements comprises rewriting and/or removing the syntax elements. In some embodiments, in case a syntax element indicating that a subpicture identifier mapping is explicitly signalled in the bitstream, the subpicture identifier mapping is omitted in a picture parameter set. In some embodiments, in case a syntax element indicating that a subpicture identifier mapping is explicitly signalled in the bitstream, the subpicture identifier mapping is signalled in a picture parameter set.

Figure 16:
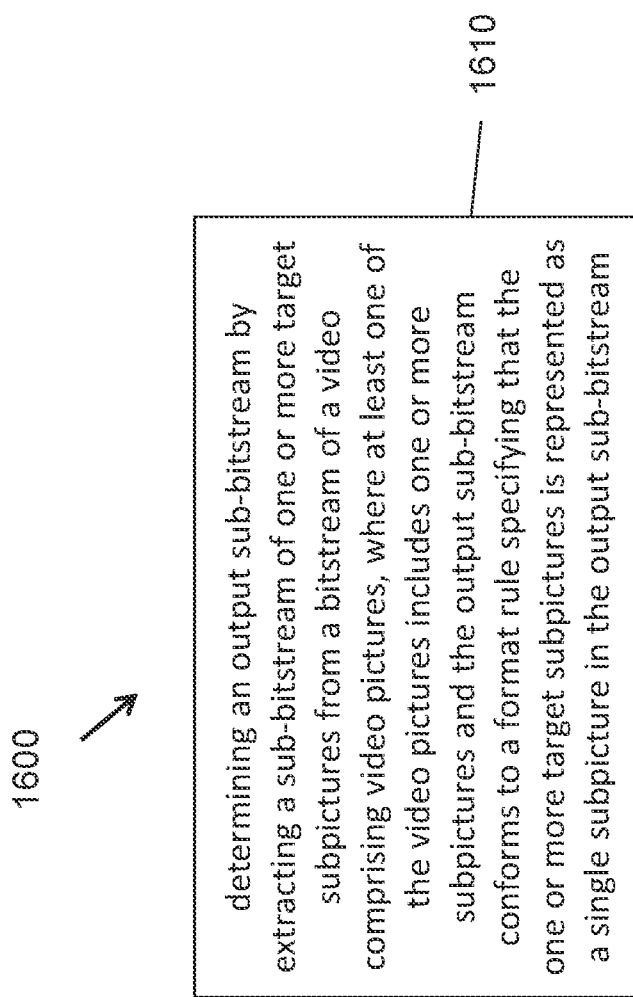
FIG. 16 is a flowchart representation of another method for video processing according to various embodiments of the present disclosure.

FIG. 16 is a flowchart representation of a method 1600 for video processing in accordance with the present technology. The method 1600 includes, at operation 1610, determining an output sub-bitstream by extracting a sub-bitstream of one or more target subpictures from a bitstream of a video comprising video pictures. At least one of the video pictures includes one or more subpictures and the output sub-bitstream conforms to a format rule specifying that the one or more target subpictures is represented as a single subpicture in the output sub-bitstream.

In some embodiments, one or more syntax elements of the output sub-bitstream are rewritten and/or removed for the determining. In some embodiments, one or more syntax elements referred to the one or more target subpictures in all output layers are omitted in the output sub-bitstream responsive to representing the one or more target subpictures as the single subpicture in the output sub-bitstream. In some embodiments, the one or more syntax elements include a first syntax element indicating whether the subpicture is treated as a picture. In some embodiments, the first syntax element is inferred to be equal to 1 indicating that the subpicture is treated as a picture. In some embodiments, the one or more syntax elements include a second syntax element indicating whether a loop filter operation is enabled across a boundary of the subpicture. In some embodiments, the second syntax element is inferred to be equal to 0 indicating that the loop filter operation is disabled across a boundary of the subpicture.

In some embodiments, a third syntax element in all referred syntax structures of a sequence parameter set and a fourth syntax element in all referred syntax structures of a picture parameter set are modified to be 0, the third syntax element and the fourth syntax element indicating a number of subpictures in a video picture minus 1. In some embodiments, a fifth syntax element indicating whether an operation is performed across a boundary of the subpicture is modified to be equal to 1. In some embodiments, a sixth syntax element indicating whether a video picture is partitioned is modified in a syntax structure referred in the sub-bitstream. In some embodiments, the sixth syntax element is conditionally modified based on a number of tiles or slices in the subpicture. In some embodiments, in case the subpicture includes a single tile or slice, the sixth syntax element is modified to be equal to 1 indicating that the video picture is not partitioned. In some embodiments, in case the number of tiles or slices in the subpicture is greater than 1, the sixth syntax element is modified to be equal to 0 indicating that the video picture is partitioned.

FIG. 17 is a flowchart representation of a method 1700 for video processing in accordance with the present technology. The method 1700 includes, at operation 1710, performing a conversion between a video comprising an instantaneous decoding refresh (IDR) picture and a bitstream of the video. The bitstream conforms to a format rule specifying that one or more syntax elements associated with a reference picture list are present in a slice header of the IDR picture.

In some embodiments, a syntax flag indicates that the one or more syntax elements are present in the slice header of the IDR picture. In some embodiments, the syntax flag is set to be equal to 1.

In some embodiments, the conversion comprises determining an output bitstream by merging two input bitstreams of the video. A network abstraction layer (NAL) unit type of one of the two input bitstreams is an intra random access point (IRAP) video coding layer (VCL) NAL unit type, and the reference picture list of the IDR picture is available for the conversion.

FIG. 18 is a flowchart representation of a method 1800 for video processing in accordance with the present technology. The method 1800 includes, at operation 1810, performing a conversion between a video comprising luma video blocks and chroma video blocks and a bitstream of the video. The luma video blocks are partitioned according to luma partition trees, and the chroma video blocks are partitioned according to chroma partition trees. The bitstream includes luma block splitting information indicative of the luma partition trees and chroma block splitting information indicative of the chroma partition trees. The bitstream conforms to a rule specifying that the chroma block splitting information is allowed to be different from the luma block splitting information.

In some embodiments, the luma video block or the chroma video block comprises a coding tree block, a transform block, a picture block, or a coding block. In some embodiments, the chroma partition trees comprise a chroma dual tree, and at least a splitting structure or a splitting syntax element of the chroma video blocks is different from a splitting structure or a splitting syntax element of the luma video blocks. In some embodiments, the luma partition tree comprises a local dual tree, and at least a splitting structure or a splitting syntax element of the chroma video blocks is different from a splitting structure or a splitting syntax element of the luma video blocks.

FIG. 19 is a flowchart representation of a method 1900 for video processing in accordance with the present technology. The method 1900 includes, at operation 1910, performing a conversion between a video comprising video pictures that include one or more subpictures and a bitstream of the video. The bitstream conforms to a format rule specifying that that one or more syntax structures are constrained based on a constraint flag of a syntax element that includes general constraints information.

In some embodiments, the constraint flag comprises one tile_per_pic_constraint_flag indicating whether each video picture in one or more output layer sets specified by a video parameter set includes a single tile, and the one or more syntax structures comprise a first syntax structure NumTilesInPic indicating a number of tiles in a picture that is constrained to be 1 in case one_tile_per_pic_constraint_flag is equal to 1. In some embodiments, the constraint flag comprises one_slice_per_pic_constraint_flag indicating whether each video picture in one or more output layer sets specified by a video parameter set includes a single slice, and the one or more syntax structures comprise a second syntax element num_slices_in_pic_minus1 indicating a number of rectangular slices in each video picture minus 1. In some embodiments, the second syntax element num_slices_in_pic_minus1 is constrained to be 0 in case one_slice_per_pic_constraint_flag is equal to 1 and another syntax element rect_slice_flag indicating usage of rectangular slices in video pictures is equal to 1. In some embodiments, the second syntax element num_slices_in_pic_minus1 in each slice header of the bitstream is constrained to be equal to a number of tiles in a video picture minus 1 in case one_slice_per_pic_constraint_flag is equal to 1 and another syntax element rect_slice_flag indicating usage of rectangular slices in video pictures is equal to 0.

In some embodiments, the constraint flag comprises one_subpic_per_pic_constraint flag indicating whether a video picture includes a single subpicture, and wherein the one or more syntax elements comprise a third syntax element sps_num_subpics_minus1 indicating a number of subpictures in a video picture that is constrained to be 0 in case one_subpic_per_pic_constraint is equal to 1. In some embodiments, the constraint flag comprises a flag indicating whether sps_subpic_info_present_flag for all pictures in one or more output layer sets specified by a video parameter set is equal to 0, and wherein the one or more syntax structures comprise a third syntax element sps_num_subpics_minus1 indicating a number of subpictures in a video picture that is constrained to be 0 in case one_subpic_per_pic_constraint is equal to 1. In some embodiments, sps_subpic_info_present_flag being equal to 0 indicates that each video picture includes a single subpicture and subpicture information is not present.

In some embodiments, the one or more syntax elements are in a slice parameter set, a video parameter set, a picture parameter set, a picture header, or a slice header. In some embodiments, the one or more syntax elements comprise a syntax flag indicating whether a coding tool is enabled or not. In some embodiments, the syntax flag is constrained to be 0 indicating the coding tool is disabled in case the constraint flag is equal to 1. In some embodiments, the syntax flag is overridden based on the constraint flag.

In some embodiments, whether the syntax flag is present in the bitstream is based on the constraint flag. In some embodiments, the syntax flag is omitted in the bitstream in case the constraint flag is equal to 1. In some embodiments, the syntax flag is inferred to be 0 indicating that the coding tool is disabled.

In some embodiments, the constraint flag indicates that there is no resolution change in a coded layer video sequence (CLVS), and wherein the one or more syntax elements comprise a first syntax element in a sequence parameter set indicating whether a resolution change is allowed in the CLVS. In some embodiments, the first syntax element is omitted in the bitstream in case the constraint flag is equal to 1. In some embodiments, the first syntax element is inferred to be 0 indicating that the resolution change is disallowed in the CLVS.

In some embodiments, the one or more syntax elements further comprise a second syntax element indicating a scaling window offset parameter, and whether the second syntax element is present in the bitstream is based on at least the constraint flag or the first syntax element. In some embodiments, the second syntax element is omitted in the bitstream in case the first syntax element is equal to 0 indicating the resolution change is disallowed in the CLVS. In some embodiments, the second syntax element is omitted in the bitstream in case the constraint flag is equal to 1 indicating that there is no resolution change in the CLVS. In some embodiments, the second syntax element is inferred to be 0.

In some embodiments, the constraint flag comprises one_slice_per_pic_constraint_flag indicating whether a video picture includes a single slice, and the one or more syntax elements comprise a syntax flag one_subpic_per_pic_constraint_flag indicating whether a video picture includes a single subpicture. In some embodiments, the syntax flag one_subpic_per_pic_constraint_flag is omitted in the bitstream in case the constraint flag is equal to 1, and wherein the syntax flag is inferred to be 1 indicating that a video picture includes a single subpicture. In some embodiments, the syntax flag one_subpic_per_pic_constraint_flag is included in the bitstream in case the constraint flag is equal to 0. In some embodiments, the constraint flag comprises no_transform_skip_constraint_flag indicating whether transform skip is disallowed for the conversion, and the one or more syntax elements comprise a syntax flag no_bdpcm_constraint flag indicating whether a block differential pulse-code modulation (BDPCM) coding tool is disallowed. In some embodiments, the syntax flag is constrained to be 1 indicating that the BDPCM coding tool is disallowed in case the constraint flag is equal to 1 indicating that transform skip is disallowed. In some embodiments, the syntax flag is omitted in the bitstream in case the constraint flag is equal to 1 indicating that transform skip is disallowed. In some embodiments, the syntax flag is inferred to be 1 indicating that the BDPCM coding tool is disallowed.

In some embodiments, whether the constraint flag is present in the bitstream is based on at least one other constraint flag in the syntax structure. In some embodiments, the at least one other constraint flag is defined as a constraint group flag. In some embodiments, multiple constraint flags are grouped based on a coding tool type of a profile of the video. In some embodiments, a value of a constraint flag in one group is determined based on a corresponding constraint group flag. In some embodiments, whether a constraint flag is present in the bitstream is determined based on a corresponding constraint group flag. In some embodiments, the constraint flag is inferred to be 0 in case the constraint flag is omitted in the bitstream.

In some embodiments, the conversion comprises encoding the video into the bitstream. In some embodiments, the conversion comprises decoding the video from the bitstream.

In the present document, the term "video processing" may refer to video encoding, video decoding, video compression or video decompression. For example, video compression algorithms may be applied during conversion from pixel representation of a video to a corresponding bitstream representation or vice versa. The bitstream (coded) representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, a video encoder may perform an encoding operation according to the described format rule such that the coded representation that is produced by the encoding operation conforms to the format. Similarly, a decoder may parse the coded representation with the knowledge of the format rule (e.g., whether to expect presence or absence of certain fields according to the format rule) and perform decoding operation to generate video pixel values.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically EPROM (EEPROM), and flash memory devices; magnetic disks, e.g., internal hard disks or removable disks; magneto optical disks; and compact disc read-only memory (CD ROM) and digital versatile disc read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
performing a conversion between a video comprising video pictures that include one or more subpictures and a bitstream of the video,
wherein the bitstream conforms to a format rule specifying that one or more syntax elements are constrained based on one or more constraint flags of general constraints information,
wherein the one or more constraint flags comprise a first constraint flag indicating whether each video picture in an output layer set contains only one slice,
wherein the one or more syntax elements comprises a first syntax element present in each slice header of the output layer set, wherein a value of the first syntax element plus 1 indicates a number of tiles in a slice,
wherein when the first constraint flag is equal to 1 and a second syntax element indicating whether a rectangular slice is in use for each video picture is equal to 0, the first syntax element is constrained to be equal to a variable minus 1,
wherein the variable indicates a number of tiles in a video picture,
wherein the first constraint flag being equal to 1 indicates that each video picture contains only one slice, and
wherein the second syntax element being equal to 0 indicates that the rectangular slice is not in use for each video picture.

2. The method of claim 1, wherein the one or more syntax elements further comprises a third syntax element, a value of which plus 1 indicates a number of rectangular slices in each video picture, wherein the third syntax element is constrained to be equal to 0 when the first constraint flag is equal to 1 and the second syntax element is equal to 1, and wherein the second syntax element being equal to 1 indicates that the rectangular slice is in use for each video picture.

3. The method of claim 1, wherein the variable is constrained to be equal to 1 when a second constraint flag indicating whether each video picture in the output layer set contains only one tile is equal to 1, and wherein the second constraint flag being equal to 1 indicates that each video picture in the output layer set contains only one tile.

4. The method of claim 1, wherein the one or more constraint flags further comprise a third constraint flag indicating whether a video picture comprises only one subpicture and whether subpicture information is present, wherein the one or more syntax elements further comprise a fourth syntax element, a value of which plus 1 indicates a number of subpictures in the video picture, wherein the fourth syntax element is constrained to be 0 when the third constraint flag is equal to 1, and wherein the third constraint flag being equal to 1 indicates that the video picture comprises only one subpicture and the subpicture information is not present.

5. The method of claim 1, wherein the conversion comprises encoding the video into the bitstream.

6. The method of claim 1, wherein the conversion comprises decoding the video from the bitstream.

7. An apparatus for processing video data comprising a processor and a non-transitory memory with instructions thereon, wherein the instructions upon execution by the processor, cause the processor to:
perform a conversion between a video comprising video pictures that include one or more subpictures and a bitstream of the video, wherein the bitstream conforms to a format rule specifying that one or more syntax elements are constrained based on one or more constraint flags of general constraints information, wherein the one or more constraint flags comprise a first constraint flag indicating whether each video picture in an output layer set contains only one slice, wherein the one or more syntax elements comprises a first syntax element present in each slice header of the output layer set, wherein a value of the first syntax element plus 1 indicates a number of tiles in a slice, wherein when the first constraint flag is equal to 1 and a second syntax element indicating whether a rectangular slice is in use for each video picture is equal to 0, the first syntax element is constrained to be equal to a variable minus 1, wherein the variable indicates a number of tiles in a video picture, wherein the first constraint flag being equal to 1 indicates that each video picture contains only one slice, and wherein the second syntax element being equal to 0 indicates that the rectangular slice is not in use for each video picture.

8. The apparatus of claim 7, wherein the one or more syntax elements further comprises a third syntax element, a value of which plus 1 indicates a number of rectangular slices in each video picture, wherein the third syntax element is constrained to be equal to 0 when the first constraint flag is equal to 1 and the second syntax element is equal to 1, and wherein the second syntax element being equal to 1 indicates that the rectangular slice is in use for each video picture.

9. The apparatus of claim 7, wherein the variable is constrained to be equal to 1 when a second constraint flag indicating whether each video picture in the output layer set contains only one tile is equal to 1, and wherein the second constraint flag being equal to 1 indicates that each video picture in the output layer set contains only one tile.

10. The apparatus of claim 7, wherein the one or more constraint flags further comprise a third constraint flag indicating whether a video picture comprises only one subpicture and whether subpicture information is present, wherein the one or more syntax elements further comprise a fourth syntax element, a value of which plus 1 indicates a number of subpictures in the video picture, wherein the fourth syntax element is constrained to be 0 when the third constraint flag is equal to 1, and wherein the third constraint flag being equal to 1 indicates that the video picture comprises only one subpicture and the subpicture information is not present.

11. The apparatus of claim 7, wherein the apparatus is an encoder.

12. The apparatus of claim 7, wherein the apparatus is a decoder.

13. A non-transitory computer-readable storage medium storing instructions that cause a processor to:

perform a conversion between a video comprising video pictures that include one or more subpictures and a bitstream of the video, wherein the bitstream conforms to a format rule specifying that one or more syntax elements are constrained based on one or more constraint flags of general constraints information, wherein the one or more constraint flags comprise a first constraint flag indicating whether each video picture in an output layer set contains only one slice, wherein the one or more syntax elements comprises a first syntax element present in each slice header of the output layer set, wherein a value of the first syntax element plus 1 indicates a number of tiles in a slice, wherein when the first constraint flag is equal to 1 and a second syntax element indicating whether a rectangular slice is in use for each video picture is equal to 0, the first syntax element is constrained to be equal to a variable minus 1, wherein the variable indicates a number of tiles in a video picture, wherein the first constraint flag being equal to 1 indicates that each video picture contains only one slice, and wherein the second syntax element being equal to 0 indicates that the rectangular slice is not in use for each video picture.

14. The non-transitory computer-readable storage medium of claim 13, wherein the one or more syntax elements further comprises a third syntax element, a value of which plus 1 indicates a number of rectangular slices in each video picture, wherein the third syntax element is constrained to be equal to 0 when the first constraint flag is equal to 1 and the second syntax element is equal to 1, and wherein the second syntax element being equal to I indicates that the rectangular slice is in use for each video picture.

15. The non-transitory computer-readable storage medium of claim 13, wherein the variable is constrained to be equal to 1 when a second constraint flag indicating whether each video picture in the output layer set contains only one tile is equal to 1, and wherein the second constraint flag being equal to 1 indicates that each video picture in the output layer set contains only one tile.

16. The non-transitory computer-readable storage medium of claim 13, wherein the one or more constraint flags further comprise a third constraint flag indicating whether a video picture comprises only one subpicture and whether subpicture information is present, wherein the one or more syntax elements further comprise a fourth syntax element, a value of which plus 1 indicates a number of subpictures in the video picture, wherein the fourth syntax element is constrained to be 0 when the third constraint flag is equal to 1, and wherein the third constraint flag being equal to 1 indicates that the video picture comprises only one subpicture and the subpicture information is not present.

17. A non-transitory computer-readable recording medium storing a bitstream of a video which is generated by a method performed by a video processing apparatus, wherein the method comprises:

generating the bitstream of the video comprising video pictures that include one or more subpictures, wherein the bitstream conforms to a format rule specifying that one or more syntax elements are constrained based on one or more constraint flags of general constraints information, wherein the one or more constraint flags comprise a first constraint flag indicating whether each video picture in an output layer set contains only one slice, wherein the one or more syntax elements comprises a first syntax element present in each slice header of the output layer set, wherein a value of the first syntax element plus 1 indicates a number of tiles in a slice, wherein when the first constraint flag is equal to 1 and a second syntax element indicating whether a rectangular slice is in use for each video picture is equal to 0, the first syntax element is constrained to be equal to a variable minus 1, wherein the variable indicates a number of tiles in a video picture, wherein the first constraint flag being equal to 1 indicates that each video picture contains only one slice, and wherein the second syntax element being equal to 0 indicates that the rectangular slice is not in use for each video picture.

18. The non-transitory computer-readable recording medium of claim 17, wherein the one or more syntax elements further comprises a third syntax element, a value of which plus 1 indicates a number of rectangular slices in each video picture, wherein the third syntax element is constrained to be equal to 0 when the first constraint flag is equal to 1 and the second syntax element is equal to 1, and wherein the second syntax element being equal to I indicates that the rectangular slice is in use for each video picture.

19. The non-transitory computer-readable recording medium of claim 17, wherein the variable is constrained to be equal to 1 when a second constraint flag indicating whether each video picture in the output layer set contains only one tile is equal to 1, and wherein the second constraint flag being equal to 1 indicates that each video picture in the output layer set contains only one tile.

20. The non-transitory computer-readable recording medium of claim 17, wherein the one or more constraint flags further comprise a third constraint flag indicating whether a video picture comprises only one subpicture and whether subpicture information is present, wherein the one or more syntax elements further comprise a fourth syntax element, a value of which plus 1 indicates a number of subpictures in the video picture, wherein the fourth syntax element is constrained to be 0 when the third constraint flag is equal to 1, and wherein the third constraint flag being equal to 1 indicates that the video picture comprises only one subpicture and the subpicture information is not present.

* * * * *